United States Patent
Yoon

(10) Patent No.: US 7,190,825 B2
(45) Date of Patent: Mar. 13, 2007

(54) PORTABLE COMMUNICATION DEVICE FOR STEREOSCOPIC IMAGE DISPLAY AND TRANSMISSION

(75) Inventor: Byoungyi Yoon, Ulsan (KR)

(73) Assignee: Geo-Rae Co., Ltd., Ulsan Gwang-yeok-si (KR)

( * ) Notice: Subject to any disclaimer, the term of this patent is extended or adjusted under 35 U.S.C. 154(b) by 712 days.

(21) Appl. No.: 10/280,179

(22) Filed: Oct. 24, 2002

(65) Prior Publication Data

US 2003/0108236 A1    Jun. 12, 2003

Related U.S. Application Data

(63) Continuation of application No. PCT/KR01/01398, filed on Aug. 17, 2001.

(30) Foreign Application Priority Data

| Oct. 30, 2001 | (KR) | 10-2001-0067245 |
| Oct. 30, 2001 | (KR) | 10-2001-0067246 |
| Feb. 27, 2002 | (KR) | 10-2002-0010422 |
| Feb. 27, 2002 | (KR) | 10-2002-0010423 |
| Feb. 27, 2002 | (KR) | 10-2002-0010424 |

(51) Int. Cl.
  *G06K 9/00*  (2006.01)
  *G06K 9/40*  (2006.01)

(52) U.S. Cl. ............................ 382/154; 382/275

(58) Field of Classification Search ............. 382/154, 382/275; 345/419; 348/47, 51, 52
See application file for complete search history.

(56) References Cited

U.S. PATENT DOCUMENTS

| 4,418,993 A | 12/1983 | Lipton |
| 4,729,017 A | 3/1988 | Sayanagi et al. |
| 4,734,756 A | 3/1988 | Butterfield et al. |
| 4,740,836 A | 4/1988 | Craig |

(Continued)

FOREIGN PATENT DOCUMENTS

JP            4-035395       2/1992

(Continued)

OTHER PUBLICATIONS

Selker, et al. "Eye-R, a Glasses-Mounted Eye Motion Detection Interface", MIT Media Lab, Sep. 2002.

(Continued)

*Primary Examiner*—Daniel Mariam
(74) *Attorney, Agent, or Firm*—Knobbe Martens Olson & Bear LLP

(57) ABSTRACT

In a method and system of correcting deformation of a 3-D image, display of different sense of distance as a photographing ratio of the left and right cameras (11 and 12) to the object (60) changes according to the movement of the object or magnification and reduction photographing of the object by the cameras, and display of a 3-D image partially deformed as the distance between the left and right eyes (51 and 52)) of a viewer changes, are corrected by the magnification and reduction control of the left and right images by the left and right image magnifying and reducing apparatus (21 and 22) and the movement of the left and right images (41 and 42). Thus, an actual shape of the object is displayed so that the quality of a 3-D image is improved.

18 Claims, 86 Drawing Sheets

U.S. PATENT DOCUMENTS

| | | | |
|---|---|---|---|
| 4,951,075 A | 8/1990 | Tokumaru et al. | |
| 4,994,898 A | 2/1991 | Ling et al. | |
| 4,999,713 A | 3/1991 | Ueno et al. | |
| 5,175,616 A | 12/1992 | Milgram et al. | |
| 5,181,181 A | 1/1993 | Glynn | |
| 5,355,163 A | 10/1994 | Tomitaka | |
| 5,357,277 A | 10/1994 | Nakayoshi et al. | |
| 5,526,089 A | 6/1996 | Sato et al. | |
| 5,532,716 A | 7/1996 | Sano | |
| 5,625,408 A * | 4/1997 | Matsugu et al. | 348/42 |
| 5,638,461 A | 6/1997 | Fridge | |
| 5,640,222 A | 6/1997 | Paul | |
| 5,727,242 A | 3/1998 | Lo et al. | |
| 5,805,168 A | 9/1998 | Minakata | |
| 5,844,599 A | 12/1998 | Hildin | |
| 5,850,352 A | 12/1998 | Moezzi et al. | |
| 5,949,477 A | 9/1999 | Hoglin | |
| 5,978,143 A | 11/1999 | Spruck | |
| 5,993,004 A | 11/1999 | Moseley et al. | |
| 6,005,607 A | 12/1999 | Uomori et al. | |
| 6,025,883 A | 2/2000 | Jun | |
| 6,042,231 A | 3/2000 | Fateh | |
| 6,072,462 A | 6/2000 | Movshovich | |
| 6,078,423 A | 6/2000 | Orr et al. | |
| 6,101,338 A | 8/2000 | Bernardi et al. | |
| 6,172,700 B1 | 1/2001 | Obata | |
| 6,175,379 B1 | 1/2001 | Uomori et al. | |
| 6,178,043 B1 | 1/2001 | Son et al. | |
| 6,204,876 B1 | 3/2001 | Uomori et al. | |
| 6,208,348 B1 | 3/2001 | Kaye | |
| 6,215,516 B1 | 4/2001 | Ma et al. | |
| 6,220,709 B1 | 4/2001 | Heger | |
| 6,268,880 B1 | 7/2001 | Uomori et al. | |
| 6,285,757 B1 | 9/2001 | Carroll et al. | |
| 6,307,585 B1 | 10/2001 | Hentschke | |
| 6,307,589 B1 | 10/2001 | Maquire, Jr. | |
| 6,327,381 B1 | 12/2001 | Rogina et al. | |
| 6,333,757 B1 * | 12/2001 | Faris | 348/60 |
| 6,388,666 B1 | 5/2002 | Murray | |
| 6,414,716 B1 | 7/2002 | Kawai | |
| 6,417,880 B1 | 7/2002 | Uomori et al. | |
| 6,449,309 B1 | 9/2002 | Tabata | |
| 6,476,850 B1 | 11/2002 | Erbey | |
| 6,507,359 B1 | 1/2003 | Muramoto et al. | |
| 6,535,226 B1 | 3/2003 | Sorokin et al. | |
| 6,583,808 B2 * | 6/2003 | Boulanger et al. | 348/14.09 |
| 6,625,408 B1 | 9/2003 | Buch et al. | |
| 6,712,700 B1 | 3/2004 | Imai et al. | |
| 6,747,610 B1 | 6/2004 | Taima et al. | |
| 6,750,913 B1 | 6/2004 | Noro et al. | |
| 6,752,498 B2 | 6/2004 | Covannon et al. | |
| 2001/0024231 A1 | 9/2001 | Nakamura et al. | |
| 2001/0033327 A1 | 10/2001 | Uomori et al. | |
| 2001/0052123 A1 | 12/2001 | Kawai | |
| 2002/0008906 A1 | 1/2002 | Tomita | |
| 2003/0063778 A1 * | 4/2003 | Rowe et al. | 382/115 |
| 2003/0108236 A1 | 6/2003 | Yoon | |
| 2003/0206653 A1 | 11/2003 | Katayama et al. | |
| 2005/0206583 A1 | 9/2005 | Lemeison et al. | |

FOREIGN PATENT DOCUMENTS

| | | |
|---|---|---|
| JP | 09-074573 | 3/1997 |
| JP | 9-074573 | 3/1997 |
| JP | 2002-92656 | 3/2002 |
| KR | 97-0004916 | 1/1997 |
| KR | 10-0276681 | 10/2000 |
| KR | 01-0001341 | 1/2001 |
| KR | 0327874 | 2/2002 |
| KR | 2002-19118 | 3/2002 |
| KR | 2002-79268 | 10/2002 |

OTHER PUBLICATIONS

Robert D. Poor. The Need for "Digital Glue", Jan. 1999, MIT Media Laboratory, http://web.media.mit.edu/~r/projects/picsem/irx2/.

R. Jacob, Eye Tracking in Advanced Interface Design. in Virtual Environments and Advanced Interface Design. Oxford University Press, 258-288, 1995.

F. Kanfer. Verbal Rate, Eyeblink, and Content in Structured Psychiatric Interviews. in Journal of Abnormal and Social Psychology (vol. 61, No. 3), pp. 341-347, 1960.

H. Liberman and T. Selker, Out of Context: Computer Systems That Adapt To, and Learn From, Context, in IBM Systems, Journal 39, Nos. 3&4, 617-632, 2000.

Fisher Ralph, "remote Viewing System"1973, Remotely Manned Systems pp. 229-238.

* cited by examiner

| | SCALE | A | B | C |
|---|---|---|---|---|
| MAXIMUM PHOTGRAPHING RATIO | ∞ | 3 | 2 | 1 |
| MINIMUM PHOTGRAPHING RATIO | 0.3m | 1.5 | 1 | 1 |

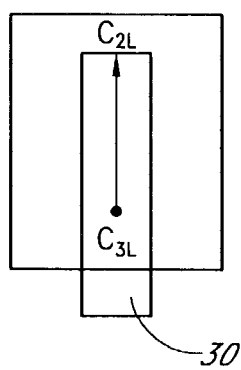 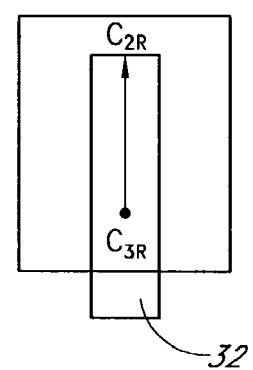
FIG. 27A
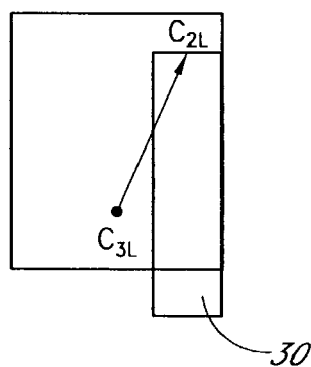 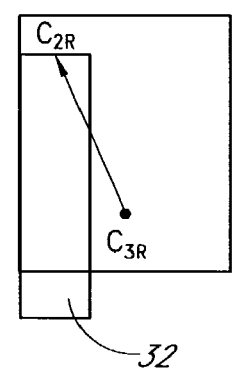
FIG. 27B
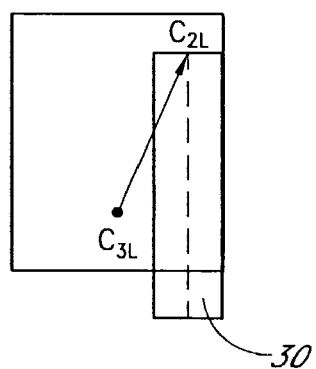 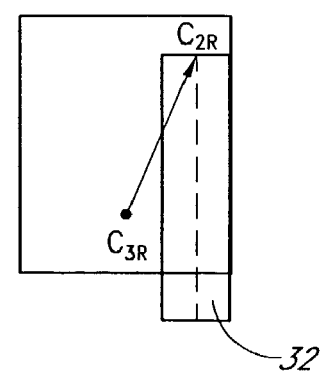
FIG. 27C

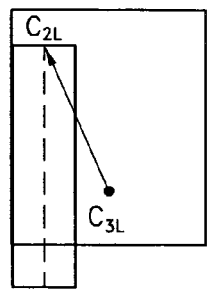
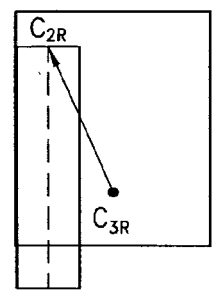
FIG. 27D
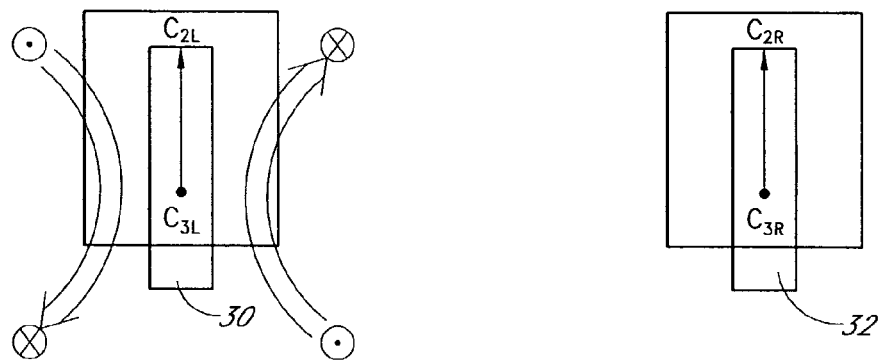
FIG. 27E
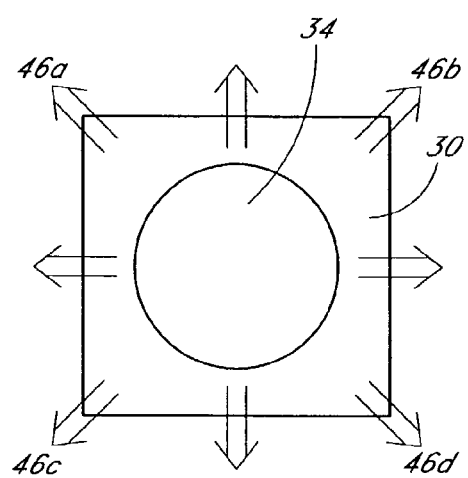
FIG. 27F

| (X,Y), mm | HORIZONTAL MOTOR | VERTICLE MOTOR |
|---|---|---|
| (0,0) | | |
| (1,0) | 2° CLOCKWISE | |
| (0,1) | | 2° +LATITUDINAL |
| (−1,0) | 2° COUNTER CLOCKWISE | |
| (2,2) | 4° CLOCKWISE | 4° +LATITUDINAL |
| (−3,−3) | 6° COUNTER CLOCKWISE | 6° −LATITUDINAL |
| (0,−2) | | 4° −LATITUDINAL |
| ⋮ | ⋮ | ⋮ |

FIG. 32A

| CAMERA ADJUSTING VALUE | CAMERA |
|---|---|
| (0,0) | C33 |
| (1,0) | C34 |
| (0,1) | C23 |
| (-1,0) | C32 |
| (2,2) | C15 |
| (-1,-1) | C42 |
| (0,-2) | C53 |
| ⋮ | ⋮ |

*FIG. 35*

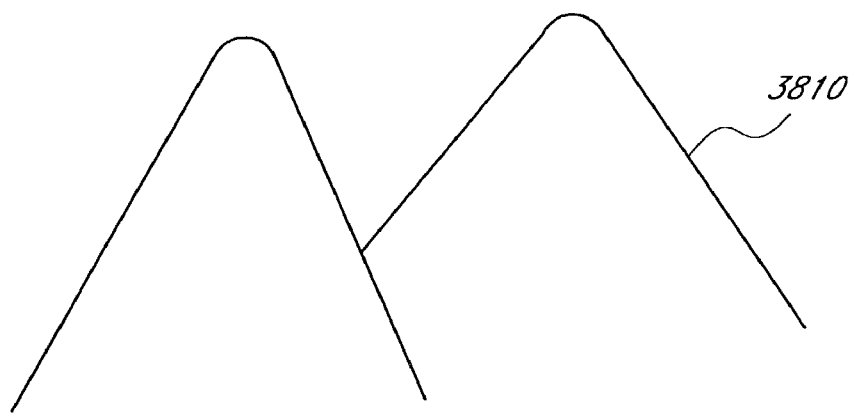
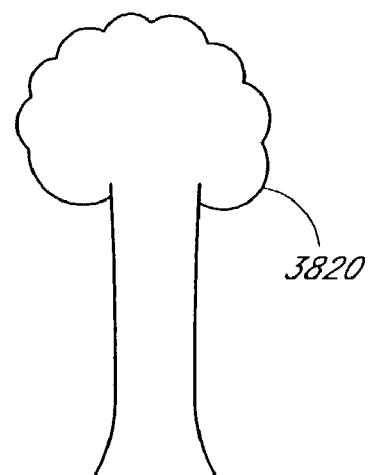
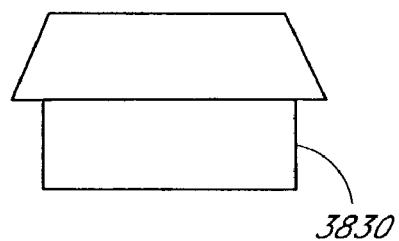
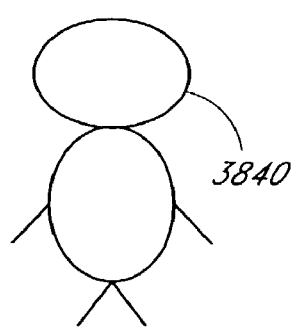
FIG. 39

CAMERA

DISPLAY DEVICE

EYE

| SPACE MAGNIFICATION | CAMERA DISTANCE |
|---|---|
| 1 | 80 mm |
| 10 | 8 mm |
| 0.1 | 800 mm |
| 5 | 16 mm |
| 0.5 | 160 mm |
| ⋮ | ⋮ |

FIG. 52

| CAMERA MOTION DETECTION (LEFT, RIGHT) | DISPLAY (LEFT, RIGHT) |
|---|---|
| (0, 10° COUNTER CLOCKWISE) | (0, 10° CLOCKWISE) |
| (10° CLOCKWISE, 0) | (10° COUNTER CLOCKWISE, 0) |
| (10° COUNTER CLOCKWISE, 10° CLOCKWISE) | (10° CLOCKWISE, 10° COUNTER CLOCKWISE) |
| ⋮ | ⋮ |

FIG. 55

| |
|---|
| Photographing ratio |
| Left image 1 |
| Right image 1 |
| Left image 2 |
| Right image 2 |
| |
| ⋮ |

FIG. 63

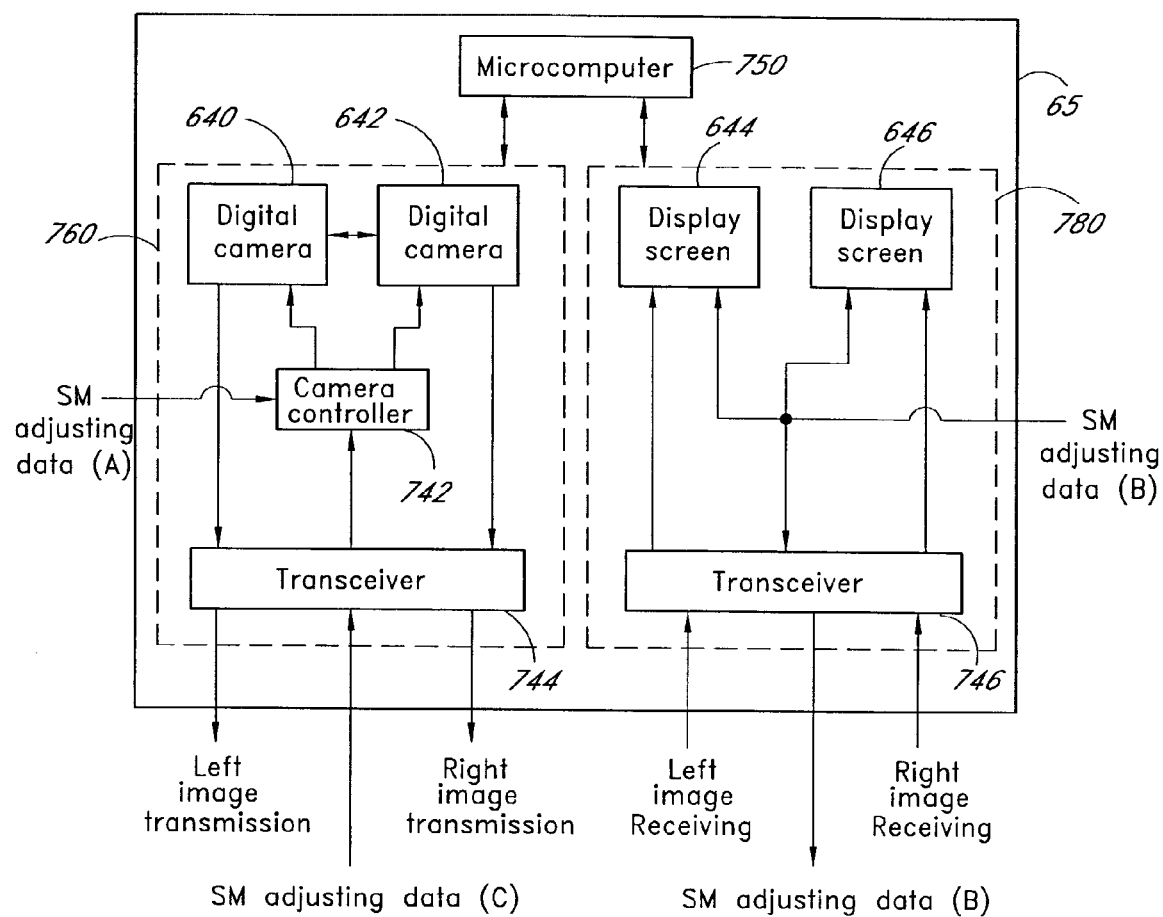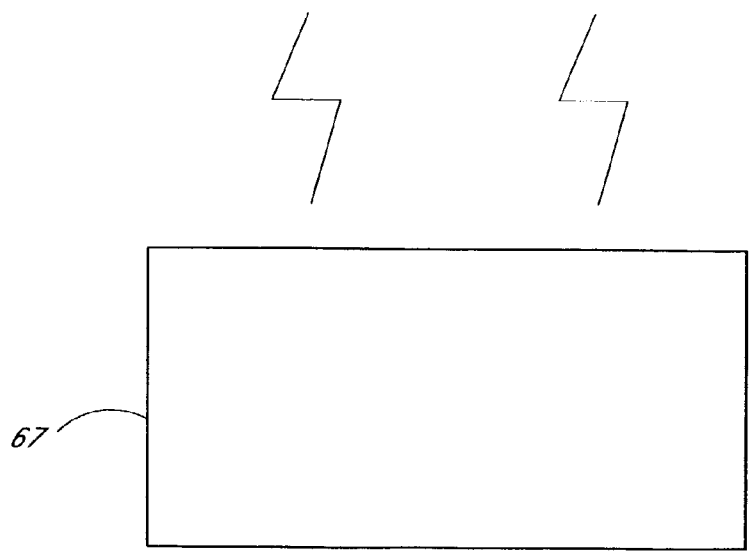
FIG. 67

PORTABLE COMMUNICATION DEVICE FOR STEREOSCOPIC IMAGE DISPLAY AND TRANSMISSION

RELATED APPLICATIONS

This application is a continuation application, and claims the benefit under 35 U.S.C. §§ 120 and 365 of PCT application No. PCT/KR01/01398 filed on Aug. 17, 2001 and published on Feb. 21, 2002, in English, which is hereby incorporated by reference herein. This application is related to, and hereby incorporates by reference, the following patent applications:

U.S. patent application entitled "METHOD AND SYSTEM FOR CALCULATING A PHOTOGRAPHING RATIO OF A CAMERA", filed on even date herewith and having application Ser. No. 10/280,239;

U.S. patent application entitled "METHOD AND SYSTEM FOR CONTROLLING A SCREEN RATIO BASED ON A PHOTOGRAPHING RATIO", filed on even date herewith and having application Ser. No. 10/280,246;

U.S. patent application entitled "METHOD AND SYSTEM FOR CONTROLLING THE DISPLAY LOCATION OF STEREOSCOPIC IMAGES", filed on even date herewith and having application Ser. No. 10/280,241;

U.S. patent application entitled "METHOD AND SYSTEM FOR PROVIDING THE MOTION INFORMATION OF STEREOSCOPIC CAMERAS", filed on even date herewith and having application Ser. No. 10/280,436;

U.S. patent application entitled "METHOD AND SYSTEM FOR CONTROLLING THE MOTION OF STEREOSCOPIC CAMERAS BASED ON A VIEWER'S EYE MOTION", filed on even date herewith and having application Ser. No. 10/280,251;

U.S. patent application entitled "METHOD AND SYSTEM OF STEREOSCOPIC IMAGE DISPLAY FOR GUIDING A VIEWER'S EYE MOTION USING A THREE-DIMENSIONAL MOUSE", filed on even date herewith and having application Ser. No. 10/280,465;

U.S. patent application entitled "METHOD AND SYSTEM FOR CONTROLLING THE MOTION OF STEREOSCOPIC CAMERAS USING A THREE-DIMENSIONAL MOUSE", filed on even date herewith and having application Ser. No. 10/280,419;

U.S. patent application entitled "METHOD AND SYSTEM FOR CONTROLLING SPACE MAGNIFICATION FOR STEREOSCOPIC IMAGES", filed on even date herewith and having application Ser. No. 10/280,344;

U.S. patent application entitled "METHOD AND SYSTEM FOR ADJUSTING DISPLAY ANGLES OF A STEREOSCOPIC IMAGE BASED ON A CAMERA LOCATION", filed on even date herewith and having application Ser. No. 10/280,248; and U.S. patent application entitled "METHOD AND SYSTEM FOR TRANSMITTING OR STORING STEREOSCOPIC IMAGES AND PHOTOGRAPHING RATIOS FOR THE IMAGES", filed on even date herewith and having application Ser. No. 10/280,464.

BACKGROUND OF THE INVENTION

1. Field of the Invention

The present invention relates to a method and system for generating and/or displaying a more realistic stereoscopic image. Specifically, the present invention relates to a portable communication device comprising a pair of digital cameras that produce at least one stereoscopic image for transmission, and a pair of display screens that display a received stereoscopic image.

2. Description of the Related Technology

In general, a human being can recognize an object by sensing the environment through eyes. Also, as the two eyes are spaced apart a predetermined distance from each other, the object perceived by the two eyes is initially sensed as two images, each image being formed by one of the left or right eyes. The object is recognized by the human brain as the two images are partially overlapped. Here, in the portion where the images perceived by a human being overlap, as the two different images transmitted from the left and right eyes are synthesized in the brain, there is a perception of 3-dimensions.

By using the above principle, various conventional 3-D image generating and reproducing systems using cameras and displays have been developed.

As one example of the systems, U.S. Pat. No. 4,729,017 discloses "Stereoscopic display method and apparatus therefor." With a relatively simple construction, the apparatus allows a viewer to view a stereoscopic image via the naked eye.

As another example of the systems, U.S. Pat. No. 5,978,143 discloses "Stereoscopic recording and display system." The patent discloses that the stereoscopically shown image content is easily controllable by the observer within the scene, which is recorded by the stereo camera.

As another example of the systems, U.S. Pat. No. 6,005,607 discloses "Stereoscopic computer graphics image generating apparatus and stereoscopic TV apparatus." This apparatus stereoscopically displays two-dimensional images generated from three-dimensional structural information.

SUMMARY OF CERTAIN INVENTIVE ASPECTS OF THE INVENTION

One aspect of the invention provides an information communication system. The system comprises a first portable device and a second portable device. The first portable device comprises a pair of stereoscopic cameras and a pair of display screens. The pair of stereoscopic cameras produce and transmit a first stereoscopic image, the pair of display screens being configured to receive and display a second stereoscopic image. The second portable device communicates with the first portable device and comprises a pair of stereoscopic cameras and a pair of display screens. The pair of stereoscopic cameras of the second device produce and transmit a second stereoscopic image to the first portable device. The pair of display screens of the second device receive the first stereoscopic image from the first portable device and display the first stereoscopic image. Each of the pairs of stereoscopic cameras is spaced at a predetermined distance apart from each other, and each of the first and second stereoscopic images comprises a pair of two-dimensional plane images produced by each of the pairs of the stereoscopic cameras, respectively.

Another aspect of the invention provides a portable communication apparatus. The apparatus comprises a pair of stereoscopic cameras, a transmitter, a receiver and a pair of display screens. The pair of stereoscopic cameras produce a stereoscopic image of a first scene. The transmitter transmits the first stereoscopic image. The receiver receives a stereoscopic image of a second scene different from the first scene. The pair of display screens display the image of the second scene. Each stereoscopic image comprises a pair of two-dimensional plane images.

BRIEF DESCRIPTION OF THE DRAWINGS

FIG. 27 is a conceptual drawing that illustrates the movement of a set of stereoscopic cameras.

FIG. 32A illustrates an exemplary table for controlling horizontal and vertical motors.

FIG. 35 illustrates an exemplary table showing the relationship between camera adjusting values and selected cameras.

FIG. 39 illustrates one example of a 3D display image.

FIG. 52 illustrates an exemplary table for explaining the relationship between the space magnification and camera distance.

FIG. 55 illustrates an exemplary table for explaining the relationship between the camera motion and display angle.

FIG. 63 illustrates an exemplary format of the data that are stored in the recording medium of FIG. 62.

FIG. 67 illustrates an exemplary block diagram of a portable communication device for controlling space magnification for stereoscopic images.

DETAILED DESCRIPTION OF CERTAIN EMBODIMENTS OF THE INVENTION

Figure 1A:
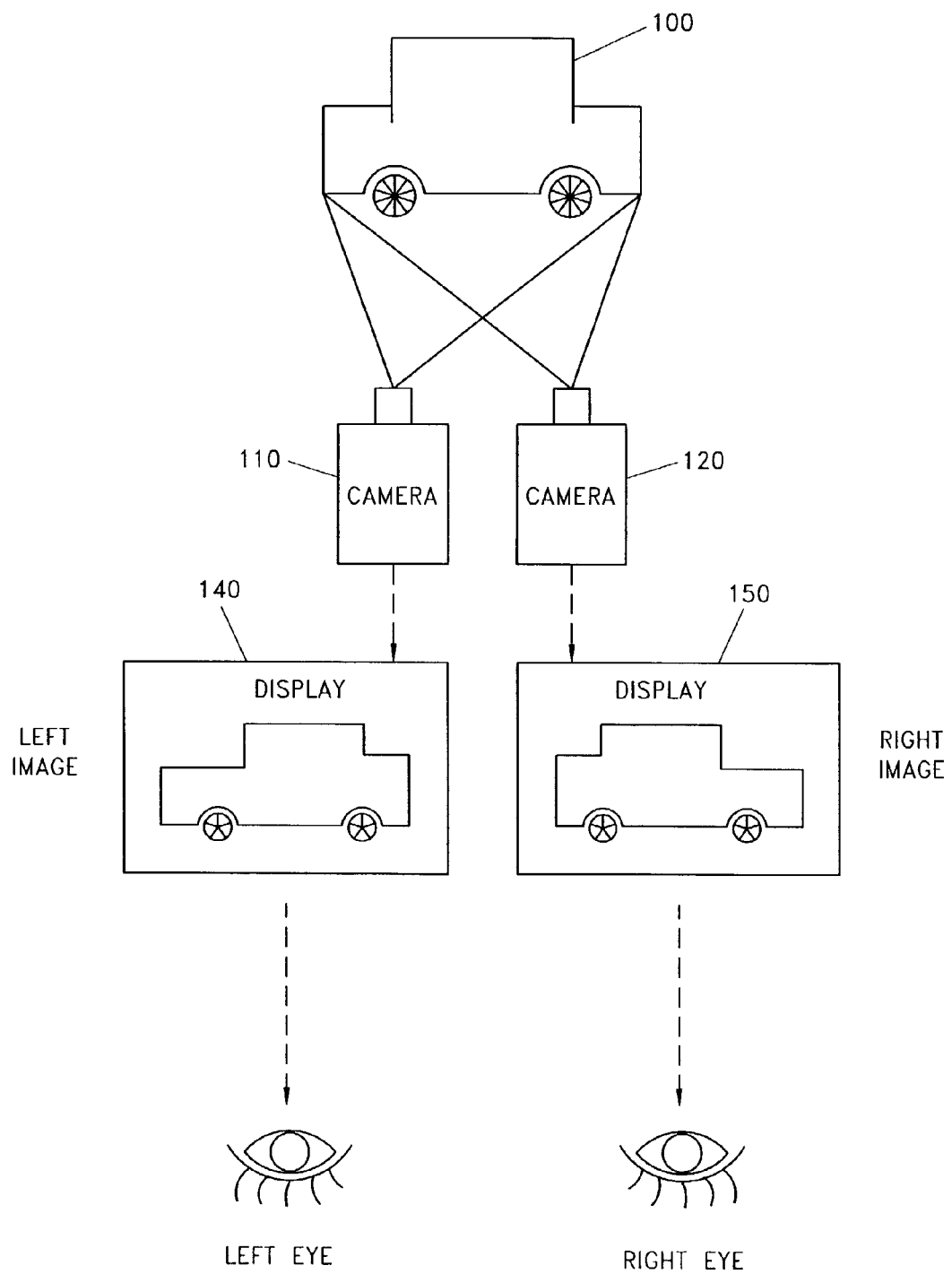
FIG. 1A illustrates one typical 3-D image generating and reproducing apparatus.

FIG. 1A illustrates one typical 3-D image generating and reproducing apparatus. The system of FIG. 1A uses two display devices so as to display stereoscopic images. The apparatus includes a set of stereoscopic cameras 110 and 120, spaced apart a predetermined distance from each other. The cameras 110 and 120 may be spaced apart as the same as exists distance between a viewer's two eyes, for photographing an object 100 at two different positions. Each camera 110 and 120 provides each photographed image simultaneously or sequentially to the display devices 140 and 150, respectively. The display devices 140 and 150 are located such that a viewer can watch each image displayed in the devices 140 and 150 through their left and right eyes, respectively. The viewer can recognize a 3-D image by simultaneously or sequentially perceiving and synthesizing the left and right images. That is, when the viewer sees a pair of stereoscopic images with each eye, a single image (object) is perceived having a 3D quality.

Figure 1B:
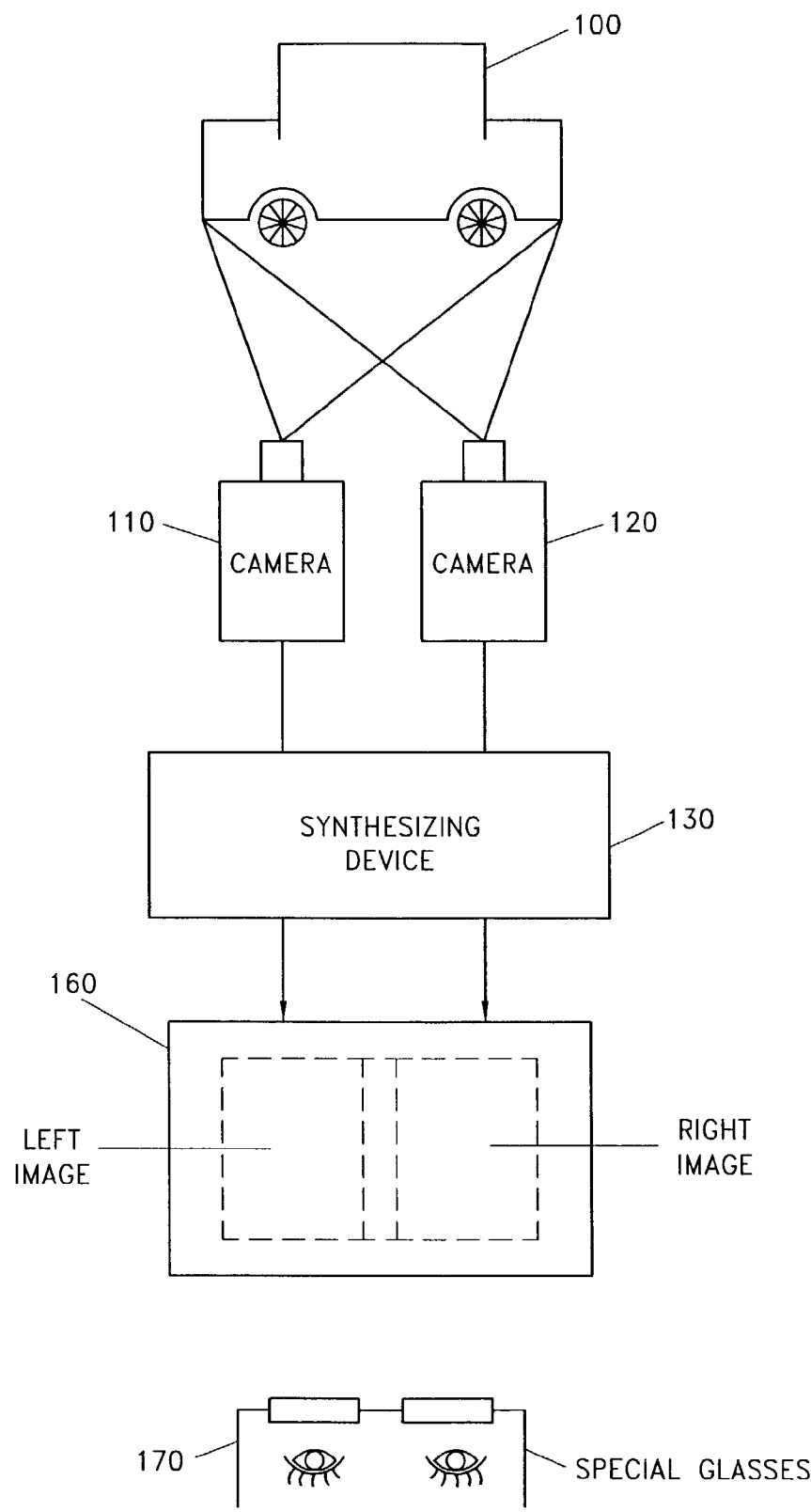
FIG. 1B illustrates another typical 3-D image generating and reproducing apparatus.

FIG. 1B illustrates another typical 3-D image generating and reproducing apparatus. The system of FIG. 1B uses one display device so as to display stereoscopic images. The apparatus includes a set of stereoscopic cameras 110 and 120, spaced apart a predetermined distance from each other for photographing the same object 100 at the two different positions. Each camera 110 and 120 provides each photographed image to a synthesizing device 130. The synthesizing device 130 receives two images from the left and right cameras 110 and 120, and sequentially irradiates the received images on a display device 160. The synthesizing device 130 may be located in either a camera site or a display site. The viewer wears special glasses 170 that allow each displayed image to be seen by each eye. The glasses 170 may include a filter or a shutter that allows the viewer to see each image alternately. The display device 160 may comprise a LCD or a 3-D glasses such as a head mounted display (HMD). Thus, the viewer can recognize a 3-D image by sequentially perceiving the left and right images through each eye.

Here, according to the distance between the two cameras and the object to be photographed by the cameras, and the size of the photographed object, the size of the displayed image is determined. Also, as the distance between the left and right images displayed on the display device has the same ratio as the distance between a viewer's two eyes, the viewer feels a sense of viewing the actual object in 3-dimensions.

In the above technology, an object may be photographed by a camera while the object moves, the camera moves, or a magnifying (zoom-in) or reducing (zoom-out) imaging function is performed with respect to the object, not being in a state in which a fixed object is photographed by a fixed camera. In those situations, the distance between the camera and the photographed object, or the size of the photographed object changes. Thus, a viewer may perceive the image having a sense of distance different than is the actual distance from the camera to the object.

Also, even when the distance between the object and the stereoscopic cameras is fixed during photographing, each viewer has their own unique eye distance, a biometric which is measured as the distance between the center points of the viewer's eyes. For example, the distance between an adult's eyes is quite different from that of a child's eyes. Also the eye distance varies between viewers of the same age. In the meantime, in current 3D display systems, the distance between the center points of each stereoscopic image is fixed at the distance value of the average adult (i.e., 70 mm) as exemplified in FIGS. 1A and 1B. However, as discussed above, each viewer has their own personal eye distance. This may cause a headache when the viewer sees stereoscopic images as well as the sense of 3-dimensions being distorted. In certain instances, the sense of 3-dimensions is not even perceived.

In order to display a realistic 3D image, one aspect of the invention is to adjust display images or display devices such that a screen ratio (D:E:F) in the display device is substantially the same as a photographing ratio (A:B:C) in the camera. Hereinafter, the term 3D images and stereoscopic images will be used to convey the same meaning. Also, a stereoscopic image comprises a pair of two-dimensional plane images produced by a pair of stereoscopic cameras. Stereoscopic images comprise a plurality of stereoscopic images.

Photographing Ratio (A:B:C) and Screen Ratio (D:E:F)

Figure 2A:
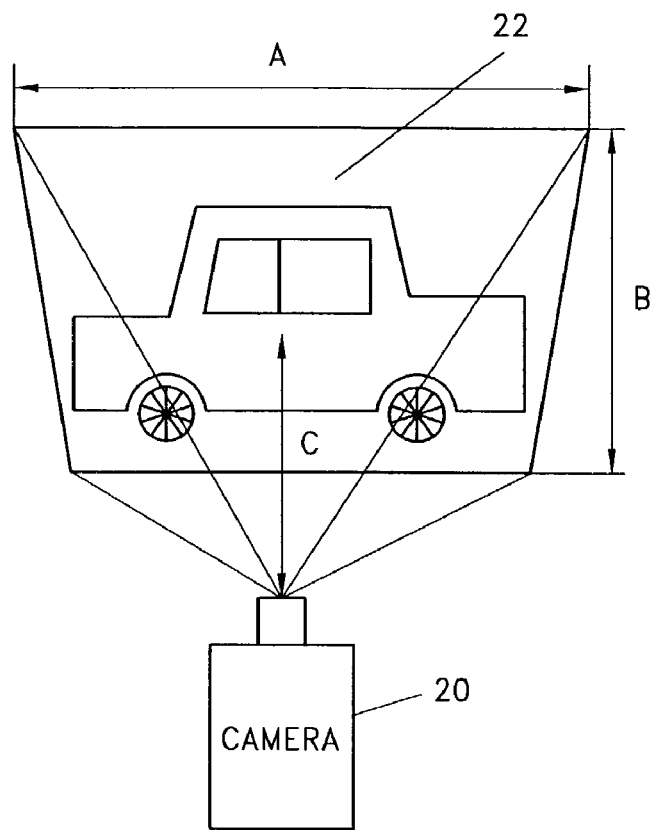
FIGS. 2A and 2B illustrate a photographing ratio of a camera.
Figure 2B:
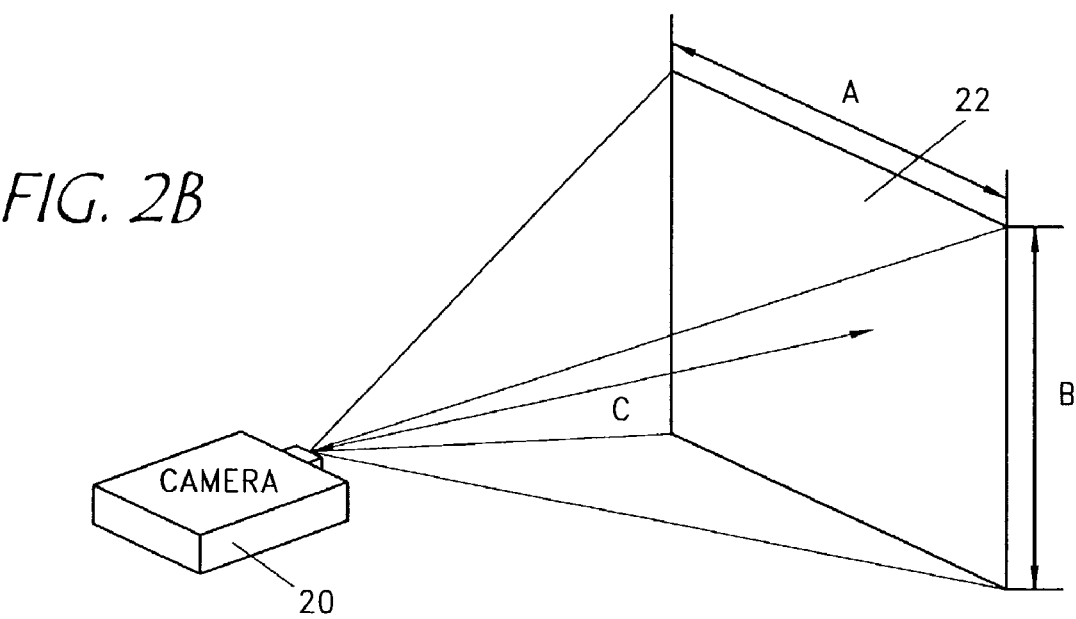

FIGS. 2A and 2B illustrate a photographing ratio of a camera. The ratio relates to a scope or the size of the space, being proportional to a range which is seen through a viewfinder of a camera, that the camera can photograph in a scene. The photographing ratio includes three parameters (A, B, C). Parameters A and B are defined as horizontal and vertical lengths of the space, respectively, including the object 22 photographed by the camera 20. Parameter C is defined as the perpendicular distance between the camera 20 and the object 22. Generally, a camera has its own horizontal and vertical ranges that can photograph an object, and the ratio of the horizontal and vertical lengths is typically constant, e.g., 4:3 or 16:9. Thus, once one of the horizontal and vertical lengths is determined, the other length may be automatically determined. In one embodiment of the invention, the camera 20 comprises a video camera, a still camera, an analog camera, or a digital camera.

For the purpose of the explanation, assume that the object 22 is located "10 m" away from the camera 20 and is photographed such that the object 22 is included in a single film or an image frame as shown in FIGS. 2A and 2B. If the horizontal distance (A) is 20 m, the vertical distance (B) would be "15 m" for a 4:3 camera ratio. Since the distance between the camera 20 and the object 22 is 10 m, the photographing ratio is 20:15:10=2:1.5:1. In one embodiment of the invention, the present photographing ratio while photographing an object may be determined based on the optical property of a camera object lens, e.g., the maximum photographing ratio and minimum photographing ratio.

Figure 3A:
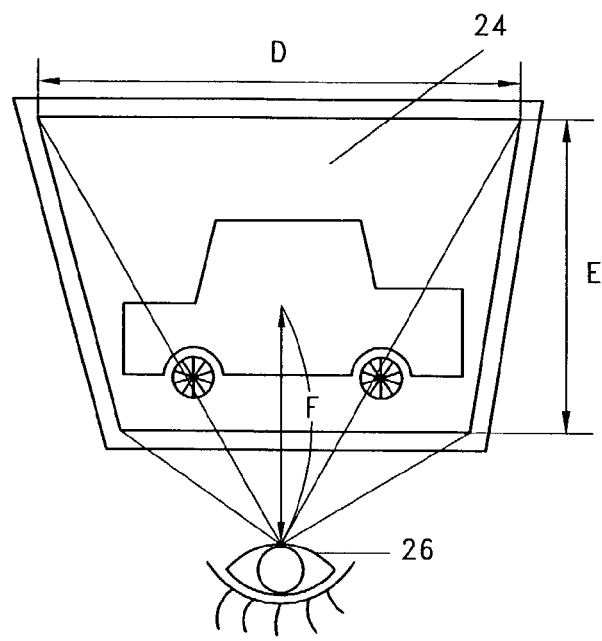
FIGS. 3A and 3B illustrate a screen ratio of a display device that displays a photographed image.
Figure 3B:
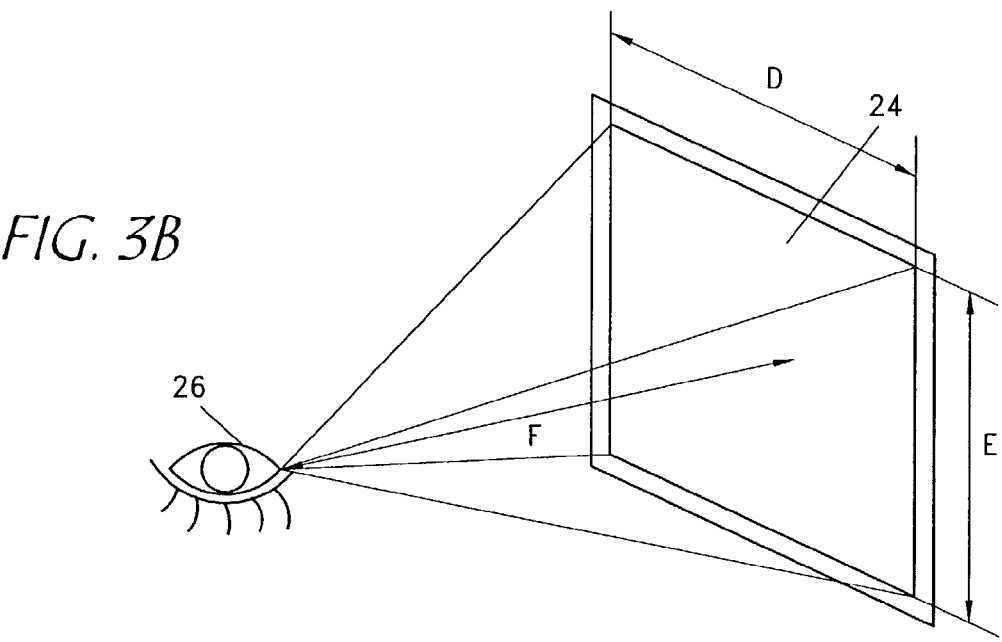

FIGS. 3A and 3B illustrate a screen ratio of a display device that displays a photographed image. The screen ratio relates to a range or scope that a viewer can see through a display device. The screen ratio includes three parameters (D, E, F). Parameters D and E are defined as horizontal and vertical lengths of the image displayed in the display device 24, respectively. Parameter F is defined as the perpendicular distance between the display device and a viewer's eye 26. For convenience, only one eye 26 and one display device 24 are illustrated instead of two eyes and a set of display devices in FIGS. 3A and 3B. F may be automatically measured using a distance detection sensor or may be manually measured, or may be fixed. In one embodiment of the invention, parameters D and E are adjusted such that the photographing ratio (A:B:C) equals the screen ratio (D:E:F). Thus the size of the adjusted image in the display device 24 corresponds to that of the image that has been captured by the camera 20. This means that a viewer watches the display image at the same size the camera 20 photographs an object. Thus, by always maintaining the relationship of being "A:B:C=D:E:F," a more realistic 3D image can be provided to the viewer. Thus, by one embodiment of the invention, if the camera photographs an object with a large photographing ratio, the image is displayed using a large screen ratio.

Figure 4A:
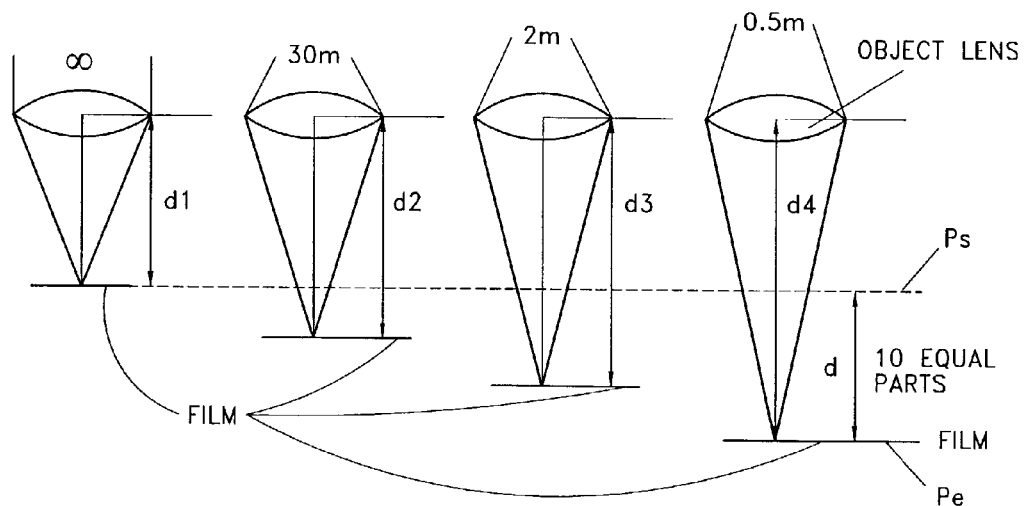
FIG. 4A illustrates the variation of the distance between an object lens and a film according to the variation of a focal length of a camera.

FIG. 4A illustrates the variation of the distance between an object lens and a film according to the variation of a focal length of the camera 20. (Note that although the term "film" is used in this specification, the term is not limited to analog image recording media. For instance, a CCD device or CMOS image sensor may be used to capture an image in a digital context.) The camera 20 may have more focal length ranges, but only four focal length ranges are exemplified in FIG. 4A.

As shown in FIG. 4A, the distance between a film and an object lens ranges from d1–d4 according to the focal length of the camera 20. The focal length may be adjusted by a focus adjusting portion (which will be explained below) of the camera 20. The distance (d1) is shortest when the focal length is "infinity" ($\infty$). When the camera 20 is set to have an infinity focal length, the camera 20 receives the most amount of light through the object lens. The distance (d4) is longest when the focal length is "0.5 m," where the camera receives the least amount of light through the object lens. That is, the amount of light coming into the camera 20 varies according to the focal length of the camera 20.

Since the location of the object lens is normally fixed, in order to change the distance from d1 to d4, the location of the film ranges from $P_s$ to $P_1$ as much as "d" according to the focal length. The focus adjusting portion of the camera 20 adjusts the location of the film from $P_s$ to $P_e$. The focus adjusting of the camera 20 may be manually performed or may be automatically made.

Figure 4B:
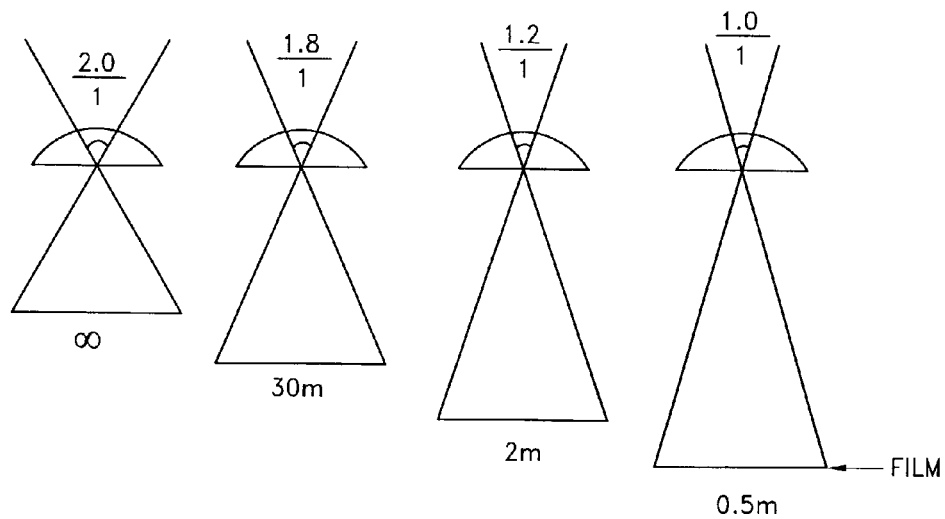
FIG. 4B illustrates the variation of a photographing ratio according to the variation of the focal length of the camera.

FIG. 4B illustrates the variation of a photographing ratio according to the variation of the focal length of the camera 20. The photographing ratio (A:B:C) may be expressed as (A/C: B/C). When the camera is set to have an infinity focal length, the value A/C or B/C is the biggest amount, which is shown as "2.0/1" in FIG. 4B. In contrast, when the camera 20 is set to have, e.g., a "0.5 m" focal length, the value A/C or B/C is the smallest amount, which is shown as "1.0/1" in FIG. 4B. That is, the more amount of light the camera receives, the larger the photographing ratio. Similarly, the longer the focal length, the greater the photographing ratio.

Figures 4C, 4D:
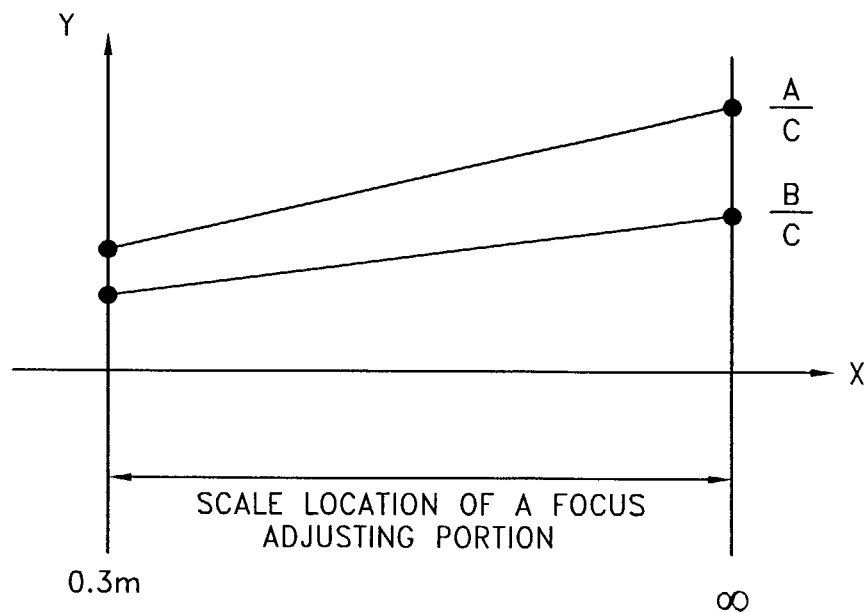
FIG. 4C shows the relationship between a photographing ratio and the focal length of the camera.
FIG. 4D illustrates an exemplary table showing maximum and minimum photographing ratios of a camera.

FIG. 4C shows the relationship between a photographing ratio and a focal length of a camera. The focal length of the camera may be determined, e.g., by detecting a current scale location of the focus adjusting portion of the camera. As shown in FIG. 4C, when the camera has a focal length range of "0.3 m to infinity," the focus adjusting portion is located in one position of the scales between 0.3 m and infinity while the camera is photographing an object. In this situation, the photographing ratio varies linearly as shown in FIG. 4C. If the camera has a focus adjusting portion that is automatically adjusted while photographing an object, the photographing ratio may be determined by detecting the current focal length that is automatically adjusted.

FIG. 4D illustrates an exemplary table showing maximum and minimum photographing ratios of a camera. As described before, a camera has the maximum photographing ratio (A:B:C=3:2:1) when the focal length is the longest, i.e., a distance of infinity as shown in FIG. 4D. In addition, the camera has the minimum photographing ratio (A:B:C=1.5:1:1) when the focal length is the shortest, i.e., "0.3 m" as shown in FIG. 4D. The maximum and minimum photographing ratios of the camera are determined by the optical characteristic of the camera. In one embodiment, a camera manufacturing company may provide the maximum and minimum photographing ratios in the technical specification of the camera. The table in FIG. 4D is used for determining a photographing ratio when the focus adjusting portion is located in one scale between "0.3 m and an infinity."

Method and System for Calculating a Photographing Ratio of a Camera

Figure 5A:
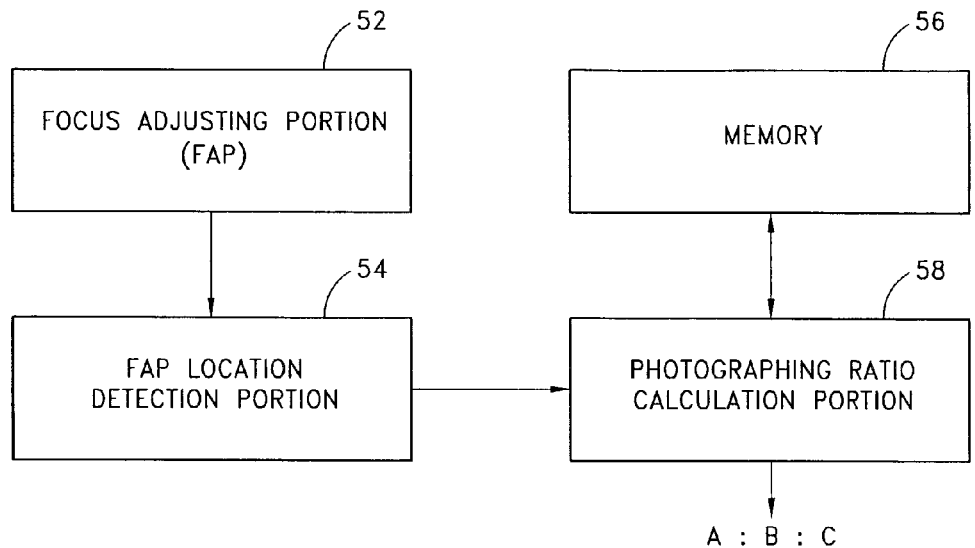
FIG. 5A illustrates a photographing ratio calculation apparatus according to one aspect of the invention.

FIG. 5A illustrates a photographing ratio calculation apparatus according to one aspect of the invention. The apparatus comprises a focus adjusting portion (FAP) 52, a FAP location detection portion 54, a memory 56, and a photographing ratio calculation portion 58. In one embodiment, the photographing ratio calculation apparatus may be embedded into the camera 20.

The focus adjusting portion 52 adjusts the focus of the object lens of the camera 20. The focus adjusting portion 52 may perform its function either manually or automatically. In one embodiment of the invention, the focus adjusting portion 52 may comprise 10 scales between "0.3 m and infinity," and is located in one of the scales while the camera 20 is photographing an object. In one embodiment of the invention, the focus adjusting portion 52 may use a known focus adjusting portion that is used in a typical camera.

The FAP location detection portion 54 detects the current scale location of the focus adjusting portion 52 among the scales. In one embodiment of the invention, the FAP location detection portion 54 may comprise a known position detection sensor that detects the scale value in which the focus adjusting portion 52 is located. In another embodiment of the invention, since the variation of the scale location is proportional to the distance between the object lens and film as shown in FIG. 4A, the FAP location detection portion 54 may comprise a known distance detection sensor that measures the distance between the object lens and film.

The memory 56 stores data representing maximum and minimum photographing ratios of the camera 20. In one embodiment of the invention, the memory 56 comprise a ROM, a flash memory or a programmable ROM. This may apply to all of the other memories described throughout the specification.

The photographing ratio calculation portion 58 calculates a photographing ratio (A:B:C) based on the detected scale location and the maximum and minimum photographing ratios. In one embodiment of the invention, the photographing ratio calculation portion 58 comprises a digital signal processor (DSP) calculating the ratio (A:B:C) using the following Equations I and II.

Equation I: $A = \left(\frac{A_{max} - A_{min}}{c}\right) \times \left(\frac{S_{cur}}{S_{tot}}\right) + \frac{A_{min}}{c}$ Equation II: $B = \left(\frac{B_{max} - B_{min}}{c}\right) \times \left(\frac{S_{cur}}{S_{tot}}\right) + \frac{B_{min}}{c}$ In Equations I and II, parameters $A_{max}$ and $B_{max}$ represent horizontal and vertical length values (A and B) of the maximum photographing ratio, respectively, exemplified as "3" and "2" in FIG. 4D. Parameters $A_{min}$ and $B_{min}$ represent horizontal and vertical length values (A and B) of the minimum photographing ratio, respectively, shown as "1.5" and "1" in FIG. 4D. Parameters $S_{cur}$ and $S_{tot}$ represent the current detected scale value and the total scale value, respectively. Parameter "c" represents the distance value of the maximum or minimum photographing ratio. Since the photographing ratio (A:B:C) represents the relative proportion between the three parameters, A, B and C, the parameters may be simplified as shown in FIG. 4D. For example, the photographing ratio, A:B:C=300:200:100, is the same as A:B:C=3:2:1. In one embodiment of the invention, the parameter "c" has the value "1" as shown in FIG. 4D.

In another embodiment of the invention, the photographing ratio calculation portion 58 calculates a photographing ratio (A:B:C) such that the ratio falls between the maximum and minimum photographing ratios and at the same time is proportional to the value of the detected scale location. Thus, as long as the ratio falls between the maximum and minimum photographing ratios and is proportional to the value of the detected scale location, any other equation may be used for calculating the photographing ratio.

Figure 6A:
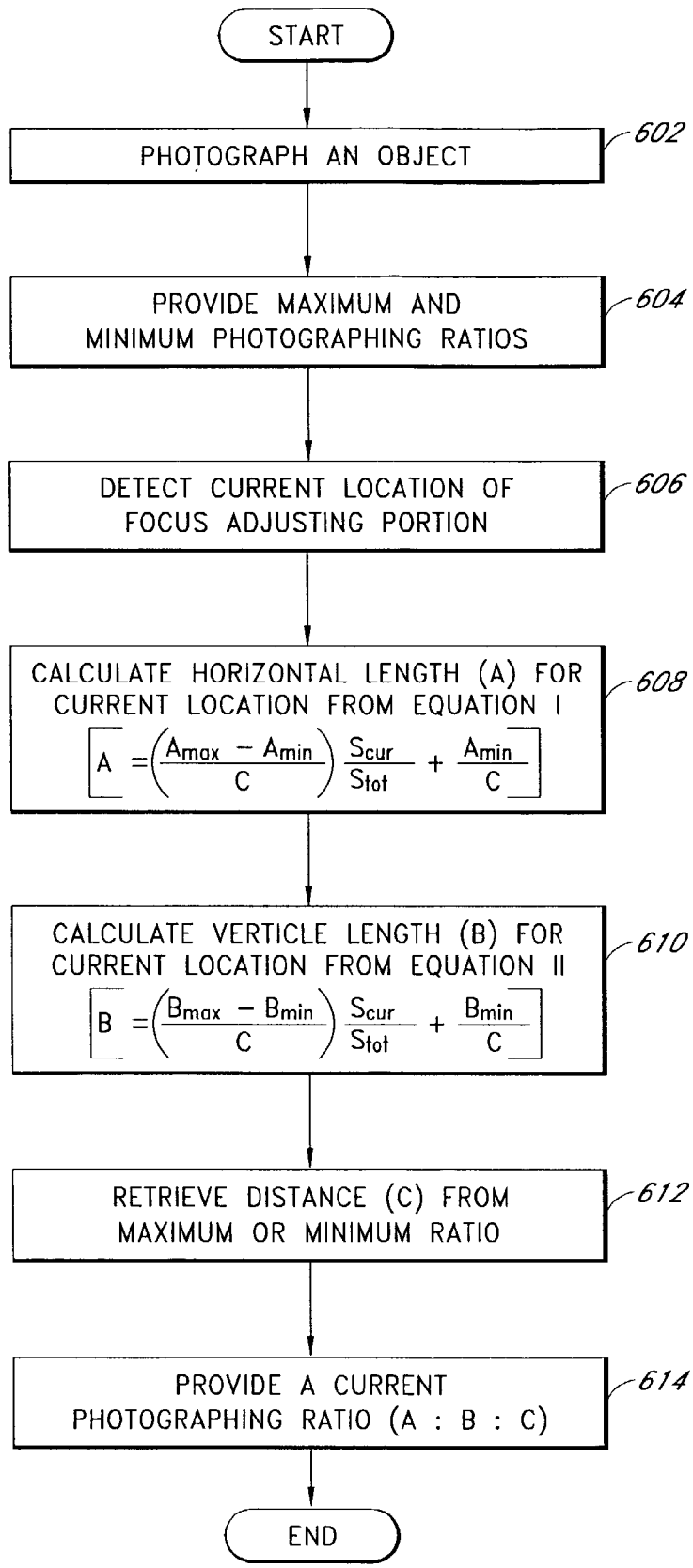
FIG. 6A illustrates an exemplary flowchart for explaining the operation of the photographing ratio calculation apparatus of FIG. 5A.

Referring to FIG. 6A, the operation of the photographing ratio calculation apparatus of FIG. 5A will be explained. The camera 20 photographs an object (602). In one embodiment of the invention, the camera 20 comprise a single (mono) camera. In another embodiment of the invention, the camera 20 comprise a pair of stereoscopic cameras as shown in FIG. 1A. In either case, the operation of the apparatus will be described based on the single camera for convenience.

Maximum and minimum photographing ratios are provided from the memory 56 to the photographing ratio calculation portion 58 (604). In one embodiment of the invention, the photographing ratio calculation portion 58 may store the maximum and minimum photographing ratios therein. In this situation, the memory 56 may be omitted from the apparatus.

The FAP location detection portion 54 detects the current location of the focus adjusting portion 52 while the camera 20 is photographing the object (606). While the camera is photographing the object, the focal length may be changed. The detected current location of the focus adjusting portion 52 is provided to the photographing ratio calculation portion 58.

The photographing ratio calculation portion 58 calculates a horizontal value (A) of a current photographing ratio from Equation I (608). It is assumed that the detected current location value is "5" among the total scale values "10." Using Equation I and the table of FIG. 4D, the horizontal value A is obtained as follows.

$$A = \left(\frac{A_{max} - A_{min}}{c}\right) \times \left(\frac{S_{cur}}{S_{tot}}\right) + \frac{A_{min}}{c} = \left(\frac{3 - 1.5}{1}\right) \times \left(\frac{5}{10}\right) + \frac{1.5}{1} = 2.25$$

The photographing ratio calculation portion 58 calculates a vertical value (B) of a current photographing ratio from Equation II (610). In the above example, using Equation II and the table of FIG. 4D, the vertical value B is obtained as follows.

$$B = \left(\frac{B_{max} - B_{min}}{c}\right) \times \left(\frac{S_{cur}}{S_{tot}}\right) + \frac{B_{min}}{c} = \left(\frac{2 - 1}{1}\right) \times \left(\frac{5}{10}\right) + \frac{1}{1} = 1.5$$

The photographing ratio calculation portion 58 retrieves parameter C from the maximum and minimum ratios that have been used for calculating parameters A and B (612). Referring to the table of FIG. 4D, the distance value (C) is "1." The photographing ratio calculation portion 58 provides a current photographing ratio (A:B:C) (614). In the above example, the current photographing ratio=2.25:1.5:1.

Figure 5B:
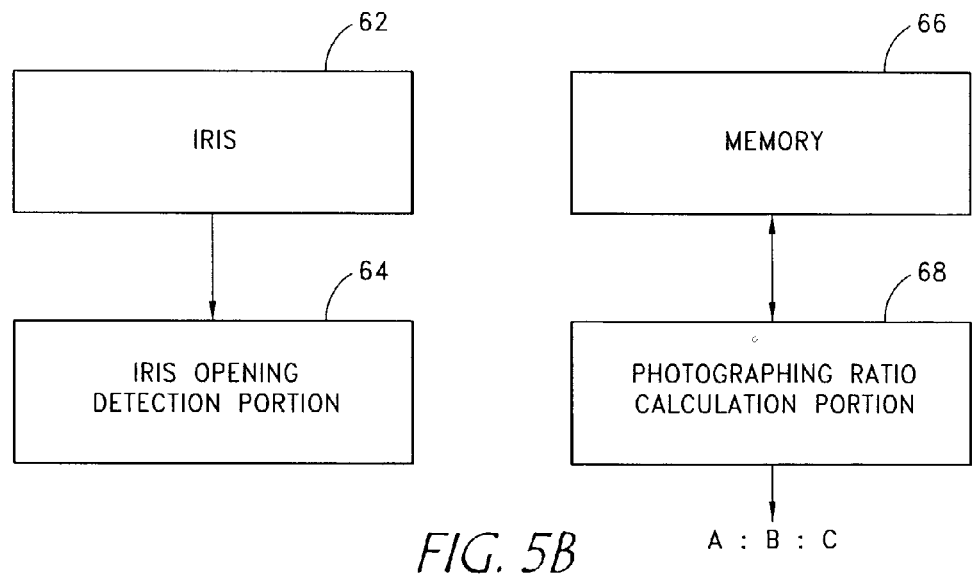
FIG. 5B illustrates a photographing ratio calculation apparatus according to another aspect of the invention.

FIG. 5B illustrates a block diagram of a photographing ratio calculation apparatus according to another aspect of the invention. The apparatus comprises an iris 62, an iris opening detection portion 64, a memory 66 and a photographing ratio calculation portion 68. In one embodiment of the invention, the photographing ratio calculation apparatus is embedded into the camera 20.

The iris 62 is a device that adjusts an amount of light coming into the camera 20 according to the degree of its opening. When the degree of the opening of the iris 62 is largest, the maximum amount of light shines on the film of the camera 20. This largest opening corresponds to the longest focal length and the maximum photographing ratio. In contrast, when the degree of the opening of the iris 62 is smallest, the least amount of light comes into the camera 20. This smallest opening corresponds to the shortest focal length and the minimum photographing ratio. In one embodiment of the invention, the iris 62 may be a known iris that is used in a typical camera.

The iris opening detection portion 64 detects the degree of the opening of the iris 62. The degree of the opening of the iris 62 may be quantitized to a range of, for example, 1–10. Degree "10" may mean the largest opening of the iris 62 and degree "1" may mean the smallest opening of the iris 62. The memory 66 stores data representing maximum and minimum photographing ratios of the camera 20.

The photographing ratio calculation portion 68 calculates a photographing ratio (A:B:C) based on the detected degree of the opening and the maximum and minimum photographing ratios. In one embodiment of the invention, the photographing ratio calculation portion 68 comprises a digital signal processor (DSP) calculating the ratio (A:B:C) using the following Equations III and IV.

$$\text{Equation III}: A = \left(\frac{A_{\max} - A_{\min}}{c}\right) \times \left(\frac{I_{cur}}{I_{largest}}\right) + \frac{A_{\min}}{c}$$

$$\text{Equation IV}: B = \left(\frac{B_{\max} - B_{\min}}{c}\right) \times \left(\frac{I_{cur}}{I_{largest}}\right) + \frac{B_{\min}}{c}$$

In Equations III and IV, parameters $A_{max}$ and $B_{max}$, $A_{min}$ and $B_{min}$, and "c" are the same as the parameters used in Equations I and II. Parameters $I_{cur}$ and $I_{largest}$ represent the detected current degree of the opening and the largest degree of the opening, respectively.

Figure 6B:
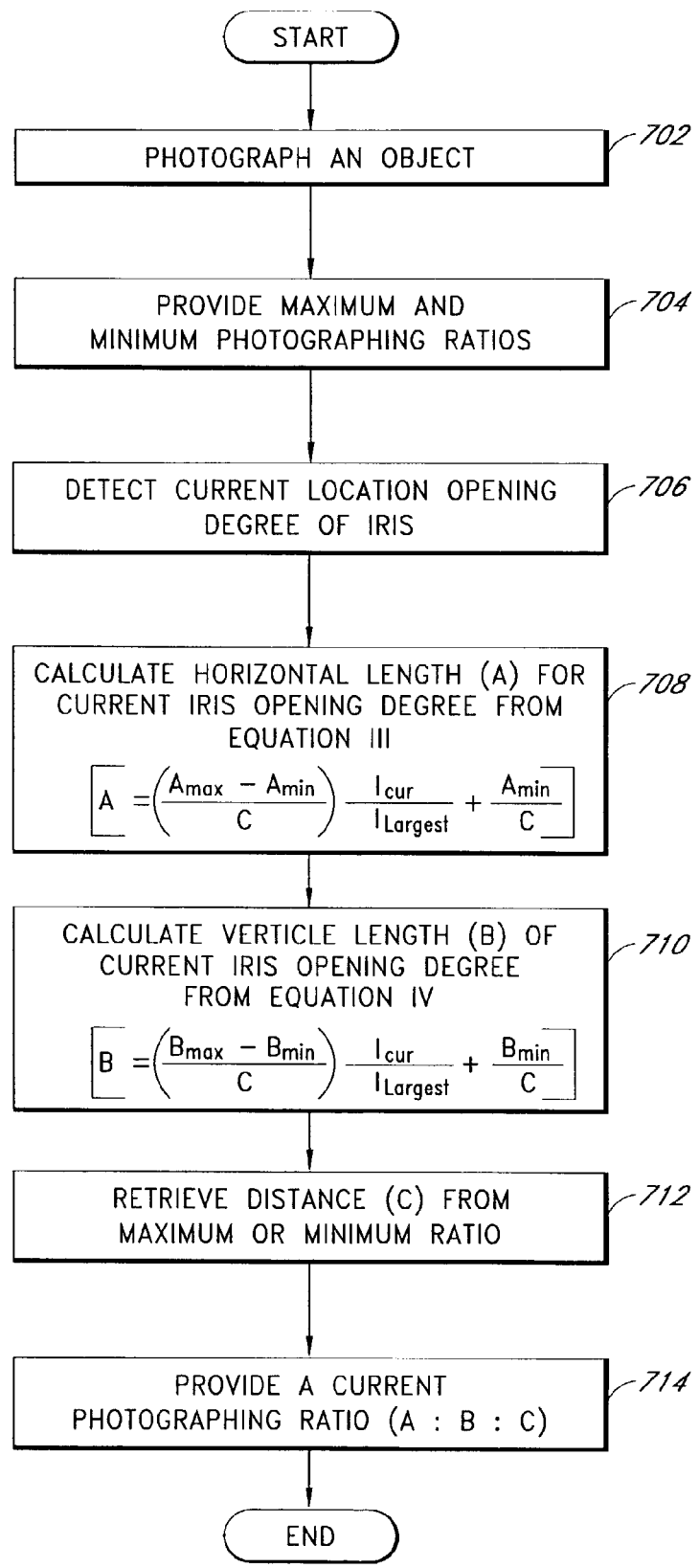
FIG. 6B illustrates an exemplary flowchart for explaining the operation of the photographing ratio calculation apparatus of FIG. 5B.

Referring to FIG. 6B, the operation of the photographing ratio calculation apparatus will be described. The operation with regard to the first two procedures 702 and 704 is the same as those in FIG. 6A.

The iris opening detection portion 64 detects the current degree of the opening of the iris 62 while the camera 20 is photographing the object (706). The detected degree of the opening of the iris 62 is provided to the photographing ratio calculation portion 68.

The photographing ratio calculation portion 68 calculates a horizontal value (A) of a current photographing ratio from Equation III (708). It is assumed that the detected current opening degree is 2 among the total degree values 10. Using Equation III and FIG. 4D, the horizontal value A is obtained as follows.

$$A = \left(\frac{A_{\max} - A_{\min}}{c}\right) \times \left(\frac{I_{cur}}{I_{largest}}\right) + \frac{A_{\min}}{c} = \left(\frac{3 - 1.5}{1}\right) \times \left(\frac{2}{10}\right) + \frac{1.5}{1} = 1.8$$

The photographing ratio calculation portion 68 calculates a vertical value (B) of a current photographing ratio from Equation IV (710). In the above example, using equation IV and FIG. 4D, the vertical value B is obtained as follows.

$$B = \left(\frac{B_{\max} - B_{\min}}{c}\right) \times \left(\frac{I_{cur}}{I_{largest}}\right) + \frac{B_{\min}}{c} = \left(\frac{2 - 1}{1}\right) \times \left(\frac{2}{10}\right) + \frac{1}{1} = 1.2$$

The photographing ratio calculation portion 68 retrieves parameter C from the maximum and minimum ratios that have been used for calculating parameters A and B (712). Referring to FIG. 4D, the distance value is "1." The photographing ratio calculation portion 68 provides a current photographing ratio (A:B:C) (714). In the above example, a current photographing ratio is 1.8:1.2:1.

Figure 7:
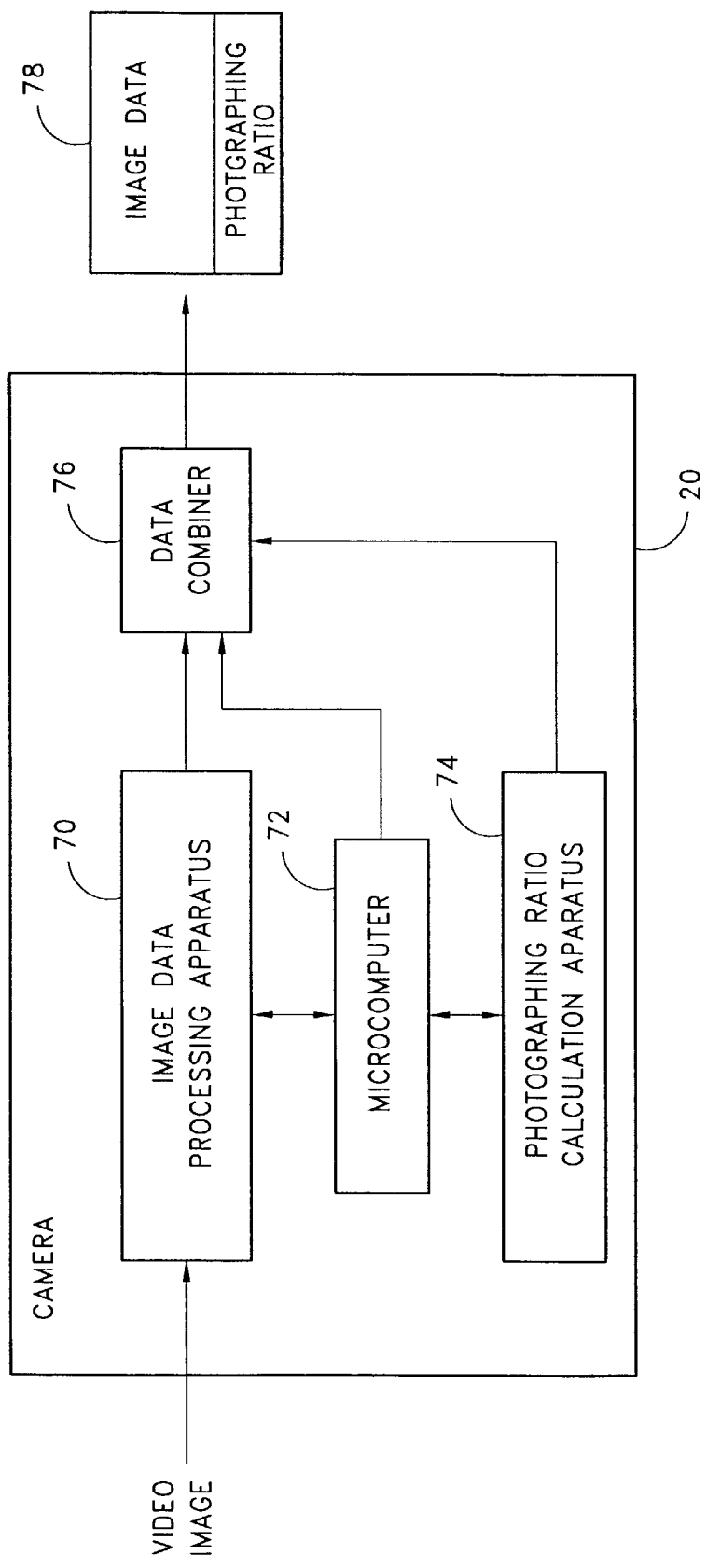
FIG. 7 illustrates a camera comprising the photographing ratio calculation apparatus as shown in FIGS. 5A and 5B.

FIG. 7 illustrates a camera comprising the photographing ratio calculation apparatus as shown in FIGS. 5A and 5B. The camera 20 comprises an image data processing apparatus 70, a microcomputer 72, a photographing ratio calculation apparatus 74, and a data combiner 76.

In one embodiment of the invention, the camera 20 comprises an analog camera and a digital camera. When the camera 20 photographs an object, the image data processing apparatus 70 performs a typical image processing of the photographed image according to the control of the microcomputer 72. In one embodiment of the invention, the image data processing apparatus 70 may comprise a digitizer that digitizes the photographed analog image into digital values, a memory that stores the digitized data, and a digital signal processor (DSP) that performs an image data processing of the digitized image data (all not shown). The image data processing apparatus 70 provides the processed data to a data combiner 76.

In one embodiment, the photographing ratio calculation apparatus 74 comprises the apparatus shown in FIG. 5A or 5B. The photographing ratio calculation apparatus 74 calculates a photographing ratio (A:B:C). The calculated photographing ratio (A:B:C) data are provided from the apparatus 74 to the data combiner 76.

The microcomputer 72 controls the image data processing apparatus 70, the photographing ratio calculation apparatus 74, and the data combiner 76 such that the camera 20 outputs the combined data 78. In one embodiment of the invention, the microcomputer 72 controls the image data processing apparatus 70 such that the apparatus properly processes the digital image data. In this embodiment of the invention, the microcomputer 72 controls the photographing ratio calculation apparatus 74 to calculate a photographing ratio for the image being photographed. In this embodiment of the invention, the microcomputer 72 controls the data combiner 76 to combine the processed data and the photographing ratio data corresponding to the processed data. In one embodiment of the invention, the microcomputer 72 may provide a synchronization signal to the data combiner 76 so as to synchronize the image data and the ratio data. As discussed above, as long as the current scale location of the focus adjusting portion or the opening degree of the iris is not changed, the photographing ratio is not changed. The microcomputer 72 may detect the change of the scale location or the opening degree, and control the data combiner 76 such that the image data and the corresponding ratio data are properly combined.

In one embodiment of the invention, the microcomputer 72 is programmed to perform the above function using typical microcomputer products, available from the Intel, IBM and Motorola companies, etc. This product may also apply to the other microcomputers described throughout this specification.

The data combiner 76 combines the image data from the image data processing apparatus 70 and the calculated photographing ratio (A:B:C) data according to the control of the microcomputer 72. The combiner 76 outputs the combined data 78 in which the image data and the ratio data may be synchronized with each other. In one embodiment of the invention, the combiner 76 comprises a known multiplexer.

Figure 8:
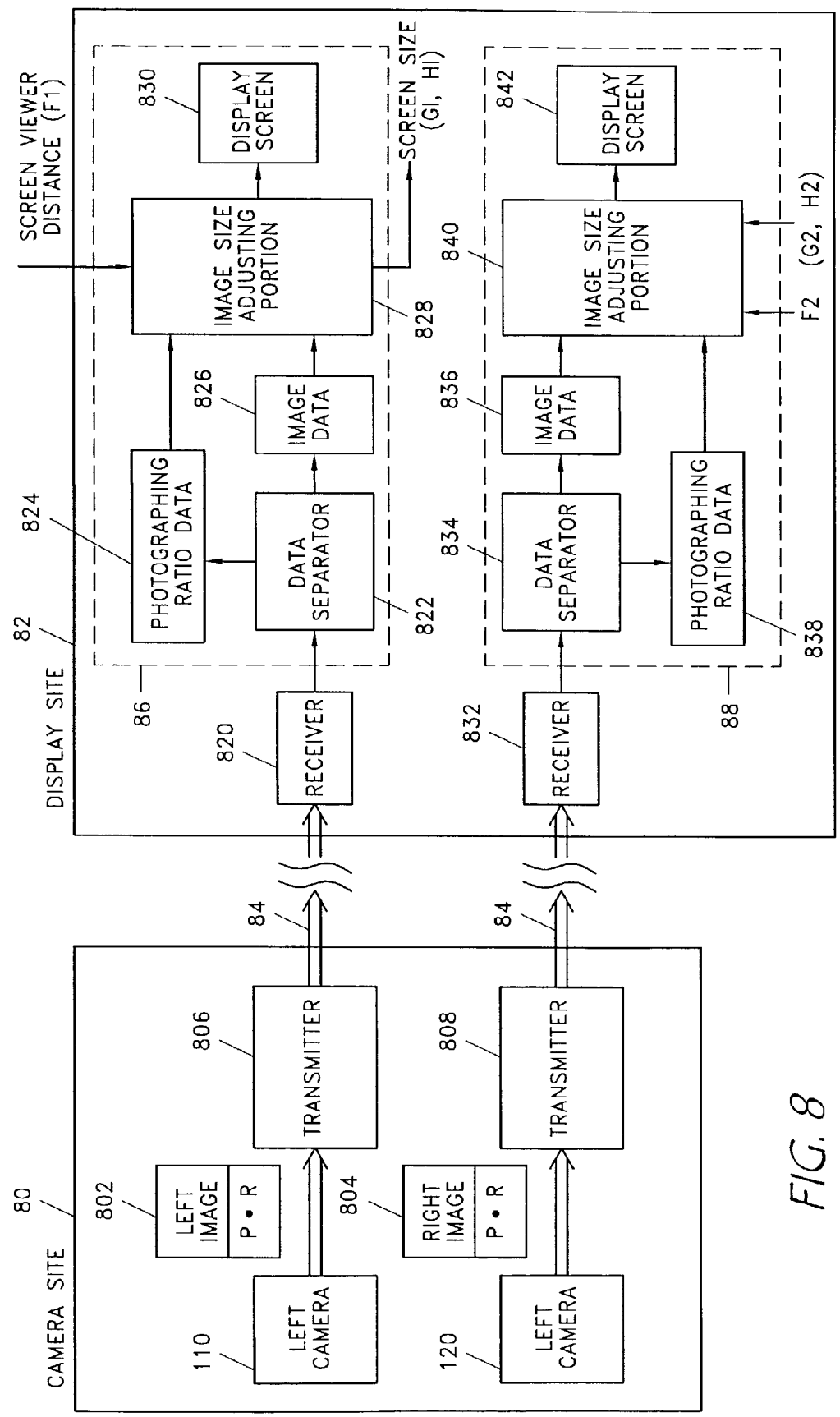
FIG. 8 illustrates a system for displaying stereoscopic images such that a photographing ratio (A:B:C) is substantially the same as a screen ratio (D:E:F).

Method and System for Controlling a Screen Ratio Based on a Photographing Ratio FIG. 8 illustrates a system for displaying stereoscopic images such that a photographing ratio (A:B:C) is substantially the same as a screen ratio (D:E:F). The system comprises a camera site 80 and a display site 82. The camera site 80 transmits a photographing ratio (A:B:C) and photographed image to the display site 82. The display site 82 displays the transmitted image such that a screen ratio (D:E:F) is substantially the same as the photographing ratio (A:B:C). In one embodiment of the invention, the camera site 80 may comprise a single camera and the display site may comprise a single display device. In another embodiment of the invention, the camera site may comprise a set of stereoscopic cameras and the display site may comprise a set of display devices as shown in FIG. 8.

The embodiment of camera site 80 shown in FIG. 8 comprises a set of stereoscopic cameras 110 and 120, and transmitters 806 and 808. The stereoscopic left and right cameras 110 and 120 may be located as shown in FIG. 1A with regard to an object to be photographed. The cameras 110 and 120 comprise the elements described with respect to FIG. 7. Each of the cameras 110 and 120 provides its own combined data 802 and 804 to the transmitters 806 and 808, respectively. Each transmitter 806 and 808 transmits the combined data 802 and 804 to the display site 82 through a network 84. The network 84 may comprise a wire transmission or a wireless transmission. In one embodiment of the invention, each transmitter 806 and 808 is separate from the cameras 110 and 120. In another embodiment of the invention, each transmitter 806 and 808 may be embedded into each camera 110 and 120. For convenience, it is assumed that both of the photographing ratios are referred to as "A1:B1:C1" and "A2:B2:C2," respectively.

In one embodiment of the invention, the photographing ratios "A1:B1:C1" and "A2:B2:C2" are substantially the same. In one embodiment of the invention, the data 802 and 804 may be combined and transmitted to the display site 82. In one embodiment of the invention, the photographing ratio may have a standard data format in each of the camera and display sites so that the display site can identify the photographing ratio easily.

The display site 82 comprises a set of receivers 820, 832, a set of display devices 86, 88. Each receiver 820, 832 receives the combined data transmitted from the camera site 80 and provides each data set to the display devices 86, 88, respectively. In one embodiment of the invention, each of the receivers 820, 832 is separate from the display devices 86, 88. In another embodiment of the invention, receivers 820, 832 may be embedded into each display device 86, 88.

The display devices 86 and 88 comprise data separators 822 and 834, image size adjusting portions 828 and 840, and display screens 830 and 842. The data separators 822 and 834 separate the photographing ratio data (824, 838) and the image data (826, 836) from the received data. In one embodiment of the invention, each of the data separators 822 and 834 comprises a typical demultiplexer.

The image size adjusting portion 828 adjusts the size of the image to be displayed in the display screen 830 based on the photographing ratio (A1:B1:C1), and screen-viewer distance (F1) and display screen size values (G1, H1). The screen-viewer distance (F1) represents the distance between the display screen 830 and one of a viewer's eyes, e.g., a left eye, that is directed to the screen 830. In one embodiment of the invention, the distance F1 may be fixed. In this situation, a viewer's eyes may be located in a eye fixing structure, which will be described in more detail later. Also, the image size adjusting portion 828 may store the fixed value F1 therein. The screen size values G1 and H1 represent the horizontal and vertical dimensions of the screen 830, respectively. In one embodiment of the invention, the size values G1 and H1 may be stored in the image size adjusting portion 828.

The image size adjusting portion 840 adjusts the size of the image to be displayed in the display screen 842 based on the photographing ratio (A2:B2:C2), and screen-viewer distance (F2) and display screen size values (G2, H2). The screen-viewer distance (F2) represents the distance between the display screen 842 and one of a viewer's eyes, e.g., a right eye, that is directed to the screen 842. In one embodiment of the invention, the distance F2 may be fixed. In one embodiment of the invention, the screen-viewer distance (F2) is substantially the same as the screen-viewer distance (F1). The screen size values G2 and H2 represent the horizontal and vertical dimensions of the screen 842, respectively. In one embodiment of the invention, the display screen size values G2 and H2 are substantially the same as the display screen size values G1 and H1.

The operation of the image size adjusting portions 828 and 840 will be described in more detail by referring to FIGS. 9 and 10. Since the operations of the two image size adjusting portions 828 and 840 are substantially the same, for convenience, only the operation with regard to the image size adjusting portion 828 will be explained.

The image data 826, the photographing ratio data (A1:B1:C1) and the screen-viewer distance (F1) are provided to the image size adjusting portion 828 (902). A screen ratio (D1:E1:F1) is calculated based on the photographing ratio (A1:B1:C1) and the screen-viewer distance (F1) using the following Equation V (904). Since the value F1 is already provided, the parameters D1 and E1 of the screen ratio are obtained from Equation V.

Equation V: $A1:B1:C1 = D1:E1:F1$ $$D1 = A1 \times \frac{F1}{C1}$$

$$E1 = B1 \times \frac{F1}{C1}$$

The horizontal and vertical screen size values (G1, H1) of the display screen 830 are provided to the image size adjusting portion 828 (906). In one embodiment of the invention, the screen size values G1 and H1, and the distance value F1 are fixed and stored in the image size adjusting portion 828. In another embodiment of the invention, the screen size values G1 and H1, and the distance value F1 are manually provided to the image size adjusting portion 828.

Image magnification (reduction) ratios d and e are calculated from the following Equation VI (908). The ratios d and e represent horizontal and vertical magnification (reduction) ratios for the display screens 830 and 842, respectively.

Equation VI: $d = \frac{D1}{G1}$ $$e = \frac{E1}{H1}$$

This is to perform magnification or reduction of the provided image 826 with regard to the screen sizes (G1, H1). If the calculated value "D1" is greater than the horizontal screen size value (G1), the provided image needs to be magnified as much as "d." If the calculated value "D1" is less than the horizontal screen size value (G1), the provided image needs to be reduced as much as "d." The same applies to the calculated value "E1." This magnification or reduction enables a viewer to recognize the image at the same ratio that the camera 110 photographed the object. The combination of the display devices 86 and 88 provides a viewer with a more realistic three-dimensional image.

It is determined whether the magnification (reduction) ratios (d, e) are greater than "1" (910). If both of the ratios (d, e) are greater than 1, the image data 826 are magnified as much as "d" and "e," respectively, as shown in FIG. 10A (912). In one embodiment of the invention, the portion of the image greater than the screen sizes (G1, H1) is cut out as shown in FIG. 10A (914).

If both of the ratios "d" and "e" are not greater than 1, it is determined whether the magnification (reduction) ratios (d, e) are less than "1" (916). If both of the ratios d and e are less than 1, the image data 826 are reduced as much as "d" and "e," respectively, as shown in FIG. 10B (918). In one embodiment of the invention, the blank portion of the screen is filled with background color, e.g., black color, as shown in FIG. 10B (920).

If both of the ratios d and e are equal to 1, no adjustment of the image size is made (922). In this situation, since the magnification (reduction) ratio is 1, no magnification or reduction of the image is made as shown in FIG. 10C.

Figure 11:
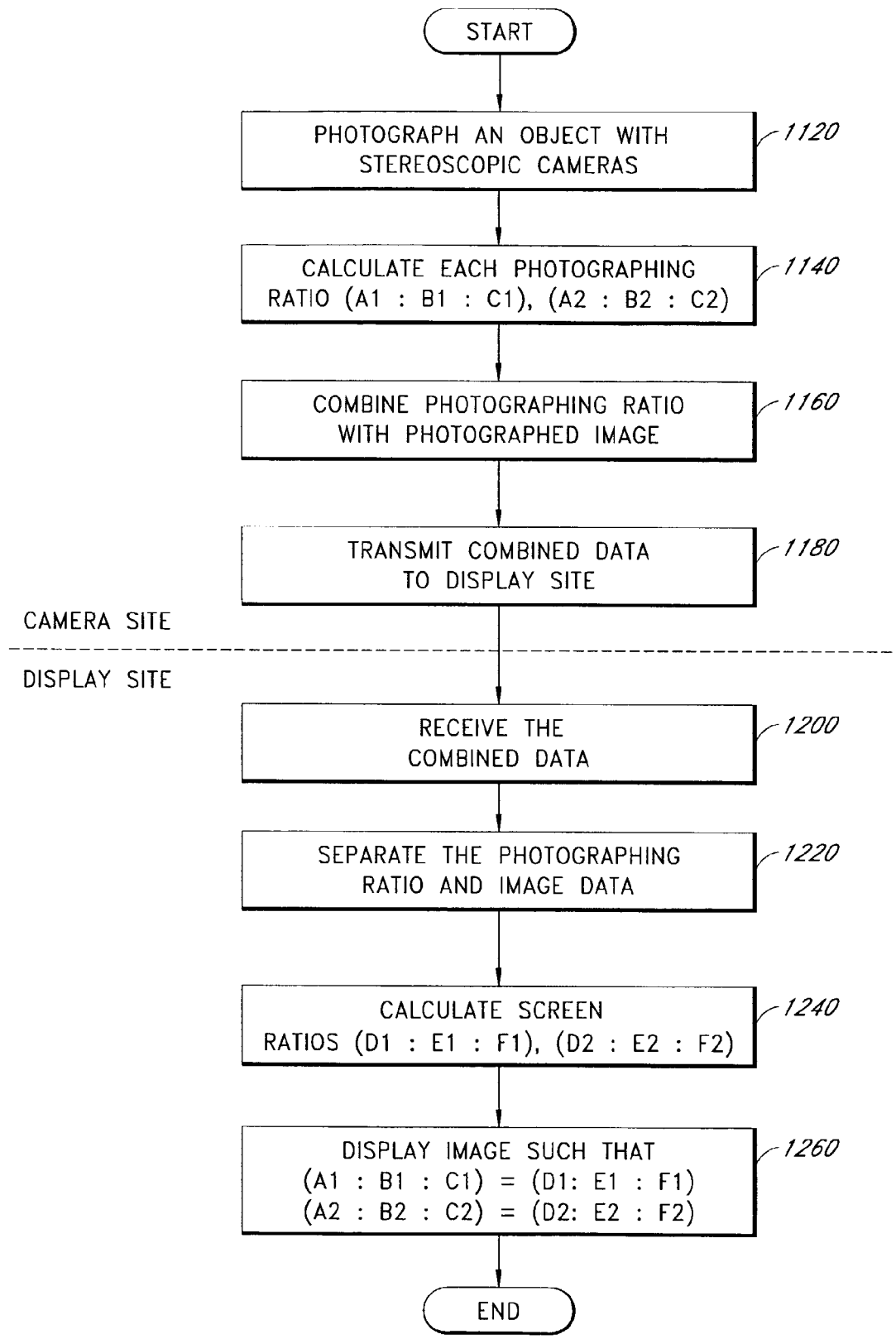
FIG. 11 illustrates an exemplary flowchart for explaining the entire operation of the system shown in FIG. 8.

Now referring to FIG. 11, the entire operation of the system shown in FIG. 8 will be described. Photographing an object is performed using a set of stereoscopic cameras 110 and 120 (1120), as exemplified in FIG. 1A. Each of the cameras 110 and 120 calculates the photographing ratio (A1:B1:C1) and (A2:B2:C2), respectively (1140), for example, using the method shown in FIG. 6.

The image data and the photographing ratio that are calculated for the image are combined for each of the stereoscopic cameras 110 and 120 (1160). The combined data are illustrated as reference numerals 802 and 804 in FIG. 8. In one embodiment of the invention, the combining is performed per a frame of the image data. In one embodiment of the invention, as long as the photographing ratio remains unchanged, the combining may not be performed and only image data without the photographing ratio may be transmitted to the display site 82. In that situation, when the photographing ratio is changed, the combining may resume. Alternatively, the photographing ratio is not combined, and rather, is transmitted separately from the image data. Each of the transmitters 806 and 808 transmits the combined data to the display site 82 through the communication network 84 (1180).

Each of the receivers 820 and 832 receives the transmitted data from the camera site 80 (1200). The photographing ratio and image data are separated from the combined data (1220). Alternatively to 1200 and 1220, the image data and photographing ratio are separately received as they are not combined in transmission. In one embodiment of the invention, the combined data may not include a photographing ratio. In that circumstance, the photographing ratio that has been received most recently is used for calculating the screen ratio. In one embodiment of the invention, the screen ratio may remain unchanged until the new photographing ratio is received.

Figure 9:
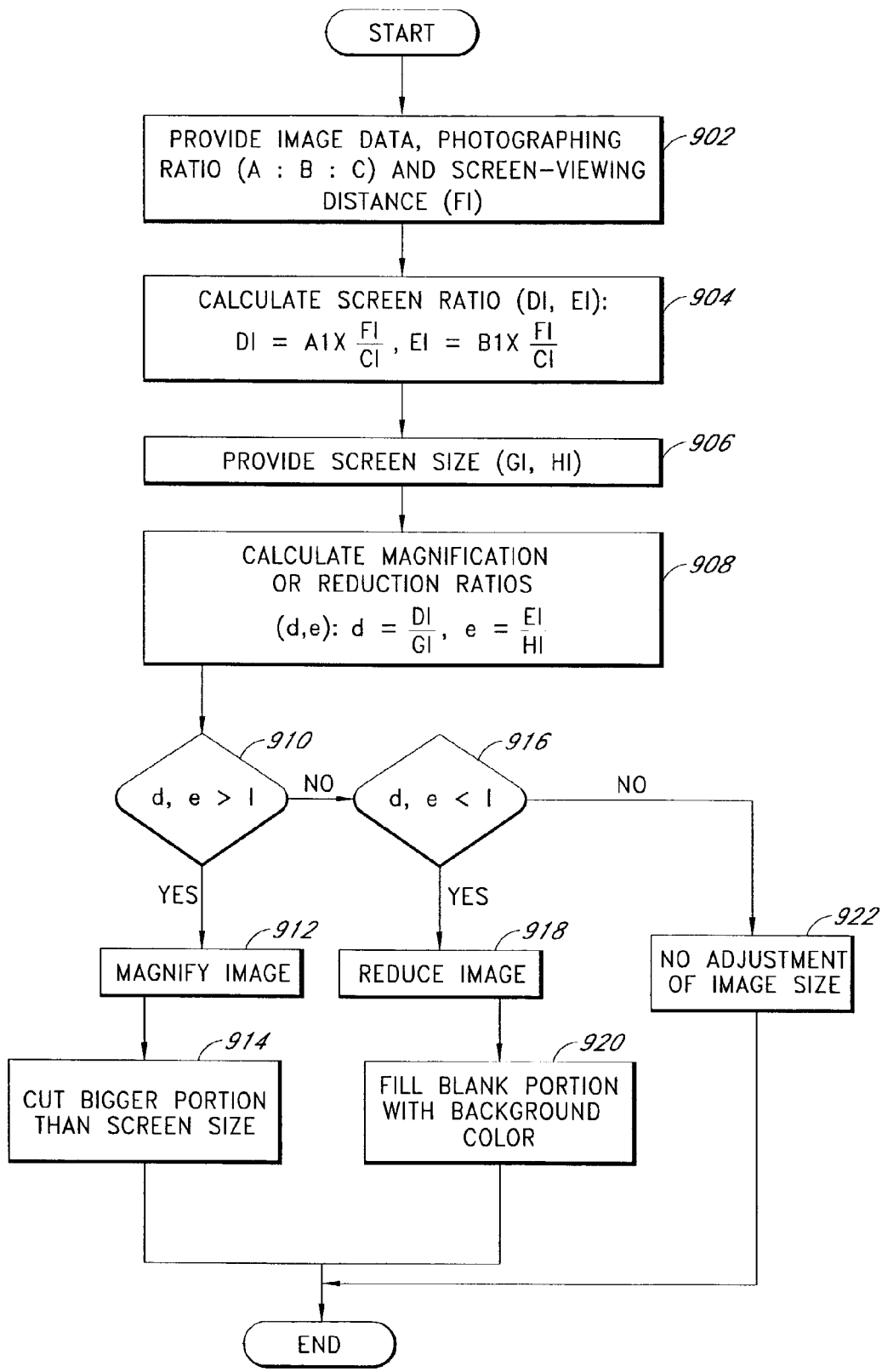
FIG. 9 illustrates an exemplary flowchart for explaining the operation of the image size adjusting portion of FIG. 8.
Figure 10:
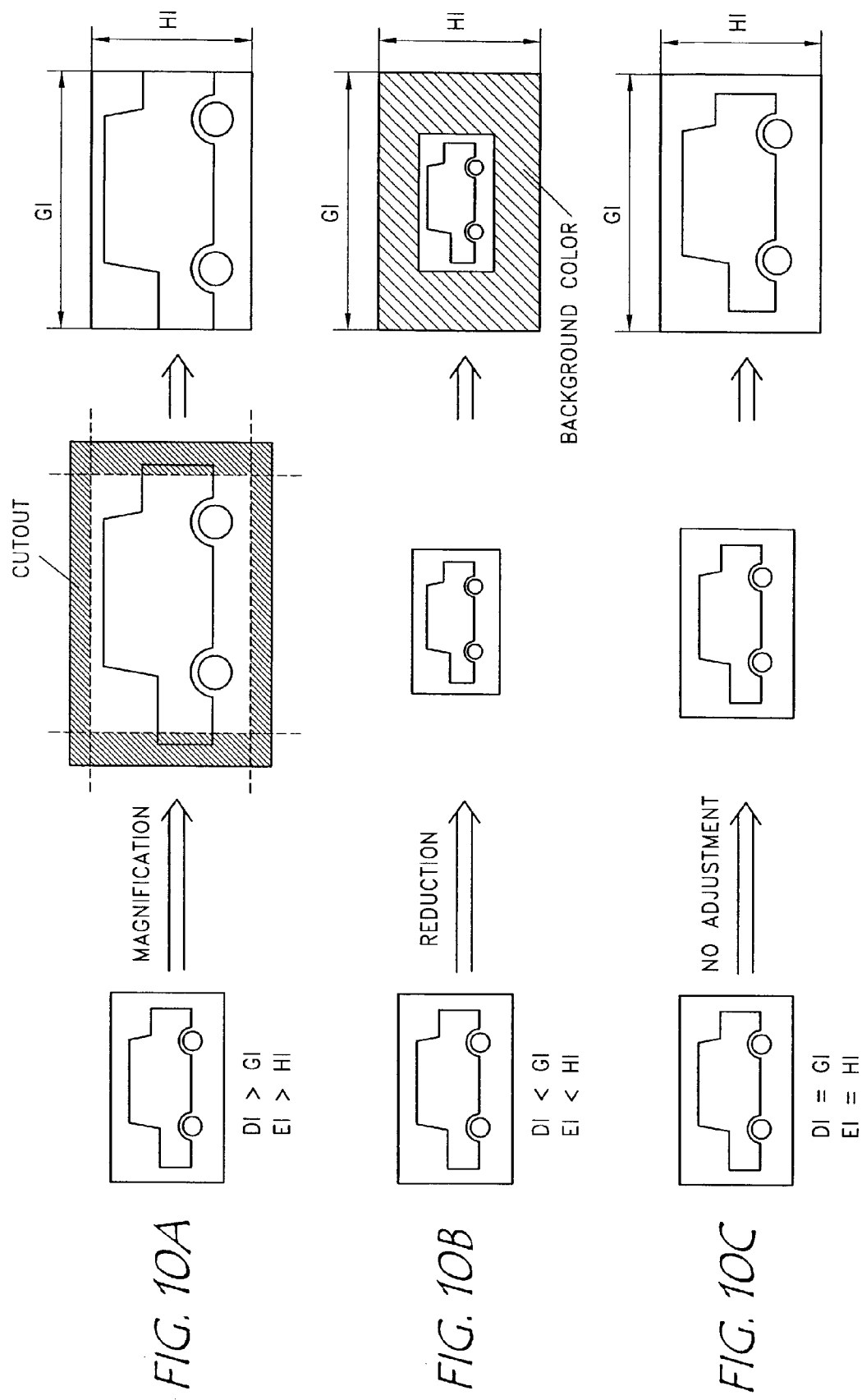
FIG. 10 is a conceptual drawing for explaining the image size adjustment in each of the display devices.

The screen ratios (D1:E1:F1) and (D2:E2:F2) for each of the display devices 86 and 88 are calculated using the method described with regard to FIG. 9 (1240). The stereoscopic images are displayed such that each of the photographing ratios (A1:B1:C1) and (A2:B2:C2) is substantially the same as each of the screen ratios (D1:E1:F1) and (D2:E2:F2) (1260). In this situation, the image may be magnified or reduced with regard to the screen size of each of the display devices 86 and 88 as discussed with reference to FIGS. 9 and 10.

Method and System for Controlling the Display Location of a Stereoscopic Image

Figure 12A:
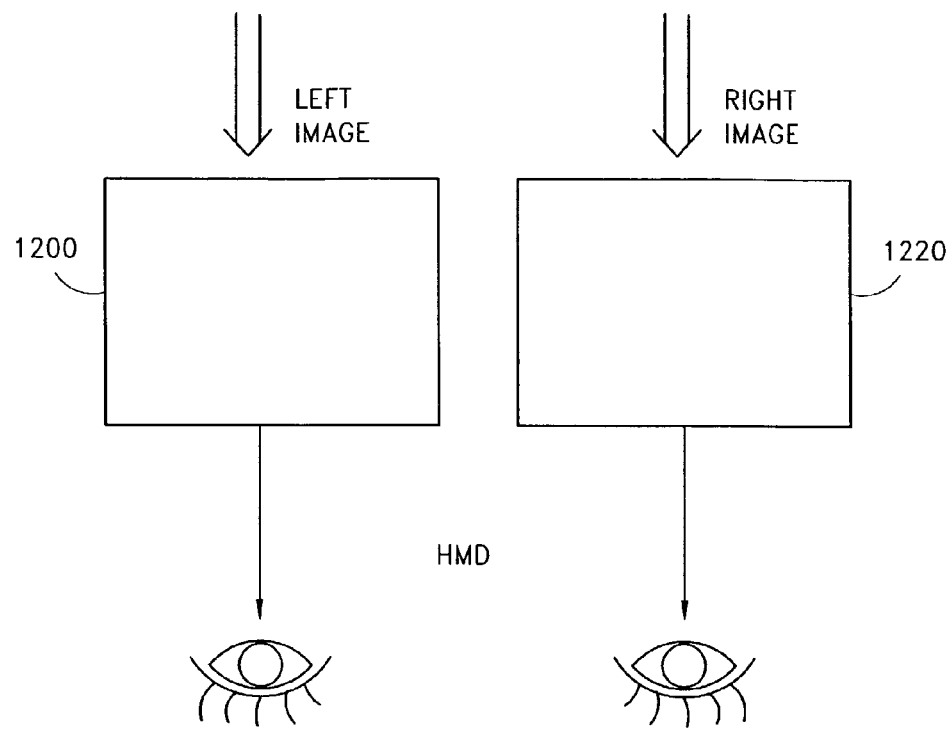
FIG. 12 illustrates examples of the display system according to one aspect of the invention.

FIG. 12 illustrates examples of the display system according to one embodiment of the invention. FIG. 12A illustrates a head mount display (HMD) system. The HMD system comprises the pair of the display screens 1200 and 1220. For convenience, the electronic display mechanism as exemplified in FIG. 8 is omitted in this HMD system. A viewer wears the HMD on his or her head and watches stereoscopic images through each display screen 1200 and 1220. Thus, in one embodiment of the invention, the screen-viewer's eye distance (F) may be fixed. In another embodiment of the invention, the distance (F) may be measured with a known distance detection sensor and provided to the HMD system. Another embodiment of the invention includes a 3D display system as shown in FIG. 1B. Another embodiment of the display devices includes a pair of projection devices that project a set of stereoscopic images on the screen.

Figure 12B:
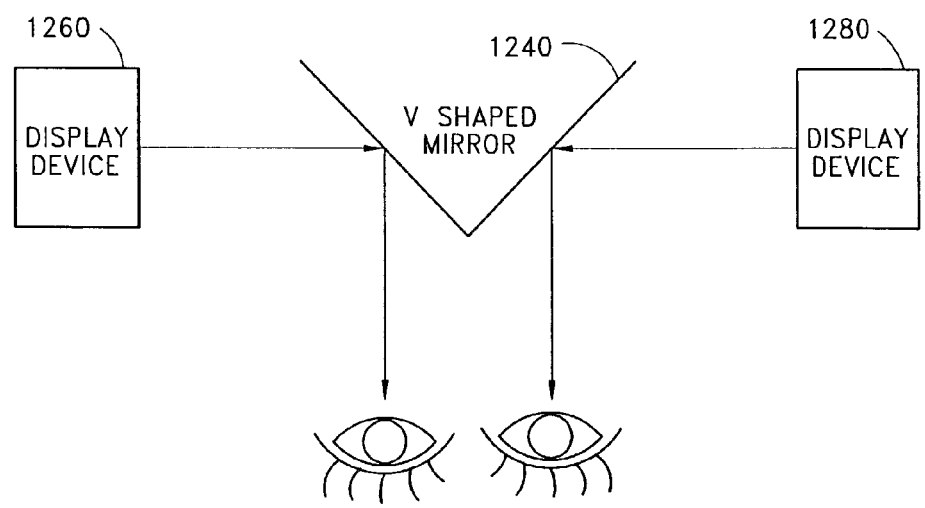

FIG. 12B illustrates a 3D display system according to another embodiment of the invention. The display system comprises a V shaped mirror 1240, and a set of display devices 1260 and 1280. In one embodiment of the invention, the display devices 1260 and 1280 are substantially the same as the display devices 86 and 88 of FIG. 8 except for further comprising an inverting portion (not shown), respectively. The inverting portion inverts the left and right sides of the image to be displayed. The V shaped mirror 1240 reflects the images coming from the display devices 1260 and 1280 to a viewer's eyes. Thus, the viewer watches a reflected image from the V shaped mirror 1240. The 3D display system comprising the V shaped mirror is disclosed in U.S. application Ser. No. 10/067,628, which was filed on Feb. 4, 2002, by the same inventor as this application and is incorporated by reference herein. For convenience, hereinafter, the description of inventive aspects will be mainly made based on the display system as shown in FIG. 12B, however, the invention is applicable to other display systems such as the one shown in FIG. 12A.

Figure 13A:
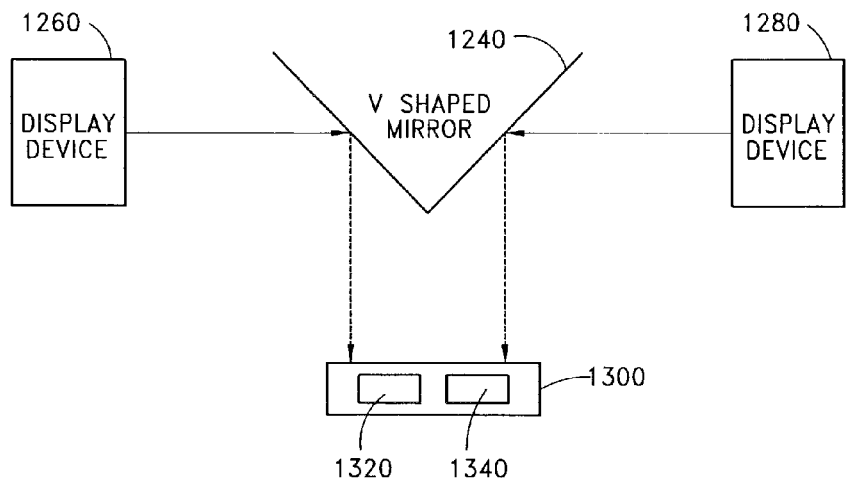
FIG. 13 illustrates a 3D display system including an eye position fixing device according to one aspect of the invention.
Figure 13B:
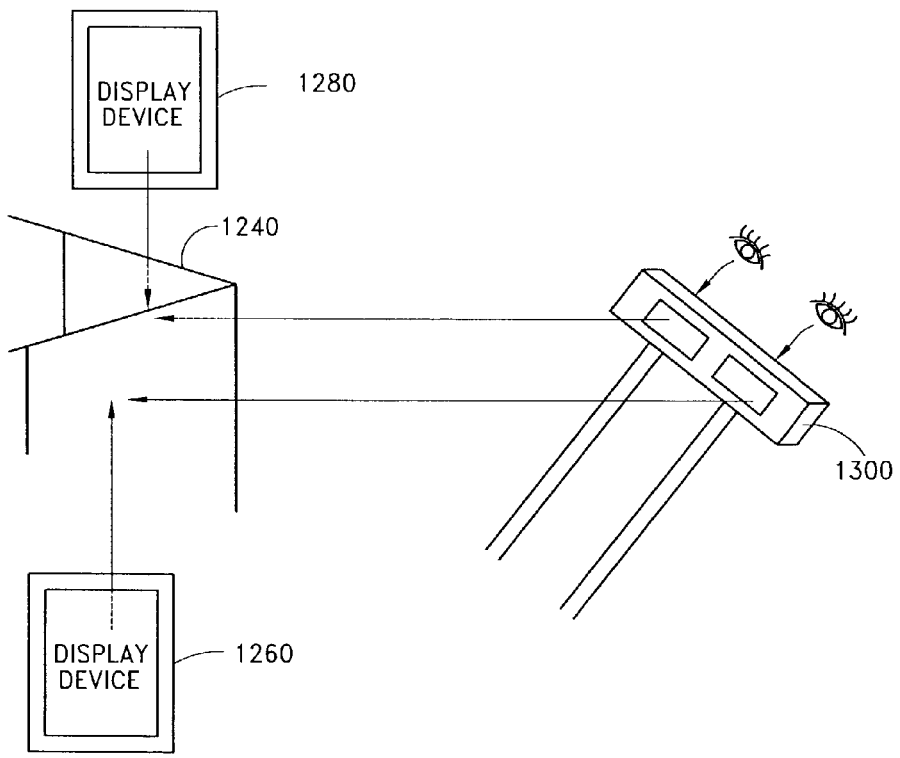

FIG. 13 illustrates a 3D display system including an eye position fixing device 1300 according to one aspect of the invention. Referring to FIGS. 13A and 13B, the eye position fixing device 1300 is located in front of the V shaped mirror 1240 at a predetermined distance from the mirror 1240. The eye position fixing device 1300 is used for fixing the distance between the mirror 1240 and a viewer's eyes. The eye position fixing device 1300 is also used for locating a viewer's eyes such that each of the viewer's eyes is substantially perpendicular to each of the mirror (imaginary) images. A pair of holes 1320 and 1340 defined in the device 1300 are configured to allow the viewer to see each of the center points of the reflected images. In one embodiment of the invention, the size of each of the holes 1320 and 1340 is big enough to allow the viewer to see a complete half portion (left or right portion) of the V shaped mirror 1240 at a predetermined distance and location as exemplified in FIGS. 13A and 13B. In one embodiment of the invention, the eye position fixing device 1300 may be used for fixing the location of a viewer's eyes as necessary with regard to the other aspects of the invention as discussed below.

Figure 14A:
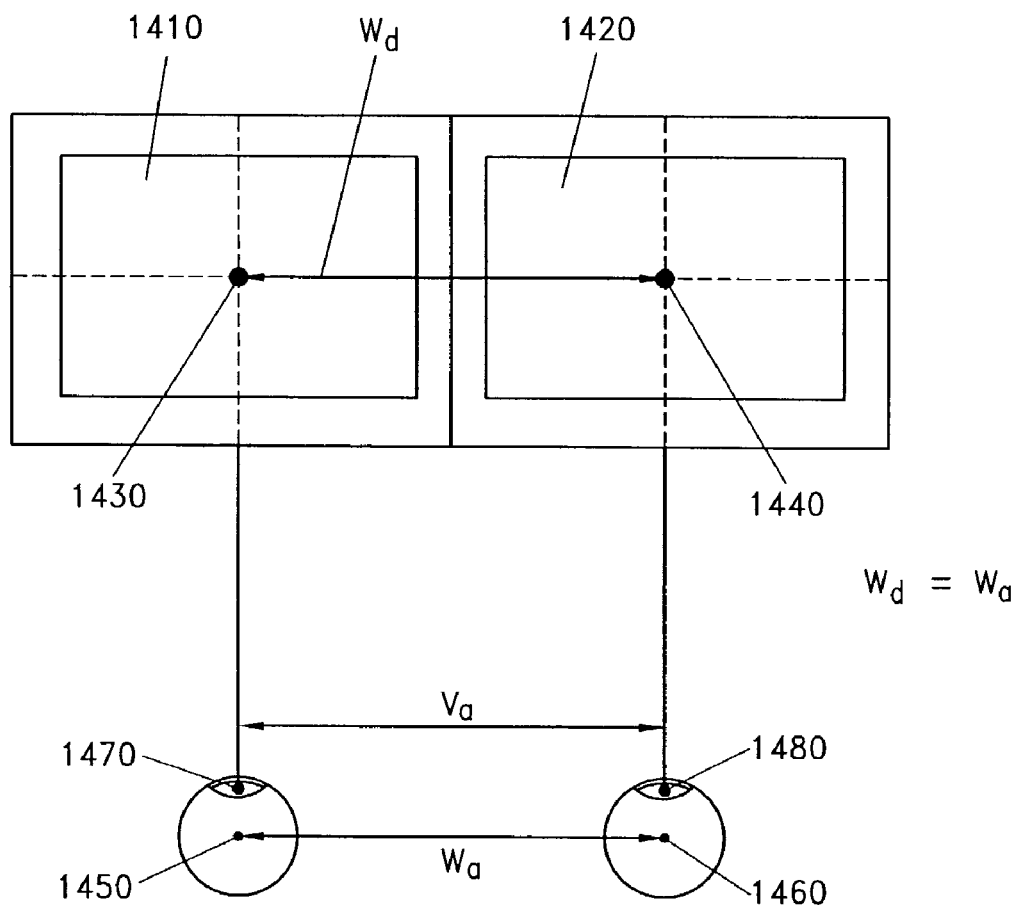
FIG. 14 illustrates a relationship between the displayed images and a viewer's eyes.
Figure 14B:
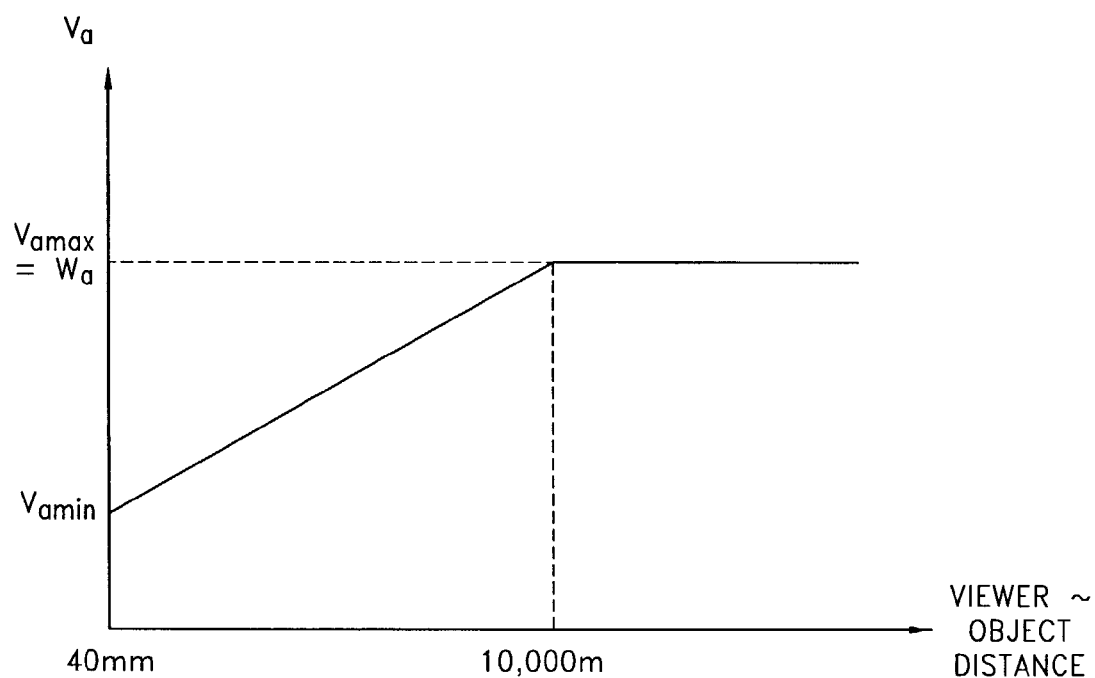

FIG. 14A illustrates a relationship between the displayed images and a viewer's eyes. Distance ($W_d$) represents the distance between the center points (1430, 1440) of each of the displayed images (1410, 1420). Distance ($W_a$) represents the distance between the center points (1450, 1460) of each of a viewer's eyes. The distance $W_a$ varies from person to person. Normally the distance increases as a person grows and it does not change when he or she reaches a certain age. The average distance of an adult may be 70 mm. Some people may have 80 mm distance, other people may have 60 mm distance. Distance ($V_a$) represents the distance between the center points (1470, 1480) of each of a viewer's eye lenses. Here, a lens means a piece of round transparent flesh behind the pupil of an eye. The lens moves along the movement of the eye. The distance $V_a$ changes according to the distance (F) between an object and the viewer's eyes. The farther the distance (F) is, the greater the value $V_a$ becomes. Referring to FIG. 14B, when a viewer sees an object farther than, for example, 10,000 m, $V_a$ has the maximum value ($V_{amax}$) which is substantially the same as the distance $W_a$.

Traditional 3D display systems display images without considering the value $W_a$. This means that the distance value ($W_d$) is the same for all viewers regardless of the fact that they have a different $W_a$ value. These traditional systems caused several undesirable problems such as headache or dizziness of the viewer, and deterioration of a sense of three dimension. In order to produce a more realistic three-dimensional image and to reduce headaches or dizziness of a viewer, the distance $W_d$ needs to be determined by considering the distance $W_a$. The consideration of the $W_a$ value may provide a viewer with better and more realistic three-dimensional images. In one embodiment of the invention, the distance $W_d$ is adjusted such that the distance $W_d$ is substantially the same as $W_a$.

Figure 15:
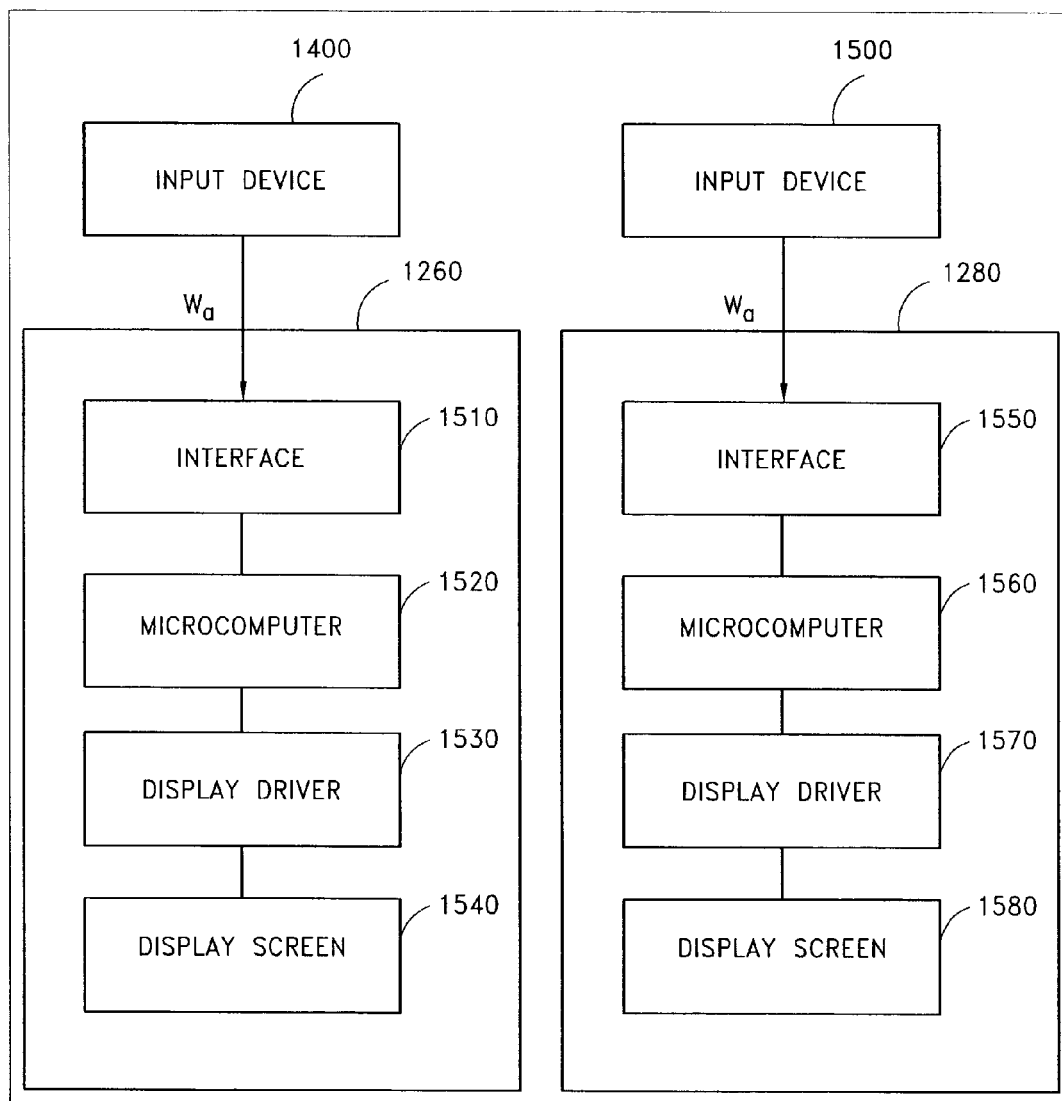
FIG. 15 illustrates a 3D image display system according to one aspect of the invention.

FIG. 15 illustrates a 3D image display system according to one aspect of the invention. Once again, the system may be used with, for example, either a HMD system or a display system with the V shaped mirror shown in FIGS. 13A and 13B, a projection display system, respectively.

The system shown in FIG. 15 comprises a pair of display devices 1260 and 1280, and a pair of input devices 1400 and 1500. Each of the input devices 1400 and 1500 provides the distance value $W_a$, to each of the display devices 1260 and 1280. In one embodiment of the invention, each of the input devices 1400 and 1500 comprises a keyboard, a mouse, a pointing device, or a remote controller. In one embodiment of the invention, one of the input devices 1400 and 1500 may be omitted and the other input device is used for providing the distance value $W_a$ to both of the display devices 1260 and 1280.

The display devices 1260 and 1280 comprise interfaces 1510 and 1550, microcomputers 1520 and 1560, display drivers 1530 and 1570, and display screens 1540 and 1580, respectively. In one embodiment of the invention, each of the display screens 1540 and 1580 comprises a LCD screen, a CRT screen, or a PDP screen. The interfaces 1510 and 1550 provide the interface between the input devices 1400 and 1500 and the microcomputers 1520 and 1560, respectively. In one embodiment of the invention, each of the interfaces 1510 and 1550 comprises a typical input device controller and/or a typical interface module (not shown).

There may be several methods to measure and provide the distance ($W_a$). As one example, an optometrist may measure the $W_a$ value of a viewer with eye examination equipment. In this situation, the viewer may input the value ($W_a$) via the input devices 1400, 1500. As another example, an eye lens motion detector may be used in measuring the $W_a$ value. In this situation, the $W_a$ value may be provided from the detector to either the input devices 1400, 1500 or the interfaces 1510, 1550 in FIG. 15.

Figure 14C:
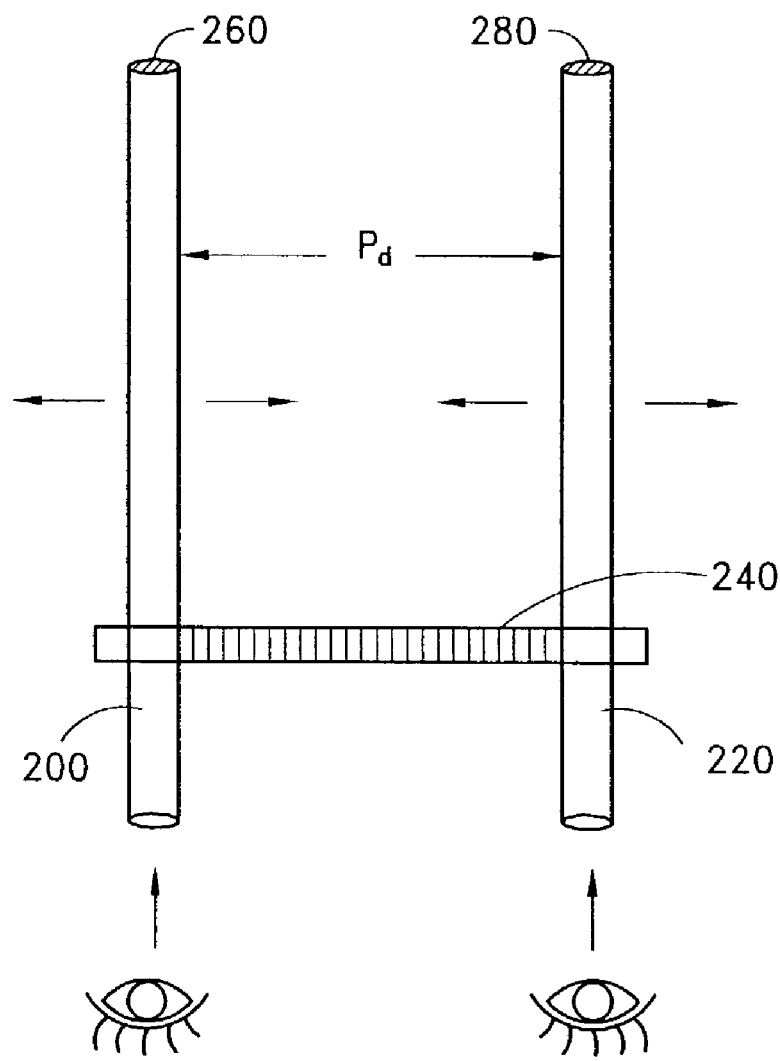

As another example, as shown in FIG. 14C, the $W_a$ value may be measured using a pair of parallel pipes 200, 220, about 1 m in length and about 1 mm in diameter, which are spaced approximately 1 cm apart from a viewer's eyes. Each end of the pipes 200, 220 is open. The pipe distance ($P_d$) may be adjusted between about 40 mm and about 120 mm by widening or narrowing the pipes 200, 220. The pipes 200, 220 maintain a parallel alignment while they are widened or narrowed. A ruler 240 may be attached into the pipes 200, 220, as shown in FIG. 14C so that the ruler 240 can measure the distance between the pipes 200, 220. When the viewer sees the holes 260, 280 completely through the holes that are located closer to the viewer, respectively, the ruler 240 indicates the $W_a$ value of the viewer. In another embodiment, red and blue color materials (paper, plastic, or glass) may cover the holes 260, 280, respectively. In this situation, the pipe distance ($P_d$) is the $W_a$ value of the viewer where the viewer perceives a purple color from the holes 260, 280 by the combination of the red and blue colors.

Each of the microcomputers 1520 and 1560 determines an amount of movement for the displayed images based on the provided $W_a$ value such that the $W_d$ value is substantially the same as the $W_a$ value. In one embodiment of the invention, each microcomputer (1520, 1560) initializes the distance value $W_d$ and determines an amount of movement for the displayed images based on the value $W_a$ and the initialized value $W_d$. Each of the display drivers 1530 and 1570 moves the displayed images based on the determined movement amount and displays the moved images on each of the display screens 1540 and 1580. In one embodiment of the invention, each microcomputer (1520, 1560) may incorporate the function of each of the display drivers 1530 and 1570. In that situation, the display drivers 1530 and 1570 may be omitted.

Figure 16:
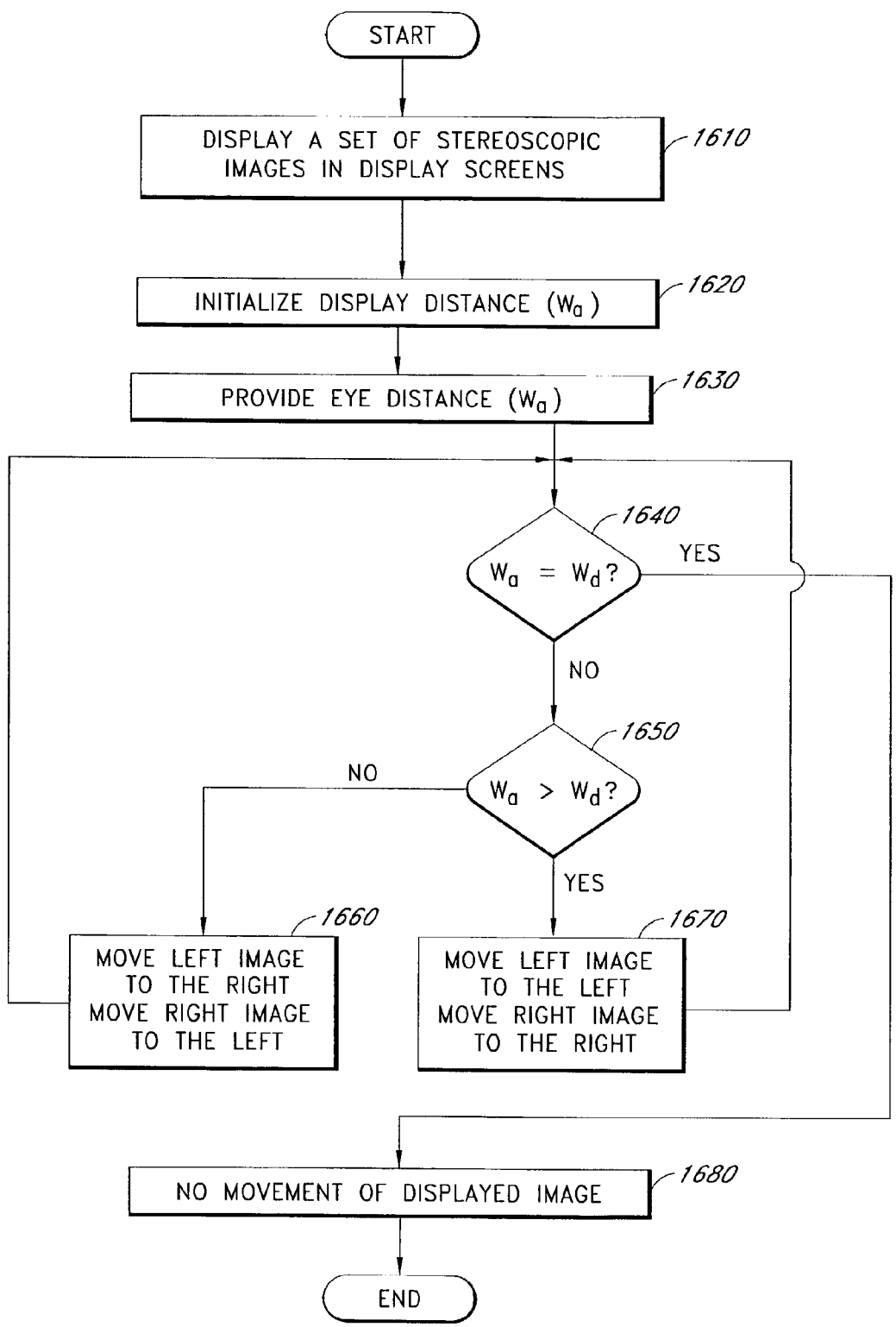
FIG. 16 illustrates an exemplary flowchart for explaining the operation of the system of FIG. 15.

Referring to FIG. 16, the operation of the system of FIG. 15 will be described. A set of stereoscopic images are displayed in the pair of display screens 1540 and 1580 (1610). The stereoscopic images may be provided from the stereoscopic cameras 110 and 120, respectively, as exemplified in FIG. 1A. The distance ($W_d$) between the center points of the displayed images is initialized (1620). In one embodiment of the invention, the initial value may comprise the eye distance value of the average adult, e.g., "70 mm." The distance ($W_a$) between the center points of a viewer's eye lenses is provided (1630).

It is then determined whether $W_a$ equals $W_d$ (1640). If $W_a$ equals $W_d$, no movement of the displayed images is made (1680). In this situation, since the distance ($W_a$) between the center points of the viewer's eye is the same as the distance ($W_d$) between the center points of the displayed images, no adjustment of the displayed images is made.

Figure 17A:
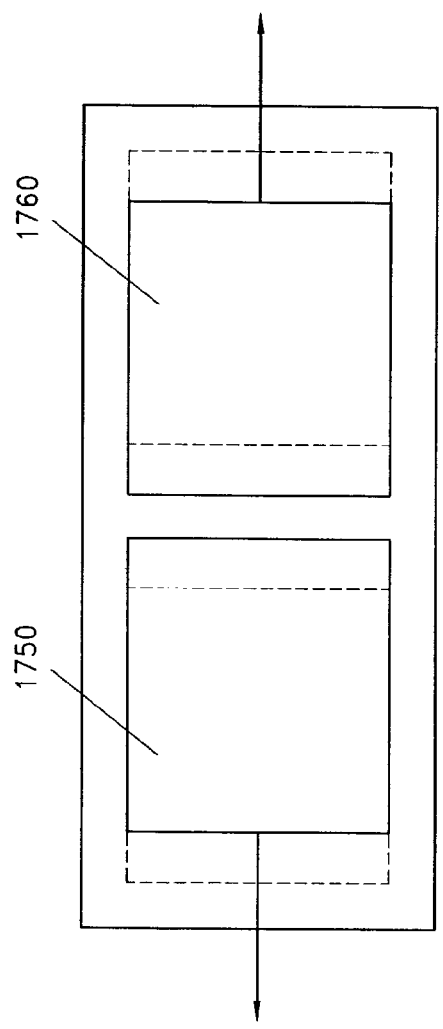
FIG. 17 is a conceptual drawing for explaining the operation of the display device of FIG. 15.
Figure 17B:
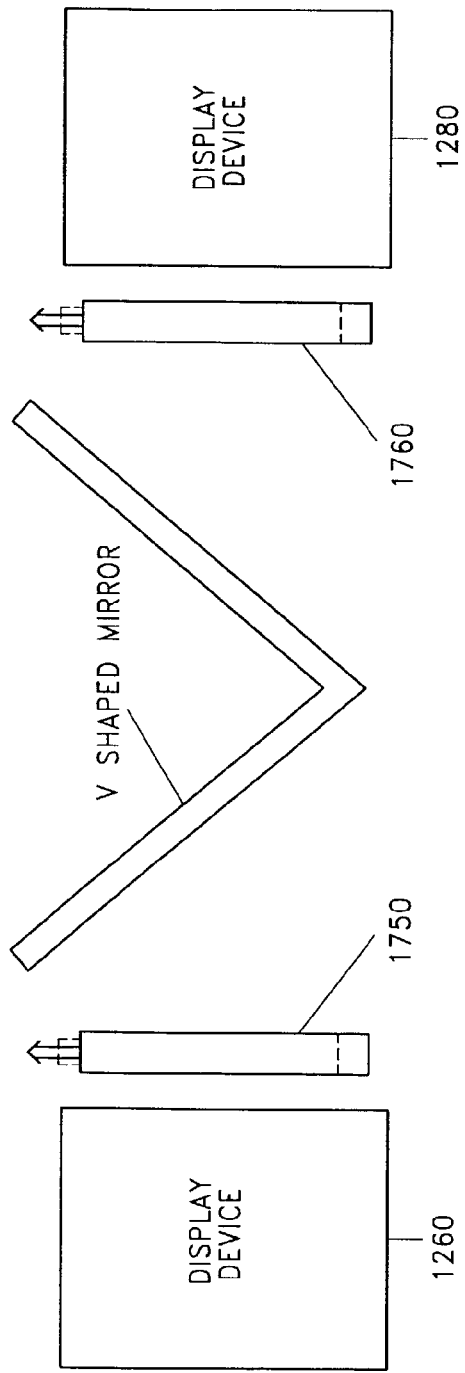

If $W_a$ does not equal $W_d$, it is determined whether $W_a$ is greater than $W_d$ (1650). If $W_a$ is greater than $W_d$, the distance ($W_d$) needs to be increased until $W_d$ equals $W_a$. In this situation, the left image 1750 displayed in the left screen 1540 is moved to the left side and the right image 1760 displayed in the right screen 1580 is moved to the right side until the two values are substantially the same as shown in FIG. 17A (1660). Referring to FIG. 17B, movements of the displayed images 1750 and 1760 are conceptually illustrated for the display system with a V shaped mirror. Since the V shaped mirror reflects the displayed images, which have been received from the display devices 1260 and 1280, to a viewer, in order for the viewer to see the adjusted images through the mirror as shown in FIG. 17A, the displayed images 1750 and 1760 need to be moved with regard to the V shaped mirror as shown in FIG. 17B. That is, when the displayed images 1750 and 1760 are moved as shown in FIG. 17B, the viewer who sees the V shaped mirror perceives the image movement as shown in FIG. 17A.

With regard to the HMD system shown in FIG. 12A, the movement direction of the displayed images is the same as the direction of those shown in FIG. 17A. With regard to the projection display system described in connection with FIG. 15, since the projection display system projects images into a screen that is located across the projection system, the movement direction of the displayed images is opposite to the direction of those shown in FIG. 17A.

Figure 17C:
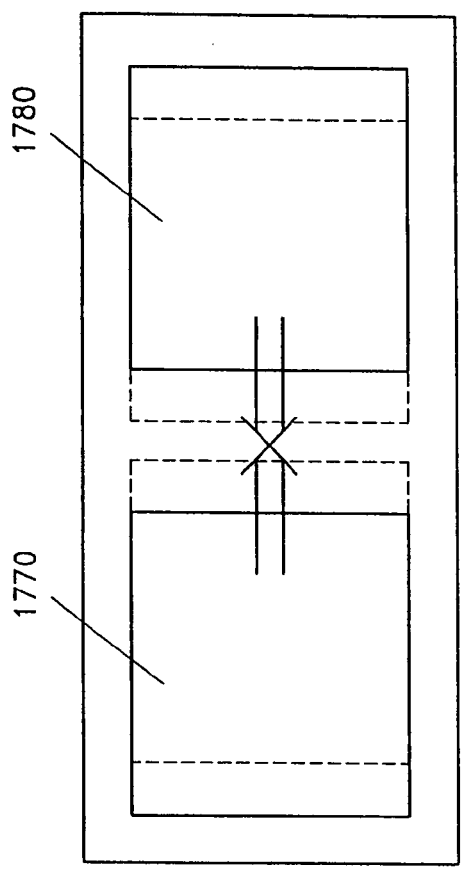
Figure 17D:
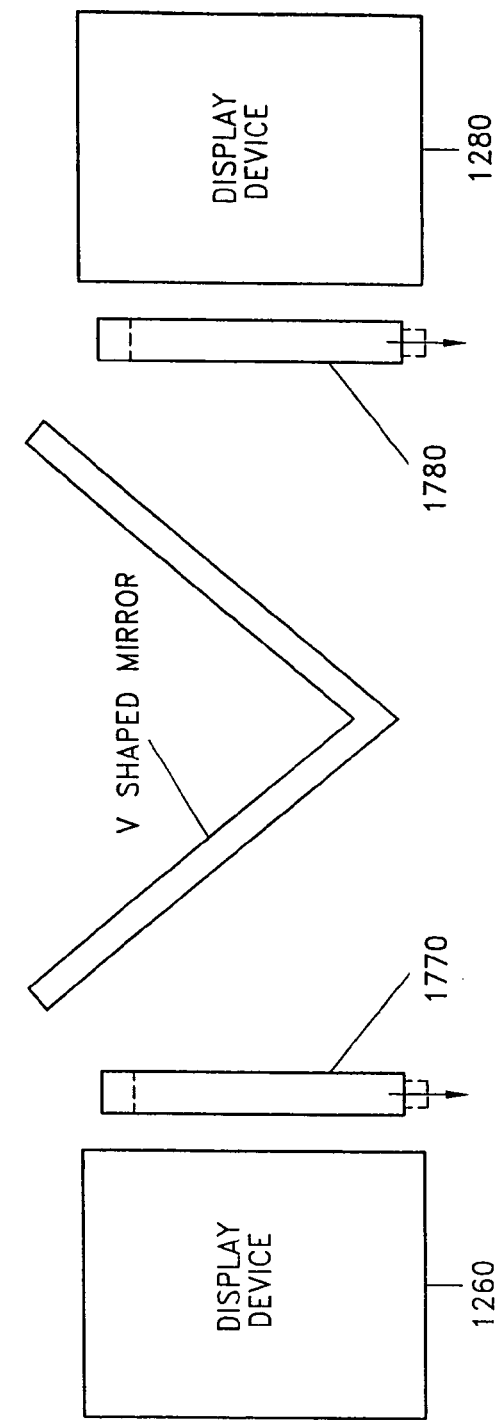

If it is determined that $W_a$ is not greater than $W_d$, the distance $W_d$ needs to be reduced until $W_d$ equals $W_a$. Thus, the left image 1770 displayed in the display device 1260 is moved to the right side and the right image 1780 displayed in the display device 1280 is moved to the left side until the two values are substantially the same as shown in FIGS. 17C and 17D. The same explanation with regard to the movement of the displayed images described in FIGS. 17A and 17B applies to the system of FIGS. 17C and 17D.

Figure 18:
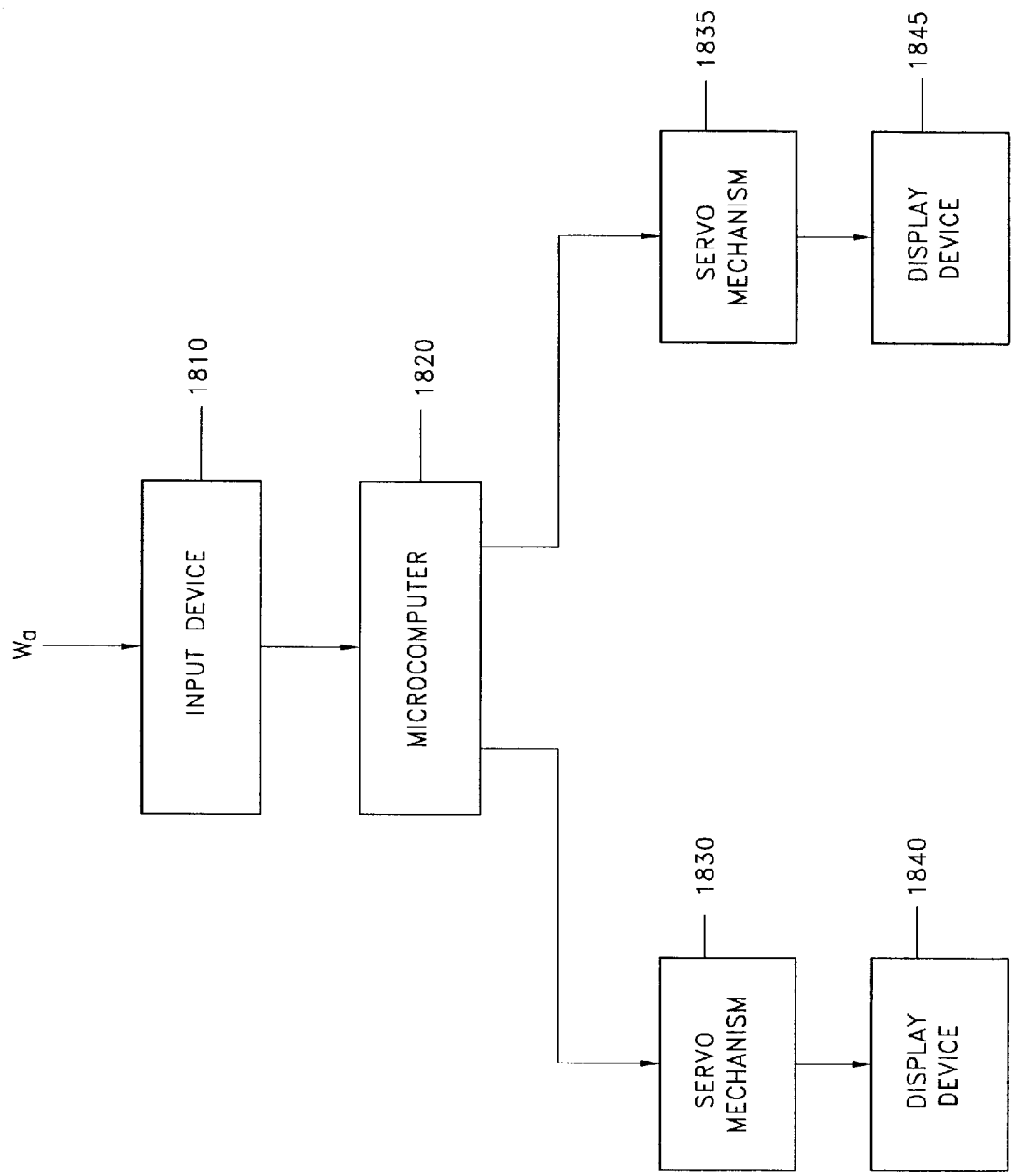
FIG. 18 illustrates a 3D image display system according to another aspect of the invention.

FIG. 18 illustrates a 3D image display system according to another embodiment of the invention. The system comprises an input device 1810, a microcomputer 1820, a pair of servo mechanisms 1830 and 1835, and a pair of display devices 1840 and 1845. The input device 1810 provides a viewer's input, i.e., the distance value $W_a$, to each of the display devices 1840 and 1845. In one embodiment of the invention, the input device 1810 may be a keyboard, a mouse, a pointing device, or a remote controller, for example. An interface is omitted for convenience.

The microcomputer 1820 determines an amount of the movement for the display devices 1840 and 1845 based on the provided value $W_a$ such that the $W_d$ value is substantially the same as the $W_a$ value. In one embodiment of the invention, the microcomputer 1820 initializes the distance value ($W_d$) and determines an amount of the movement for the display devices 1840 and 1845 based on the value $W_a$ and the initialized value $W_d$. Each of the servo mechanisms 1830 and 1835 moves the display devices 1840 and 1845, respectively, based on the determined movement amount.

Figure 19:
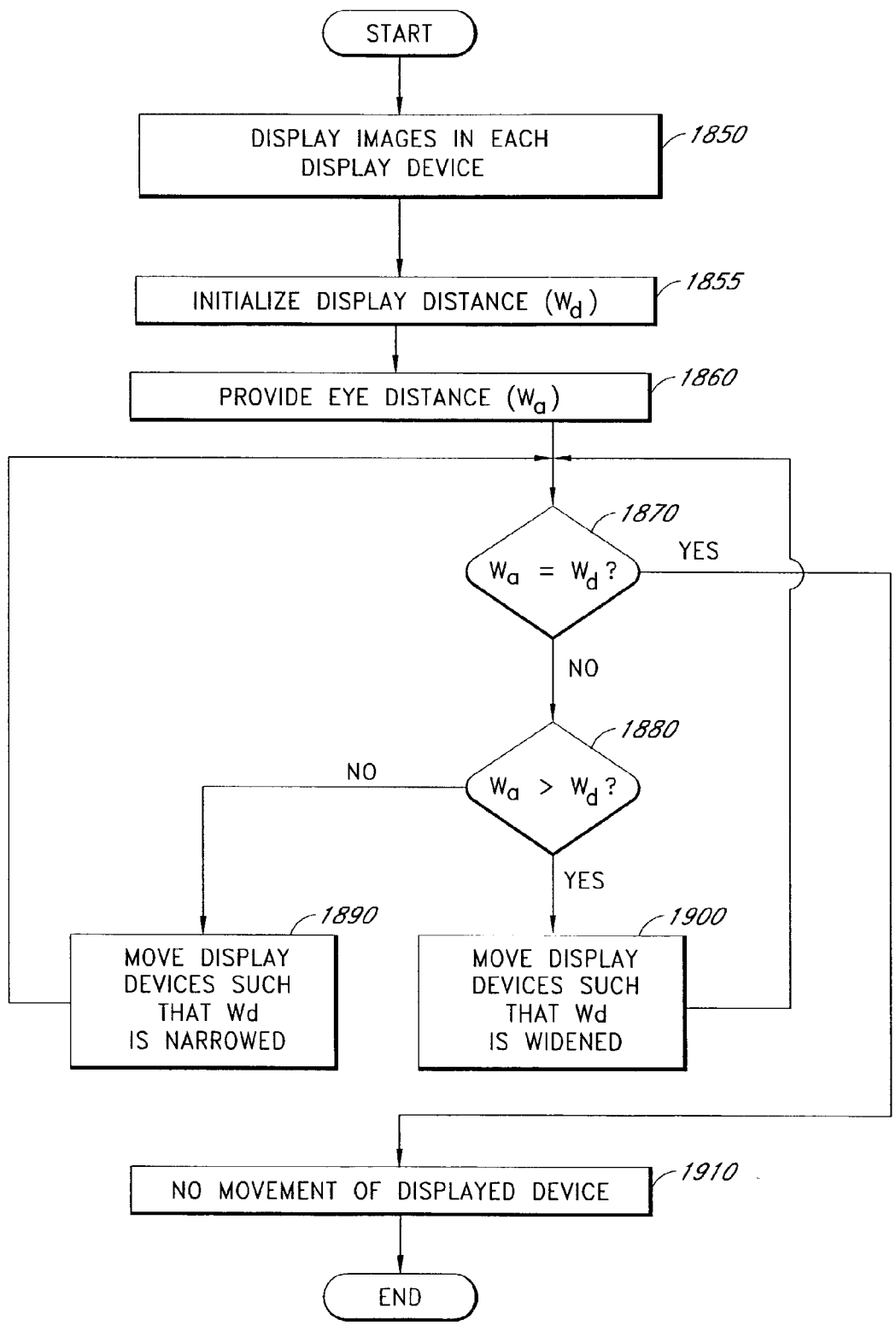
FIG. 19 illustrates an exemplary flowchart for explaining the operation of the system of FIG. 18.
Figure 20A:
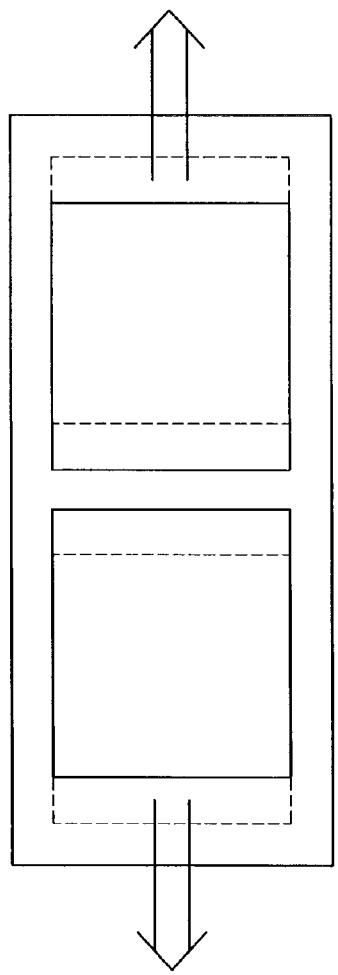
FIG. 20 illustrates a conceptual drawing for explaining the operation of the system of FIG. 18.
Figure 20B:
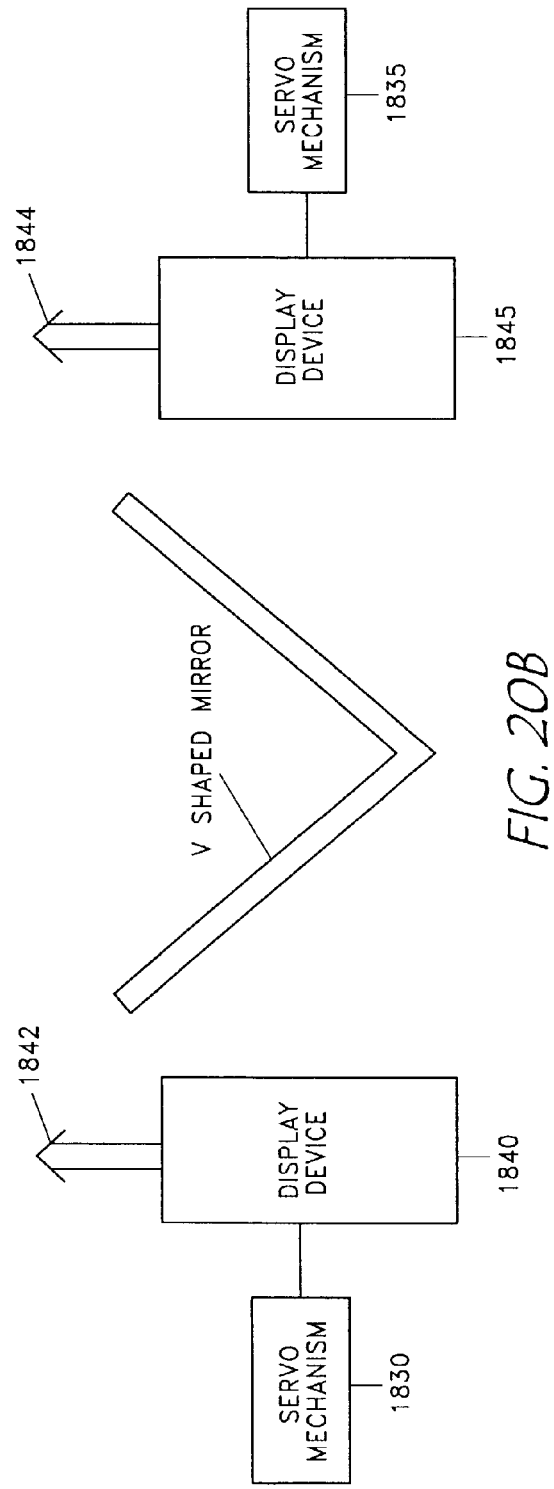
Figure 20C:
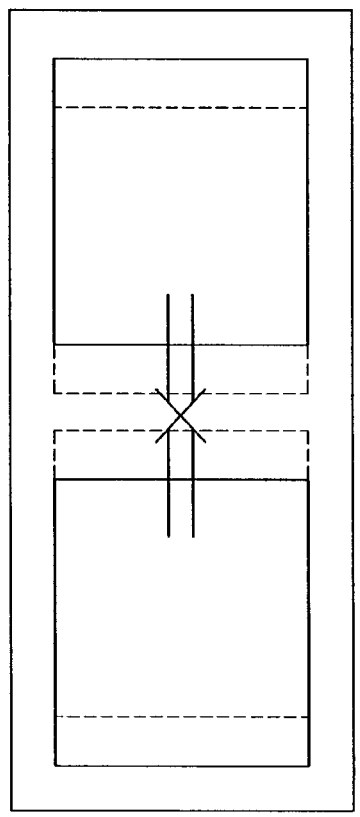
Figure 20D:
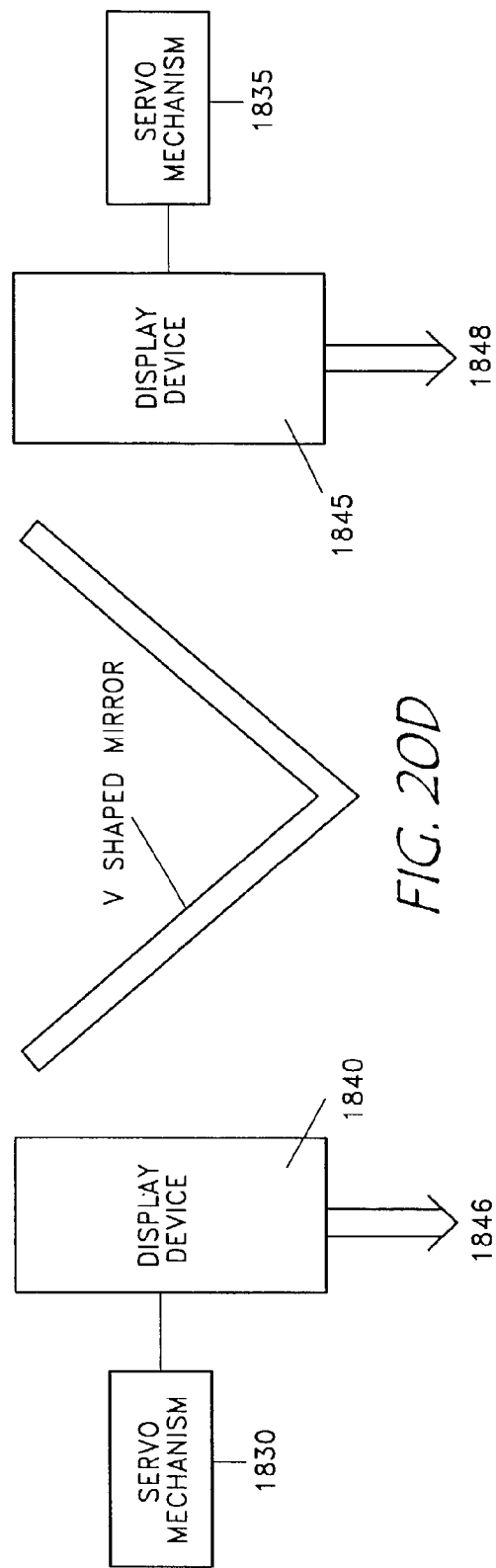

Referring to FIG. 19, the operation of the system of FIG. 18 will be described. Each of stereoscopic images is displayed in the display devices 1840 and 1845 (1850). The distance ($W_d$) between the center points of the displayed images is initialized (1855). In one embodiment of the invention, the initial value may be "70 mm." The distance ($W_a$) between the center points of a viewer's eyes is provided to the microcomputer 1820 (1860). It is determined whether $W_a$ equals $W_d$ (1870). If $W_a$ equals $W_d$, no movement of the display devices 1840 and 1845 is made (1910). If it is determined that $W_a$ is greater than $W_d$ (1880), the servo mechanisms 1830 and 1835 move the display devices 1840 and 1845 in the directions (1842, 1844), respectively such that $W_d$ is widened to $W_a$ as shown in FIGS. 20A and 20B. If it is determined that $W_a$ is not greater than $W_d$, the servo mechanisms 1830 and 1835 move the display devices 1840 and 1845 in the directions (1846, 1848), respectively such that $W_d$ is narrowed to $W_a$ as shown in FIGS. 20C and 20D.

Figure 21A:
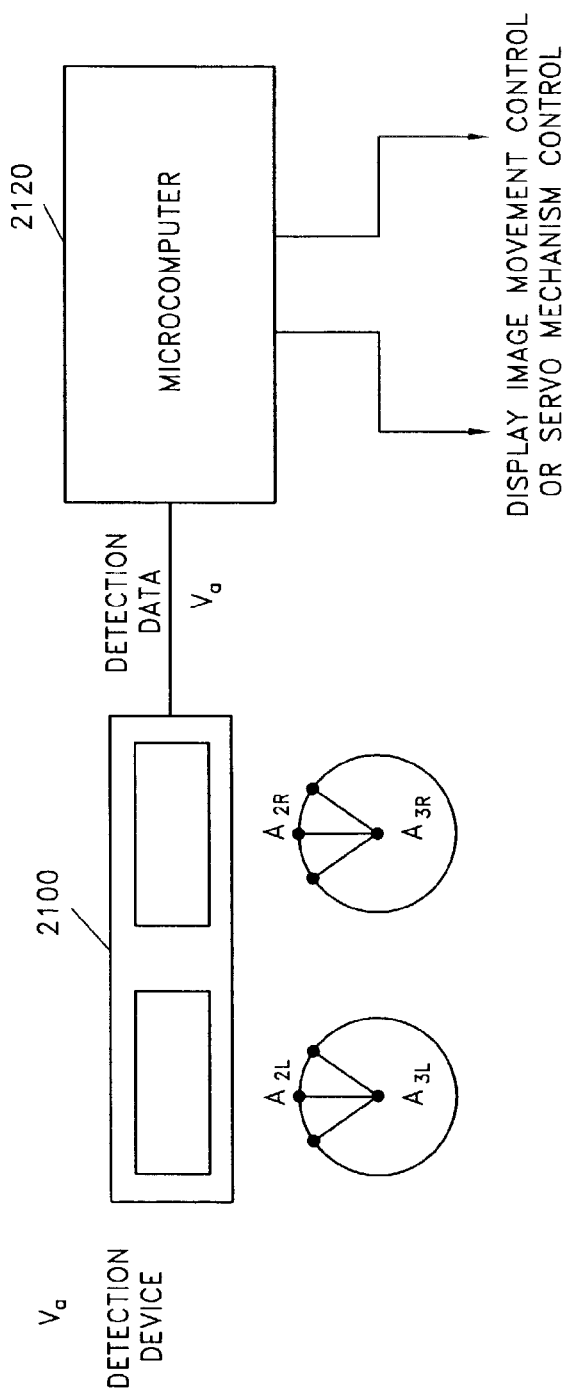
FIG. 21A illustrates an eye lens motion detection device.
Figure 21B:
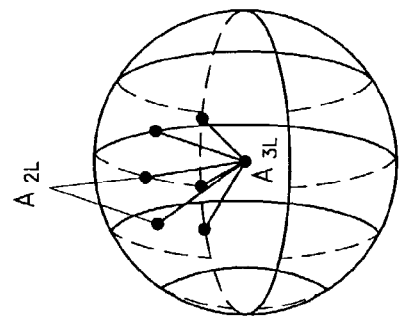
FIG. 21B is a conceptual drawing for explaining the movement of the eye lenses.

In another embodiment of the invention, the distance ($V_a$) is automatically detected using a known eye lens motion detector. This embodiment of the invention will be described referring to FIG. 21A. The detector 2100 detects the distance $V_a$ between the center points of a viewer's eye lenses. In addition, the detector 2100 detects the locations of each of the eye lenses. In FIGS. 21A and 21B, $A_{2L}$ and $A_{2R}$ represent the center points of a viewer's eye lenses, and $A_{3L}$ and $A_{3R}$ represent the center points of a viewer's eyes. As seen in FIGS. 21A and 21B, the $A_{3L}$ location is fixed, but the $A_{2L}$ location moves. The detector 2100 detects the current locations of each of the eye lenses. In one embodiment of the invention, the detector 2100 comprises a known eye lens detecting sensor disclosed, for example, in U.S. Pat. No. 5,526,089.

Figure 22:
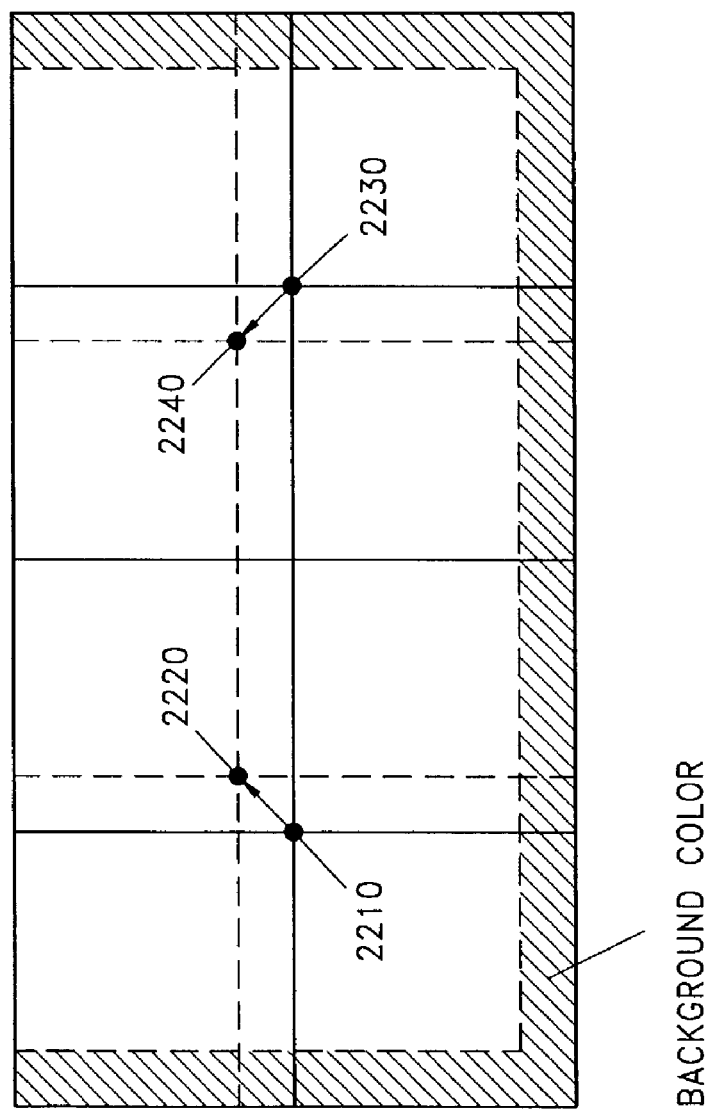
FIG. 22 is a conceptual drawing for explaining the movement of the center points of the displayed images.

The detected distance and location values are provided to a microcomputer 2120. The microcomputer 2120 receives the distance value $V_a$ and determines an amount of movement for the displayed images or an amount of movement for the display devices similarly as described with regard to FIGS. 15–20. The determined amount is used for controlling either the movement of the displayed images or the movement of the display devices. In addition, the microcomputer 2120 determines new locations of the center points of the images based on the location values of the eye lenses. In this way, the microcomputer 2120 controls the display drivers (1530, 1570) or the servo mechanisms (1830, 1835) to move the stereoscopic images from the current center points 2210 and 2230 of the images to, for example, new center points 2220 and 2240 as shown in FIG. 22.

Method and System for Providing the Motion Information Of Stereoscopic Cameras

Figure 23:
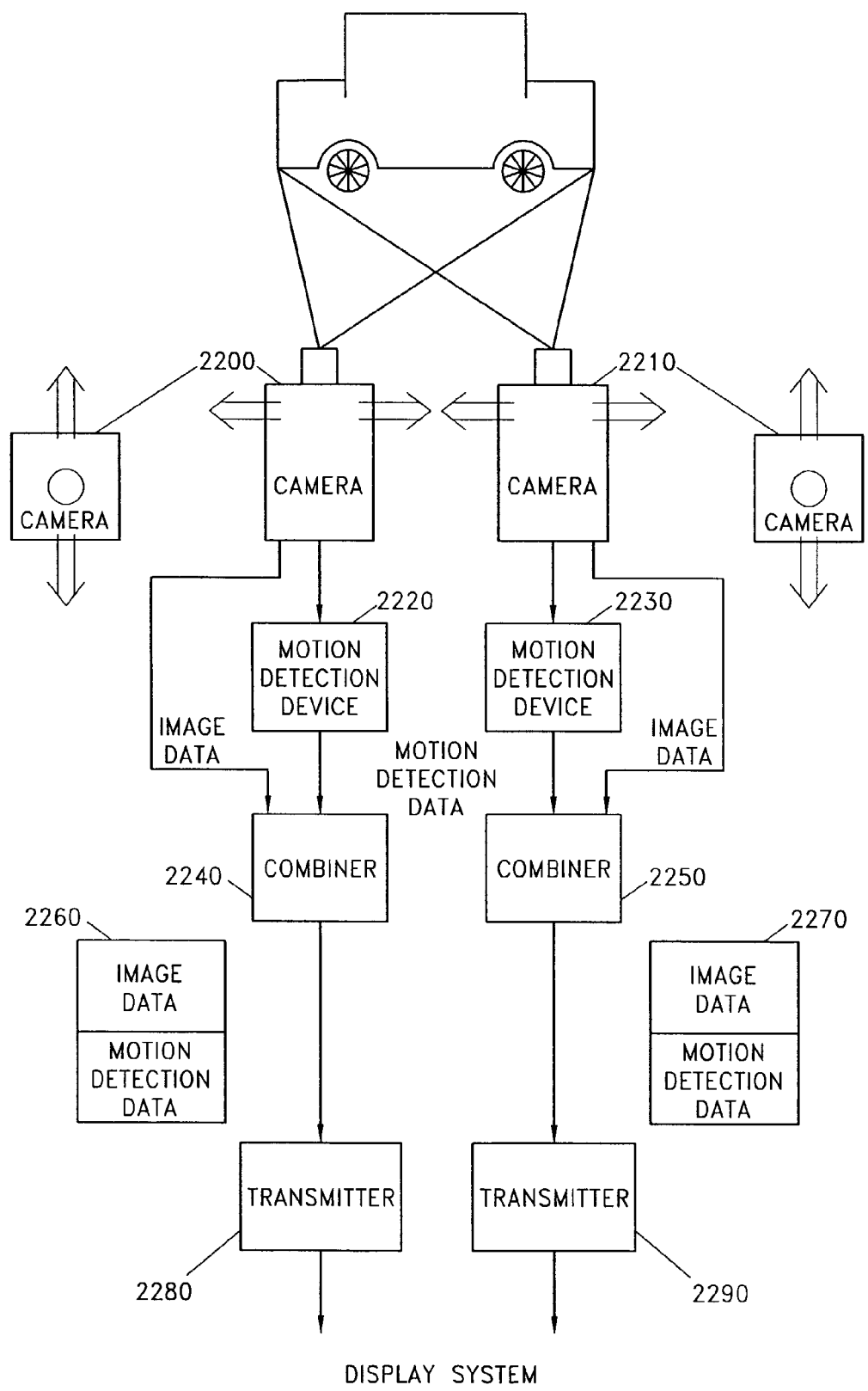
FIG. 23 illustrates a camera system for a 3D display system according to one aspect of the invention.

FIG. 23 illustrates a camera system for a 3D display system according to one aspect of the invention. The camera system is directed to provide photographed image data and camera motion detection data to a display site. The camera system comprises a set of stereoscopic cameras 2200, 2210, motion detection devices 2220, 2230, combiners 2240, 2250, and transmitters 2280, 2290. Each of the stereoscopic cameras 2200, 2210 captures an image and provides the captured image data to each of the combiners 2240, 2250.

The motion detection devices 2220 and 2230 detect the motion of the cameras 2200 and 2210, respectively. The motion of the cameras 2200 and 2210 may comprise motions for upper and lower directions, and left and right directions as shown in FIG. 23. Each detection device (2220, 2230) provides the detection data to each of the combiners 2240 and 2250. In one embodiment of the invention, if each of the detection devices 2220 and 2230 does not detect any motion of the cameras 2200 and 2210, the devices 2220 and 2230 may provide no detection data or provide information data representing no motion detection to the combiners 2240 and 2250. In one embodiment of the invention, each of the motion detection devices 2220 and 2230 comprises a typical motion detection sensor. The motion detection sensor may provide textual or graphical detection data to the combiners 2240 and 2250.

The combiners 2240 and 2250 combine the image data and the motion detection data, and provide the combined data 2260 and 2270 to the transmitters 2280 and 2290, respectively. If the combiners 2240 and 2250 receive information data representing no motion detection from the motion detection devices 2220 and 2230, or if the combiners 2240 and 2250 do not receive any motion data, each combiner (2240, 2250) provides only the image data to the transmitters 2280 and 2290 without motion detection data. In one embodiment of the invention, each of the combiners 2240 and 2250 comprises a typical multiplexer. Each of the transmitters 2280 and 2290 transmits the combined data 2260 and 2270 to the display site through a communication network (not shown).

Figure 24:
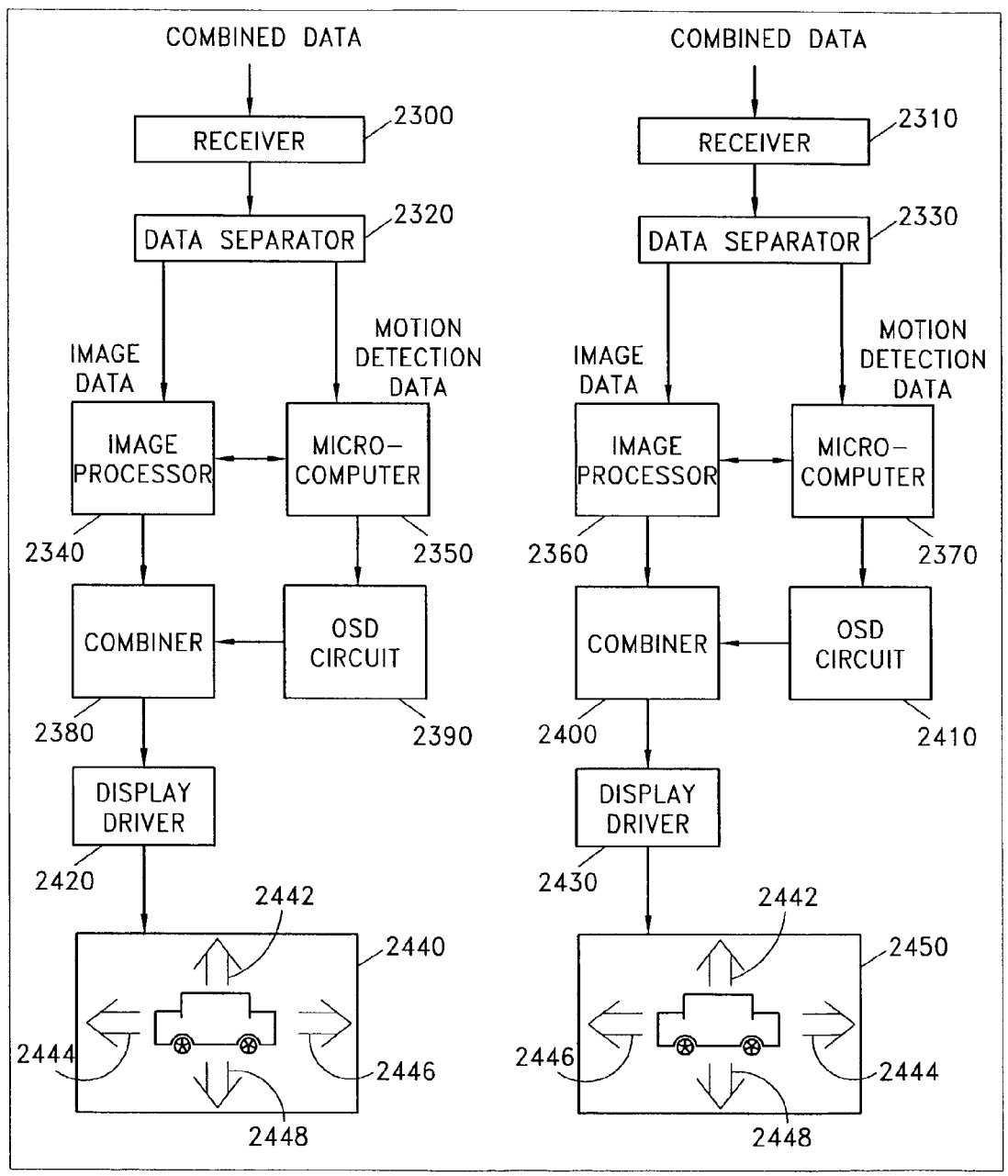
FIG. 24 illustrates a display system corresponding to the camera system shown in FIG. 23.

FIG. 24 illustrates a display system corresponding to the camera system shown in FIG. 23. The display system is directed to provide camera motion to a viewer. The camera system comprises a pair of receivers 2300 and 2310, data separators 2320 and 2330, image processors 2340 and 2360, microcomputers 2350 and 2370, on screen data (OSD) circuits 2390 and 2410, combiners 2380 and 2400, display drivers 2420 and 2430, and display screens 2440 and 2450.

Each of the receivers 2300 and 2310 receives the combined data transmitted from the camera system, and provides the received data to the data separators 2320 and 2330, respectively. Each of the data separators 2320 and 2330 separates the image data and the motion detection data from the received data. The image data are provided to the image processors 2340 and 2360. The motion detection data are provided to the microcomputers 2350 and 2370. The image processors 2340 and 2360 perform typical image data processing for the image data, and provide the processed data to the combiners 2380 and 2400, respectively.

Each of the microcomputers 2350 and 2370 determines camera motion information from the motion detection data. In one embodiment of the invention, each microcomputer (2350, 2370) determines camera motion information for at least four directions, e.g., upper, lower, left, right. The microcomputers 2350 and 2370 provide the determined camera motion information to the OSD circuits 2390 and 2410, respectively. Each of the OSD circuits 2390 and 2410 produces OSD data representing camera motion based on the determined motion information. In one embodiment of the invention, the OSD data comprise arrow indications 2442–2448 showing the motions of the cameras 2200 and 2210. The arrows 2442 and 2448 mean that each camera has moved to the upper and lower directions, respectively. The arrows 2444 and 2446 mean that each camera has moved to the directions in which the distance between the cameras is widened and narrowed, respectively.

The combiners 2380 and 2400 combine the processed image data and the OSD data, and provide the combined image to the display drivers 2420 and 2430. Each of the display drivers 2420 and 2430 displays the combined image in each of the display screens 2440 and 2450.

Figure 25:
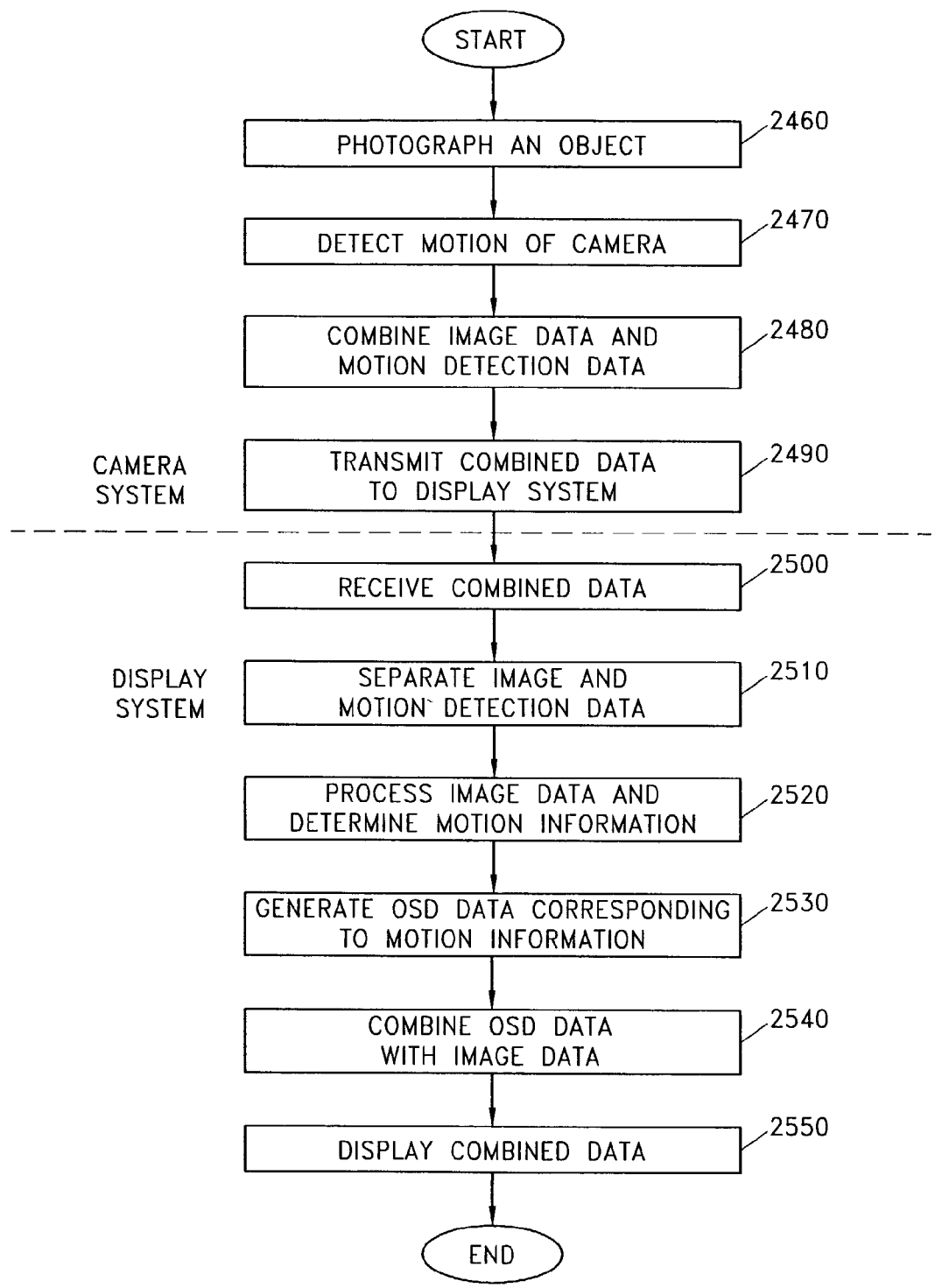
FIG. 25 illustrates an exemplary flowchart for explaining the operation of the camera and display systems shown in FIGS. 23 and 24.

Referring to FIG. 25, the operation of the camera and display systems shown in FIGS. 23 and 24 will be described. Each of the stereoscopic cameras 2200 and 2210 images an object (2460). The pair of the motion detection devices 2220 and 2230 detect the motions of the cameras 2200 and 2210, respectively (2470). The photographed image data and the motion detection data are combined in each of the combiners 2240 and 2250 (2480). The combined data 2260 and 2270 are transmitted to the display site through a communication network (2490). Other embodiments may not have the combining and separation of data as shown in the diagrams.

The transmitted data from the camera system are provided to the data separators 2320 and 2330 via the receivers 2300 and 2310 (2500). The image data and the motion detection data are separated in the data separators 2320 and 2330 (2510). The image data are provided to the image processors 2340 and 2360, and each of the processors 2340 and 2360 processes the image data (2520). The motion detection data are provided to the microcomputers 2350 and 2370, and each of the microcomputers 2350 and 2370 determines motion information from the motion detection data (2520).

OSD data corresponding to motion information are generated based on the determined motion information in the OSD circuits 2390 and 2410 (2530). The processed image data and the OSD data are combined together in the combiners 2380 and 2400 (2540). The combined data are displayed in the display screens 2440 and 2450 (2550). When the OSD data are displayed on the display screens 2440 and 2450, this means that at least one of the cameras 2200 and 2210 has moved. Thus, the image also moves in the direction in which the cameras 2200 and 2210 have moved. This is for guiding a viewer's eye lenses to track the motion of the cameras 2200 and 2210. In one embodiment of the invention, the arrows 2442–2448 are displayed right before the image is moved by the movement of the cameras so that a viewer can expect the movement of the images in advance.

In another embodiment of the invention, the display system may allow the viewer to know the movement of the cameras 2200 and 2210 by providing a voice message that represents the movement of the cameras. By way of example, the voice message may be "the stereoscopic cameras have moved in the upper direction" or "the cameras have moved in the right direction." In this embodiment of the invention, the OSD circuits 2390 and 2410 may be omitted. In another embodiment of the invention, both of the OSD data and voice message representing the movement of the cameras may be provided to the viewer.

In one embodiment of the invention, the camera and display systems shown in FIGS. 23 and 24 comprise the functions in which the image is displayed such that the photographing ratio (A:B:C) equals the screen ratio (A:B:C) as discussed with regard to FIGS. 7–11. In another embodiment of the invention, the systems may comprise the function that displays stereoscopic images such that the distance between the center points of the stereoscopic images is substantially the same as the distance between the center points of a viewer's eyes as discussed with regard to FIGS. 15–22.

Method and System for Controlling the Motion of Stereoscopic Cameras Based on a Viewer's Eye Lens Motion Another aspect of the invention provides a 3D display system that controls the movement of the cameras according to a viewer's eye lens movement. Before describing the aspect of the invention, the relationship between a viewer's eyes and a set of stereoscopic cameras will be described by referring to FIGS. 26–28.

Figure 26A:
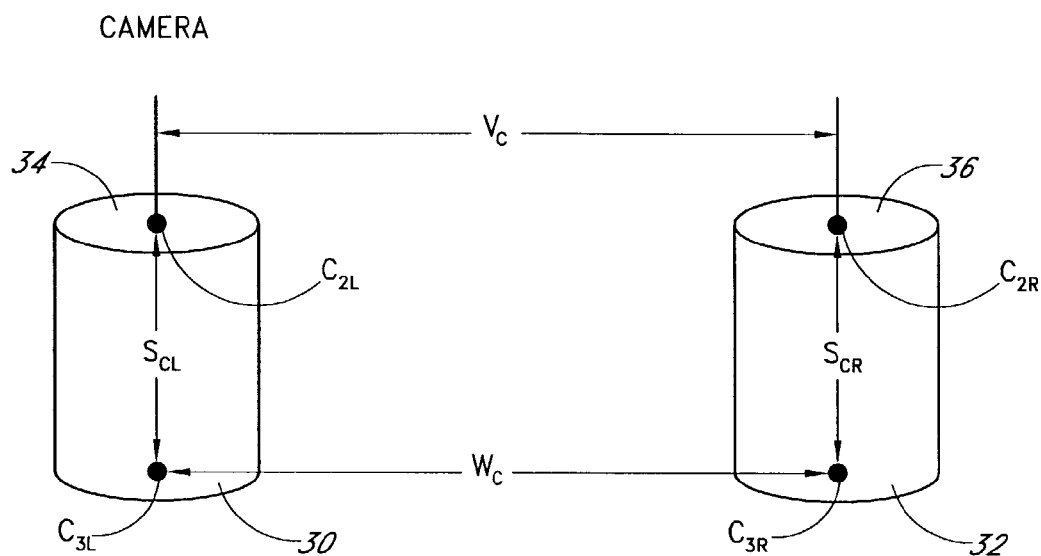
FIG. 26A is a conceptual drawing that illustrates parameters for a set of stereoscopic cameras.

FIG. 26A is a conceptual drawing that illustrates parameters for stereoscopic cameras. Each of the cameras 30 and 32 comprises object lenses 34 and 36, respectively. The camera parameters comprise $C_{2L}$, $C_{2R}$, $C_{3L}$, $C_{3R}$, $S_{CL}$, $S_{CR}$, $V_c$ and $W_c$. $C_{2L}$ and $C_{2R}$ represent the center points of the object lenses 34 and 36, respectively. $C_{3L}$ and $C_{3R}$ represent rotation axes of the cameras 30 and 32, respectively. $S_{CL}$ represents the line connecting $C_{2L}$ and $C_{3L}$. $S_{CR}$ represents the line connecting $C_{2R}$ and $C_{3R}$. $V_c$ represents the distance between $C_{2L}$ and $C_{2R}$. $W_c$ represents the distance between $C_{3L}$ and $C_{3R}$.

The rotation axes $C_{3L}$ and $C_{3R}$ do not move and are the axes around which the cameras 30 and 32 rotate. The rotation axes $C_{3L}$ and $C_{3R}$ allow the cameras 30 and 32 to rotate by behaving like a car windshield wiper, respectively, as shown in FIGS. 27B–27E. FIG. 27A illustrates a default position of the cameras 30 and 32. FIGS. 27B–27D illustrate the horizontal movements of the cameras 30 and 32. FIG. 27E illustrates the vertical movements of the cameras 30 and 32. In one embodiment of the invention, while they are moving and after they move as shown in FIGS. 27B–27E, each of the cameras 30 and 32 is substantially parallel to each other. FIG. 27F is a front view of one of the stereoscopic cameras and exemplifies the movements of the camera in eight directions. The diagonal movements 46a–46d may be performed by the combination of the horizontal and vertical movements. For example, the movement "46a" is made by moving the camera to the left and upper directions.

Figure 26B:
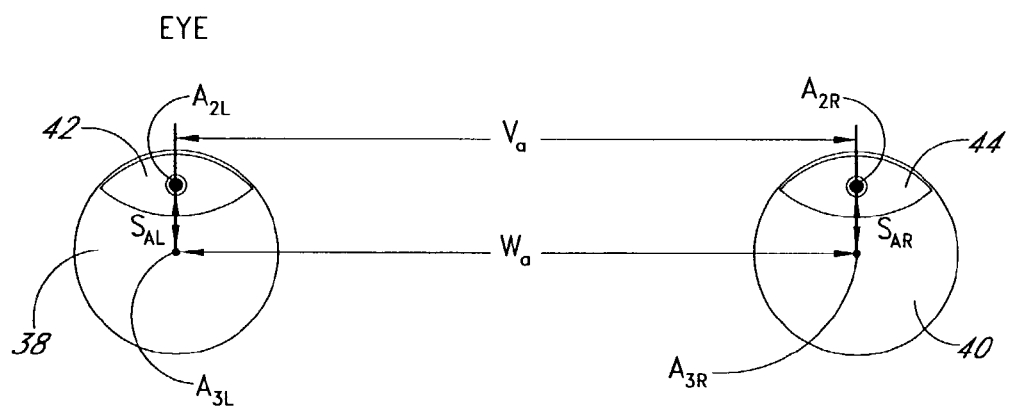
FIG. 26B is a conceptual drawing that illustrates parameters for a viewer's eyes.

FIG. 26B is a conceptual drawing that illustrates parameters for a viewer's eyes. Each of the eyes 38 and 40 comprises eye lenses 42 and 44, respectively. Each of the eye lenses is located substantially in the outside surface of the eyes. This means that the distance between each center point of the eyes and each eye lens is substantially the same as the radius of the eye. The eye lens moves along with the rotation of the eye. The eye parameters comprise $A_{2L}$, $A_{2R}$, $A_{3L}$, $A_{3R}$, $S_{AL}$, $S_{AR}$, $V_a$ and $W_a$. $A_{2L}$ and $A_{2R}$ represent the center points of the eye lenses 42 and 44, respectively. Each of the eye lenses 42 and 44 performs substantially the same function as the object lenses 34 and 36 of the stereoscopic cameras 30 and 32 in terms of receiving an image. Thus, the eye parameters $A_{2L}$ and $A_{2R}$ may correspond to the camera parameters $C_{2L}$ and $C_{2R}$.

$A_{3L}$ and $A_{3R}$ represent rotation axes of the eyes 38 and 40, respectively. The rotation axes $A_{3L}$ and $A_{3R}$ are the axes around which the eyes 38 and 40 rotate. The rotation axes $A_{3L}$ and $A_{3R}$ allow the eyes 38 and 40 to rotate as shown in FIGS. 28B–28D. As the rotation axes $C_{3L}$ and $C_{3R}$ of the stereoscopic cameras 30 and 32 do not move while the cameras 30 and 32 are rotating, so the rotation axes $A_{3L}$ and $A_{3R}$ of a viewer's eyes 38 and 40 do not move while the eyes 38 and 40 are rotating. Thus, the eye parameters $A_{3L}$ and $A_{3R}$ may correspond to the camera parameters $C_{3L}$ and $C_{3R}$.

$S_{AL}$ represents the line connecting $A_{2L}$ and $A_{3L}$. $S_{AR}$ represents the line connecting $A_{2R}$ and $A_{3R}$. As shown in FIGS. 26A and 26B, the eye parameters $S_{AL}$ and $S_{AR}$ may correspond to the camera parameters $S_{cl}$ and $S_{CR}$, respectively. $V_a$ represents the distance between $A_{2L}$ and $A_{2R}$. $W_a$ represents the distance between $A_{3L}$ and $A_{3R}$. Similarly, the eye parameters $V_a$ and $W_a$ may correspond to the camera parameters $V_c$ and $W_c$, respectively.

Figure 28A:
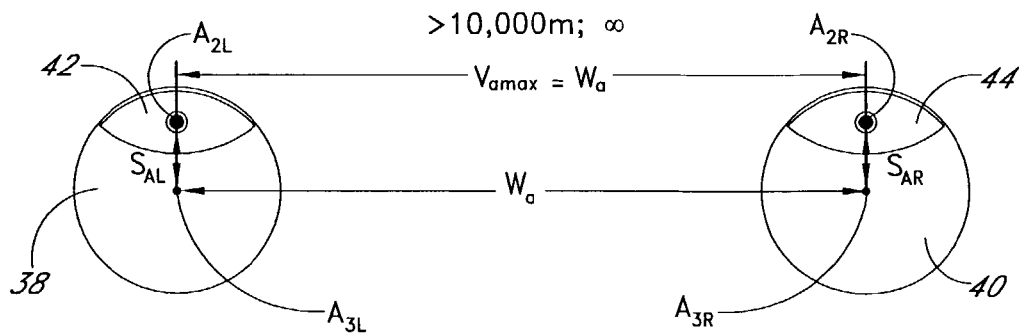
FIG. 28 is a conceptual drawing for explaining the eye lens movement according to the distance between the viewer and an object
Figure 28B:
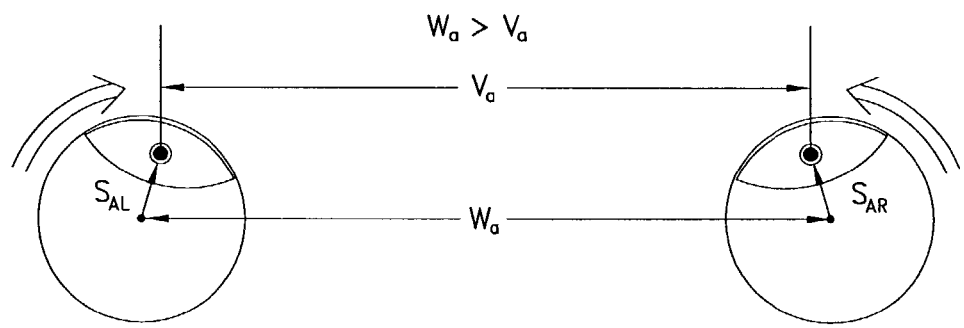
Figure 28C:
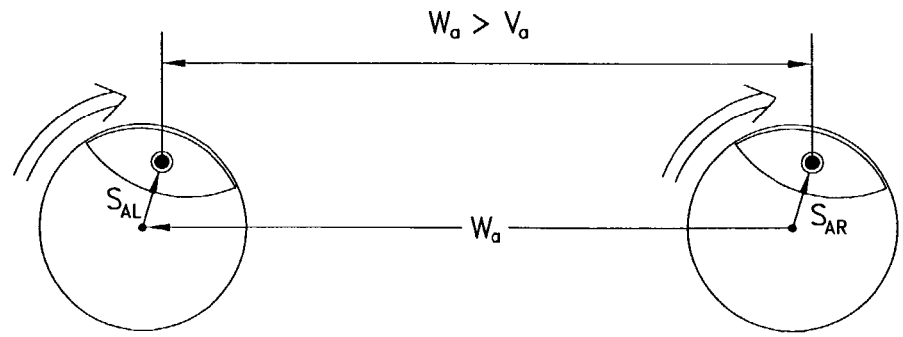
Figure 28D:
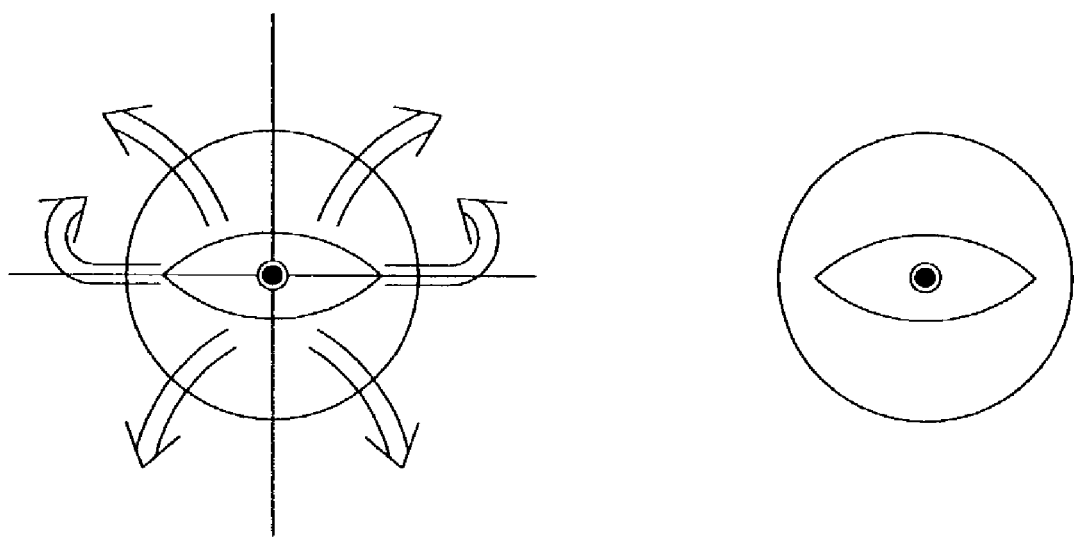

Referring to FIGS. 28A–28C, it can be seen that when the directions of the eyes 38 and 40 change, only the directions of $S_{AL}$ and $S_{AR}$ change while the rotations axes $A_{3L}$ and $A_{3R}$ are fixed. This means that $W_a$ is constant while the lines $S_{AL}$ and $S_{AR}$ change. Thus, in order to control the movements of the cameras 30 and 32 based on the movements of the eyes 38 and 40, the directions of the camera lines $S_{CL}$ and $S_{CR}$, need to be controlled based on those of eye lines $S_{AL}$ and $S_{AR}$ while the distance $W_c$ is constant.

FIG. 28A illustrates an example of the eye configuration in which a viewer sees an object at least "10,000 m" distant from him or her. This example corresponds to the camera configuration in which the focal length of the cameras is infinity. As discussed before, when a viewer sees an object farther than, for example, "10,000 m," the distance ($V_a$) between the center points $A_{2L}$ and $A_{2R}$ of the eye lenses 42 and 44 is substantially the same as the distance ($W_a$) between the center points $A_{3L}$ and $A_{3R}$ of the eyes 38 and 40.

When a viewer sees an object that is located in front of him or her and is closer than, for example, "10 m," the viewer's left eye rotates in a clockwise direction and right eye rotates in a counter clockwise direction as shown in FIG. 28B. Consequently, the distance $V_a$ becomes shorter than the distance $W_a$. If a viewer sees an object that is located in a slightly right front side of him or her, each of the eyes rotates in a clockwise direction as shown in FIG. 28C. In this situation, the distance $V_a$ may be less than the distance $W_a$. FIG. 28D exemplifies the movements of the eyes in eight directions.

Figure 29:
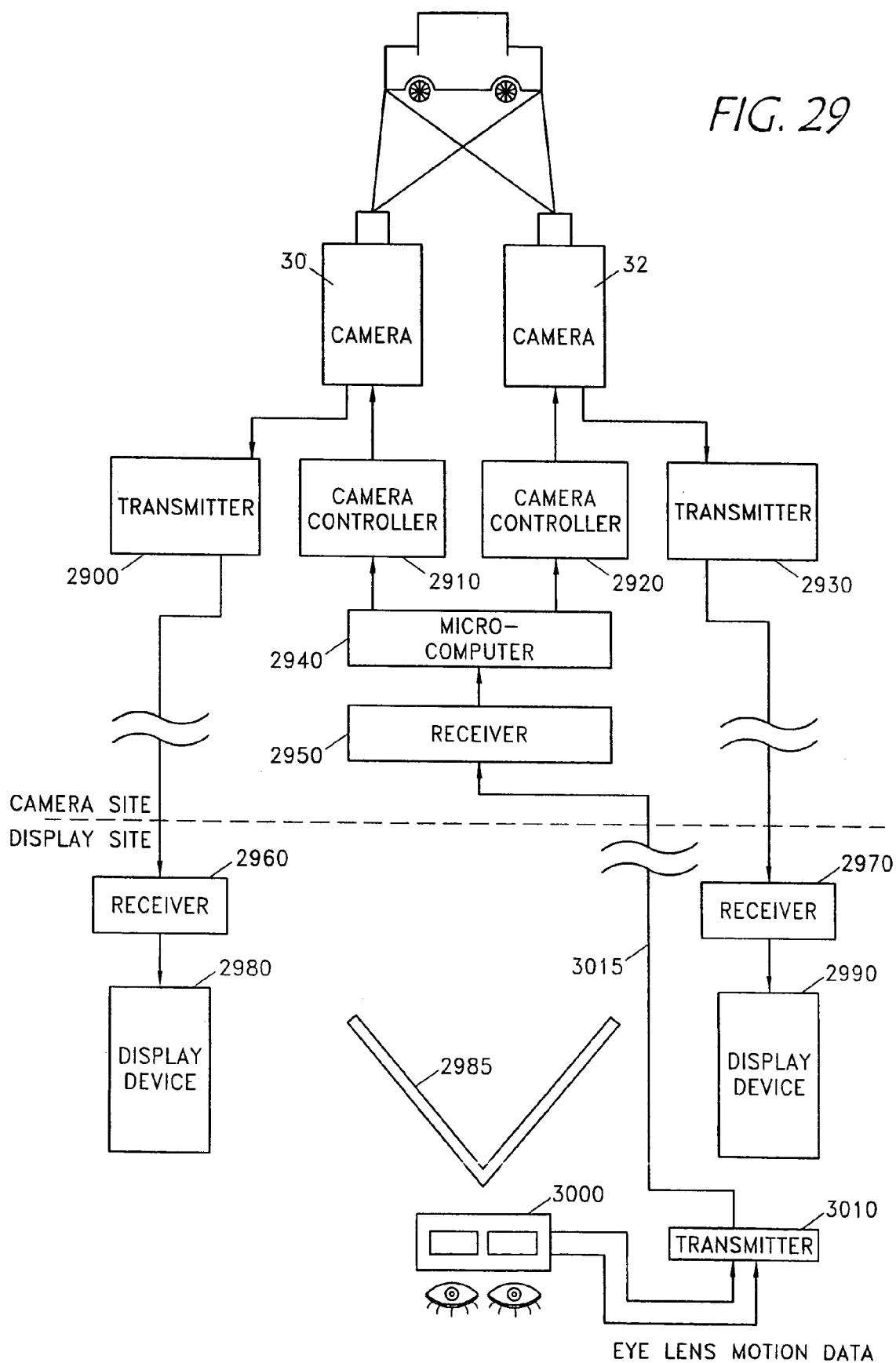
FIG. 29 illustrates a 3D display system for controlling a set of stereoscopic cameras according to another aspect of the invention.

FIG. 29 illustrates a 3D display system for controlling a set of stereoscopic cameras according to another aspect of the invention. The system comprises a camera site and a display site. The display site is directed to transmit eye lens motion data to the camera site. The camera site is directed to control the set of stereoscopic cameras 30 and 32 based on the eye lens motion data.

The display site comprises an eye lens motion detecting device 3000, a transmitter 3010, a pair of display devices 2980 and 2990, a pair of receivers 2960 and 2970, and a V shaped mirror 2985. When the camera site transmits stereoscopic images through a pair of transmitters 2900 and 2930 to the display site, the display site receives the images and displays through the display devices 2980 and 2990. A viewer sees stereoscopic images through the V shaped mirror that reflects the displayed image to the viewer. While the viewer is watching the images, the viewer's eye lenses may move in directions, e.g., latitudinal (upper or lower) and longitudinal (clockwise or counterclockwise) directions. Once again, another display device such as a HMD, or a projection display device as discussed above, may be used.

The eye lens motion detecting device 3000 detects motions of each of a viewer's eye lenses while a viewer is watching 3D images through the V shaped mirror. The motions may comprise current locations of the eye lenses. The detecting device 3000 is substantially the same as the device 2100 shown in FIG. 21A. The detecting device 3000 may convert the movements of the eye lenses to data that a microcomputer 2940 of the camera site can recognize, and provide the converted data to the transmitter 3010. In one embodiment of the invention, the detection data may comprise a pair of (x,y) values for each of the eye lenses.

The transmitter 3010 transmits the eye lens motion data to the camera site through a communication network 3015. The detection data may comprise identification data that identify each of the left and right eye lenses in the camera site. In one embodiment of the invention, the display site may comprise a pair of transmitters each transmitting left and right eye lens motion data to the camera site. In one embodiment of the invention, before transmitting the motion data, data modification such as encoding and/or modulation adapted for transmitting may be performed.

The camera site comprises a set of stereoscopic cameras 30 and 32, a receiver 2950, a microcomputer 2940, a pair of camera controllers 2910 and 2920, the pair of transmitters 2900 and 2930. The receiver 2950 receives the eye lens motion data from the display site, and provides the data to the microcomputer 2940. The microcomputer 2940 determines each of the eye lens motion data from the received data, and provides the left and right eye lens motion data to the camera controllers 2910 and 2920, respectively. In one embodiment of the invention, the camera site may comprise a pair of receivers each of which receives left and right eye lens motion data from the display site, respectively. In that situation, each receiver provides each eye lens detection data to corresponding camera controllers 2910 and 2920, respectively, and the microcomputer 2940 may be omitted.

Figure 30:
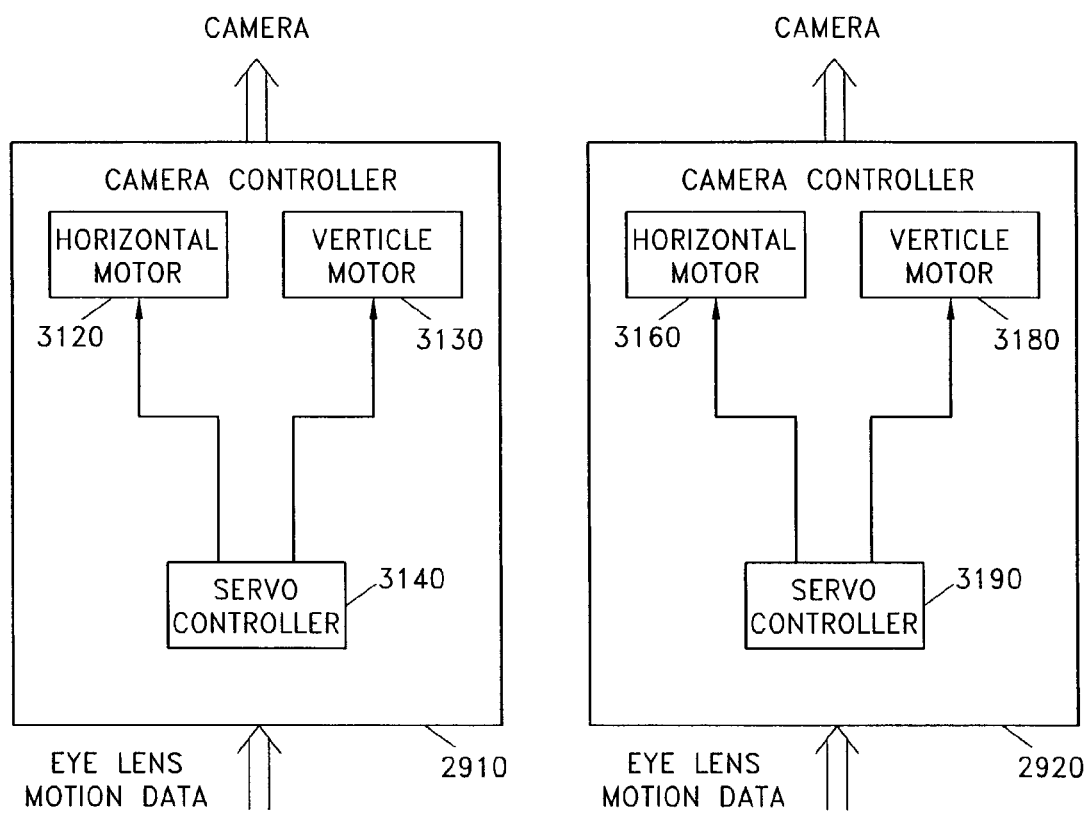
FIG. 30 illustrates an exemplary block diagram of the camera controllers shown in FIG. 29.

The camera controllers 2910 and 2920 control each of the cameras 30 and 32 based on the received eye lens motion data. That is, the camera controllers 2910 and 2920 control movement of each of the cameras 30 and 32 in substantially the same directions as each of the eye lenses 42 and 44 moves. Referring to FIG. 30, the camera controllers 2910 and 2920 comprise servo controllers 3140 and 3190, horizontal motors 3120 and 3160, and vertical motors 3130 and 3180, respectively. Each of the servo controllers 3140 and 3190 controls the horizontal and vertical motors (3120, 3160, 3130, 3180) based on the received eye lens motion data. Each of the horizontal motors 3120 and 3160, respectively moves the cameras 30 and 32 in the horizontal directions. Each of the vertical motors 3130 and 3180, respectively moves the cameras 30 and 32 in the vertical directions.

Figure 31:
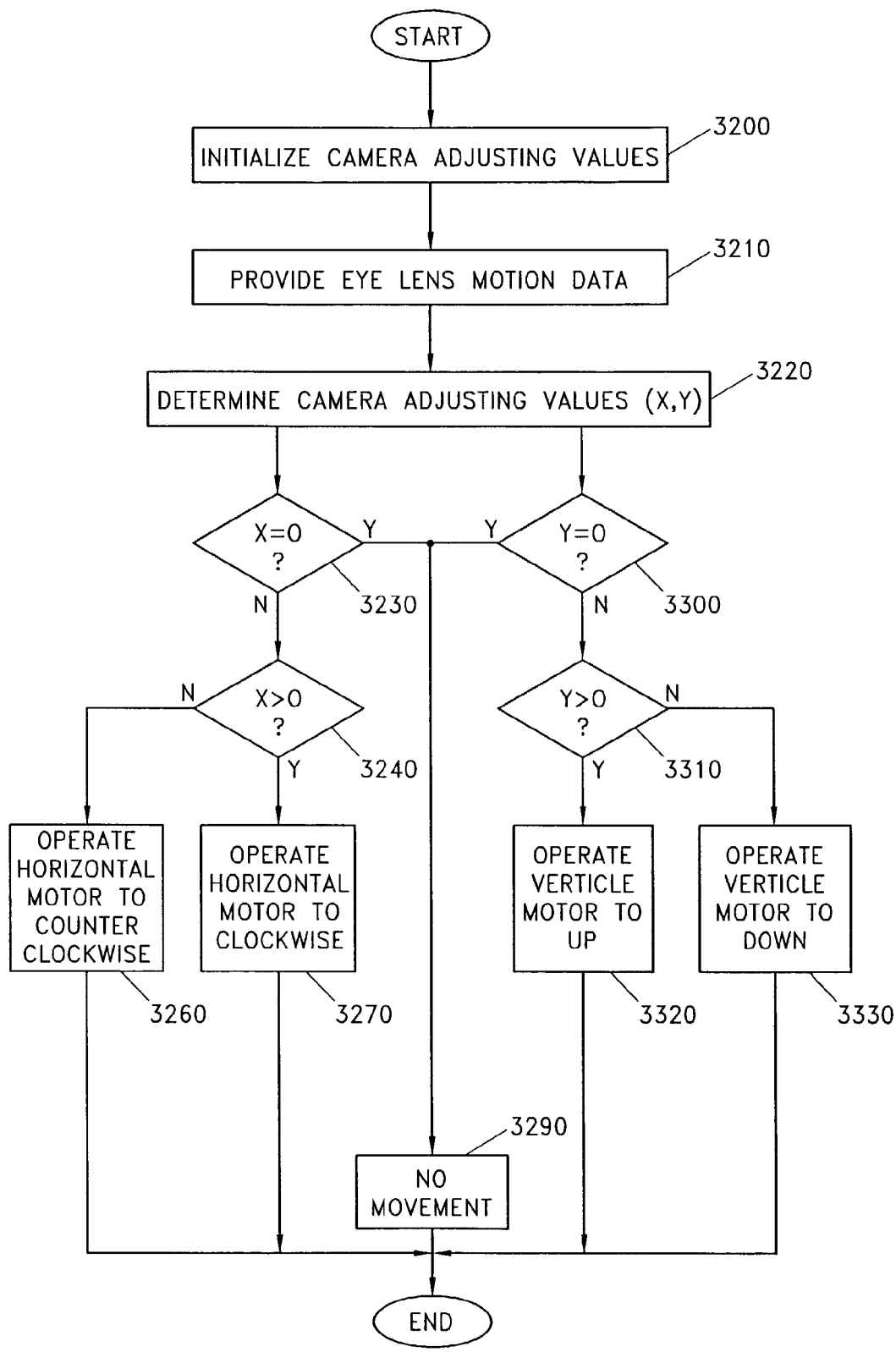
FIG. 31 illustrates an exemplary flowchart for explaining the operation of the camera controllers according to one aspect of the invention.
Figure 32B:
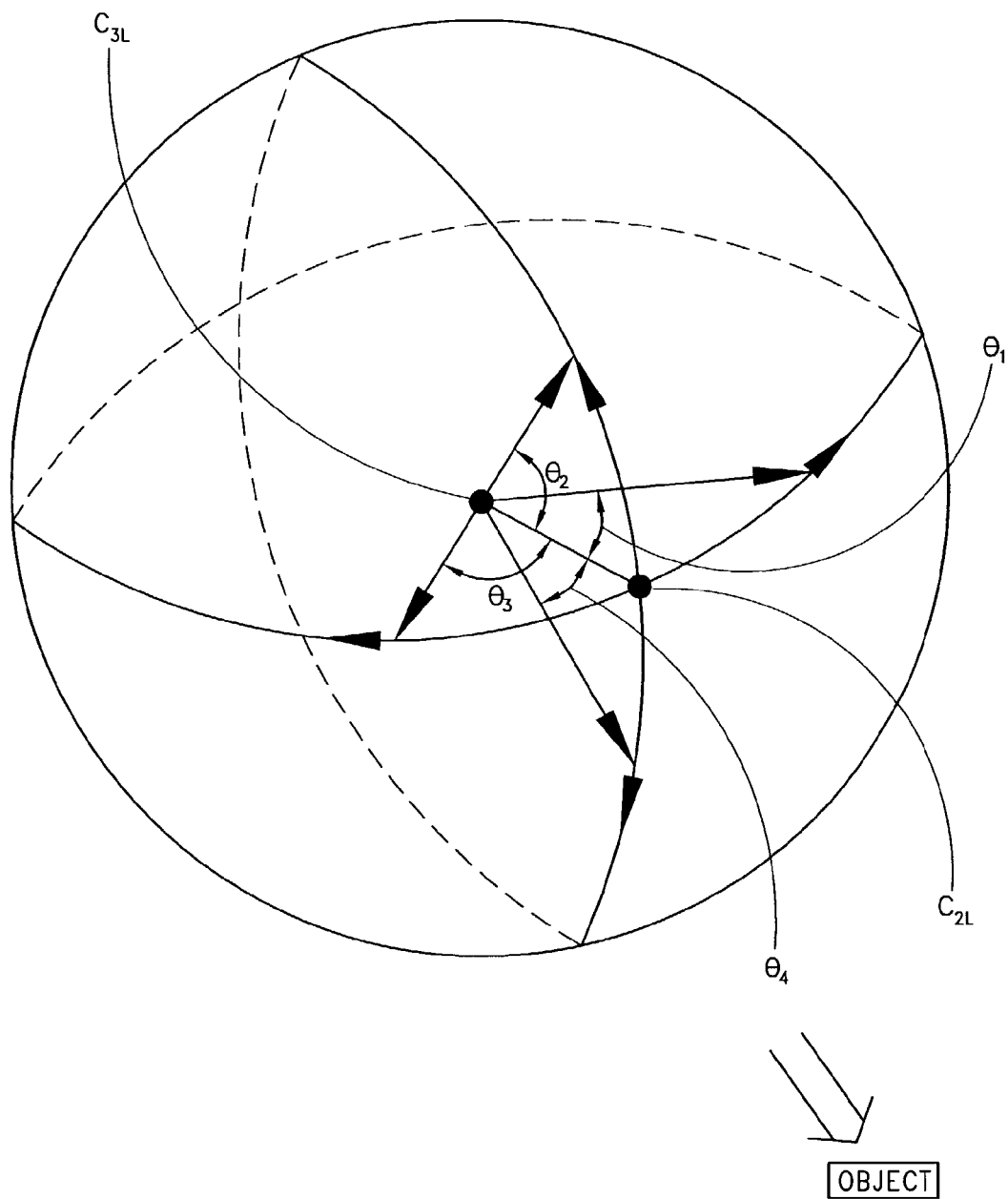
FIG. 32B illustrates a conceptual drawing that explains motion of the camera.

FIG. 31 illustrates a flow chart showing the operation of the camera controllers 2910 and 2920 according to one aspect of the invention. FIG. 32A illustrates a table for controlling horizontal and vertical motors. FIG. 32B illustrates a conceptual drawing that explains motion of the camera. Referring to FIGS. 31 and 32, the operation of the camera controllers 2910 and 2920 will be described. Since the operation of the camera controllers 2910 and 2920 is substantially the same, only the operation of the camera controller 2910 will be described. The servo controller 3140 initializes camera adjusting values (3200). In one embodiment of the invention, the initialization of the camera adjusting values may comprise setting a default value, for example, "(x,y)=(0,0)" which means no movement. These values correspond to the eye lens motion data detected in a situation where invention, the front direction without moving their eye lenses. In one embodiment of the invention, the initialization may comprise setting the relationship between the adjusting values and the actual movement amount of the camera 30 as shown in FIG. 32A.

The eye lens motion data are provided to the servo controller 3140 (3210). In one embodiment of the invention, the eye lens motion data comprise (x,y) coordinate values, where x and y represent the horizontal and vertical motions of each of the eye lenses, respectively.

The servo controller 3140 determines camera adjusting values (X, Y) based on the provided eye lens motion data. It is determined whether X equals "0" (3230). If X is "0," the servo controller 3140 does not move the horizontal motor 3120 (3290). If X is not "0," it is determined whether X is greater than "0" (3240). If X is greater than "0," the servo controller 3140 operates the horizontal motor 3120 to move the camera 30 in the right direction (3270). As exemplified in FIG. 32A, if the value X is, for example, "1," the movement amount is "2°," and the direction is clockwise ($\theta_3$ direction). If the value X is, for example, "2," the movement is "4°" in a clockwise direction.

If X is not greater than "0," meaning this means that X is less than "0," the servo controller 3140 operates the horizontal motor 3120 so as to move the camera 30 in a counterclockwise ($\theta_1$) direction (3260). Referring to FIG. 32, if the value X is, for example, "−1," the movement amount is "2°," and the direction is counterclockwise. If the value x is, for example, "−3," the movement is "6°" in a counterclockwise ($\theta_1$) direction.

Similarly, it is determined whether Y equals "0" (3300). If Y is "0," the servo controller 3140 does not move the vertical motor 3130 (3290). If Y is not "0," it is determined whether Y is greater than "0" (3310). If Y is greater than "0," the servo controller 3140 operates the vertical motor 3130 to move the camera 30 to +latitudinal (upper: $\theta_2$) direction (3320). If the value Y is, for example, "2," the movement is "4°" in the upper direction.

If Y is not greater than "0," the servo controller 3140 operates the vertical motor 3130 so as to move the camera 30 in the lower direction (3330). If the value Y is, for example, "−3," the movement amount is "6°," and the direction is in a −latitudinal (lower: $\theta_4$) direction.

Figure 33:
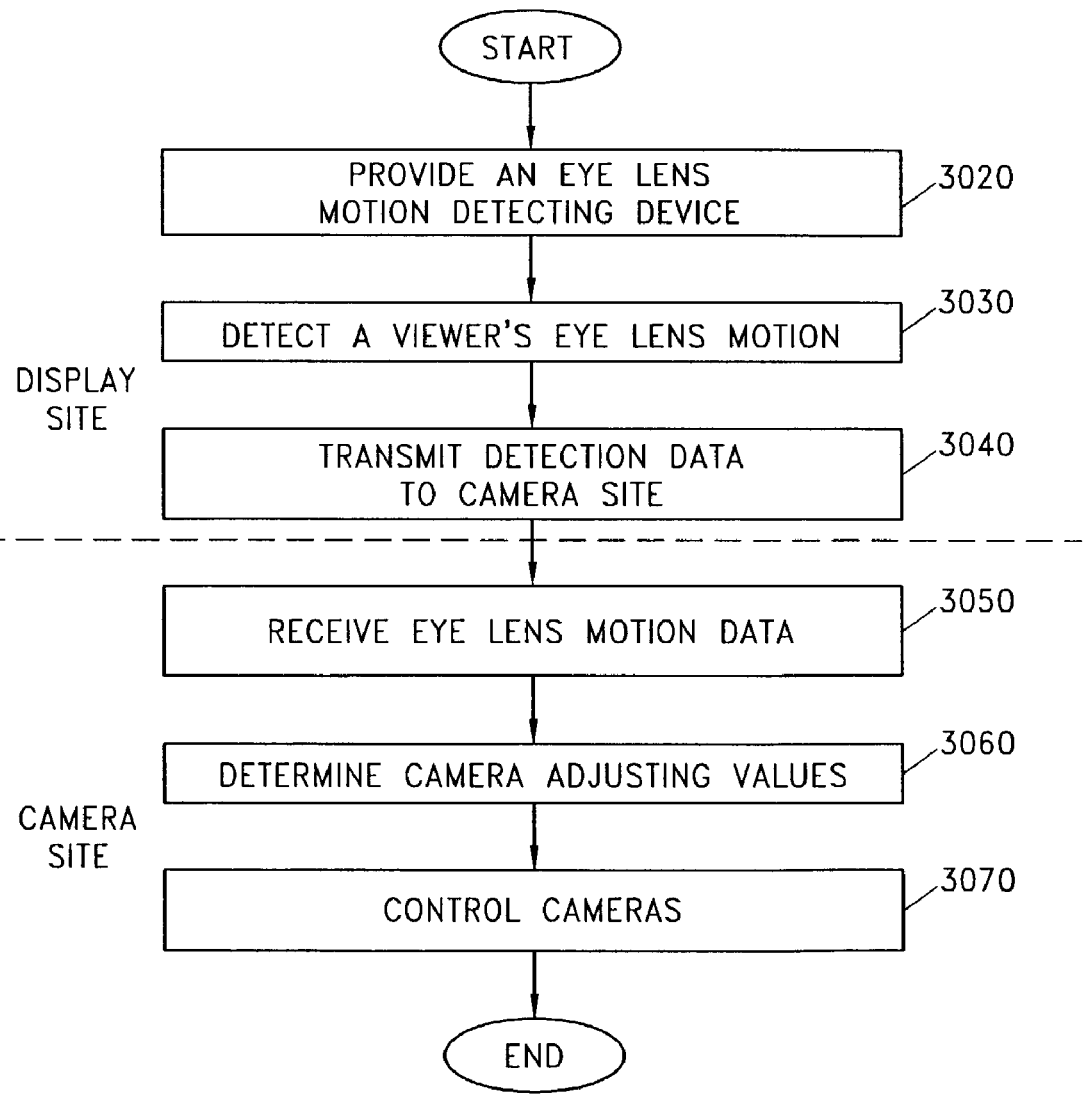
FIG. 33 illustrates an exemplary flowchart for explaining the operation of the system shown in FIG. 29.

Now, the entire operation of the system shown in FIG. 29 will be described with reference to FIG. 33. The eye lens motion detection device 3000 is provided to the display site of the system (3020). A viewer's eye lens motion is detected by the eye lens motion detection device 3000 while the viewer is watching stereoscopic images (3030). The eye lens motion data are transmitted to the camera site through the transmitter 3010 and the communication network 3015 (3040). As discussed above, either one transmitter or a pair of transmitters may be used.

The receiver 2950 of the camera site receives the eye lens motion data from the display site (3050). The camera adjusting values are determined based on the eye lens motion data (3060). The stereoscopic cameras 30 and 32 are controlled by the determined camera adjusting values (3070). In this way, the stereoscopic cameras 30 and 32 are controlled such that the cameras keep track of the eye lens motion. In terms of the viewer, he or she notices that as soon as his or her eye lenses are moved to a certain direction, stereoscopic images are also moved in the direction to which the eye lenses has moved.

Figure 34:
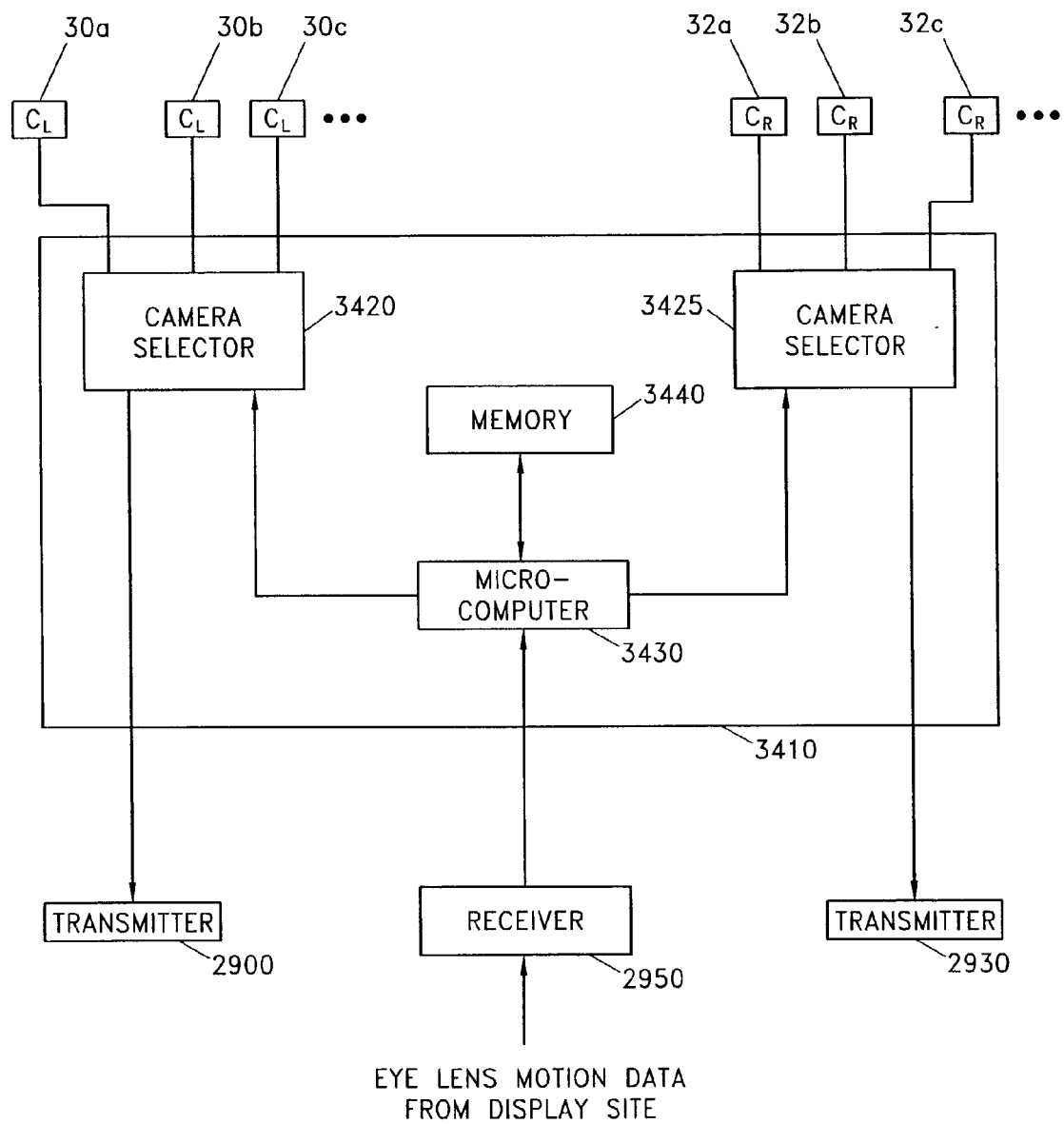
FIG. 34 illustrates a stereoscopic camera controller system used for a 3D display system according to another aspect of the invention.

FIG. 34 illustrates a stereoscopic camera controller system used for a 3D display system according to another aspect of the invention. For convenience, the display site is not shown. This aspect of the invention selects a pair of stereoscopic cameras corresponding to movement amount of the eye lenses among plural sets of stereoscopic cameras instead of controlling the movement of the pair of stereoscopic cameras.

The system comprises a microcomputer 3430, a memory 3440, camera selectors 3420 and 3425, and plural sets of stereoscopic cameras 30a and 32a, 30b and 32b, and 30c and 32c. The memory 3440 stores a table as shown in FIG. 35. The table shows relationship between camera adjusting values and selected cameras. The camera adjusting value "(0,0)" corresponds to, for example, a set of cameras C33 as shown in FIGS. 35 and 36B. The camera adjusting value "(1,0)" corresponds to a set of cameras C34 as shown in FIGS. 35 and 36B. The camera adjusting value "(2,2)" corresponds to the C15 camera set as shown in the Figures. In one embodiment of the invention, another set of stereoscopic cameras is selected from the sets of cameras such as one of the C34 camera set and one of the C32 camera set.

Figure 36A:
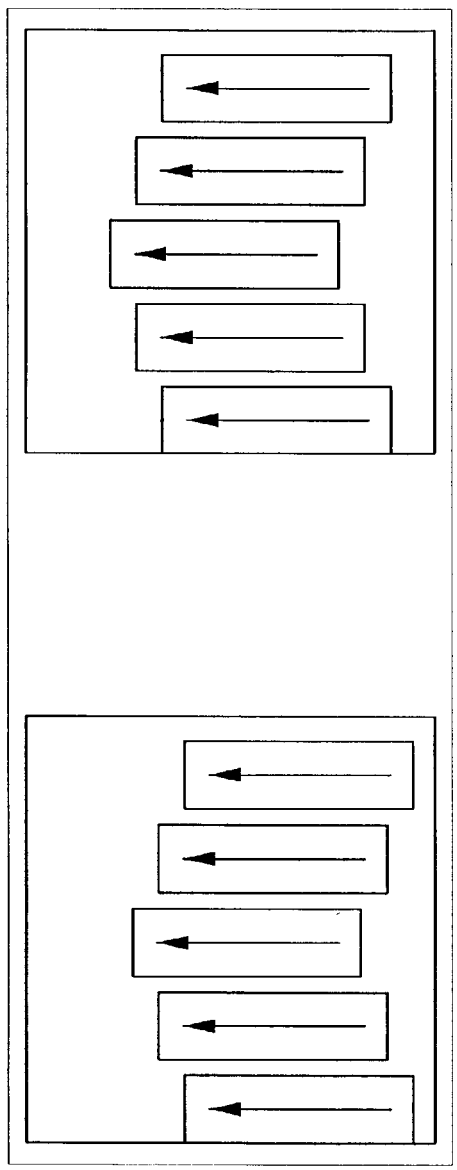
FIG. 36A is a top plan view of the plural sets of stereoscopic cameras.
Figure 36B:
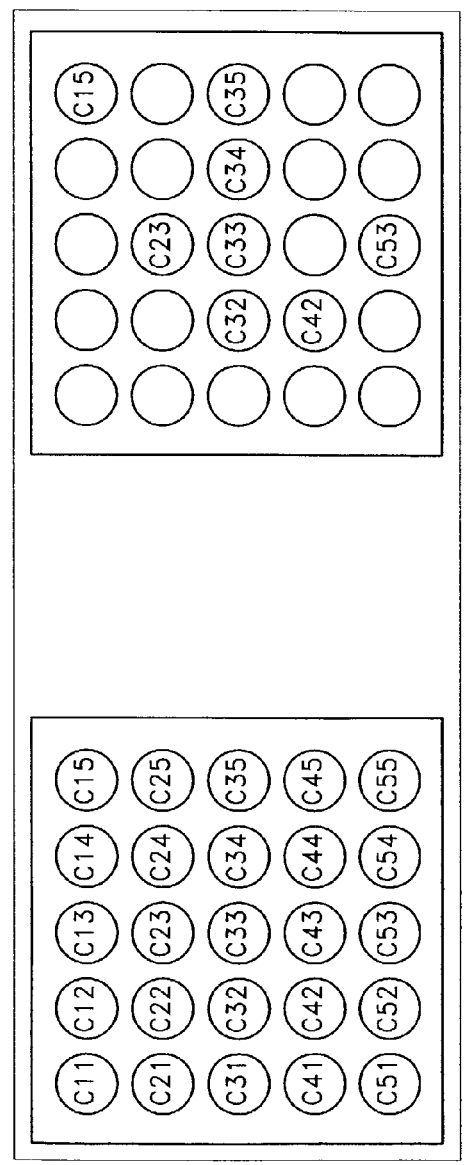
FIG. 36B is a front elevational view of the plural sets of stereoscopic cameras.

FIG. 36A is a top view of the plural sets of stereoscopic cameras. In one embodiment of the invention, the contour line that is made by connecting all of the object lenses of the plural sets of stereoscopic cameras is similar to the contour line of a viewer's eyes which is exposed to the outside.

The microcomputer 3430 determines camera adjusting values based on the received eye lens motion data. The microcomputer 3430 also determines first and second camera selection signals based on the table stored in the memory 3440. The first selection signal is determined based on the movement of a viewer's left eye lens, and used for controlling the camera selector 3420. The second selection signal is determined based on the movement of a viewer's right eye lens, and used for controlling the camera selector 3425. The microcomputer 3430 provides each of the selection signals to the camera selectors 3420 and 3425, respectively.

The camera selectors 3420 and 3425 select the respective camera based on the selection signal. In one embodiment of the invention, a base set of cameras (e.g., C33) shown in FIG. 36B, image an object and transmit the image to the display site through the transmitters 2900 and 2930, respectively. In this embodiment of the invention, if the camera selectors 3420 and 3425 select another set of cameras, the selected set of cameras image the object and transmit the image to the display site through the transmitters 2900 and 2930. In one embodiment of the invention, all of the cameras are turned on and a first set of cameras are connected to the transmitters 2900 and 2930, respectively. In this embodiment of the invention, when a second set of cameras are selected, the first set of cameras are disconnected from the transmitters 2900 and 2930, and the second set of cameras are connected to the transmitters 2900 and 2930, respectively. In another embodiment of the invention, only a selected set of cameras are turned on and the non-selected set of cameras remain turned off. In one embodiment of the invention, each of the camera selectors 3420 and 3425 comprises a switch that performs switching between the plural sets of stereoscopic cameras 30a and 32a, 30b and 32b, and 30c and 32c and the transmitters 2900 and 2930, respectively.

Figure 37:
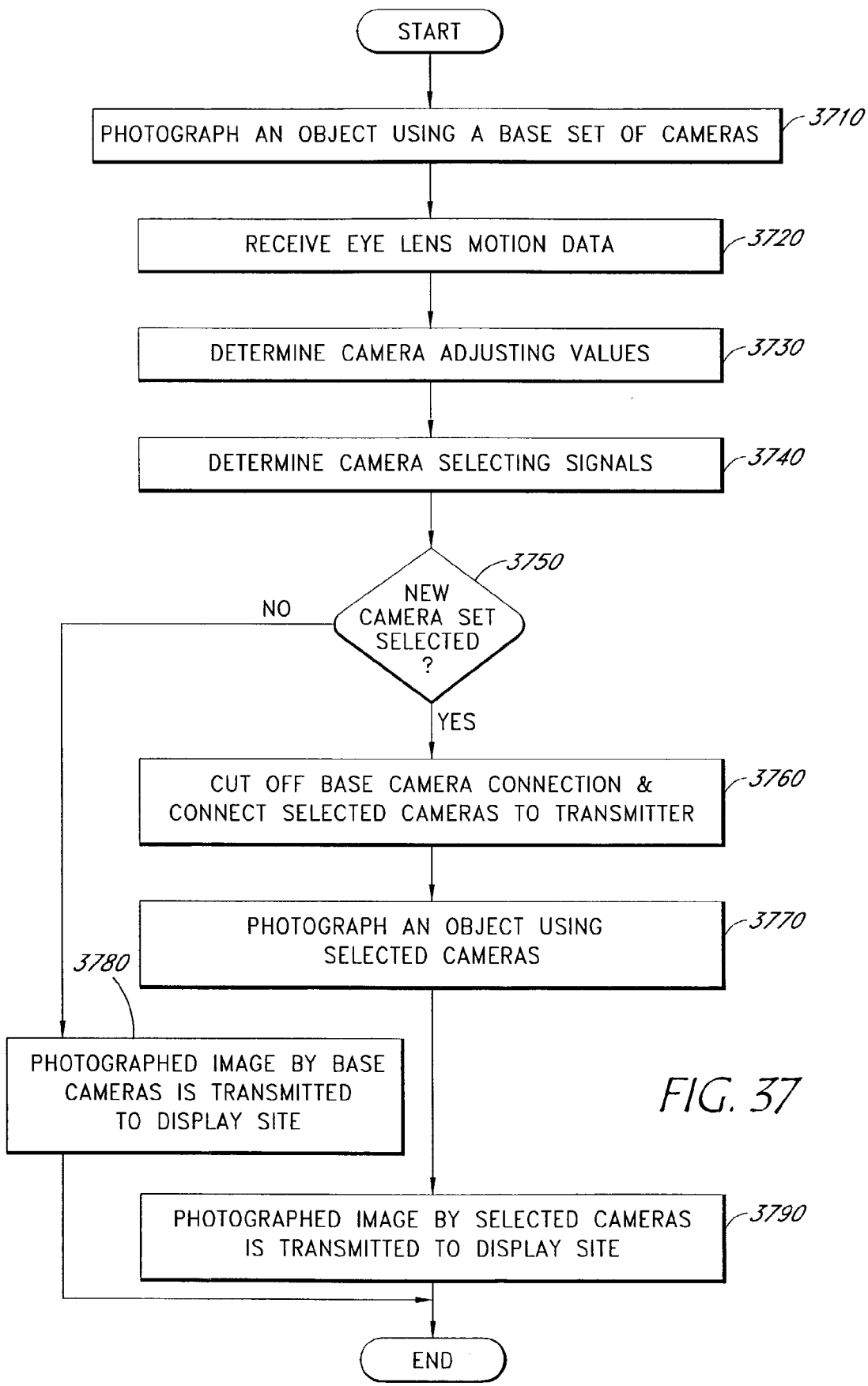
FIG. 37 illustrates an exemplary flowchart for explaining the operation of the system shown in FIG. 34.

Referring to FIG. 37, the operation of the system shown in FIG. 34 will be described. A base set of cameras (e.g., C33) of FIG. 36, image an object (3710). Eye lens motion data are received from the display site (3720). Camera adjusting values are determined based on the received eye lens motion data (3730). The camera adjusting values are exemplified in the table of FIG. 35. Camera selection signals are determined based on the determined camera adjusting values (3740), for example, using the relationship of the table of FIG. 35. It is determined whether a new set of cameras have been selected (3750). If no new set of cameras are selected, the image output from the base cameras is transmitted to the display site (3780). If a new set of cameras (e.g., C35) is selected, the base cameras (C33) are disconnected from the transmitter 2900 and the new cameras (C35) are connected to the transmitters 2900 and 2930 (3760). The selected cameras (C35) image the object (3770), and the image output from the selected cameras is transmitted to the display site (3790).

Regarding the embodiments described with regard to FIGS. 29–37, the camera control may be used in remote control technology such as a remote surgery, remote control of a vehicle, an airplane, or aircraft, fighter, or remote control of construction, investigation or automatic assembly equipments.

Figure 38:
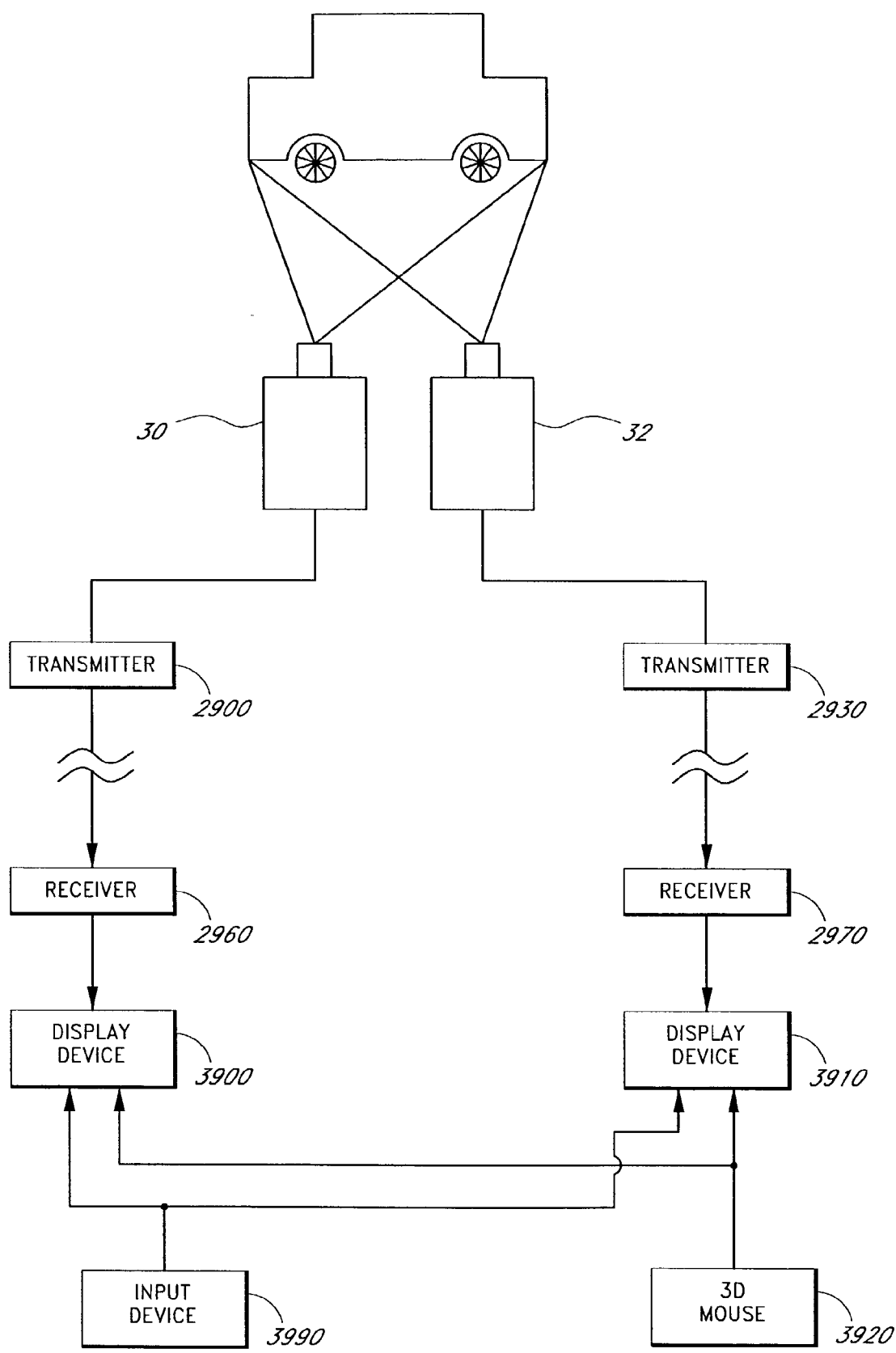
FIG. 38 illustrates a 3D display system according to another aspect of the invention.

Method and System of Stereoscopic Image Display for Guiding a Viewer's Eye Lens Motion Using a Three-Dimensional Mouse FIG. 38 illustrates a 3D display system according to another aspect of the invention. The 3D display system is directed to guide a viewer's eye lens motion using a three-dimensional input device. The system is also directed to adjust displayed images using the 3D input device such that the longitudinal and latitudinal locations of the center points of a viewer's eye lenses are substantially the same as those of the center points of the displayed images. In one embodiment of the invention, the 3D input device comprises a 3D mouse (will be described later).

The system comprises a set of stereoscopic cameras 30 and 32, a pair of transmitters 2900 and 2930, a set of display devices 3900 and 3910, a 3D mouse 3920, and an input device 3990. The stereoscopic cameras 30 and 32, a pair of transmitters 2900 and 2930, and a pair of receivers 2960 and 2970 are the same as those shown in FIG. 29. The display devices 3900 and 3910 display stereoscopic image that has been transmitted from the camera site. Also, the devices 3900 and 3910 display the pair of 3D mouse cursors that guide a viewer's eye lens movement.

In one embodiment of the invention, the input of the 3D mouse is provided to both the display devices 3900 and 3910 as shown in FIG. 38. In this embodiment of the invention, the pair of 3D mouse cursors are displayed and moved by the movement of the 3D mouse 3920.

In one embodiment of the invention, the shape of the 3D mouse cursor comprises a square, an arrow, a cross, a square with a cross therein as shown in FIGS. 40A–40H, a reticle, or a crosshair. In one embodiment of the invention, a pair of cross square mouse cursors 400 and 420 as shown in FIG. 40 will be used for the convenience. In one embodiment of the invention, when a viewer adjusts a distance value (will be described in more detail referring to FIGS. 39 and 40) for the displayed images, the distance ($M_d$) between the 3D mouse cursors 400 and 420 is adjusted. Also, in this embodiment of the invention, the size of the 3D mouse cursors may be adjusted. In this embodiment of the invention, the viewer adjusts the distance value, for example, by turning a scroll button of the 3D mouse. For example, by turning the scroll button backward (towards the user), the viewer can set a distance value from a larger value to a smaller one (10,000 m→100 m→5 m→1 m→0.5 m→5 cm). Also, by turning the scroll button forward (opposite direction of the backward direction), the viewer may set a distance value from a smaller value to a larger one (5 cm→0.5 m→1 m→5 m→100 m→10,000 m). Hereinafter the distance value 10,000 m will very often be referred to as an infinity value or infinity.

FIG. 39 illustrates one example of a 3D display image. The image comprises a mountain image portion 3810, a tree image portion 3820, a house image portion 3830 and a person image portion 3840. It is assumed that the mountain image 3810, the tree image 3820, the house image 3830, the person image 3840 are photographed in distances "about 10,000 m," "about 100 m," "about 5 m," and "about 1 m," respectively, spaced from the set of stereoscopic cameras 30 and 32.

Figure 40A:
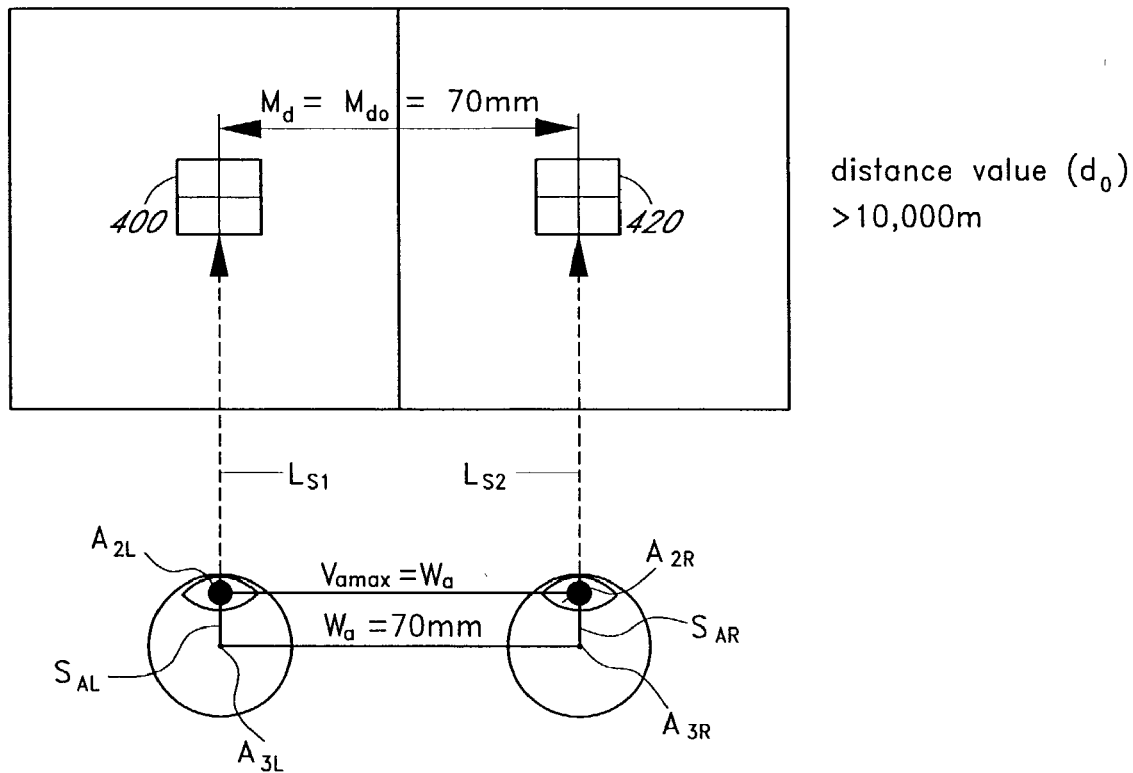
FIGS. 40A–40H illustrate conceptual drawings that explain the relationship between the 3D mouse cursors and eye lens locations.
Figure 40B:
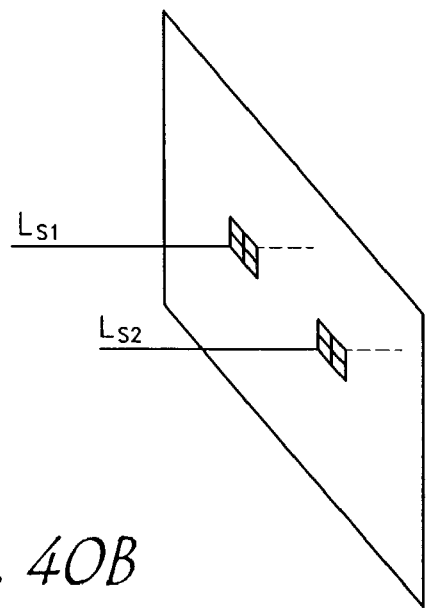

When a viewer wants to see the mountain image 3810 shown in FIG. 39, he or she may set the distance value as a value greater than "10,000 m." In this situation, the mouse cursor distance $M_d$ has $M_{d0}$ value which is the same as the $W_a$ ($V_{amax}$) value as shown in FIG. 40A. As discussed above, when the viewer sees an infinity object, $V_a$ has the maximum value ($V_{amax}$). Also, the viewer's sight lines $L_{s1}$ and $L_{s2}$, each of which is an extended line of each of $S_{AL}$ and $S_{AR}$ (each connecting $A_2$ and $A_3$), are substantially parallel to each other as shown in FIGS. 40A and 40B. This means that if the viewer sees the displayed images with their eye lenses spaced as much as $W_a$ as shown in FIGS. 40A and 40B, the viewer feels a sense of distance as if they see an object that is "$d_0$ (10,000 m)" distant. This is because a human being's eyes are spaced apart from each other about 60–80 mm and a sense of 3 dimension is felt by the synthesized images of each eye in the brain. Thus, when the viewer sees the two mouse cursors that are spaced as much as $M_d=W_a$, they perceive a single (three-dimensional) mouse cursor that is located between the two mouse cursors (400, 420) at an infinity distance.

Figure 40C:
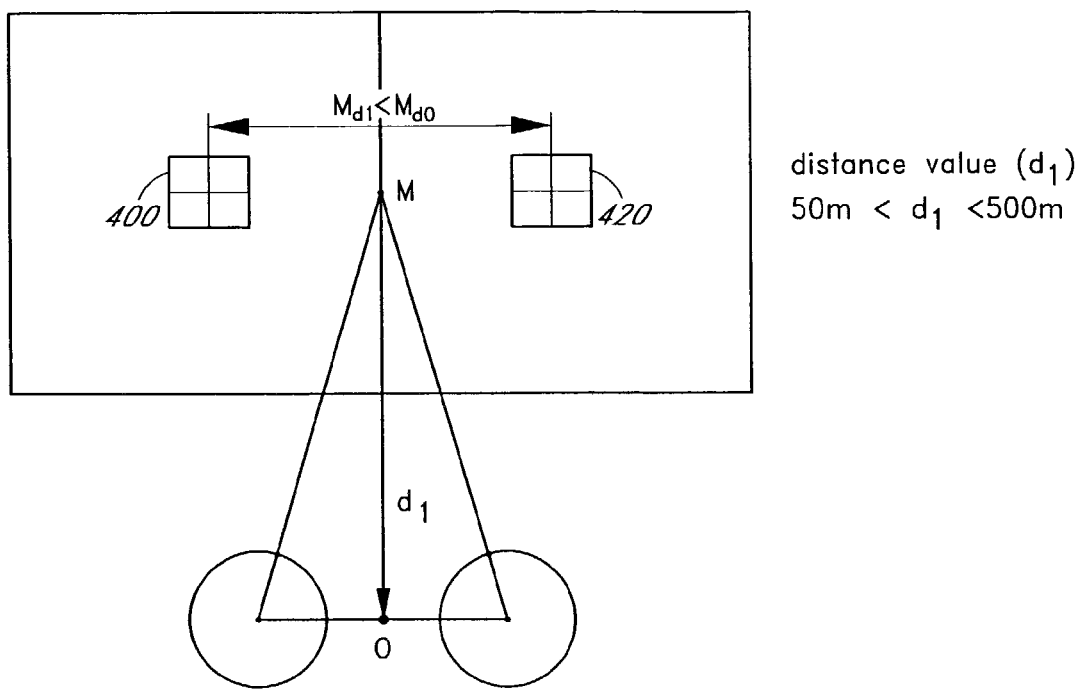
Figure 40D:
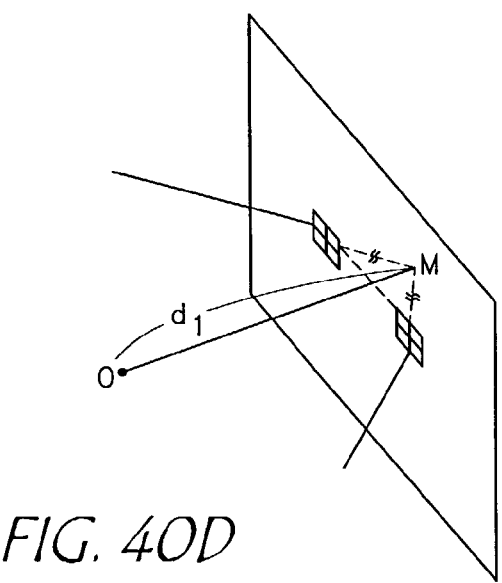

When the viewer sets the distance value ($d_1$) to, for example, "100 m," and sees the tree image 3820, $M_d$ has $M_{d1}$ value which is less than $M_{d0}$ as shown in FIGS. 40C and 40D. Also, the viewer's sight lines $L_{s1}$ and $L_{s2}$ are not parallel any more. Thus, when the two sight lines are extended, they are converged in an imaginary point "M" as shown in FIG. 40D. The point "O" represents the middle point between the center points of each eye. Similarly, if the viewer sees the displayed images with their eye lenses spaced as much as $M_{d1}$ as shown in FIGS. 40C and 40D, the viewer feels a sense of distance as if they see an object that is "$d_1$ (100 m)" distant. The distance between M and O is not physical length but imaginary length. However, since the viewer feels a sense of the distance, as far as the viewer's eye lens distance or directions are concerned, the distance between M and O can be regarded as the actual distance between the viewer's eyes and an actual object. That is, when the viewer sees the two mouse cursors 400 and 420 that are spaced as much as $M_{d1}$, they perceive a single (three-dimensional) mouse cursor that is located in the M point, at a 100 m distance.

Figure 40E:
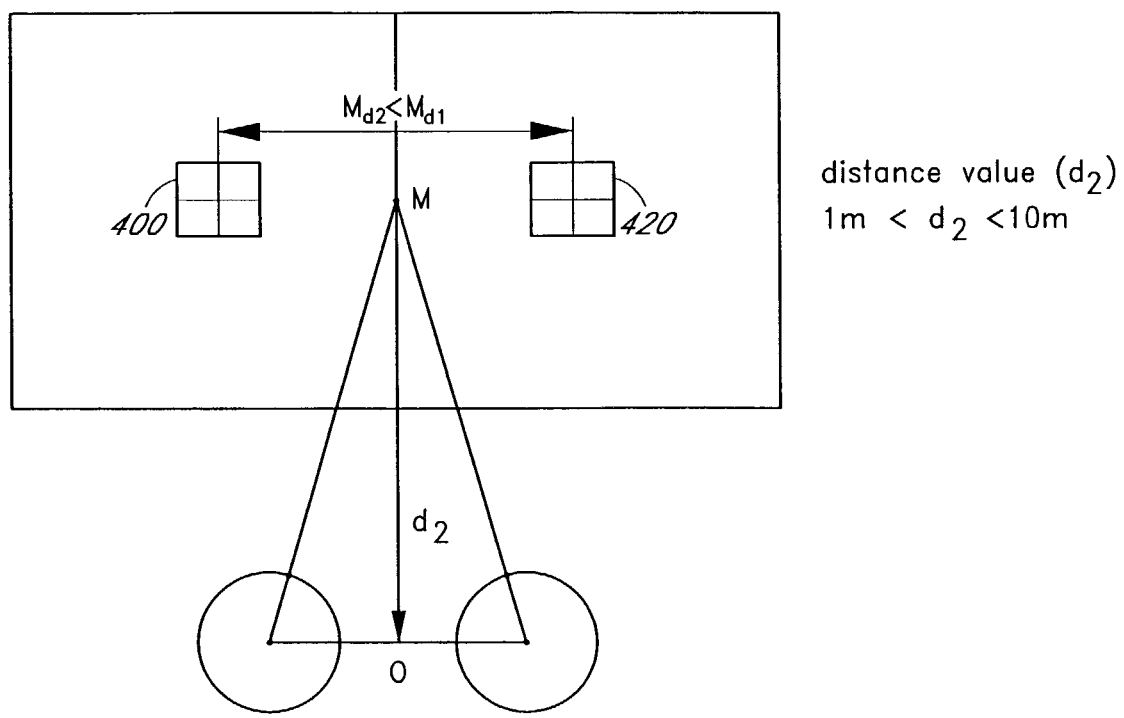
Figure 40F:
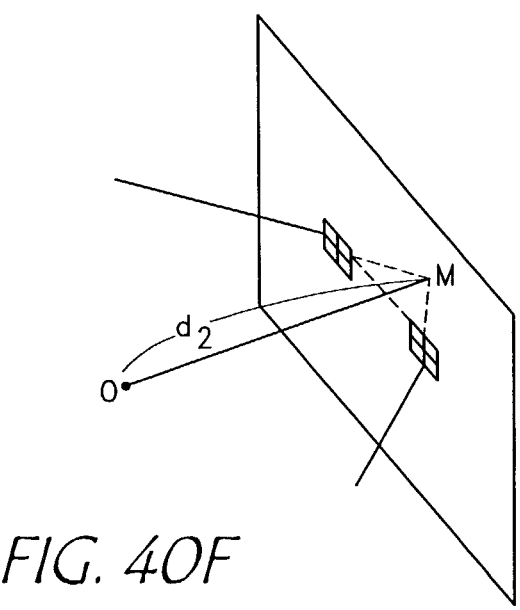

When the viewer sets a smaller distance value ($d_2$) to, for example, "5 m" and sees the house image 3830, $M_d$ has $M_{d2}$ value which is less than $M_{d1}$ as shown in FIGS. 40E and 40F. Also, when the two sight lines are extended in the screen, they are converged in an imaginary point "M" as shown in FIG. 40F. Similarly, in this situation when the viewer sees the house image 3830, the viewer feels a sense of distance as if he or she sees an object that is "$d_2$ (5 m)" away. Thus, when the viewer sees the two mouse cursors 400 and 420 that are spaced as much as $M_{d2}$, they perceive a single (three-dimensional) mouse cursor that is located in the M point, at a 5 m distance.

Figure 40G:
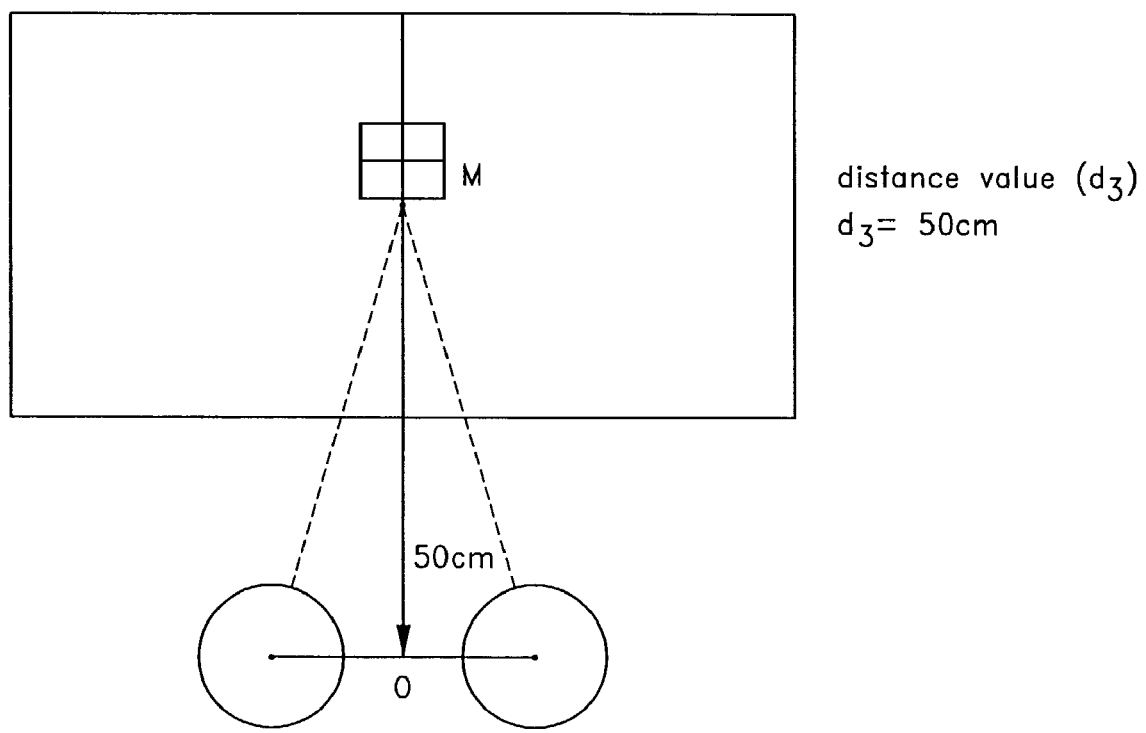

When the viewer sets a distance value ($d_3$) to the distance between the viewer and the screen, as exemplified as "50 cm," the mouse cursors 400 and 420 overlap with each other as shown in FIG. 40G. That is, when the distance value is the same as the actual distance between the point "O" and the center points of the screen as shown in FIG. 40G, the mouse cursors overlap with each other.

As seen in FIGS. 40A–40G, even though a pair of the 3D mouse cursors 400 and 420 are displayed in each of the display devices 3900 and 3910, the viewer sees one three-dimensional 3D mouse cursor for which he or she feels a sense of distance.

Figure 40H:
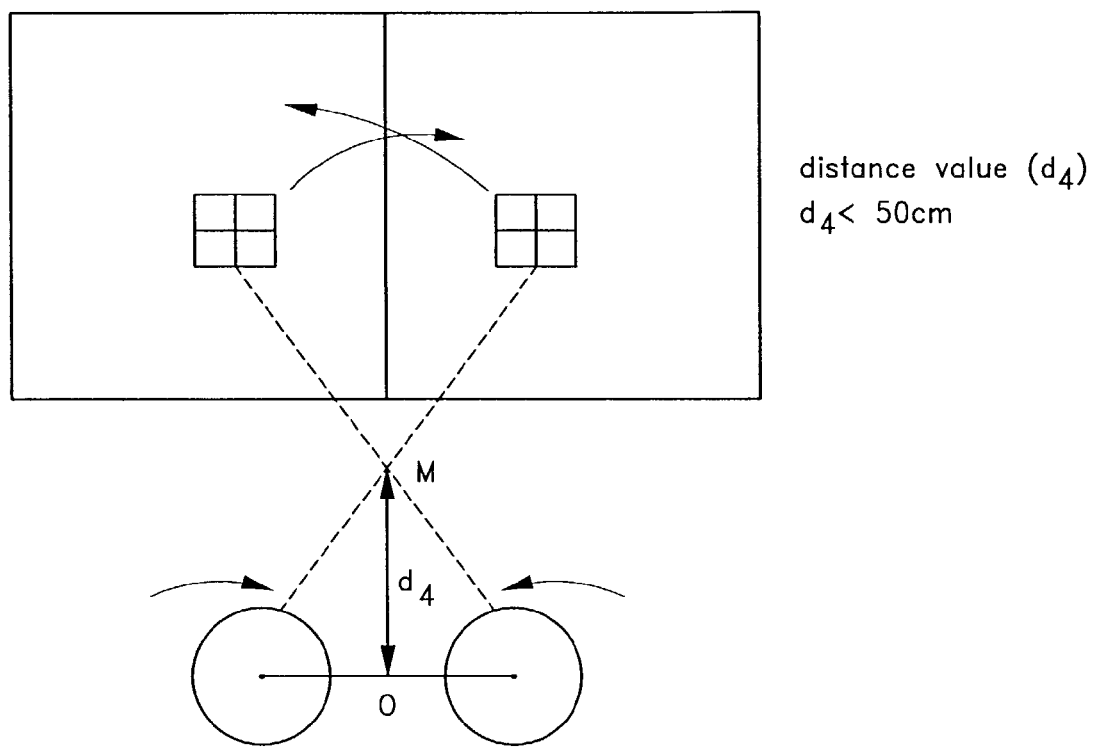

When the viewer sets the distance value to a value ($d_4$) less than "$d_3$," the viewer's sight lines are converged in front of the screen and crossed to each other as shown in FIG. 40H. In this situation, the viewer may see two mouse cursors 400 and 420 because the viewer's sight lines are converged in front of the screen.

As shown in FIGS. 40A–40H, the $M_d$ value is determined according to the distance value that is set by the viewer.

Figure 41:
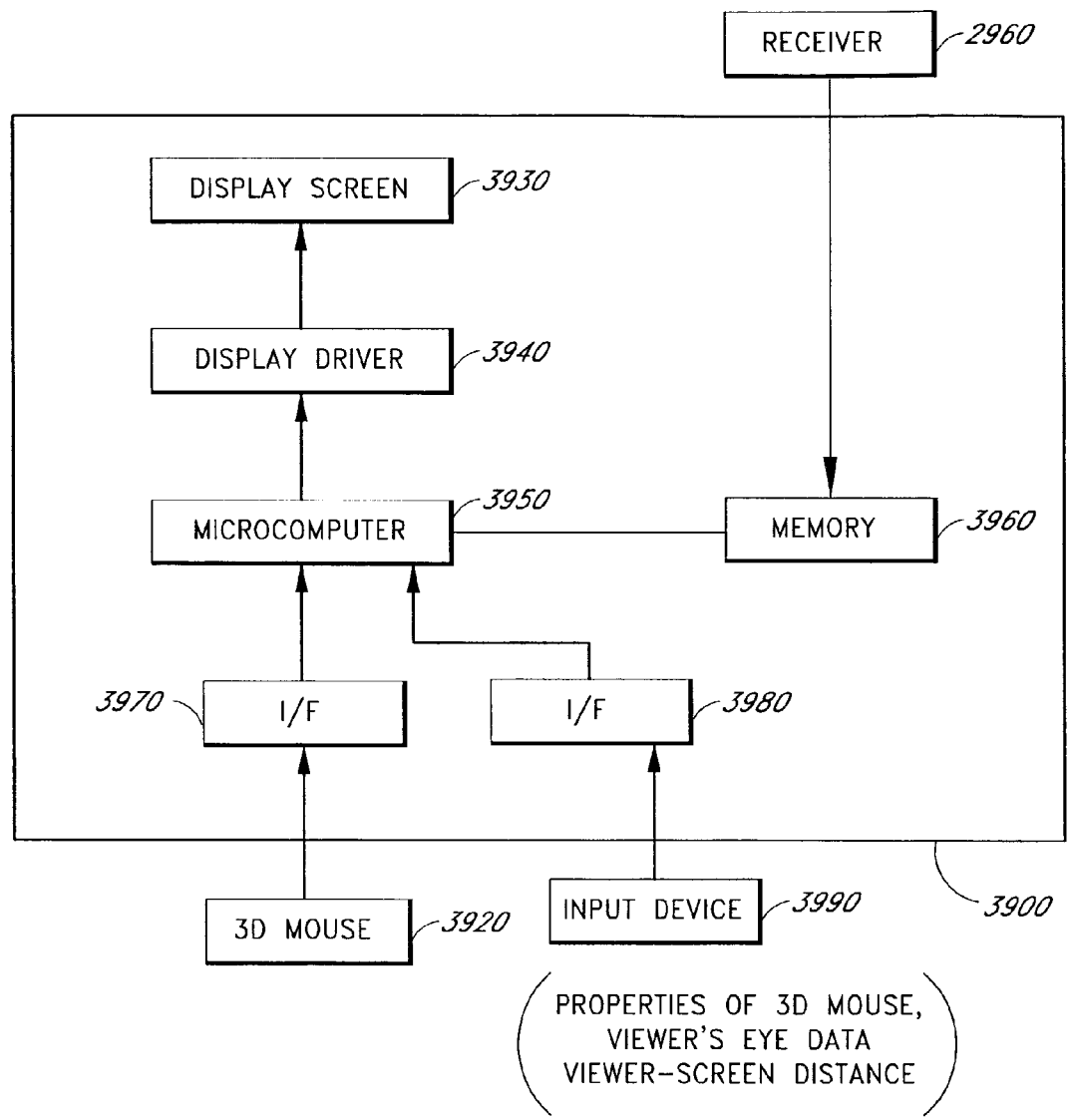
FIG. 41 illustrates an exemplary block diagram of the display devices as shown in FIG. 38.

FIG. 41 illustrates an exemplary block diagram of the display devices as shown in FIG. 38. Since each of the display devices 3900 and 3910 performs substantially the same functions, only one display device 3900 is illustrated in FIG. 41.

The display device 3900 comprises a display screen 3930, a display driver 3940, a microcomputer 3950, a memory 3960 and Interfaces 3970 and 3980. The display device 3900 adjusts the distance ($M_d$) between a pair of 3D mouse cursors 400 and 420 according to the distance value set as shown in FIGS. 40A–40H. The display device 3900 moves the center points of the displayed images based on the 3D mouse cursor movement. In one embodiment of the invention, the display device 3900 moves the displayed images such that the longitudinal and latitudinal locations of the center points of a viewer's eye lenses are substantially the same as those of the center points of the displayed images.

The 3D mouse 3920 detects its movement amount. The detected movement amount is provided to the microcomputer 3950 via the interface 3970. The distance value that the viewer sets is provided to the microcomputer 3950 via the 3D mouse 3920 and the interface 3970. In one embodiment of the invention, the interface 3970 comprises a mouse controller. In another embodiment of the invention, the distance value may be provided to the microcomputer 3950 via the input device 3990 and the interface 3980.

The input device 3990 provides properties of the 3D mouse such as minimum detection amount ($A_m$), movement sensitivity ($B_m$), and the mouse cursor size ($C_m$), the viewer-screen distance (d), and viewer's eye data such as $W_a$ and $S_{AL}$ and $S_{AR}$ to the microcomputer 3950 via the interface 3980. The minimum detection amount represents the least amount of movement which the 3D mouse can detect. That is, when the 3D mouse moves only more than the minimum detection amount, the movement of the 3D mouse can be detected. In one embodiment of the invention, the minimum detection amount is set when the 3D mouse is manufactured. The movement sensitivity represents how sensitive the mouse cursors move based on the movement of the 3D mouse. This means that the scroll button of the 3D mouse has different movement sensitivity, i.e., being either more sensitive or less sensitive, according to the distance value. For example, if the distance value is greater than 1,000 m, a "1 mm turn" of the scroll button may increase or decrease the distance by 2,000 m distance. If the distance value is between 100 m and 1,000 m, a "1 mm turn" of the scroll button may increase or decrease distance by 100 m. Similarly, if the distance value is less than 1 m, a "1 mm turn" of the scroll button may increase or decrease the distance by 10 cm.

In one embodiment of the invention, the mouse cursor size may also be adjusted. The distance (d) represents the distance between the middle point of the viewer's eyes and the screen as exemplified in FIG. 43A. In one embodiment of the invention, the screen comprises a V shaped mirror, a HMD screen, a projection screen, and a display device screen as shown in FIG. 1B.

Also, the input device 3990 provides display device properties to the microcomputer 3950 through the interface 3980. In one embodiment of the invention, the display device properties comprise the display device resolution and screen size of the display device 3900. The resolution represents the number of horizontal and vertical pixels of the device 3900. For example, if the resolution of the display device 3900 is 640×480, the number of the horizontal pixels is 640, and the number of the vertical pixels is 480. The size may comprise horizontal and vertical lengths of the display device 3900. With the resolution and screen size of the display device 3900, the length of one pixel can be obtained as, for example, "1 mm" per 10 pixels.

In one embodiment of the invention, the input device 3990 comprises a keyboard, a remote controller, and a pointing input device, etc. In one embodiment of the invention, the interface 3980 comprises the input device controller. In one embodiment of the invention, the properties of the 3D mouse are stored in the memory 3960. In one embodiment of the invention, the viewer's eye data are detected using a detection device for eye lens movement or provided to the display device 3900 by the viewer.

The microcomputer 3950 determines the mouse cursor distance ($M_d$) based on the distance value set by the viewer. A table (not shown) showing the relationship between the distance value and the $M_d$ value as shown in FIGS. 40A–40H according to a viewer's eye data may be stored in the memory 3960. The microcomputer 3950 determines the cursor distance ($M_d$) by referring to the table, and provides the determined distance value to the display driver 3940. The display driver 3940 displays the pair of the mouse cursors 400 and 420 based on the determined $M_d$ value in the display screen 3930. The microcomputer 3950 also determines new locations of the mouse cursors 400 and 420, and calculates a movement amount for the center points of the display images based on the locations of the mouse cursors 400 and 420. The memory 3960 may also store data that may be needed to calculate the movement amount for the center points of the display images.

Figure 42:
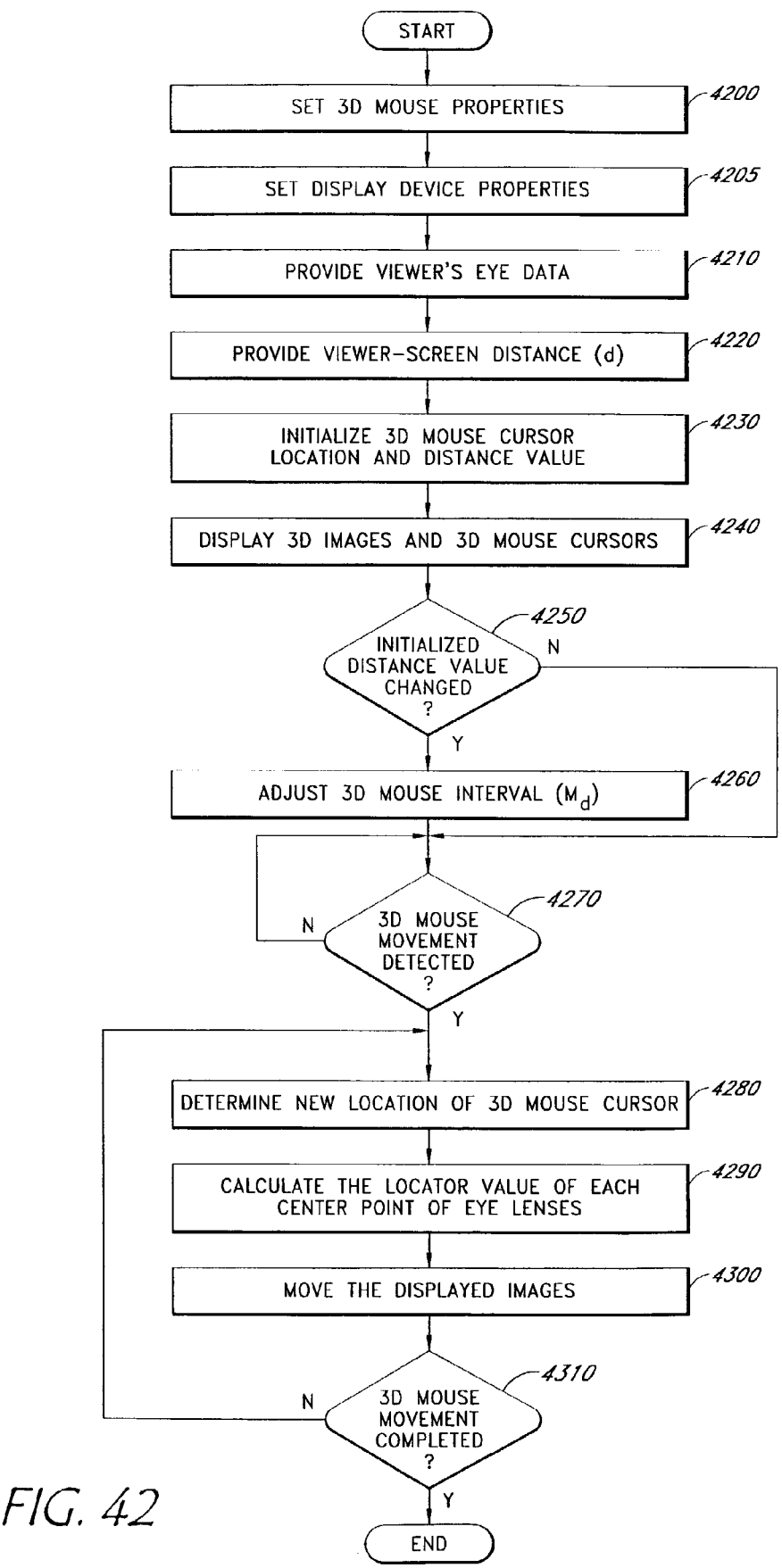
FIG. 42 illustrates an exemplary flowchart for explaining the operation of the display devices of FIG. 41.

Referring to FIG. 42, the operation of the display devices 3900 and 3910 will be described. 3D mouse properties are set in each of the display devices 3900 and 3910 (4200). As discussed above, the 3D mouse properties comprise a minimum detection amount ($A_m$), a movement sensitivity ($B_m$), and the mouse cursor size ($C_m$). Also, the 3D mouse properties may be provided by the viewer or stored in the memory 3960.

Display device properties are provided to the display devices 3900 and 3910 (4205). In one embodiment of the invention, the display device properties may be stored in the memory 3960.

The viewer's eye data are provided to the display devices 3900 and 3910 (4210). As discussed above, the viewer's eye data may be automatically detected by a detection device or provided to the display devices 3900 and 3910 by the viewer. In one embodiment of the invention, the viewer's eye data comprise the distance ($W_a$) between the center points of the eyes, and the $S_A$ ($S_{AL}$ and $S_{AR}$) value which is the distance between the eye lens center point ($A_2$) and the eye center point ($A_3$).

A viewer-screen distance (d) is provided to each of the display devices 3900 and 3910 via, for example, the input device 3990 (4220).

Figure 43A:
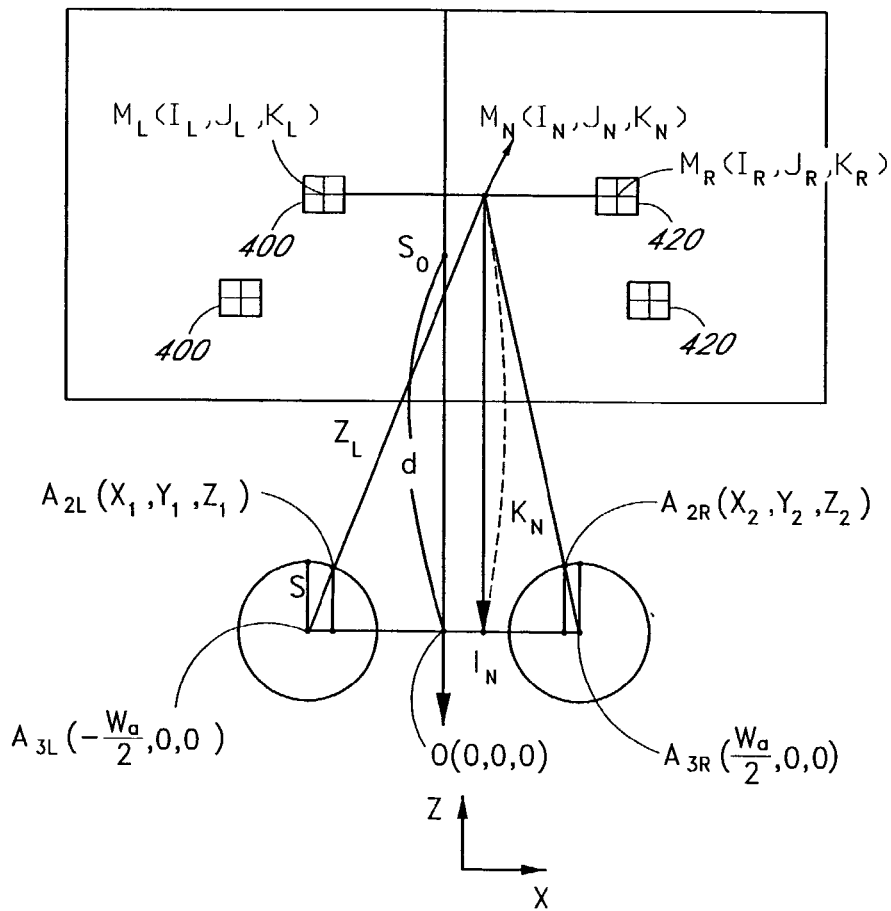
FIGS. 43A–43C illustrate conceptual drawings that explain a method for calculating the location of the center points of the eye lens and the distance between two locations.

The mouse cursor location and distance value are initialized (4230). In one embodiment of the invention, the initialization is performed in an infinity distance value. In this situation, left and right mouse cursors are located at ($-W_a/2$, 0, 0) and ($W_a/2$, 0, 0), respectively, where the origin of the coordinate system is O (0, 0, 0) point as shown in FIG. 43A. Also, the locations of the center points of each displayed image are ($-W_a/2$, 0, 0) and ($W_a/2$, 0, 0), respectively.

3D image and 3D mouse cursors are displayed in each of the display devices 3900 and 3910 (4240). In one embodiment of the invention, 3D mouse cursors 400 and 420 are displayed on each of the 3D images. Since the mouse cursor location has been initialized, the adjusted mouse cursors 400 and 420 are displayed on the images.

It is determined whether initialized distance value has been changed to another value (4250). When the viewer may want to set different distance value from the initialized distance value, he or she may provide the distance value to the display devices 3900 and 3910.

If the initialized distance value has been changed, 3D mouse cursor distance ($M_d$) is adjusted and the 3D mouse cursor location is reinitialized based on the changed distance value (4260). For example, in case that the initial location is (0, 0, 10,000 m), if another distance value (e.g., 100 m) as shown in FIG. 40C is provided, the mouse cursor distance ($M_d$) is changed from $M_{d0}$ to $M_{d1}$. However, the x and y values of the point M do not change, even though the z value of the M point is changed from 10,000 m to 100 m.

If the initialized distance value has not been changed, it is determined whether 3D mouse movement has been detected (4270).

If the 3D mouse movement has been detected, a new location of the 3D mouse cursors 400 and 420 is determined (4280). In one embodiment of the invention, the new location of the mouse cursors is determined as follows. First, the number of pixels on which the mouse cursors have moved in the x-direction is determined. For example, left direction movement may have "$-x$" value and right direction movement may have "$+x$" value. The same applies to "y" direction, i.e., "$-y$" value for lower direction movement and "$+y$" value for upper direction movement. The "z" direction movement is determined by the distance value.

The locations of the center points of the display images to be adjusted are calculated based on the new location of the 3D mouse cursors 400 and 420 (4290). In one embodiment of the invention, the locations of the center points of the display images are obtained from the location values of each of the eye lenses, respectively. In this embodiment of the invention, the location values of the eye lenses are obtained using Equations VII and VIII as described below. Referring to FIG. 43, a method of obtaining the locations of the eye lenses will be described.

First, the value for $Z_L$ is obtained from Equation VII.

Equation VII:

$$Z_L = \sqrt{\left[I_N - \left(-\frac{W_a}{2}\right)\right]^2 + [J_N - 0]^2 + [K_N - 0]^2}$$

$$= \sqrt{\left[I_N + \left(\frac{W_a}{2}\right)\right]^2 + [J_N]^2 + [K_N]^2}$$

In FIG. 43A, $M_N$ ($I_N$, $J_N$, $K_N$) represents the location of the center point of the two mouse cursors $M_L$ ($I_L$, $J_L$, $K_L$) and $M_R$ ($I_R$, $J_R$, $K_R$). Since each of the mouse cursor locations $M_L$ and $M_R$ is obtained in 4280, the center point location $M_N$ is obtained. That is, $I_N$ and $J_N$ are obtained by averaging ($I_L$, $I_R$) and ($J_L$, $J_R$). $K_N$ is determined by the current distance value. $Z_L$ is the distance between the left eye center point ($A_{3L}$) and $M_N$.

Figure 43B:
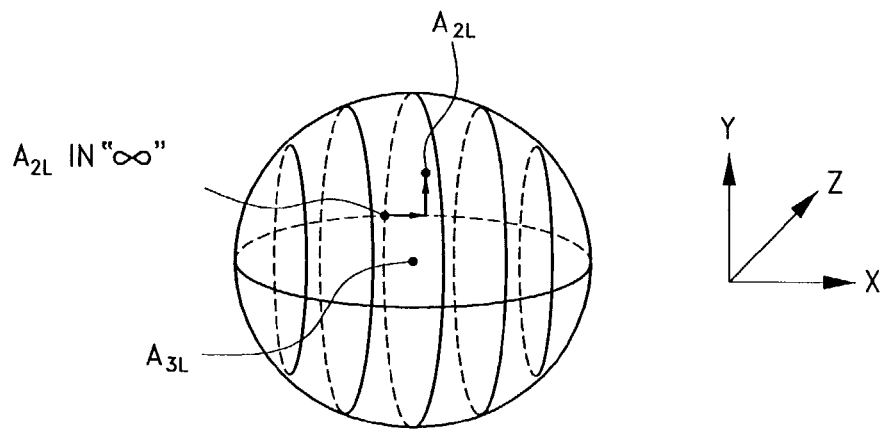

Second, center point locations [(x1, y1, z1); (x2, y2, z2)] for each eye lens are obtained from Equation VIII. $A_{2L}$ (x1, y1, z1) is the center point location of the left eye lens, and $A_{2R}$ (x2, y2, z2) is the center point location of the right eye lens, as shown in FIG. 43A. FIG. 43B illustrates a three-dimensional view of a viewer's eye. Referring to FIG. 43B, it can be seen how eye lens center point ($A_{2L}$) is moving along the surface of the eye.

Equation VIII:
$$x1 = \left(-\frac{W_a}{2}\right) + \frac{\left[\left(I_N + \frac{W_a}{2}\right) \times S\right]}{Z_L}$$

$$y1 = 0 + \frac{[(J_N) \times S]}{Z_L}$$

$$z1 = 0 + \frac{[(K_N) \times S]}{Z_L}$$

$$x2 = \left(\frac{W_a}{2}\right) - \frac{\left[\left(I_N + \frac{W_a}{2}\right) \times S\right]}{Z_L}$$

$$y2 = 0 + \frac{[(J_N) \times S]}{Z_L}$$

$$z2 = 0 + \frac{[(K_N) \times S]}{Z_L}$$

In one embodiment of the invention, a digital signal processor may be used for calculating the locations of the eye lenses.

Figure 44:
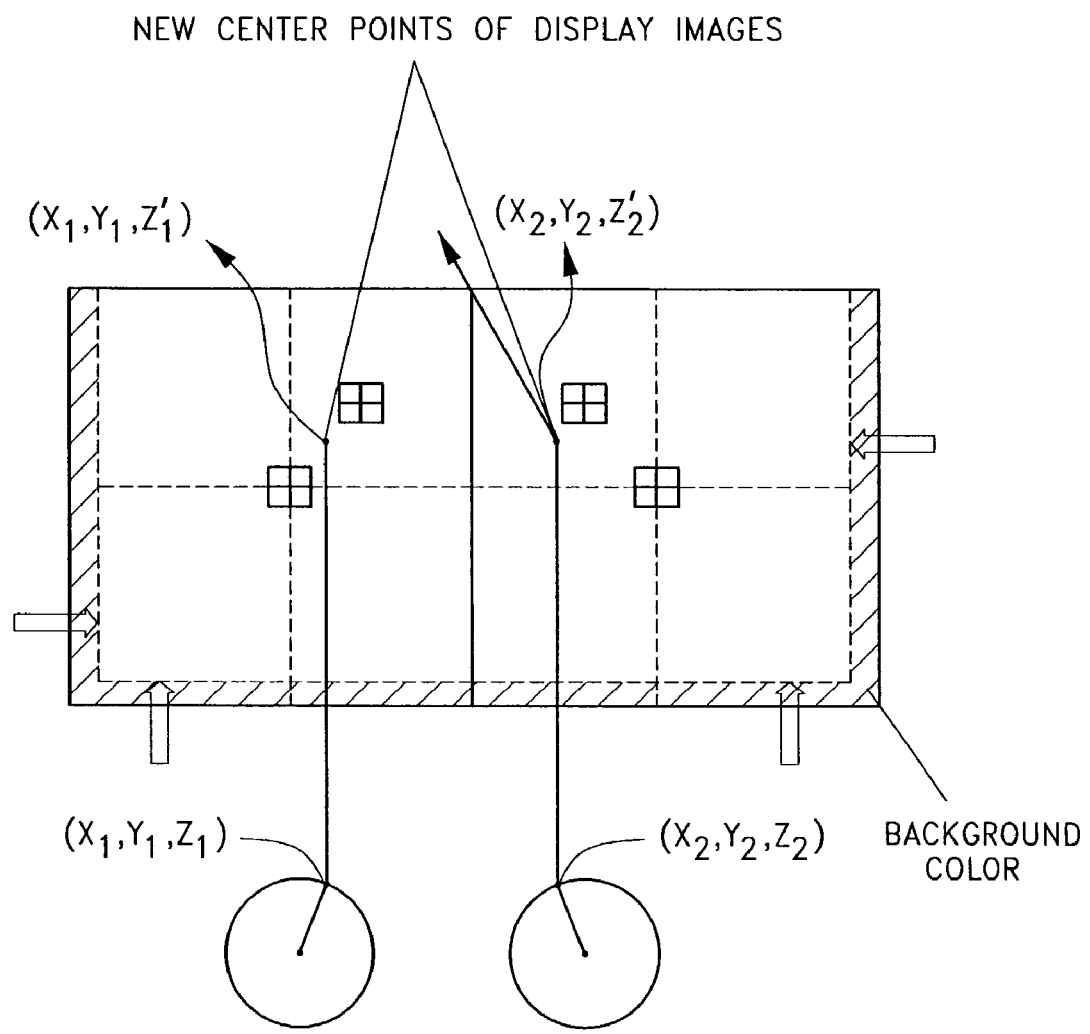
FIG. 44 is a conceptual drawing for explaining a determination method of the location of the center points of the displayed images.

Each of the center points of the displayed images is moved to the locations (x1, y1) and (x2, y2), respectively as shown in FIG. 44 (4300). In one embodiment of the invention, the blank area of the screen after moving may be filled with a background color, e.g., black, as shown in FIG. 44.

It is determined whether the 3D mouse movement has been completed (4310). If the 3D mouse movement has not been completed, procedures 4280–4300 are performed until the movement is completed. This ensures that the displayed images are moved so long as the viewer is moving the mouse cursor.

Figure 43C:
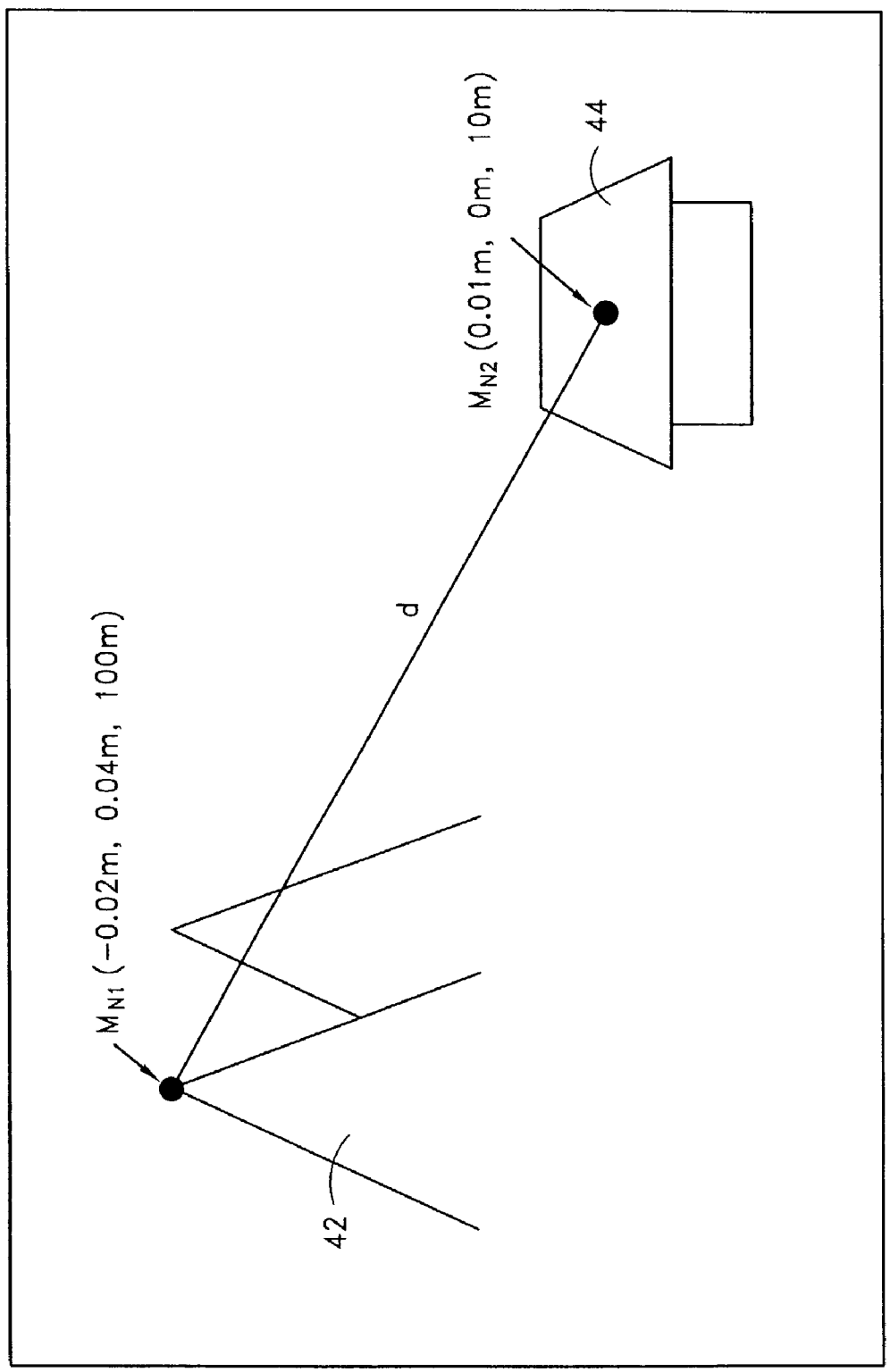

By using the above calculation method, the distance between two locations can be measured. Referring to FIG. 43C, $M_{N1}$ is a peak point of a mountain 42 and $M_{N2}$ is a point of a house 44. It is assumed that the location values of $M_{N1}$ and $M_{N2}$ are determined to be (−0.02 m, 0.04 m, 100 m) and (0.01 m, 0 m, 10 m), respectively by the above calculation method. These determined location values may be stored in the memory 3960, and the distance between the two locations $M_{N1}$ and $M_{N2}$ is calculated as follows.

$$Z_L = \sqrt{[-0.02-0.01]^2+[0.04-0]^2+[100-10]^2} = 90$$

In this embodiment, the microcomputer 3950 is programmed to calculate the distance between two locations, or may comprise a distance measure mode. In this situation, when a viewer designates a first location (A: middle point of two mouse cursors 400 and 420), the location is determined and stored in the memory 3960. In one embodiment, the location value may be displayed in the display screen 3930 or may be provided to a viewer via voice signal. This applies to a second location (B). In this way, the values of the first and second locations (A, B) are determined and the distance between the locations (A, B) is calculated.

Figure 45:
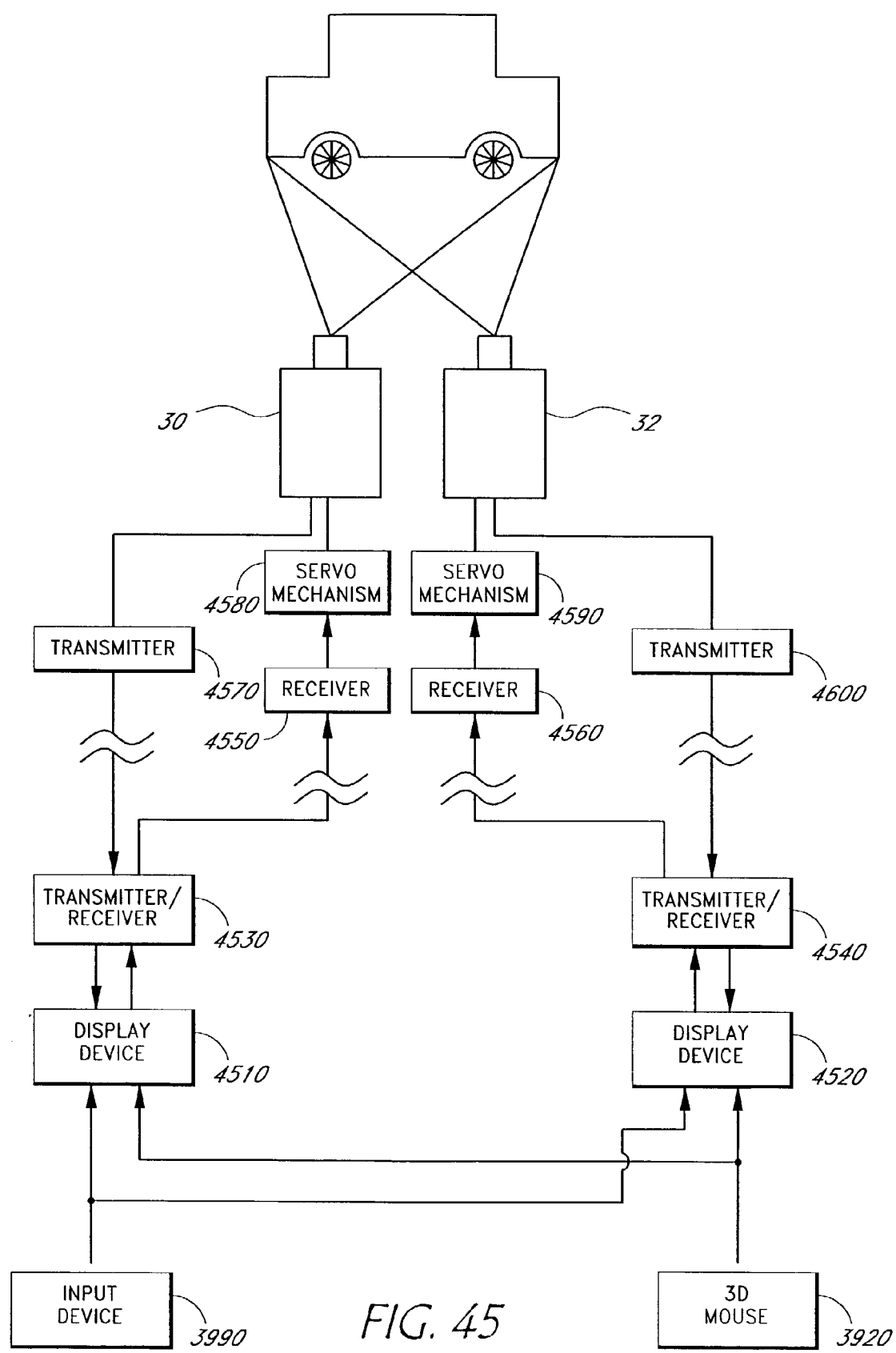
FIG. 45 illustrates a 3D display system according to another aspect of the invention.

Method and System for Controlling the Motion of Stereoscopic Cameras Using a Three-Dimensional Mouse FIG. 45 illustrates a 3D display system according to another aspect of the invention. The system is directed to control the movement of stereoscopic cameras based on the movement of a viewer's eye lenses.

The system comprises a camera site and a display site. The display site comprises a pair of transmitters/receivers 4530 and 4540, a set of display devices 4510 and 4520, and an input device 3990 and a 3D mouse 3920.

Figure 46:
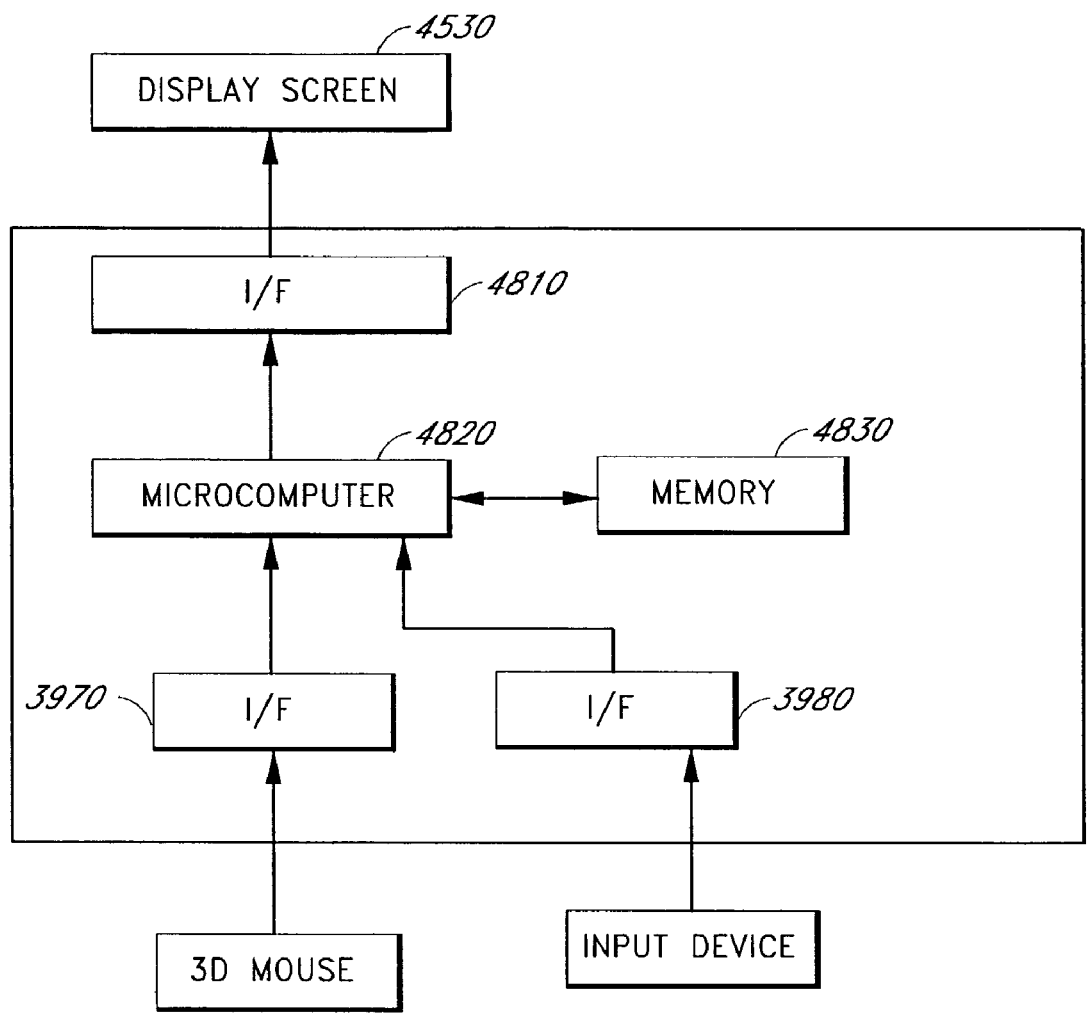
FIG. 46 illustrates an exemplary block diagram of the display device of FIG. 45.

The input device 3990 and 3D mouse 3920 are substantially the same as those of the system shown in FIG. 38. Referring to FIG. 46, the display device 4510 comprises interfaces 3970 and 3980, a microcomputer 4820, a memory 4830, and an interface 4810. The interfaces 3970 and 3980 are substantially the same as those of the display device shown in FIG. 41. The microcomputer 4820 determines the current location values of the mouse cursors, and calculates the location values of the center points of a viewer's eye lenses. The memory 4830 may also store data that may be needed to calculate the movement amount for the center points of the display images.

The interface 4810 may modify the location values adapted for transmission, and provide the modified data to the transmitter 4530. The transmitter 4530 transmits the modified location data to the camera site.

Referring to FIG. 45, the camera site comprises a set of stereoscopic camera 30 and 32, a pair of transmitters 4570 and 4600, a pair of servo mechanisms 4580 and 4590, and a pair of receivers 4550 and 4560. Each of the receivers 4550 and 4560 receives the location values transmitted from the display site, and provides the data to the pair of the servo mechanisms, 4580 and 4590, respectively.

Figure 47A:
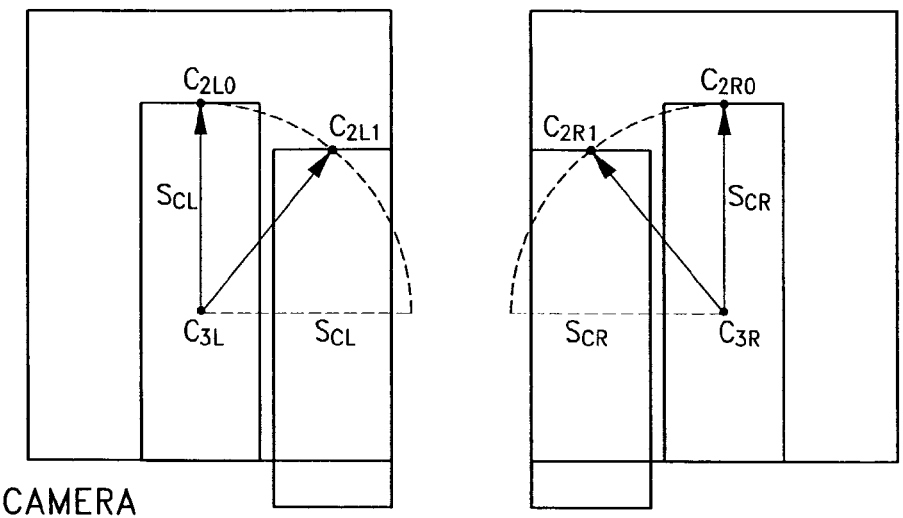
FIG. 47 is a conceptual drawing for explaining the camera control based on the movement of the eye lenses.
Figure 47B:
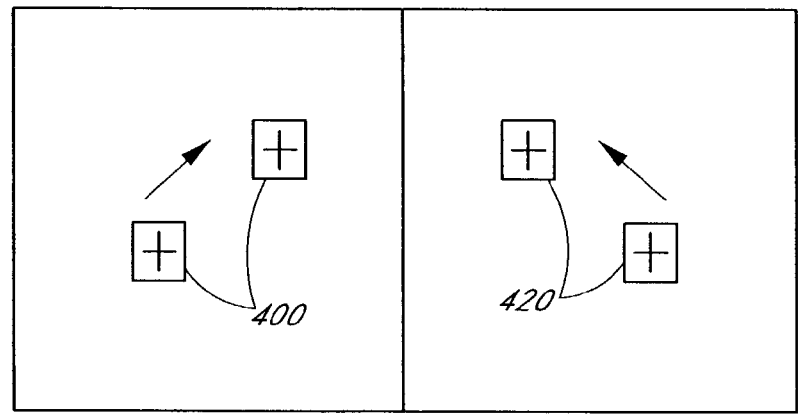
Figure 47C:
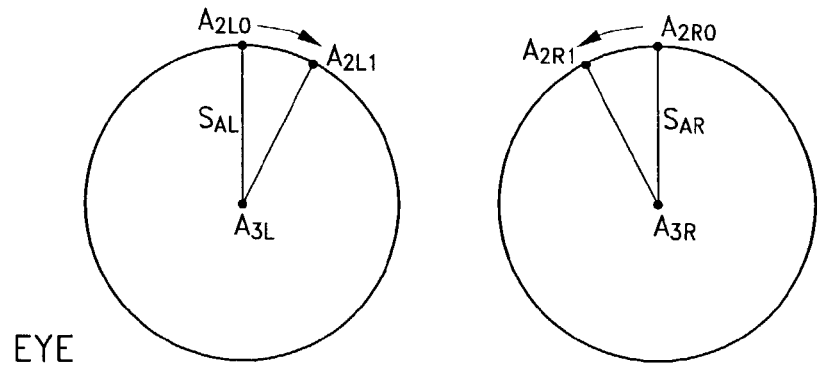

The servo mechanisms 4580 and 4590 control the cameras 30 and 32 based on the received location data, respectively. In one embodiment of the invention, the servo mechanisms 4580 and 4590 control the cameras 30 and 32 such that the longitudinal and latitudinal values of the center points of the object lenses ($C_{2L}$, $C_{2R}$; FIGS. 26 and 27) of the cameras 30 and 32 are substantially the same as those of the center points of the viewer's eye lenses as shown in FIGS. 47A and 47C.

Figure 48:
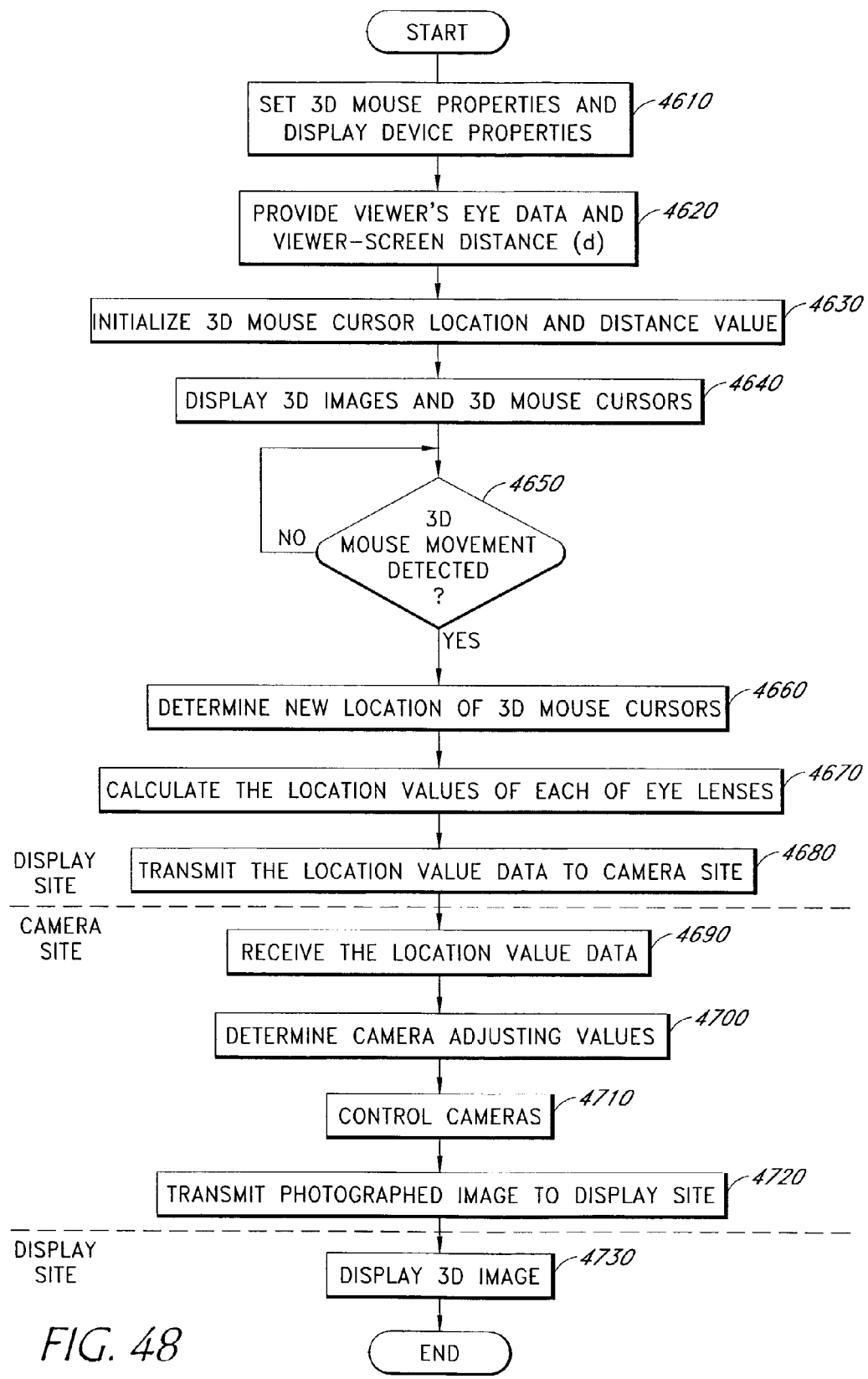
FIG. 48 illustrates an exemplary flowchart for explaining the operation of the system shown in FIG. 45.

Referring to FIG. 48, the operation of the system shown in FIG. 45 will be described. 3D mouse properties and display device properties are set in each of the display devices 4510 and 4520 (4610). The 3D mouse properties and display device properties are substantially the same as those explained with regard to FIG. 42. The viewer's eye data and viewer-screen distance (d) are provided to each of the display devices 4510 and 4520 (4620). Again, the viewer's eye data and viewer-screen distance (d) are substantially the same as those explained with regard to FIG. 42. 3D mouse cursor location and distance value are initialized (4630). In one embodiment of the invention, the 3D mouse cursor location is initialized to the center points of each of the display device screens, and the distance value is initialized to the infinity distance value. The 3D image that is received from the camera site, and 3D mouse cursors (400, 420) are displayed on the display devices 4510 and 4520 (4640). In one embodiment of the invention, the 3D mouse cursor may be displayed on the 3D image. In this situation, the portion of the image under the 3D mouse cursors (400, 420) may not be seen by a viewer.

It is determined whether 3D mouse movement is detected (4650). If movement is detected, the new location of the 3D mouse cursors is determined (4660). The location values of the center points of the viewer's eye lenses are calculated based on the new location of the mouse cursors, respectively (4670). The new location and movement of the mouse cursors (400, 420) are illustrated in FIG. 47B. The specific methods for performing the procedures 4650–4670 have been described with regard to FIGS. 42–44.

The location value data are transmitted to the camera site through each of the transmitter/receivers 4530 and 4540 (4680). As discussed above, the location values are calculated so long as the mouse cursor is moving. Thus, the location values may comprise a series of data. In one embodiment of the invention, the location values are serially transmitted to the camera site so that the cameras 30 and 32 are controlled based on the received order of the location values. In another embodiment of the invention, the sequence of the generated location values may be obtained and transmitted to the camera site so that the cameras 30 and 32 are controlled according to the sequence. In one embodiment of the invention, the location value data are digital data and may be properly modulated for transmission.

The location value data are received in each of the receivers 4550 and 4560 (4690). In one embodiment of the invention, one transmitter may be used instead of the two transmitters 4530 and 4540. In that situation, one receiver may be used instead of the receivers 4550 and 4560.

Camera adjusting values are determined based on the location values and the stereoscopic cameras 30 and 32 are controlled based on the camera adjusting values (4700). Each of the servo controllers 4580 and 4590 controls the respective camera 30 and 32 such that each of the center points of the cameras object lenses keeps track of the movement of the center points of each eye lens (4710). As shown in FIG. 47C, new location values $A_{2L1}$ and $A_{2R1}$ corresponding to the new location of the 3D mouse cursors are calculated using Equations VIII as discussed above. Each of the servo controllers 4580 and 4590 controls the cameras 30 and 32 such that the center points of each of the camera object lenses are located in $C_{2L1}$ and $C_{2R1}$ as shown in FIG. 47A. To do this, the servo controllers 4580 and 4590 may set the location values of the center points of the camera object lenses so as to conform to the location values of the center points of the eye lenses. In one embodiment of the invention, the servo controllers 4580 and 4590 comprise a horizontal motor and a vertical motor that move each camera to the horizontal direction (x-direction) and the vertical direction (y-direction), respectively. In one embodiment of the invention, only one servo controller may be used for controlling movements of both of the cameras 30 and 32 instead of the pair of the servo controllers 4580 and 4590.

While each of the servo controllers 4580 and 4590 is controlling the stereoscopic cameras 30 and 32, the cameras 30 and 32 are photographing an object. The photographed image is transmitted to the display site and displayed in each of the display devices 4510 and 4520 (4720, 4730).

Regarding the embodiments described with regard to FIGS. 45–48, the camera control may be used in remote control technology such as a remote surgery, remote control of a vehicle, an airplane, or aircraft, fighter, or remote control of construction, investigation or automatic assembly equipments.

Method and System for Controlling Space Magnification for Stereoscopic Images

Figure 49:
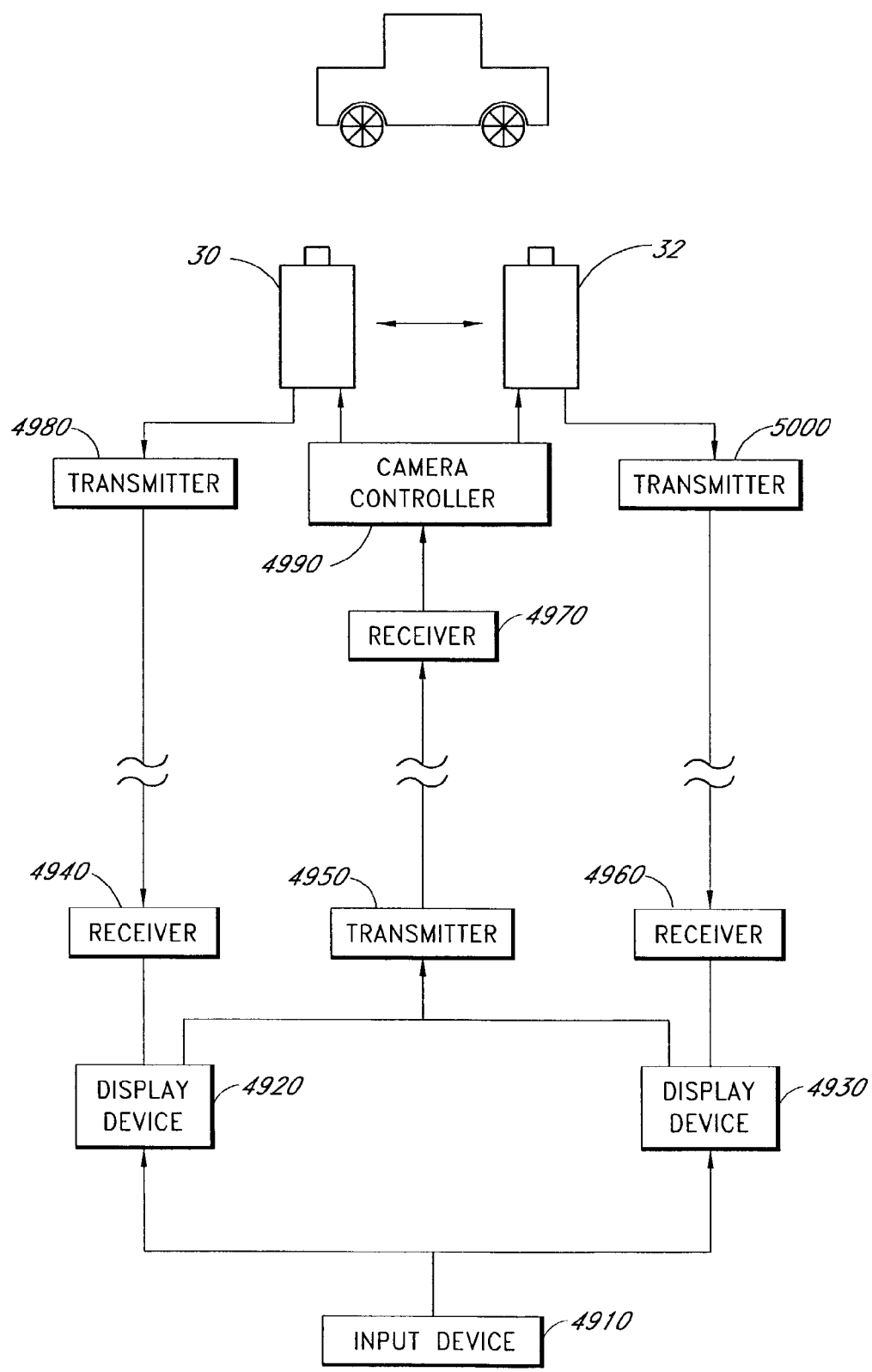
FIG. 49 illustrates a 3D display system according to another aspect of the invention.

FIG. 49 illustrates a 3D display system according to another aspect of the invention. The 3D display system is directed to adjust space magnification for a stereoscopic image based on the space magnification adjusting data provided by a viewer.

The system comprises a camera site and a display site. The display site comprises an input device 4910, a set of display devices 4920 and 4930, a transmitter 4950, and a pair of receivers 4940 and 4960.

The input device 4910 provides a viewer's eye distance value ($W_a$) as shown in FIG. 43A and space magnification adjusting data to at least one of the display devices 4920 and 4930. The space magnification means the size of space that a viewer perceives from the display images. For example, if the space magnification is "1," a viewer perceives the same size of the space in the display site as that of the real space that was photographed in the camera site. Also, if the space magnification is "10," a viewer perceives ten times of the size of the space in the display site larger than that of the real space that was imaged by the camera. In addition, if the space magnification is "0.1," a viewer perceives ten times the size of the space in the display site less than that of the real space that was imaged by the camera. The space magnification adjusting data represent data regarding the space magnification that a viewer wants to adjust. In one embodiment of the invention, the space magnification adjusting data may comprise "0.1" times of space magnification, "1" times of space magnification, "10" times of space magnification, or "100" times of space magnification. The adjustment of the space magnification is performed by an adjustment of the distance between the cameras 30 and 32, and will be described in more detail later.

At least one of the display devices 4920 and 4930 displays the space magnification adjusting data that are provided through the input device 4910. The at least one of the display devices 4920 and 4930 provides the space magnification adjusting data and eye distance value ($W_a$) to the transmitter 4950. The transmitter 4950 transmits the magnification adjusting data and the value $W_a$ to the camera site. In one embodiment of the invention, the space magnification adjusting data and the value $W_a$ may be provided directly from the input device 4910 to the transmitter 4950 without passing through the display devices 4920 and 4930.

Figure 50:
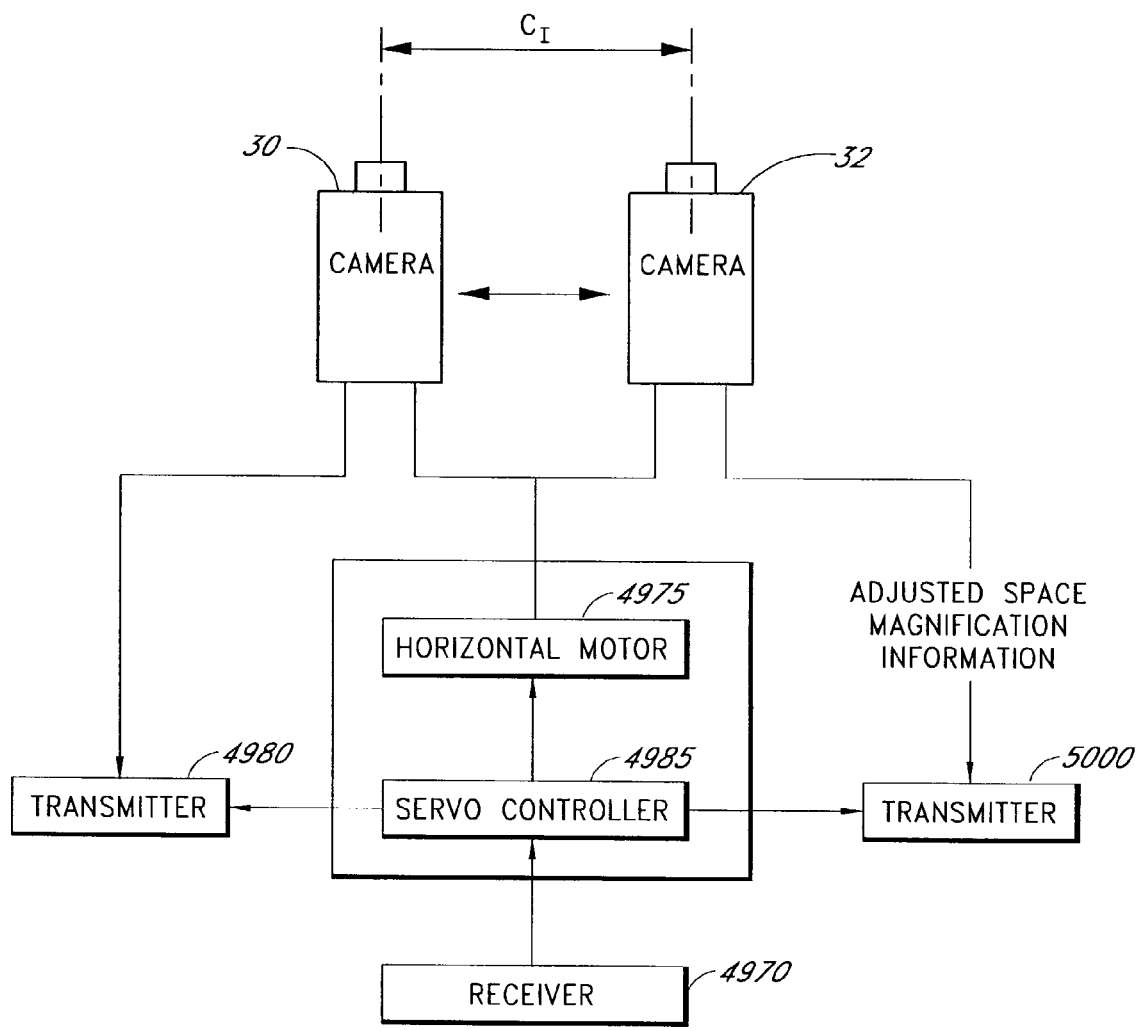
FIG. 50 illustrates an exemplary block diagram of the camera controller of FIG. 49.
Figure 51:
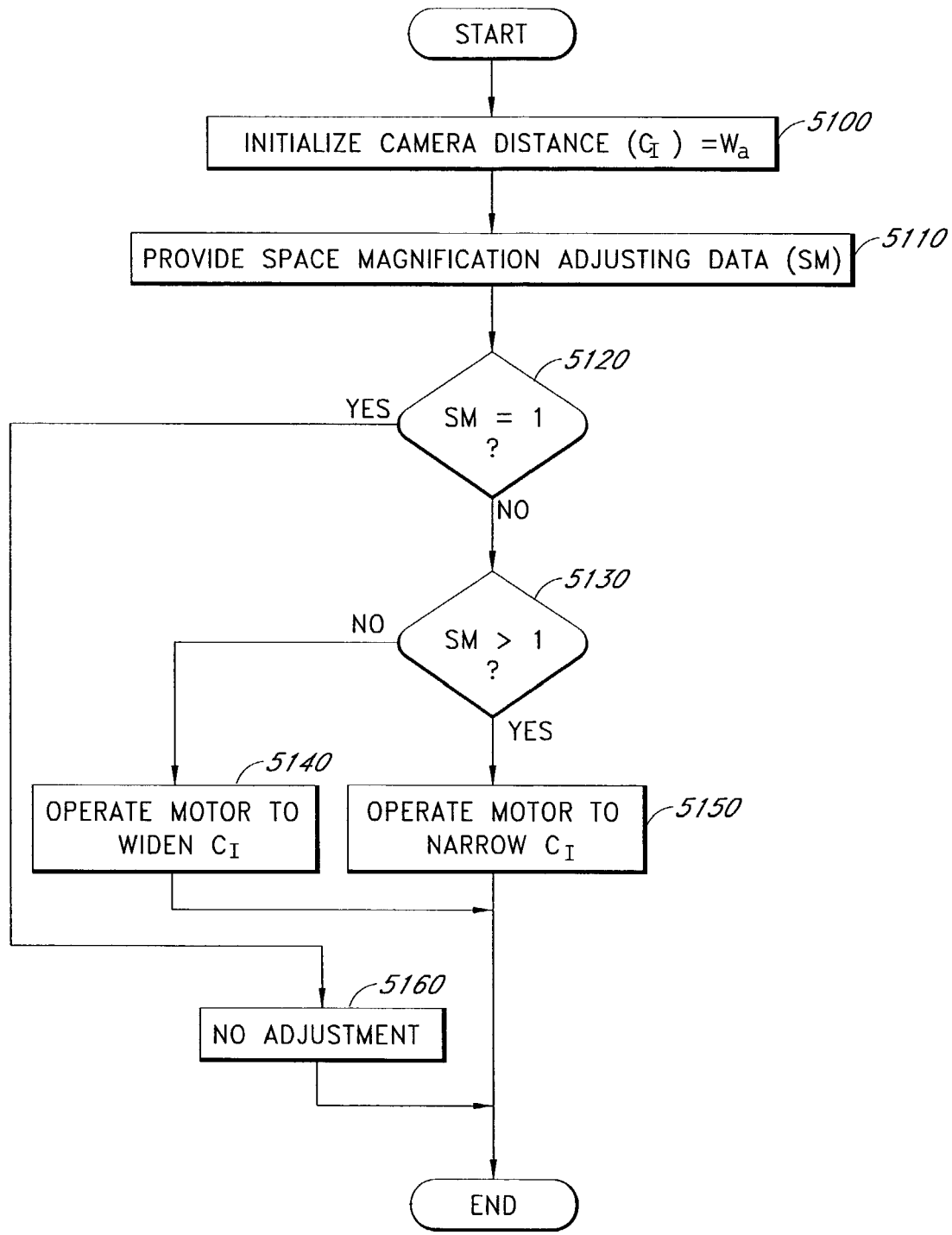
FIG. 51 illustrates an exemplary flowchart for explaining the camera controller of FIG. 50.

The receiver 4970 receives the space magnification adjusting data and $W_a$ from the transmitter 4950, and provides the data to the camera controller 4990. The camera controller 4990 controls the camera distance based on the space magnification adjusting data and the value $W_a$. The camera controller 4990 comprises a servo controller 4985 and a horizontal motor 4975 as shown in FIG. 50. Referring to FIGS. 50–52, the operation of the camera controller 4990 will be explained.

The servo controller 4985 initializes camera distance ($C_I$), for example, such that $C_I$ is the same as $W_a$ (5100). The space magnification relates to the camera distance ($C_I$) and the eye distance value ($W_a$). When $C_I$ is the same as $W_a$, the space magnification is "1," which means that a viewer sees the same size of the object that is photographed by the cameras 30 and 32. When $C_I$ is greater than $W_a$, the space magnification is less than "1," which means that a viewer perceives a smaller space than a space that is imaged by the cameras 30 and 32. When $C_I$ is less than $W_a$, the space magnification is greater than "1," which means that a viewer perceives a larger sized object than is imaged by the cameras 30 and 32.

The space magnification adjusting data (SM) are provided to the servo controller 4985 (5110). It is determined whether the adjusting data is "1" (5120). If the adjusting data are "1," no adjustment of the camera distance is made (5160). If the adjusting data are not "1," it is determined whether the adjusting data is greater than "1." If the adjusting data are greater than "1," the servo controller 4985 operates the motor 4975 so as to narrow $C_I$ until the requested space magnification is obtained (5150). Referring to FIG. 52, a table showing the relationship between the space magnification and camera distance ($C_I$) is illustrated, where $W_a$ is 80 mm. Thus, when $C_I$ is 80 mm, the space magnification is "1." In this situation, if the requested space magnification is "10," the camera distance is adjusted to "8 mm" as shown in FIG. 52.

If the adjusting data are less than "1," the servo controller 4985 operates the motor 4975 so as to widen $C_I$ until the requested space magnification is obtained (5140). As exemplified in FIG. 52, if the requested space magnification is "0.1," the camera distance is adjusted to "800 mm."

Figure 53:
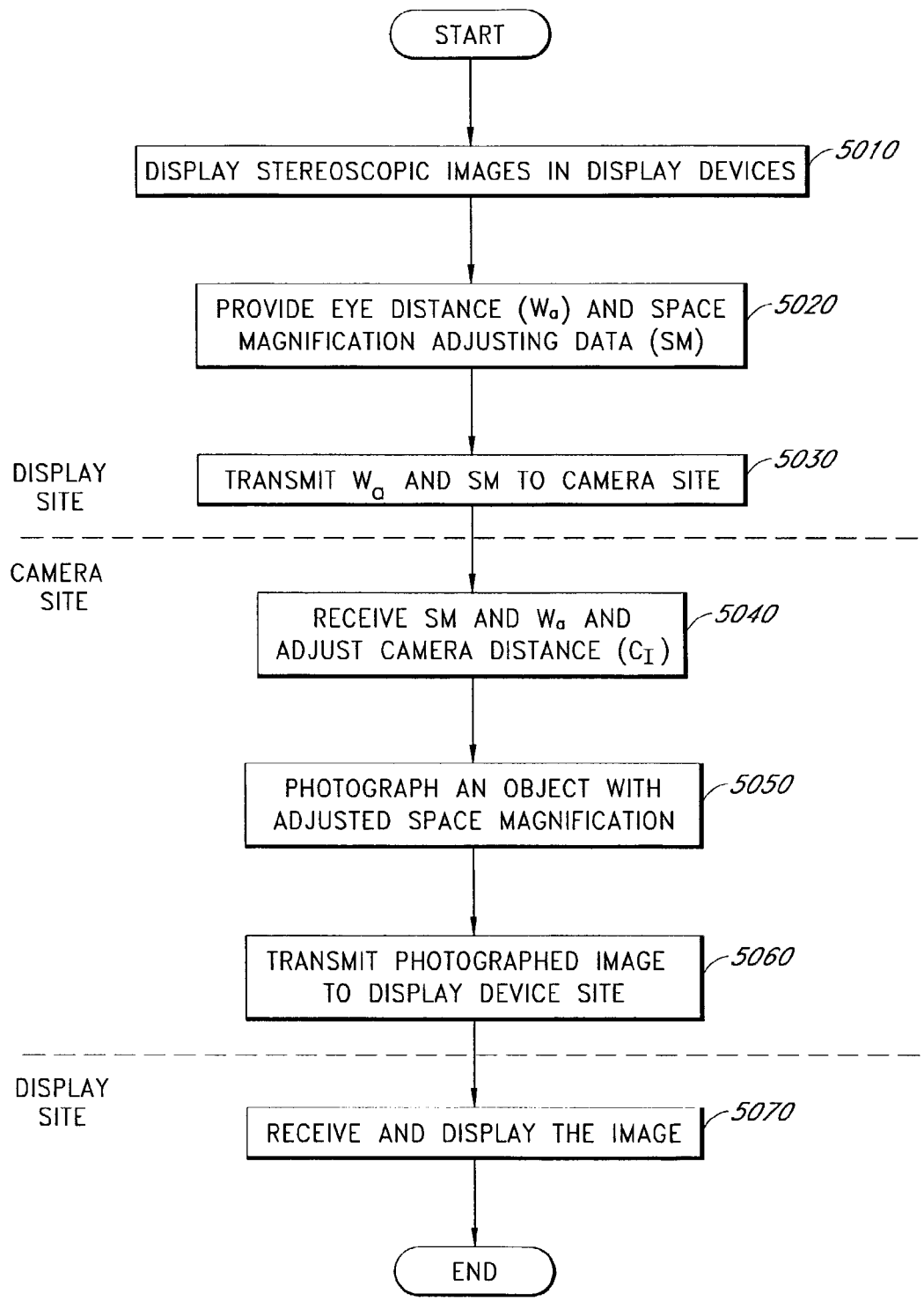
FIG. 53 illustrates an exemplary flowchart for explaining the operation of the entire system shown in FIG. 49.

Referring to FIG. 53, the operation of the entire system shown in FIG. 49 will be described. Stereoscopic images are displayed through the display devices 4920 and 4930 (5010). Eye distance ($W_a$) and space magnification adjusting data (SM) are provided to the at least one of the display devices 4920 and 4930, or to the transmitter 4950 directly from the input device 4910 (5020). The eye distance ($W_a$) and space magnification adjusting data (SM) are transmitted to the camera site (5030). The camera site receives the $W_a$ and SM values and adjusts the camera distance ($C_I$) based on the $W_a$ and SM values (5040). The stereoscopic cameras 30 and 32 image the object with adjusted space magnification (5050). The image is transmitted to the display site through the transmitters 4980 and 5000 (5060). Each of the display devices 4920 and 4930 receives and displays the image (5070).

Regarding the embodiments described with regard to FIGS. 49–53, the camera control may be used in remote control technology such as a remote surgery, remote control

Figure 54:
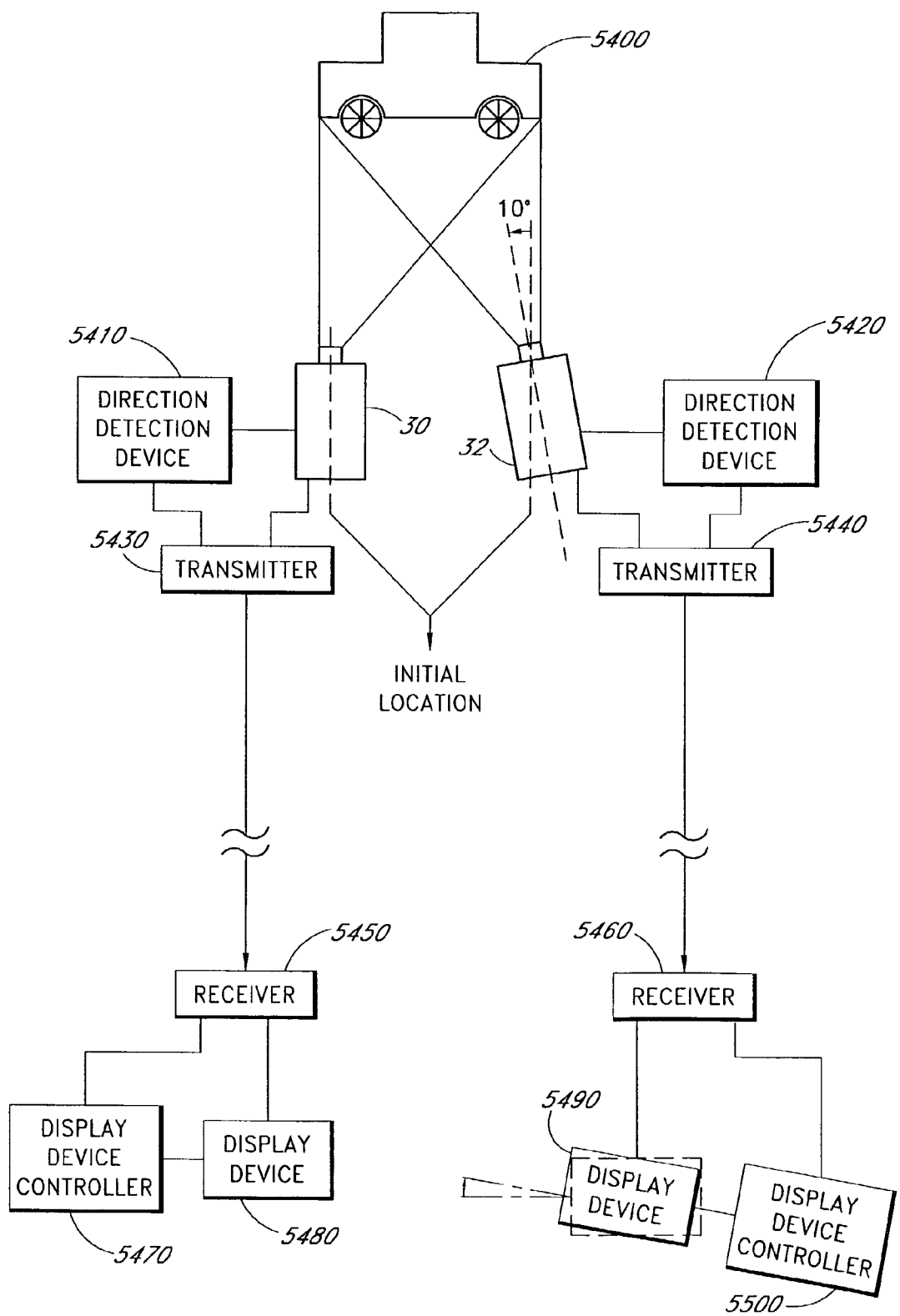
FIG. 54 illustrates a 3D display system according to another aspect of the invention.

Method and System for Adjusting Display Angles of Stereoscopic Image Based on a Camera Location FIG. 54 illustrates a 3D display system according to another aspect of the invention. The system is directed to adjust the location of the display devices based on the relative location of the stereoscopic cameras with regard to an object 5400.

The system comprises a camera site and a display site. The camera site comprises a set of stereoscopic cameras 30 and 32, a pair of direction detection devices 5410 and 5420, transmitters 5430 and 5440. In this embodiment of the invention, the cameras 30 and 32 may not be parallel to each other as shown in FIG. 54. The direction detection devices 5410 and 5420 detect directions of the stereoscopic cameras 30 and 32 with respect to the object 5400 to be photographed, respectively. In one embodiment of the invention, the devices 5410 and 5420 detect the tilt angle with respect to an initial location where the two cameras are parallel to each other. In some situations, the cameras 30 and 32 may be tilted, for example, 10 degrees in a counterclockwise direction as shown in FIG. 54, or in a clockwise direction from the initial location. The detection devices 5410 and 5420 detect the tilted angle of the cameras 30 and 32, respectively. In one embodiment of the invention, each of the direction detection devices 5410 and 5420 comprises a typical direction sensor.

Figure 57:
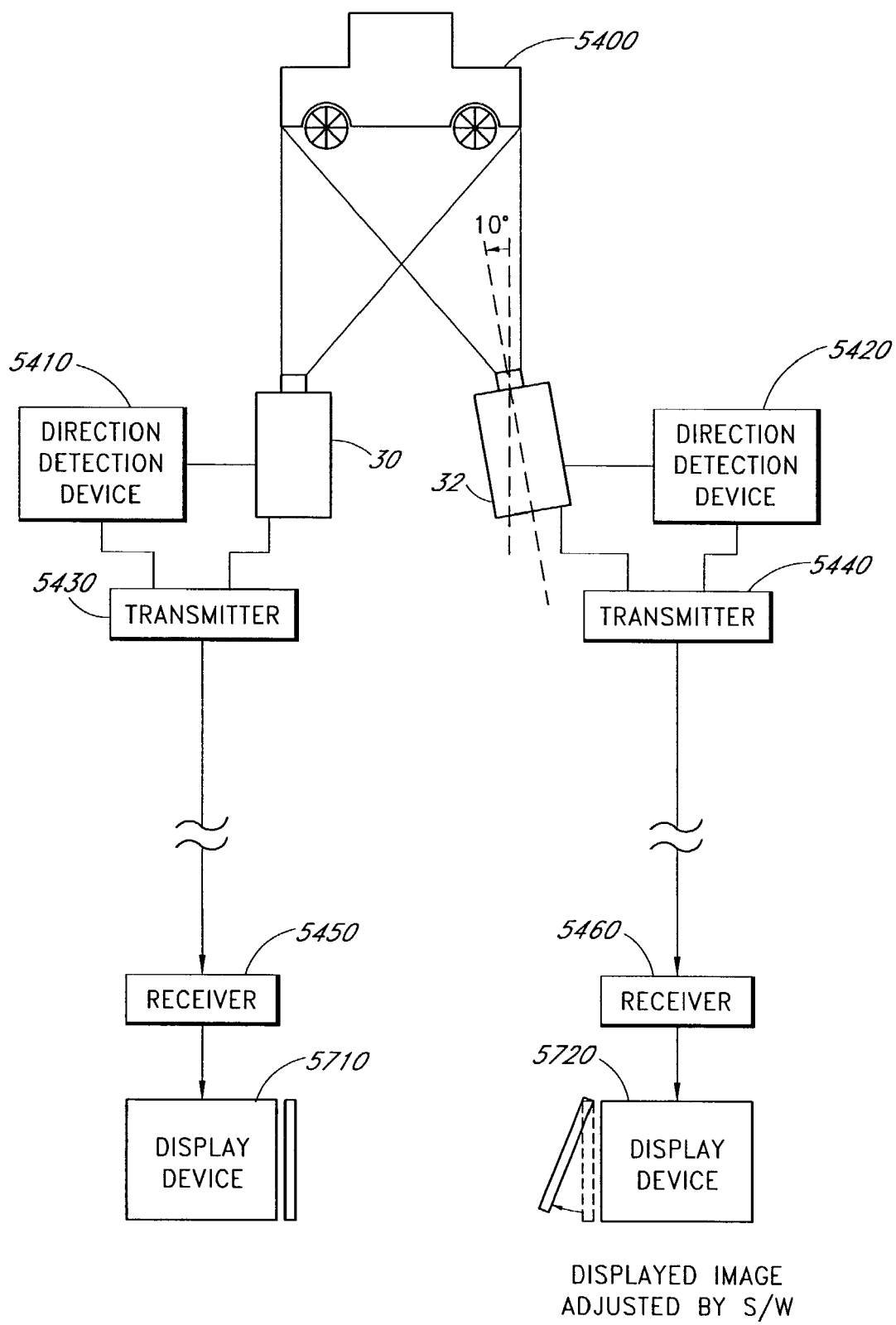
FIG. 57 illustrates a 3D display system according to another aspect of the invention.

Each of the transmitters 5430 and 5440 transmits the detected direction data of the cameras 30 and 32 to the display site. If it is detected that only the camera 32 is tilted as shown in FIG. 57, the detection device 5410 may not detect a tilting, and thus only the transmitter 5440 may transmit the detected data to the display site. The same applies to a situation where only the camera 30 is tilted.

The display site comprises a pair of receivers 5450 and 5460, a pair of display device controllers 5470 and 5500, and a set of display devices 5480 and 5490. Each of the receivers 5450 and 5460 receives the detected tilting data of the cameras 30 and 32, and provides the data to each of the display device controllers 5470 and 5500. The display device controllers 5470 and 5500 determine display adjusting values based on the received camera tilting data. The display adjusting values represent movement amounts to be adjusted for the display devices 5480 and 5490. In one embodiment of the invention, the display device controllers 5470 and 5500 determine display adjusting values based on a table as shown in FIG. 55. In this embodiment of the invention, if the camera 32 is tilted 10 degrees in a counter clockwise direction as shown in FIG. 54, the display device controller 5500 tilts the corresponding display device 5490 as much as 10 degrees in a clockwise direction as shown in FIG. 54. In this way, the camera location with respect to the object 5400 is substantially the same as an eye lens location of the viewer with regard to the screen. As discussed above, the screen may comprise a V shaped mirror, a HMD screen, a projection screen, or a display screen 160 shown in FIG. 1B.

Figure 56:
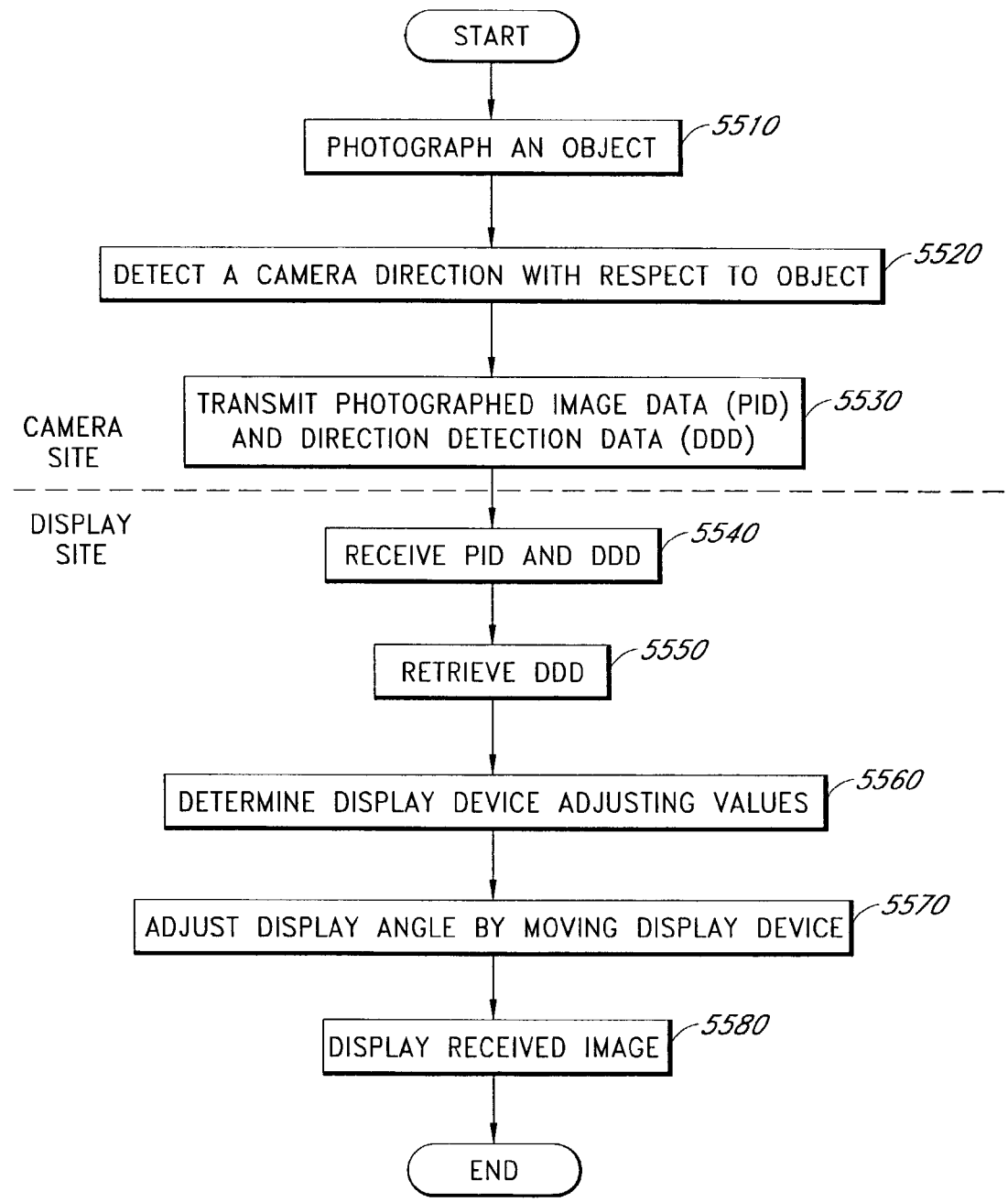
FIG. 56 illustrates an exemplary flowchart for explaining the entire operation of the system shown in FIG. 54.

Referring to FIG. 56, the entire operation of the system shown in FIG. 54 will be explained. The set of stereoscopic cameras 30 and 32 image an object (5510). Each of the direction detection devices 5410 and 5420 detects a camera direction with respect to the object (5520). That is, for example, the degree of tilting of each camera 30 and 32 from, for example, a parallel state is detected. The photographed image data (PID) and direction detection data (DDD) are transmitted to the display site (5530). The PID and DDD are received in the display site, and the PID and DDD are retrieved from the received data (5540, 5550). In one embodiment of the invention, the retrieving may be performed using a typical signal separator.

At least one of the display device controllers 5470 and 5500 determines the display device adjusting values based on the retrieved DDD (5560). The at least one of the display device controllers 5470 and 5500 adjusts the display angle with respect to the viewer's eye lenses by moving a corresponding display device (5570). The display devices 5480 and 5490 display the received stereoscopic images (5580).

FIG. 57 illustrates a 3D display system according to another aspect of the invention. The system is directed to adjust displayed image based on the relative location of the stereoscopic cameras 30 and 32 with regard to the object 5400.

Figure 58:
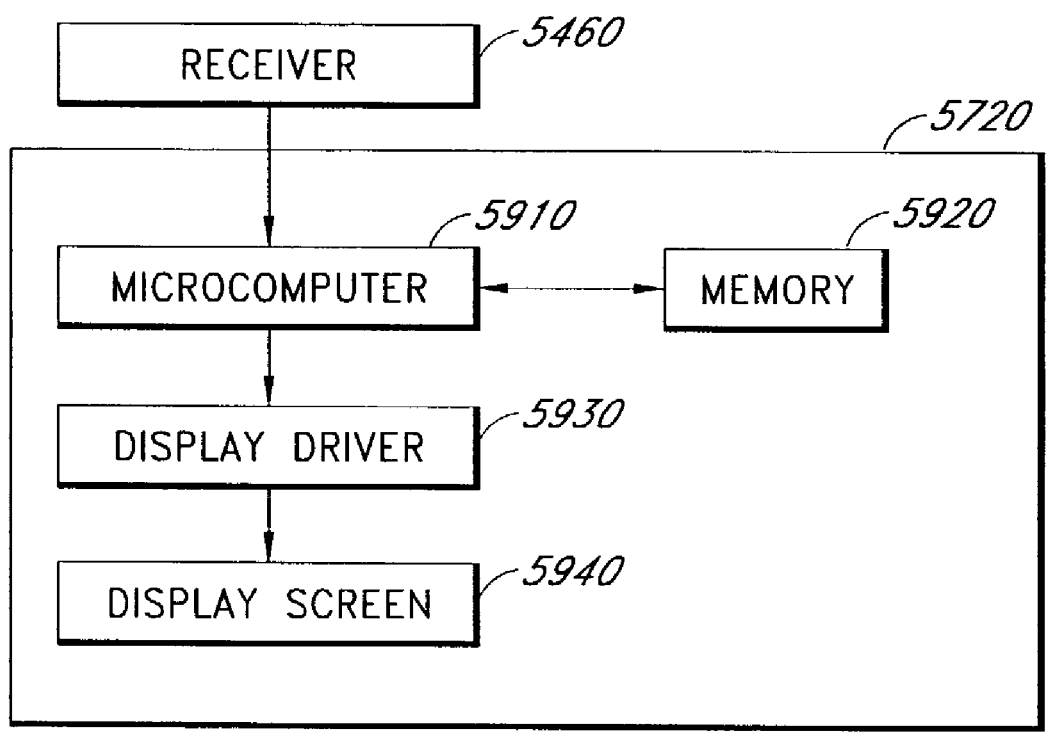
FIG. 58 illustrates an exemplary block diagram of the display device of FIG. 57.

The system shown in FIG. 57 is substantially the same as the one of FIG. 54 except for the display devices 5710 and 5720. The display devices 5710 and 5720 adjust the location of the displayed images based on the received camera direction detection data. Referring to FIG. 58, an exemplary block diagram of the display device 5720 is illustrated. Though not shown, the display device 5710 is substantially the same as the display device 5720. The display device 5720 comprises a microcomputer 5910, a memory 5920, a display driver 5930, and a display screen 5940. The memory 5920 stores a table (not shown) showing the relationship between the camera tilting angle and the adjust amount of displayed images. The microcomputer 5910 determines display image adjusting values based on the received camera direction data and the table of the memory 5920. The display driver 5930 adjusts the display angle of the display image based on the determined adjusting values, and displays the image in the display screen 5940.

Figure 59A:
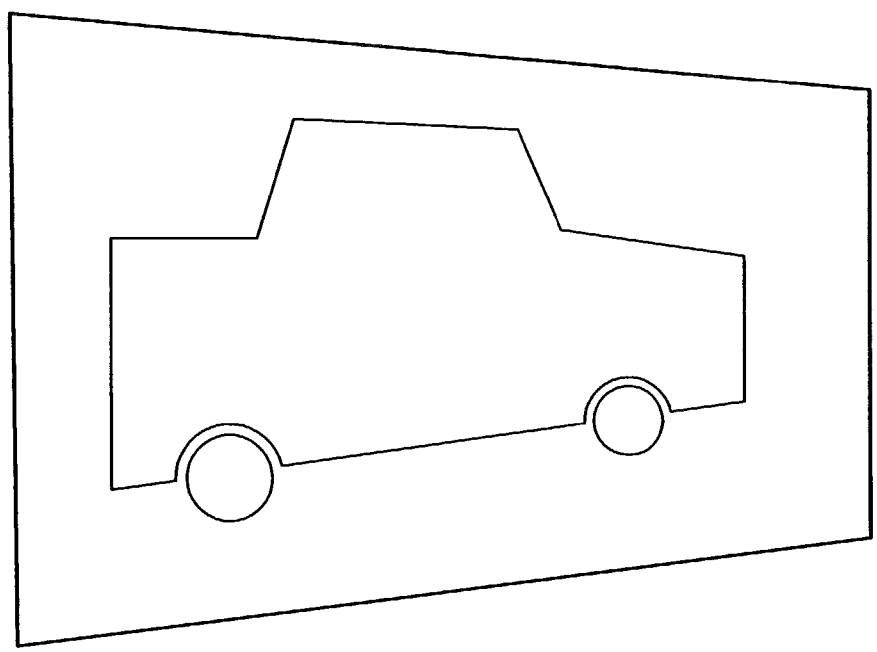
FIGS. 59A and 59B are conceptual drawings for explaining the adjustment of the displayed image.
Figure 59B:
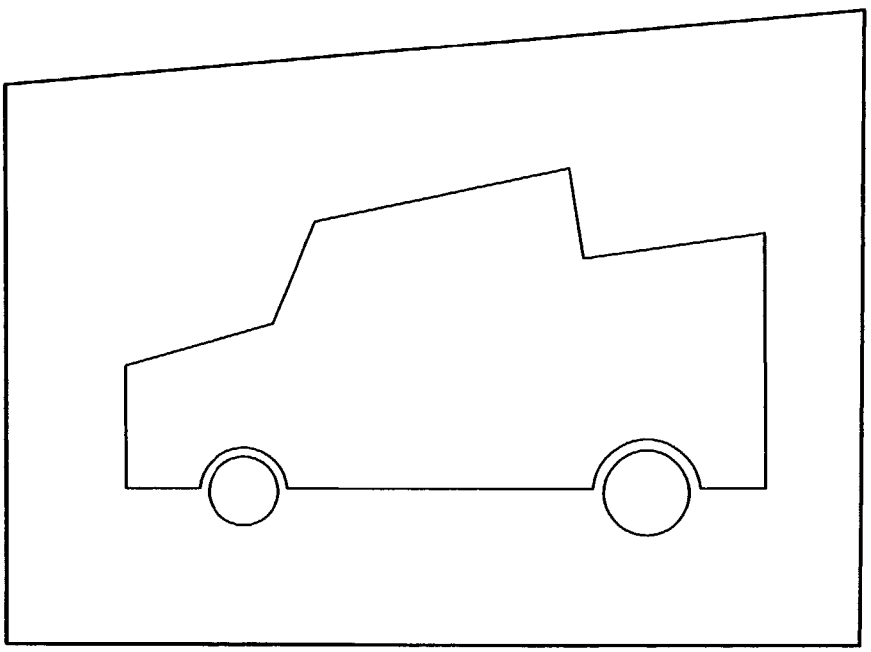

Referring to FIGS. 59A and 59B, adjustment of the displayed image is illustrated. In one embodiment of the invention, this may be performed by enlarging or reducing the image portion of the left or right sides of the displayed image. For example, according to the tilting angle of the camera, the enlarging or reducing amount is determined. In this embodiment of the invention, enlargement or reduction may be performed by a known image reduction or magnification software. The image of FIG. 59A may correspond to the tilting of the display device in a clockwise direction. Similarly, the image of FIG. 59B may correspond to the tiling of the display device in a counter clockwise direction.

Figure 60:
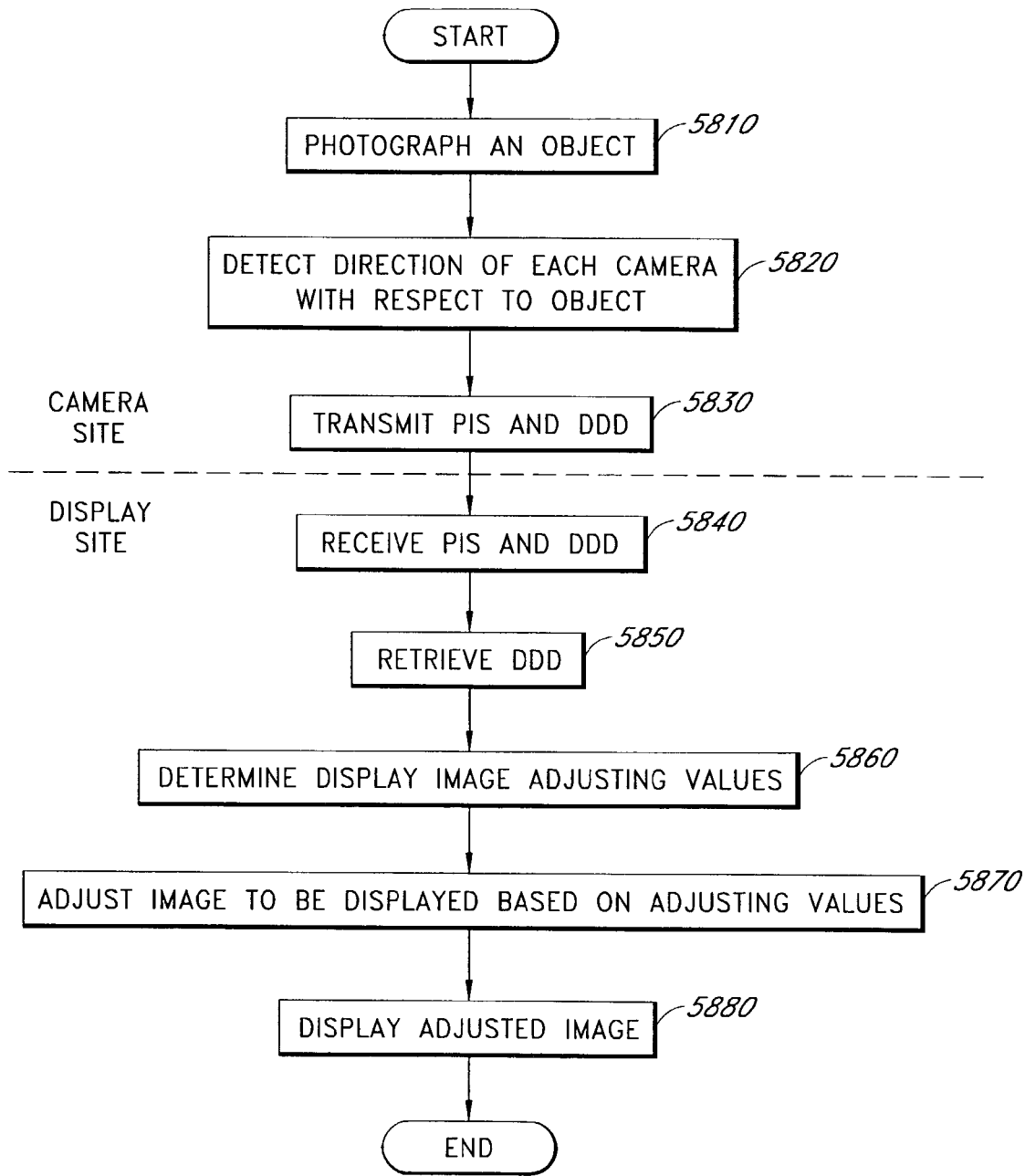
FIG. 60 illustrates an exemplary flowchart for explaining the operation of the system of FIG. 57.

Referring to FIG. 60, the operation of the system of FIG. 57 will be explained. As seen in FIG. 60, procedures 5810–5850 are the same as those shown in FIG. 55. Display image adjusting values are determined based on the retrieved camera direction detection data (DDD) (5860). The image to be displayed is adjusted as shown in FIG. 59 based on the determined adjusting values (5870). The adjusted image is displayed (5880).

Figure 61:
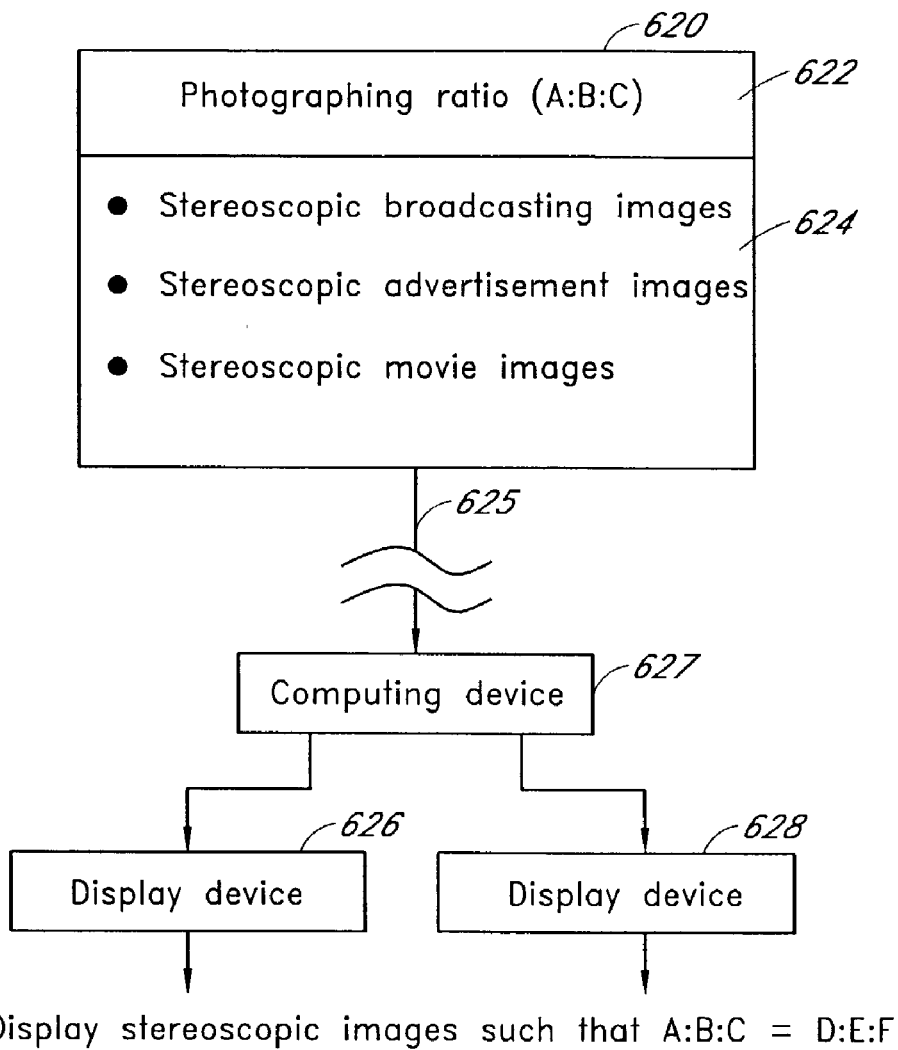
FIG. 61 illustrates an exemplary block diagram of the system for transmitting stereoscopic images and photographing ratios for the images.

Method and System for Transmitting or Storing on a Persistent Memory Stereoscopic Images and Photographing Ratios FIG. 61 illustrates a 3D display system according to another aspect of the invention. In this aspect of the invention, stereoscopic images and photographing ratios are transmitted via a network such as the Internet, or stored on a persistent memory, such as optical or magnetic disks.

Referring to FIG. 61, the combined data 620 of stereoscopic images 624 and at least one photographing ratio (A:B:C) 622 for the images 624 are shown. The stereoscopic images 624 may comprise stereoscopic broadcasting images, stereoscopic advertisement images, or stereoscopic movie images, stereoscopic product images for Internet shopping, or any other kind of stereoscopic images. In one embodiment of the invention, the photographing ratio 622 may be fixed for the entire set of stereoscopic images 624. A method of combining of the stereoscopic images 624 and photographing ratio 622 has been described above in connection with FIG. 7.

In one embodiment, stereoscopic images 624 are produced from a pair of stereoscopic cameras (not shown) and combined with the photographing ratio 622. In one embodiment of the invention, the stereoscopic (broadcasting, advertisement, or movie, etc.) images 624 and the photographing ratio 622 may be transmitted from an Internet server, or a computing device of a broadcasting company. The Internet server may be operated by an Internet broadcasting company, an Internet movie company, an Internet advertising company or an Internet shopping mall company. In another embodiment, the photographing ratio is not combined, and rather, is transmitted separately from the stereoscopic images. However, for convenience, the explanation below will be mainly directed to the combined method.

The combined data 620 are transmitted to a computing device 627 at a display site via a network 625. In one embodiment of the invention, the network 625 may comprise the Internet, a cable, a PSTN, or a wireless network. Referring to FIG. 63, an exemplary data format of the combined data 620 is illustrated. The left images and right images of the stereoscopic images 624 are embedded into the combined data 620 such that the images 624 are retrieved sequentially in a set of display devices 626 and 628. For example, left image 1 and right image 1, left image 2 and right image 2, are located in sequence in the data format such that the images can be retrieved in that sequence. In one embodiment, the computing device 627 receives the combined data 620 and retrieves the stereoscopic images 624 and photographing ratio 622 from the received data. In another embodiment, the images 624 and photographing ratio 622 are separately received as they are not combined in transmission.

The computing device 627 also provides the left and right images to the display devices 626 and 628, respectively. In one embodiment of the invention, the data format may be constituted such that the computing device 627 can identify the left and right images of the stereoscopic images 624 when the device 627 retrieves the images 624 such as predetermined order or data tagging. In one embodiment of the invention, the computing device 627 may comprise any kind of computing devices that can download the images 624 and ratio 622 either in a combined format or separately via the network 625. In one embodiment, a pair of computing devices each retrieving and providing left and right images to the display devices 626 and 628, respectively may be provided in the display site.

The display devices 626 and 628 display the received stereoscopic images such that the screen ratios (D1:E1:F1, D2:E2:F2) of each of the display devices 626 and 628 are substantially the same as the photographing ratio (A:B:C). In one embodiment of the invention, the screen ratios (D1:E1:F1, D2:E2:F2) are the same (D1:E1:F1=D2:E2:F2=D:E:F). The display devices 626 and 628 may comprise the elements of the display devices 86 and 88 disclosed in FIG. 8. In one embodiment of the invention, each of the display devices 626 and 628 may comprise CRT, LCD, HMD, PDP devices, or projection type display devices.

Figure 62:
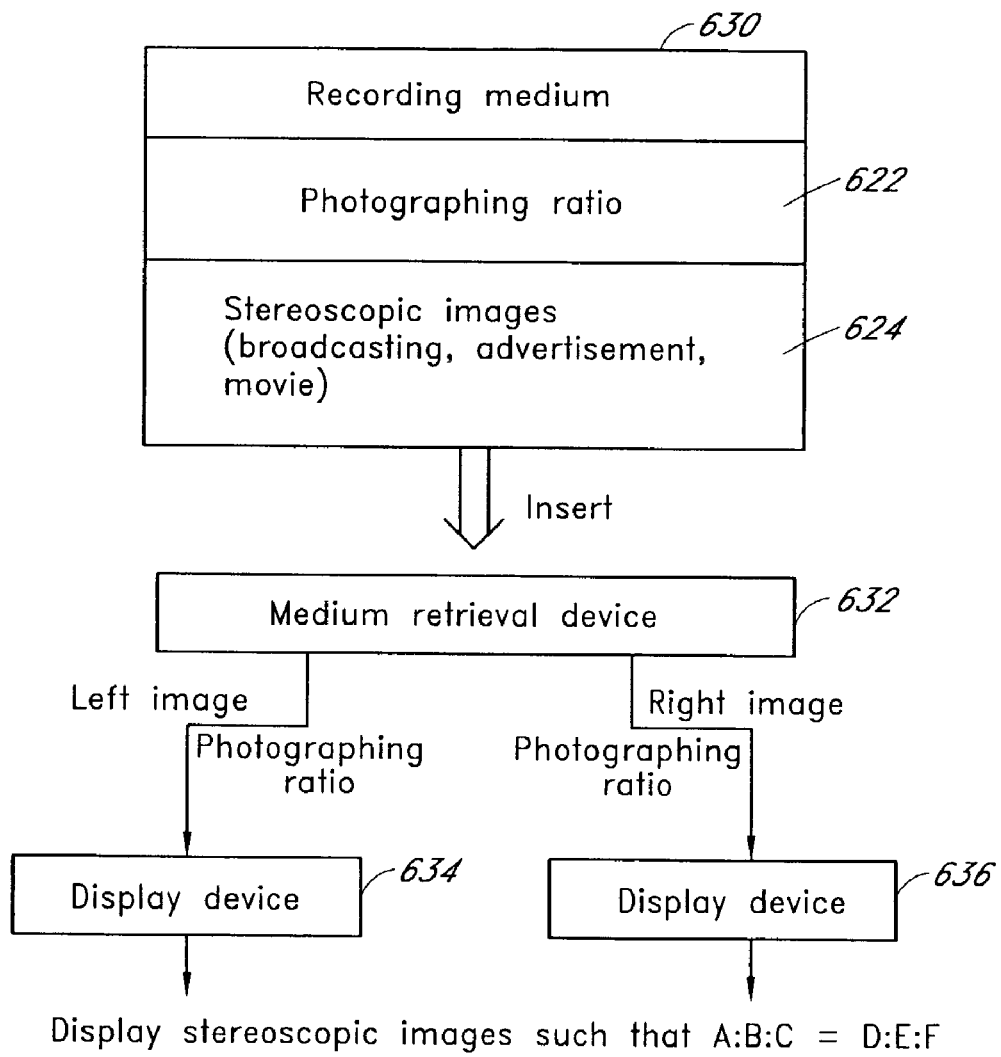
FIG. 62 illustrates an exemplary block diagram of the system for storing on a persistent memory stereoscopic images and photographing ratios for the images.

In another embodiment of the invention, as shown in FIG. 62, the combined data which are stored in a recording medium 630 such as optical or magnetic disks may be provided to the display devices 634 and 636 via a medium retrieval device 632 at the display site. In one embodiment, the optical disks may comprise a compact disk (CD) or a digital versatile disk (DVD). Also, the magnetic disk may comprise a hard disk.

The recording medium 630 is inserted into the medium retrieval device 632 that retrieves the stereoscopic images 624 and photographing ratio 622. In one embodiment of the invention, the medium retrieval device 632 may comprise a CD ROM driver, a DVD ROM driver, or a hard disk driver (HDD), and a host computer for the drivers. The medium retrieval device 632 may be embedded in a computing device (not shown).

The medium retrieval device 632 retrieves and provides the stereoscopic images 624 and photographing ratio 622 to the display devices 634 and 636, respectively. The exemplified data format shown in FIG. 63 may apply to the data stored in the recording medium 630. In one embodiment of the invention, the photographing ratio 622 is the same for the entire stereoscopic images. In this embodiment, the photographing ratio 622 is provided once to each of the display devices 634 and 636, and the same photographing ratio is used throughout the stereoscopic images.

In one embodiment of the invention, the data format recorded in the medium 630 is constituted such that the medium retrieval device 632 can identify the left and right images of the stereoscopic images 624. The operation of the display devices 634 and 636 is substantially the same as that of the devices 626 and 628 as discussed with regard to FIG. 61.

Figure 64:
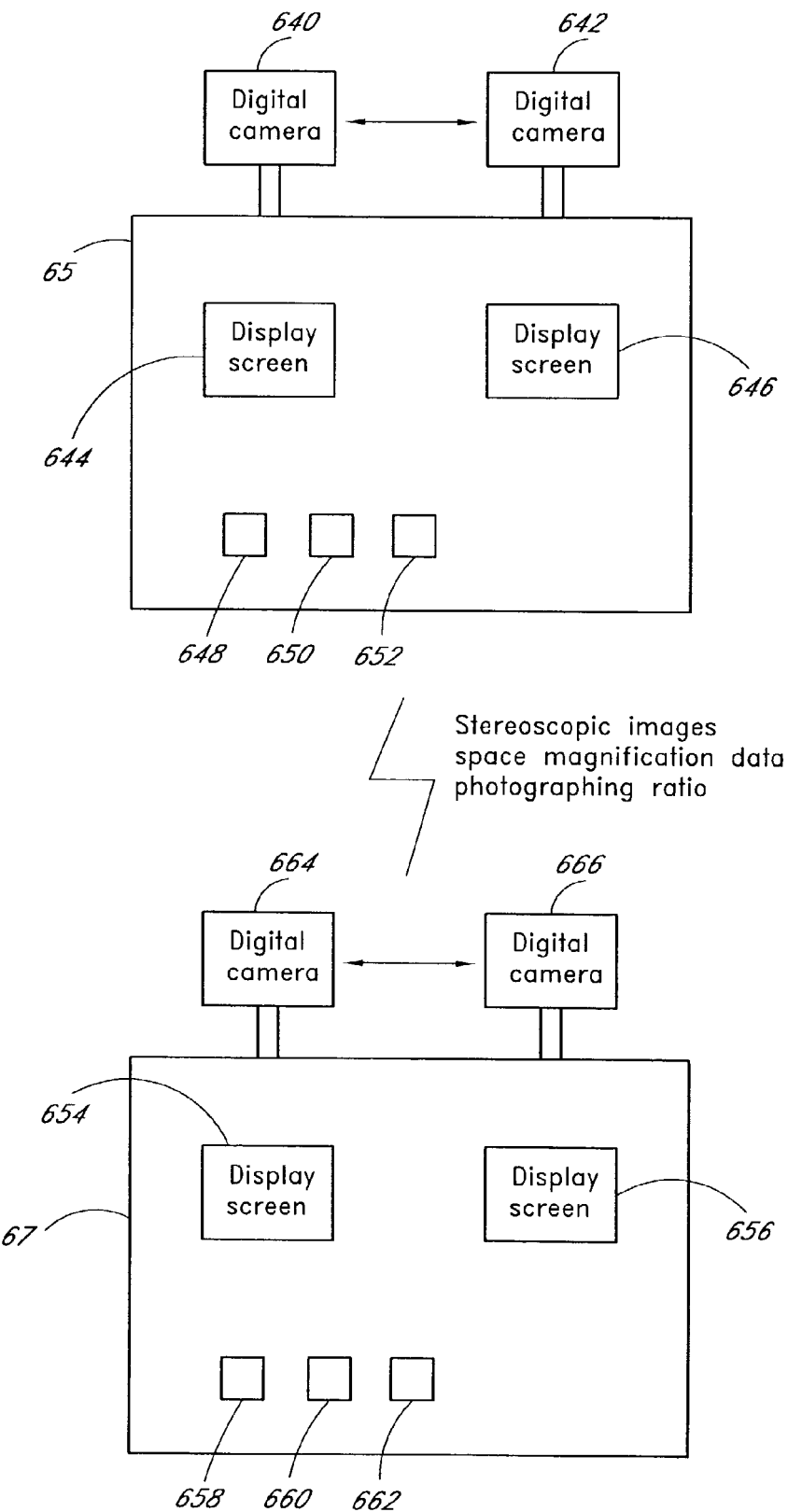
FIG. 64 illustrates an exemplary block diagram of a pair of portable communication devices comprising a pair of digital cameras and a pair of display screens.

Portable Communication Device Comprising a Pair of Digital Cameras that Produce Stereoscopic Images and a Pair of Display Screens FIG. 64 illustrates an information communication system according to another aspect of the invention. The system comprises a pair of portable communication devices 65 and 67. The device 65 comprises a pair of digital cameras 640, 642, a pair of display screens 644, 646, a distance input portion 648, an eye interval input portion 650, and a space magnification input portion 652. The device 65 comprises a receiver and a transmitter, or a transceiver (all not shown).

The pair of digital cameras 640 and 642 produce stereoscopic images of a scene or an object and photographing ratios thereof. In one embodiment of the invention, each of the cameras 640 and 642 comprises substantially the same elements of the camera 20 shown in FIG. 7. The device 65 transmits the produced stereoscopic images and photographing ratios to the device 67. The pair of display screens 644 and 646 display stereoscopic images received from the device 67.

The distance input portion 648 is provided with the distance values (similar to screen-viewer distances F1 and F2 in FIG. 8) between a viewer's eyes and each of the screens 644 and 646. The eye interval input portion 650 receives the distance values (exemplified as $W_d$ in FIG. 14A) between the center points of a viewer's eyes. The space magnification input portion 652 is provided with adjusting data for space magnification, and provides the adjusting data to the device 65. In one embodiment of the invention, each of the distance input portion 648, the eye interval input portion 650, and the space magnification input portion 652 comprises key pads that can input numerals 0–9. In another embodiment, all of the input portions are embodied as one input device.

The device 67 comprises a pair of digital cameras 664, 666, a pair of display screens 654, 656, a distance input portion 658, an eye interval input portion 660, and a space magnification input portion 662. The device 67 also comprises a receiver and a transmitter, or a transceiver (all not shown).

The pair of digital cameras 664 and 666 produce stereoscopic images of a scene or an object and photographing ratios thereof. In one embodiment of the invention, each of the cameras 664 and 666 comprises substantially the same elements of the camera 20 shown in FIG. 7. The device 67 transmits the produced stereoscopic images and photographing ratios to the device 65. The pair of display screens 654 and 656 display stereoscopic images received from the device 65.

The distance input portion 658, the eye interval input portion 660, and the space magnification input portion 662 are substantially the same as those of the device 65.

The system shown in FIG. 64 may comprise at least one base station (not shown) communicating with the devices 65 and 67. In one embodiment of the invention, each of the devices 65 and 67 comprises a cellular phone, an IMT (international mobile telecommunication)-2000 device, and a personal digital assistant (PDA), a hand-held PC or another type of portable telecommunication device.

In one embodiment of the invention, the space magnification adjusting data and photographing ratios have a standard data format so that the devices 65 and 67 can identify the data easily.

Figure 65:
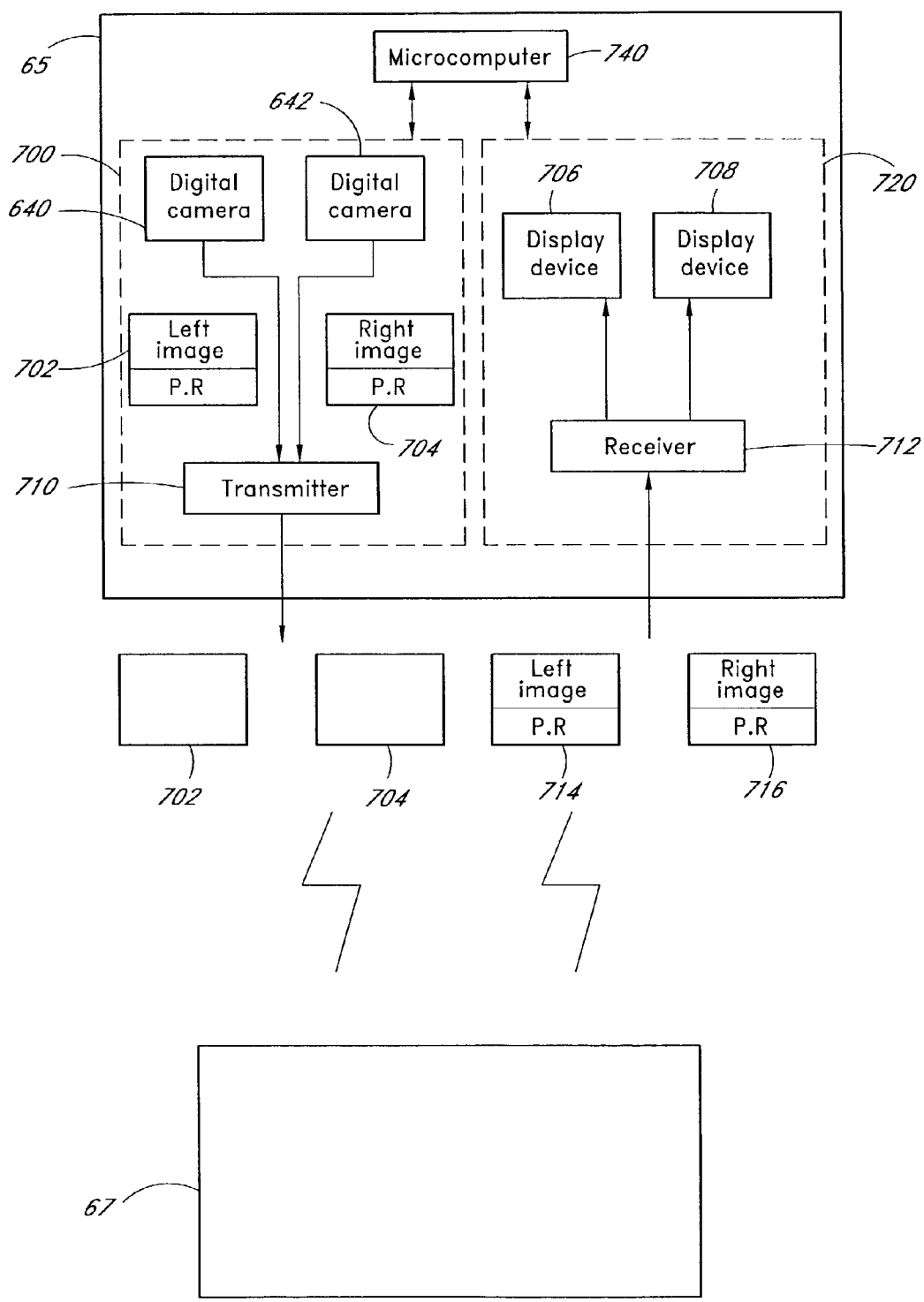
FIG. 65 illustrates an exemplary block diagram of a portable communication device for displaying stereoscopic images based on a photographing ratio and a screen ratio.

The Devices Displaying Stereoscopic Images are Implemented Such that the Photographing Ratio is Substantially the Same as the Screen Ratio FIG. 65 illustrates a pair of information communication devices 65 and 67 according to one aspect of the invention. Each of the devices 65 and 67 displays stereoscopic images received from the other device such that the photographing ratio of one device is substantially the same as the screen ratio of the other device. The device 65 comprises a camera portion 700, a display portion 720, and a data processor 740, e.g., a microcomputer.

The camera portion 700 produces and transmits stereoscopic images and photographing ratios thereof to the device 67. As discussed above, the communication between the devices 65 and 67 may be performed via at least one base station (not shown). The camera portion 700 comprises the pair of digital cameras 640, 642, and a transmitter 710. Each of the digital cameras 640 and 642 produces stereoscopic images and photographing ratios thereof, and combines the images and ratios (combined data 702 and 704). In one embodiment of the invention, the photographing ratios provided in the combined data 702 and 704 are the same. Each of the digital cameras 640 and 642 may comprise the elements of the camera 20 shown in FIG. 7.

The production of the stereoscopic images and the calculation of the photographing ratios, and the combining of the images and ratios have been explained in detail with regard to FIGS. 5–11. The transmitter 710 transmits the combined data 702, 704 to the device 67. In another embodiment, the photographing ratios are not combined, and rather, are transmitted separately from the stereoscopic images.

In one embodiment of the invention, the transmitter 710 may comprise two transmitting portions that transmit the combined data 702 and 704, respectively. The device 67 receives and displays the stereoscopic images transmitted from the device 65 such that the received photographing ratio is substantially the same as the screen ratio of the device 67.

The display portion 720 receives combined data 714 and 716 of stereoscopic images and photographing ratios thereof from the device 67, and displays the stereoscopic images such that the received photographing ratio is substantially the same as the screen ratio of the device 65.

The display portion 720 comprises a pair of display devices 706, 708, and a receiver 712. The receiver 712 receives the combined data 714 and 716 that the device 67 transmitted, and provides the combined data 714, 716 to the display devices 706, 708, respectively. In one embodiment of the invention, the receiver 712 may comprise two receiving portions that receive the combined data 714 and 716, respectively. In another embodiment, the images and photographing ratios are separately received as they are not combined in transmission.

Each of the display devices 706 and 708 separates the provided images and ratios from the receiver 712. The devices 706 and 708 also display the stereoscopic images such that the photographing ratios are substantially the same as the screen ratios of the display devices 706 and 708, respectively. Each of the display devices 706 and 708 may comprise substantially the same elements of the display device 86 or 88 shown in FIG. 8. In one embodiment, the display devices 706 and 708 are connected to the distance input portion 648 shown in FIG. 64 so that the screen-viewer distance for the devices 706 and 708 can be provided to the device 65. In one embodiment of the invention, the screen ratios for the devices 706 and 708 are substantially the same. The detailed operation of the display devices 706 and 708 has been explained in connection with FIGS. 8–11.

The microcomputer 740 controls the operation of the camera portion 700 and display portion 720, and data communication with the device 67. In one embodiment of the invention, the microcomputer 740 is programmed to control the camera portion 700 such that the digital cameras 640 and 642 produce stereoscopic images and photographing ratios thereof, and that the transmitter 710 transmits the images and ratios to the device 67 when the communication link is established between the devices 65 and 67. In another embodiment of the invention, the microcomputer 740 is programmed to control the power of the camera portion 700 and the display portion 720 independently. In this embodiment, even when the cameras 640 and 642 are turned off, the display devices 706 and 708 may display the stereoscopic images received from the device 67. Also, when the display devices 706 and 708 are turned off, the cameras 640 and 642 may produce stereoscopic images and photographing ratios thereof, and transmit the images and ratios to the device 67. In this embodiment, the device 65 may comprise an element that performs a voice signal communication with the device 67.

The device 65 may include a volatile memory such as a RAM and/or a non-volatile memory such as a flash memory or a programmable ROM that store data for the communication. The device 65 may comprise a power supply portion such as a battery.

In another embodiment of the invention, the device 65 may include a transceiver that incorporates the transmitter 710 and receiver 712. In this situation, the transmitter 710 and receiver 712 may be omitted.

Though not specifically shown, the device 67 may be configured to comprise substantially the same elements and perform substantially the same functions as those of the device 65 shown in FIG. 65. Thus, the detailed explanation of embodiments thereof will be omitted.

The Devices Controlling the Display Location of the Stereoscopic Images

Figure 66A:
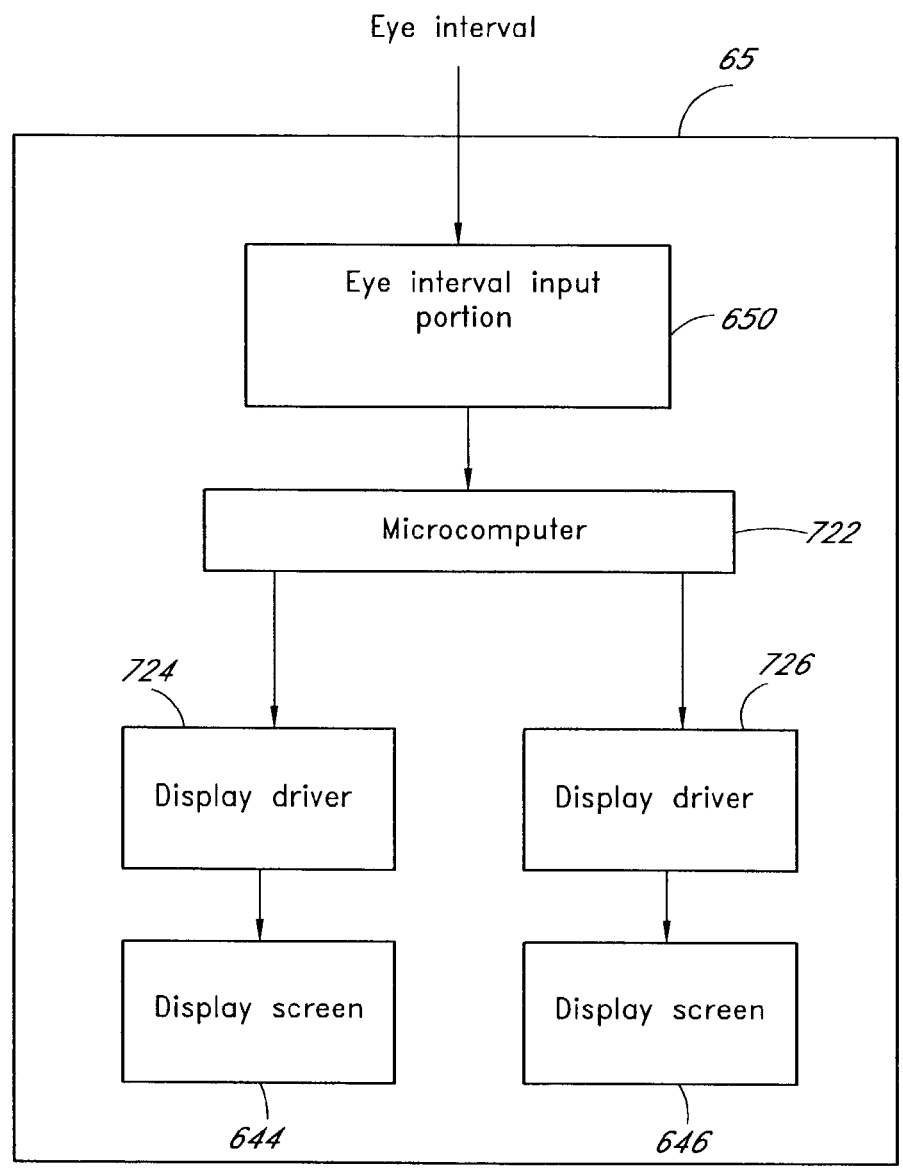
FIGS. 66A and 66B illustrate an exemplary block diagram of a portable communication device for controlling the location of the stereoscopic images.

FIG. 66A illustrates an information communication device 65 according to another aspect of the invention. In this aspect of the invention, the information communication device 65 controls the display location of the stereoscopic images based on the distance ($W_a$) between the center points of a viewer's eyes.

In one embodiment of the invention, the device 65 moves the stereoscopic images displayed in the display screens 644 and 646 such that the distance ($W_d$) between the center points of the displayed stereoscopic images is substantially the same as the $W_a$ distance. The device 65 comprises an eye interval input portion 650, a data processor 722, e.g., a microcomputer, a pair of display drivers 724, 726, and a pair of display screens 644, 646. The eye interval input portion 650 and the pair of display screens 644 and 646 are substantially the same as those of FIG. 64.

The microcomputer 722 controls the display drivers 724 and 726 based on the received $W_a$ distance such that the $W_d$ distance is substantially the same as the $W_a$ distance. Specifically, the display drivers 724 and 726 moves the stereoscopic images displayed in the display screens 644 and 646 until $W_d$ is substantially the same as $W_a$. The detailed explanation with regard to the movement of the stereoscopic images has been provided in connection with FIGS. 15–17.

Figure 66B:
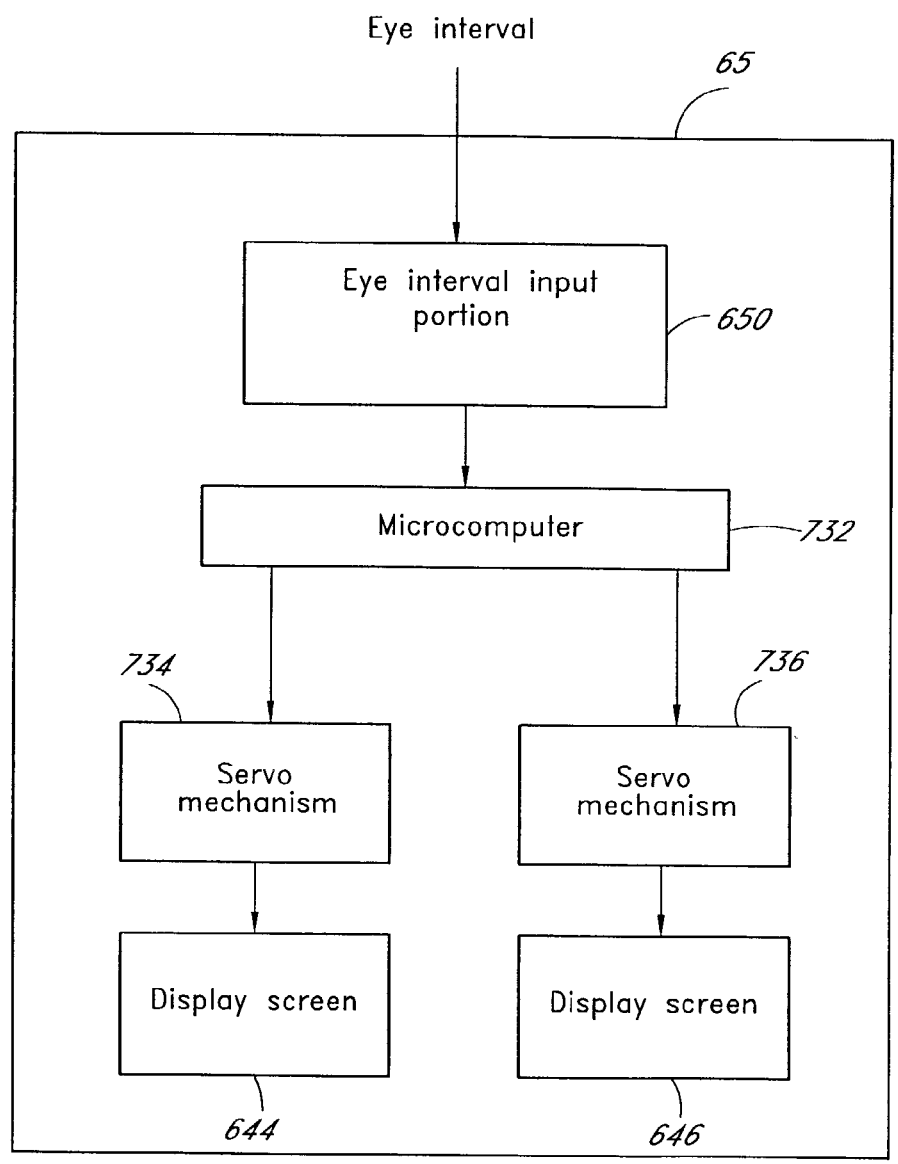

In another embodiment of the invention, as shown in FIG. 66B, the device 65 moves the display screens 644 and 646 such that the distance ($W_d$) between the center points of the stereoscopic images is substantially the same as the $W_a$ distance. In this embodiment, the device 65 comprises the eye interval input portion 650, a microcomputer 732, a pair of servo mechanisms 734, 736, and the pair of display screens 644, 646.

The microcomputer 732 controls the servo mechanisms 734 and 736 based on the received $W_a$ distance such that the $W_d$ distance is substantially the same as the $W_a$ distance. Specifically, the servo mechanisms 734 and 736 move the display screens 644 and 646 until $W_d$ is substantially the same as $W_a$. The detailed explanation with regard to the movement of the display screens has been provided with regard to FIGS. 18–20.

Though not specifically shown, the device 67 may comprise substantially the same elements and performs substantially the same functions as those of the device 65 shown in FIGS. 66A and 66B. Thus, the detailed explanation of embodiments thereof will be omitted.

The Devices Adjusting Space Magnification of Stereoscopic Images

FIG. 67 illustrates an information communication device 65 according to another aspect of the invention. In this aspect of the invention, the information communication device 65 adjusts space magnification based on adjusting data for space magnification. The device 65 comprises a camera portion 760, a display portion 780, and a microcomputer 750.

The camera portion 760 comprises a pair of digital cameras 640, 642, a camera controller 742, and a transceiver 744. The transceiver 744 receives adjusting data for space magnification from the device 67, and provides the adjusting data (C) to the camera controller 742. Space magnification embodiments have been explained in detail with respect to FIGS. 49–53. The adjusting data for space magnification are exemplified in FIG. 52.

The camera controller 742 controls the distance (interval) between the digital cameras 640 and 642 based on the provided adjusting data (C). In one embodiment of the invention, the camera controller 742 comprises a motor that adjusts the camera distance, and a servo controller that controls the motor (both not shown). The operation of the camera controller 742 is substantially the same as that of the controller 4990 described in connection with FIGS. 50–52. The digital cameras 640 and 642 produce stereoscopic images in adjusted interval, and transmit the stereoscopic images to the device 67 through the transceiver 744. The device 67 receives and displays the adjusted stereoscopic images. In this way, the device 67 can adjust the space magnification for a scene imaged by the cameras 640, 642 of the device 65. In one embodiment of the invention, each of the devices 65 and 67 may display in at least one of the display screens thereof current space magnification, such as "1", "0.5" or "10," etc., so that a viewer can know the current space magnification. In another embodiment of the invention, the devices 65 and 67 may provide a user with an audio signal representing the current space magnification.

In another embodiment, space magnification adjusting data (A) may be provided to the camera controller 742, for example, through the space magnification input portion 652 shown in FIG. 64. This embodiment may be useful in a situation where a user of the device 65 wants to provide stereoscopic images in adjusted space magnification to a user of the device 67. In one embodiment, the operation of the camera controller 742 is substantially the same as in a situation where the adjusting data (C) is received from the device 67.

The display portion 780 comprises a pair of display screens 644, 646, and a transceiver 746. Space magnification (SM) adjusting data (B) are provided to the transceiver 746 from a user of the device 65. The SM adjusting data (B) are used to adjust the interval between the cameras 664 and 666 of the device 67 (FIG. 64). The SM adjusting data (B) may also be provided to at least one of the display screens 644 and 646 so that the SM adjusting data (B) are displayed in the at least one of the display screens 644 and 646. This is to inform a user of the device 65 of current space magnification. The transceiver 746 transmits the SM adjusting data (B) to the device 67.

The device 67 receives the SM adjusting data (B) and adjusts the interval between the cameras 664 and 666 of the device 67 based on the adjusting data (B). Also, the device 67 transmits stereoscopic images produced in adjusted space magnification to the device 65. The transceiver 746 receives left and right images from the device 67 and provides the images to the display screens 644 and 646, respectively. The display screens 644 and 646 display the stereoscopic images. In one embodiment, each of the devices 65 and 67 of FIG. 67 may further comprise the functions of the devices 65 and 67 described in connection with FIGS. 65 and 66.

The microcomputer 750 controls the operation of the camera portion 760 and display portion 780, and data communication with the device 67. In one embodiment of the invention, the microcomputer 750 is programmed to control the camera portion 760 and display portion 780 such that after the communication link between the devices 65 and 67 is established, the SM adjusting data (B, C) are transmitted or received from or to each other. In another embodiment of the invention, the microcomputer 750 is programmed to control the camera portion 760 such that the camera controller 742 adjusts the interval between the digital cameras 640 and 642 based on the SM adjusting data (A) even when the communication link between the devices 65 and 67 is not established.

The device 65 may include a volatile memory such as a RAM and/or a non-volatile memory such as a flash memory or a programmable ROM that store data for the communication. The device 65 may comprise an element that performs a voice signal transmission.

Though not specifically shown, embodiments of the device 67 comprise substantially the same elements and perform the same functions as those of the device 65 shown in FIG. 67. Thus, a detailed explanation of these embodiments will be omitted.

The Device Comprising Separate Display Screens

Figure 68:
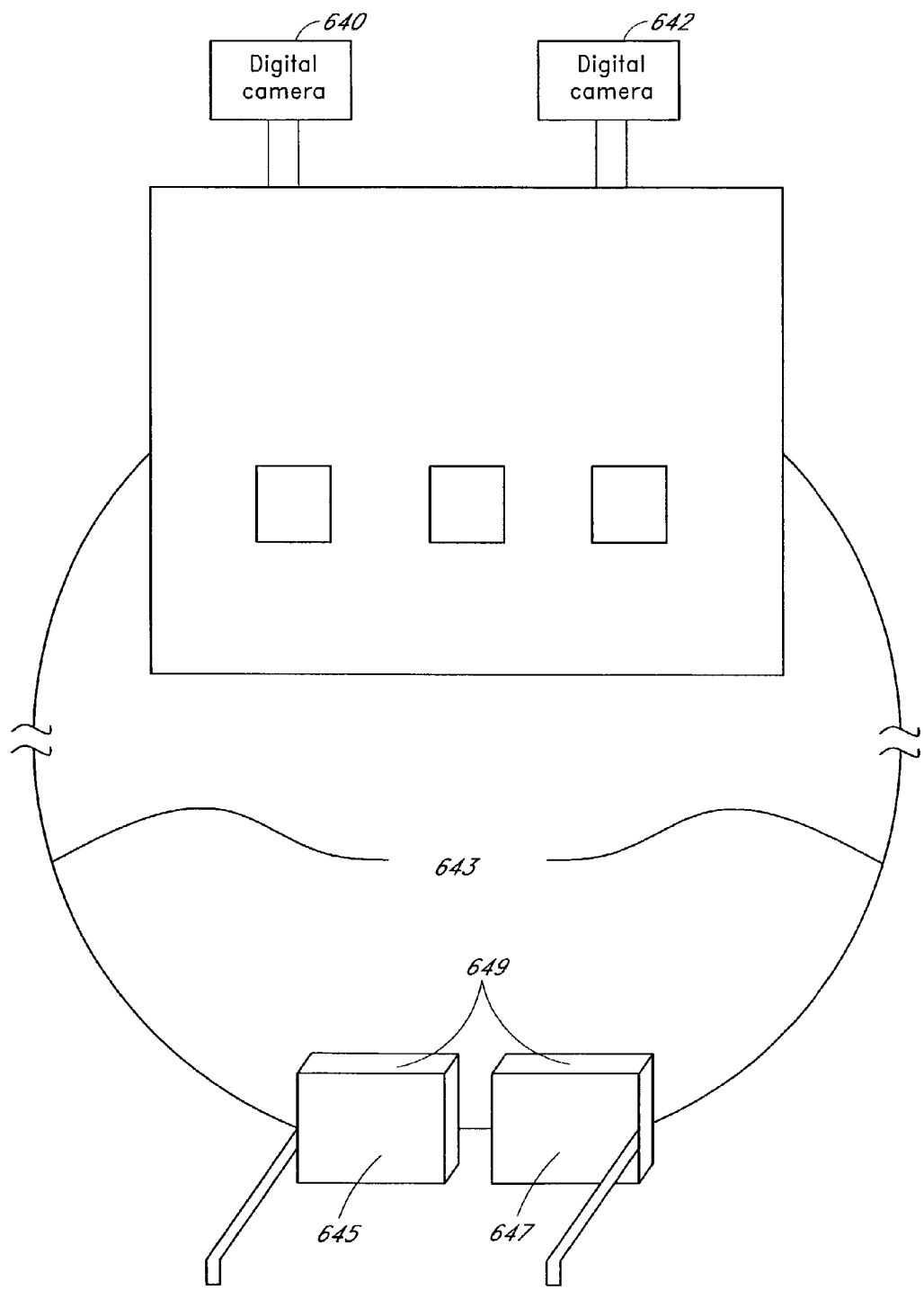
FIG. 68 illustrates a conceptual drawing for explaining a portable communication device having separate display screens.

In another embodiment of the invention, the communication device 65 comprises a goggle shaped display device 649 as shown in FIG. 68. The goggle shaped display device comprises a set of display screens 645 and 647. In one embodiment of the invention, the display device 649 may be connected to the device 65 through a communication jack 643. In another embodiment of the invention, the display device 649 may have a wireless connection to the device 65.

The device 67 may be applied to the embodiments described with regard to FIGS. 65–67. In one embodiment of the invention, each of the devices 65 and 67 may comprise a head mount display (HMD) device that includes a set of display screens.

OTHER ASPECTS OF THE INVENTION

Figure 69A:
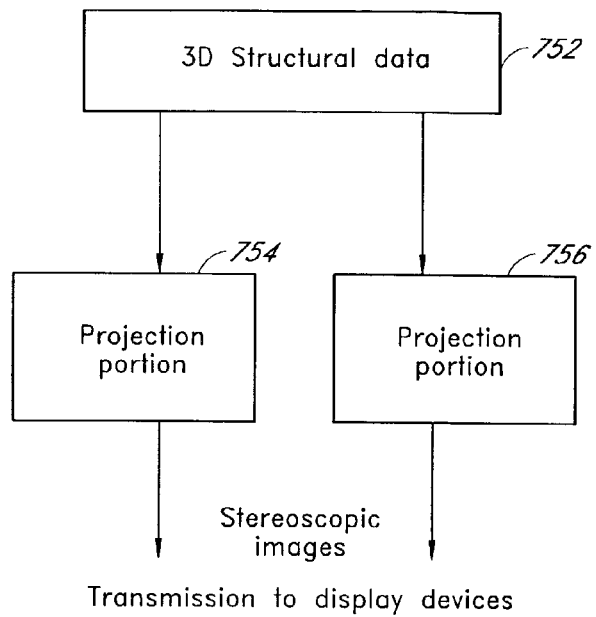
FIGS. 69A and 69B illustrate an exemplary block diagram for explaining the generation of the stereoscopic images from three-dimensional structural data.
Figure 69B:
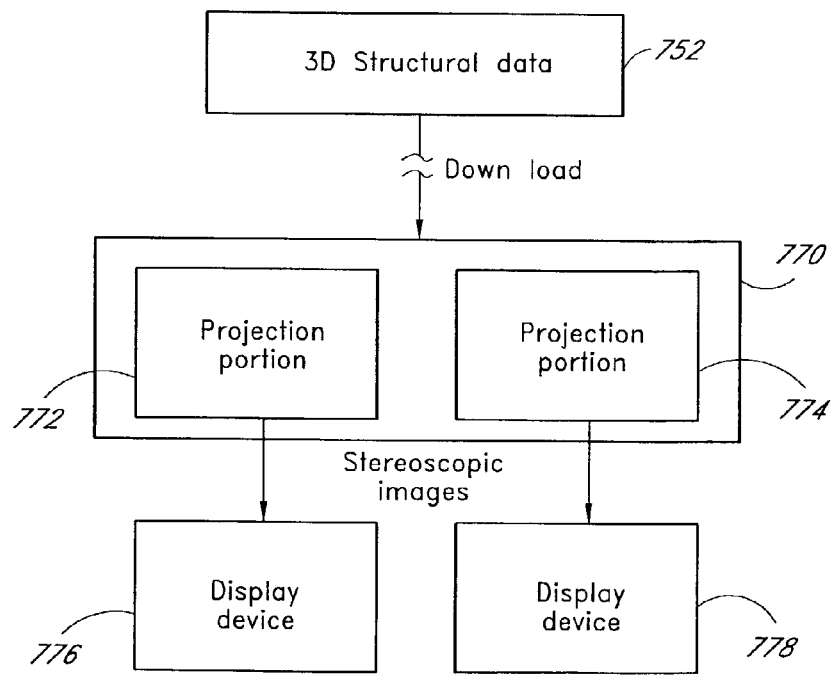

FIG. 69 illustrates a 3D display system according to another aspect of the invention. In this aspect of the invention, stereoscopic images are produced from three-dimensional structural data. The three-dimensional structural data may comprise 3D game data or 3D animation data.

As one example, the three-dimensional structural data comprise pixel values (e.g., RGB pixel values) ranging from, for example, (0000, 0000, 0000) to (9999, 9999, 9999) in the locations from (000,000, 000) to (999, 999, 999) in a 3D coordinate system (x, y, z). In this situation, Table 1 exemplifies data #1–data #N of the 3D structural data.

TABLE 1

| Data #1 in a location | Data #2 in a location | ... Data #N in a location |
|---|---|---|
| (001, 004, 002) | (001, 004, 004) | (025, 400, 087) |
| (0001, 0003, 1348) | (0010, 0033, 1234) | ... (0001, 3003, 1274) |

In one embodiment of the invention, as shown in FIG. 69A, stereoscopic images are produced from three-dimensional structural data 752 in a remote server. The three-dimensional structural data 752 are projected into a pair of two dimensional planes using known projection portions 754 and 756, which are also frequently referred to as imaginary cameras or view points in stereoscopic image display technology. The projection portions may comprise a know software that performs the projection function. These projected images are stereoscopic images, each comprising a pair of two-dimensional plane images that are transmitted to a display site. In the display site, the stereoscopic images are displayed in a pair of display devices.

In another embodiment of the invention, as shown in FIG. 69A, stereoscopic images are produced from three-dimensional structural data in a display site. In this embodiment, the three-dimensional structural data may be transmitted or downloaded from a remote server to the display site. The projection portions 772 and 774 are located in a computing device 770. In one embodiment of the invention, the projection portions 772 and 774 may comprise a software module and be downloaded with the structural data from the remote server to the computing device 770 of the display site. The projected images, i.e., produced stereoscopic images are displayed through a pair of display devices 776 and 778. In another embodiment of the invention, the 3D structural data are stored on a recording medium such as optical disks or magnetic disks and inserted and retrieved in the computing device 770 as discussed with regard to FIG. 62. In this situation, a software module for the projection portions 772 and 774 may be included in the medium.

A method of producing stereoscopic images from the three-dimensional structural data is, for example, disclosed in U.S. Pat. No. 6,005,607, issued Dec. 21, 1999, which is incorporated by reference herein.

This aspect of the invention may be applied to all of the aspects of the invention described above. In some embodiments, however, some modification may be made. As one example, the photographing ratios of the imaginary cameras (projection portions, view points) may be calculated by calculating horizontal and vertical lengths of a photographed object or scene and the distance between the cameras and the object (scene), using the location of the cameras and object in the projected coordinate system.

As another example, the control of the motions of the imaginary cameras may be performed by a computer software that identifies the location of the imaginary cameras and controls the movement of the cameras.

As another example, the control of the space magnification may be performed by adjusting the interval between the imaginary cameras using the identified location of the imaginary cameras in the projected coordinate system.

Figure 70:
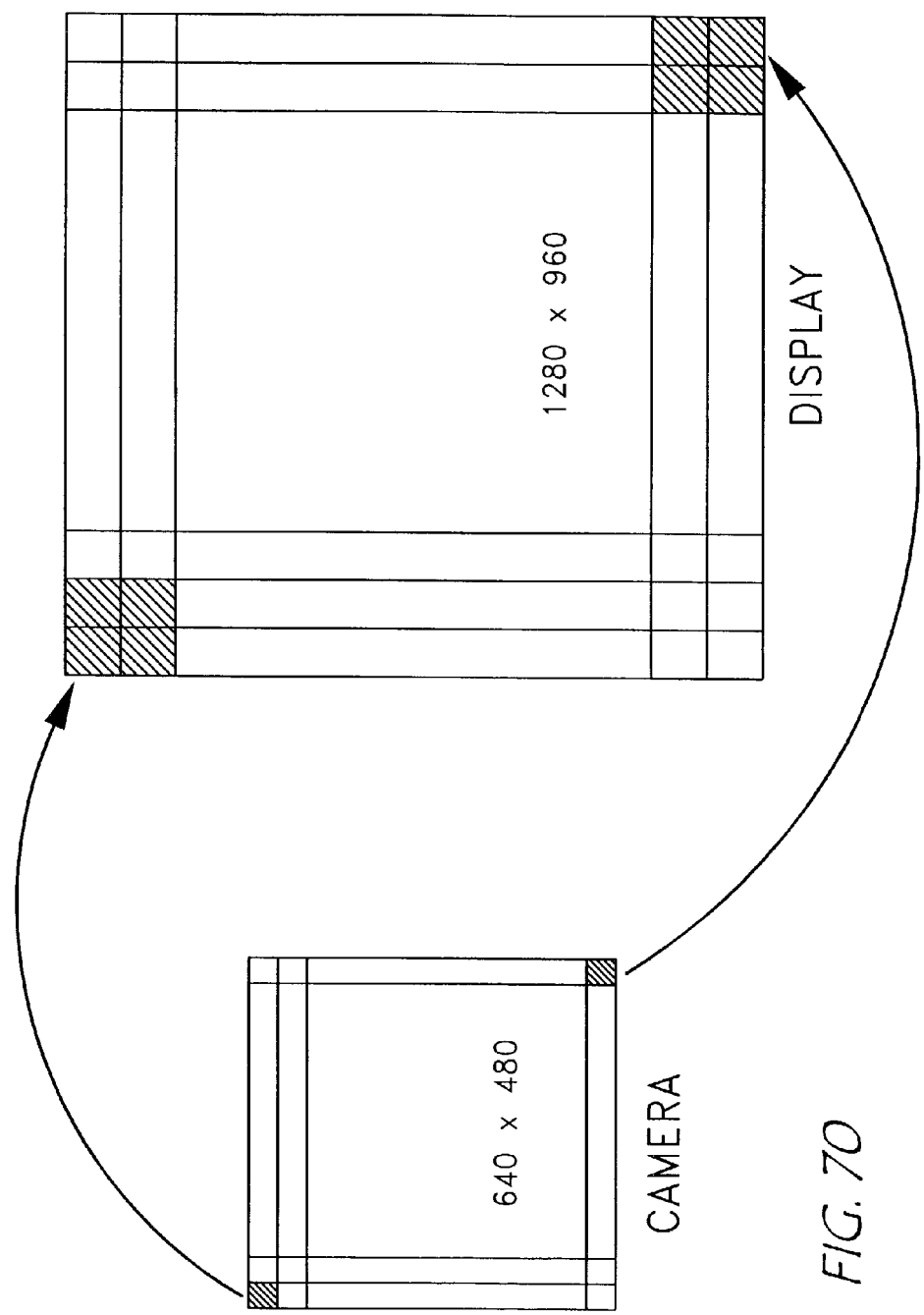
FIG. 70 illustrates a 3D display system for conforming the resolution between the stereoscopic cameras and display devices.

FIG. 70 illustrates a 3D display system according to another aspect of the invention. This aspect of the invention is directed to display stereoscopic images such that the resolution of each display device is substantially the same as that of each stereoscopic camera. In this aspect of the invention, the locations of the pixels that are photographed in each camera with regard to a camera frame (e.g., 640×480) are substantially the same as those of the pixels that are displayed in each display device with regard to a display screen (e.g., 1280×960). Referring to FIG. 70, the resolution of the display device is double that of the camera. Thus, one pixel of the left top corner photographed in the camera is converted to four pixels of the display screen in the same location as shown in FIG. 70. Similarly, one pixel of the right bottom corner photographed in the camera is converted to four pixels of the display screen in the same location as shown in FIG. 70. This aspect of the invention may be applied to all of the 3D display systems described in this application.

The above systems have been described showing a communication location connecting the display to a remote camera site. However, these various inventions can be practiced without a receiver/a transmitter and network so that functions are performed at a single site. Some of the above systems also have been described based on a viewer's eye lens motion or location. However, the systems can be practiced based on a viewer's eye pupils or corneas.

While the above description has pointed out novel features of the invention as applied to various embodiments, the skilled person will understand that various omissions, substitutions, and changes in the form and details of the device or process illustrated may be made without departing from the scope of the invention. Therefore, the scope of the invention is defined by the appended claims rather than by the foregoing description. All variations coming within the meaning and range of equivalency of the claims are embraced within their scope.

What is claimed is:

1. An information communication system, comprising:
a first portable device comprising a pair of stereoscopic cameras and a pair of display screens, the pair of stereoscopic cameras being configured to produce and transmit a first stereoscopic image, the pair of display screens being configured to receive and display a second stereoscopic image; and
a second portable device configured to communicate with the first portable device and comprising a pair of stereoscopic cameras and a pair of display screens, the pair of stereoscopic cameras of the second device being configured to produce and transmit the second stereoscopic image to the first portable device, the pair of display screens of the second device being configured to receive the first stereoscopic image from the first portable device and display the first stereoscopic image;
wherein each of the pairs of stereoscopic cameras is spaced at a predetermined distance apart from each other,
wherein each of the first and second stereoscopic images comprises a pair of two-dimensional plane images produced by each of the pairs of the stereoscopic cameras, respectively,
and wherein at least one of the first and second portable devices further comprises:
an input portion configured to provide the distance ($W_a$) between the center points of a viewer's eyes;
a computing device configured to determine an amount of movement for each of the displayed two-dimensional plane images based on the provided $W_a$ value such that the $W_a$ value is substantially the same as the distance between the center points of the displayed images; and
a display driver configured to move the displayed images based on the determined amount of movement.

2. An information communication system, comprising:
a first portable device comprising a pair of stereoscopic cameras and a pair of display screens, the pair of stereoscopic cameras being configured to produce and transmit a first stereoscopic image, the pair of display screens being configured to receive and display a second stereoscopic image; and
a second portable device configured to communicate with the first portable device and comprising a pair of stereoscopic cameras and a pair of display screens, the pair of stereoscopic cameras of the second device being configured to produce and transmit the second stereoscopic image to the first portable device, the pair of display screens of the second device being configured to receive the first stereoscopic image from the first portable device and display the first stereoscopic image;
wherein each of the pairs of stereoscopic cameras is spaced at a predetermined distance apart from each other,
wherein each of the first and second stereoscopic images comprises a pair of two-dimensional plane images produced by each of the pairs of the stereoscopic cameras, respectively,
and wherein at least one of the first and second portable devices further comprises:
an input portion configured to provide the distance ($W_a$) between the center points of a viewer's eyes;
a computing device configured to determine an amount of movement for each of the displayed two-dimensional images based on the provided $W_a$ value such that the $W_a$ value is substantially the same as the distance between the center points of the displayed images; and
a servo mechanism configured to move the respective display screens based on the determined amount of movement.

3. The system of claim 2, wherein the servo mechanism comprises:
a servo controller configured to determine an adjustment amount based on the determined amount of movement; and
a horizontal motor configured to adjust the distance between the display screens based on the determined adjustment amount.

4. An information communication system, comprising:
a first portable device comprising a pair of stereoscopic cameras and a pair of display screens, the pair of stereoscopic cameras being configured to produce and transmit a first stereoscopic image, the pair of display screens being configured to receive and display a second stereoscopic image; and
a second portable device configured to communicate with the first portable device and comprising a pair of stereoscopic cameras and a pair of display screens, the pair of stereoscopic cameras of the second device being configured to produce and transmit the second stereoscopic image to the first portable device, the pair of display screens of the second device being configured to receive the first stereoscopic image from the first portable device and display the first stereoscopic image;
wherein each of the pairs of stereoscopic cameras is spaced at a predetermined distance apart from each other,
wherein each of the first and second stereoscopic images comprises a pair of two-dimensional plane images produced by each of the pairs of the stereoscopic cameras, respectively,
and wherein at least one of the first and second portable devices comprises:
an input portion configured to provide adjusting data for space magnification, the space magnification relating to a size of a scene that is imaged by one of the pairs of stereoscopic cameras; and
a camera control portion configured to adjust the distance between the one pair of stereoscopic cameras based on the provided adjusting data.

5. An information communication system, comprising:
a first portable device comprising a pair of stereoscopic cameras and a pair of display screens, the pair of stereoscopic cameras being configured to produce and transmit a first stereoscopic image, the pair of display screens being configured to receive and display a second stereoscopic image; and a second portable device configured to communicate with the first portable device and comprising a pair of stereoscopic cameras and a pair of display screens, the pair of stereoscopic cameras of the second device being configured to produce and transmit the second stereoscopic image to the first portable device, the pair of display screens of the second device being configured to receive the first stereoscopic image from the first portable device and display the first stereoscopic image;

wherein each of the pairs of stereoscopic cameras is spaced at a predetermined distance apart from each other, wherein each of the first and second stereoscopic images comprises a pair of two-dimensional plane images produced by each of the pairs of the stereoscopic cameras, respectively, and wherein each of the first and second portable devices comprises:

a receiver configured to receive adjusting data for space magnification, the space magnification relating to a size of a scene that is imaged by one of the pairs of stereoscopic cameras; and a camera control portion configured to adjust the distance between the one pair of stereoscopic cameras based on the received adjusting data.

6. The system of claim 5, wherein at least one of the first and second portable devices is configured to display the received space magnification adjusting data.

7. The system of claim 5, wherein at least one of the first and second portable devices comprises a voice providing portion that provides a voice signal representing the received space magnification adjusting data.

8. An information communication system, comprising:

a first portable device comprising a pair of stereoscopic cameras and a pair of display screens, the pair of stereoscopic cameras being configured to produce and transmit a first stereoscopic image, the pair of display screens being configured to receive and display a second stereoscopic image; and a second portable device configured to communicate with the first portable device and comprising a pair of stereoscopic cameras and a pair of display screens, the pair of stereoscopic cameras of the second device being configured to produce and transmit the second stereoscopic image to the first portable device, the pair of display screens of the second device being configured to receive the first stereoscopic image from the first portable device and display the first stereoscopic image;

wherein each of the pairs of stereoscopic cameras is spaced at a predetermined distance apart from each other, wherein each of the first and second stereoscopic images comprises a pair of two-dimensional plane images produced by each of the pairs of the stereoscopic cameras, respectively, and wherein each of the first and second portable devices comprises:

an input portion configured to provide adjusting data for space magnification, the space magnification relating to a size of a scene that is imaged in one of the first and second portable devices; and a transmitter configured to transmit the space magnification adjusting data to the other portable device.

9. An information communication system, comprising:

a first portable device comprising a pair of stereoscopic cameras and a pair of display screens, the pair of stereoscopic cameras being configured to produce and transmit a first stereoscopic image, the pair of display screens being configured to receive and display a second stereoscopic image; and a second portable device configured to communicate with the first portable device and comprising a pair of stereoscopic cameras and a pair of display screens, the pair of stereoscopic cameras of the second device being configured to produce and transmit the second stereoscopic image to the first portable device, the pair of display screens of the second device being configured to receive the first stereoscopic image from the first portable device and display the first stereoscopic image;

wherein each of the pairs of stereoscopic cameras is spaced at a predetermined distance apart from each other, wherein each of the first and second stereoscopic images comprises a pair of two-dimensional plane images produced by each of the pairs of the stereoscopic cameras, respectively, wherein the first portable device is configured to transmit the first stereoscopic image, and first and second photographing ratios (A1:B1:C1, A2:B2:C2) for the image produced in the first portable device to the second device, respectively, wherein A1 and A2, and B1 and B2 are defined as horizontal and vertical lengths of a scene imaged by the stereoscopic cameras of the first device, respectively, and C1 and C2 are defined as distances between object lenses of the stereoscopic cameras and the scene, respectively; and wherein the second device is configured to receive and display the received image such that each screen ratio (D1:E1:F1, D2:E2:F2) of the display screens of the second device is substantially the same as each photographing ratio (A1:B1:C1, A2:B2:C2), wherein D1 and D2, and E1 and E2 are defined as horizontal and vertical lengths of the two-dimensional plane images displayed in each of the display screens of the second device, respectively, and F1 and F2 are defined as distances between the display screens of the second device and viewing points.

10. The system of claim 9, wherein the viewing points comprise points where each of a viewer's eyes is located at a substantially perpendicular angle with regard to the center points of the displayed images, respectively.

11. A portable communication apparatus, comprising:

a pair of stereoscopic cameras configured to produce a stereoscopic image of a first scene;

a transmitter configured to transmit the first stereoscopic image;

a receiver configured to receive a stereoscopic image of a second scene different from the first scene;

a pair of display screens configured to display the image of the second scene, wherein each stereoscopic image comprises a pair of two-dimensional plane images;

an input portion configured to provide the distance ($W_a$) between the center points of a viewer's eyes;

a computing device configured to determine an amount of movement for the displayed two-dimensional plane images based on the provided $W_a$ value such that the $W_a$ value is substantially the same as the distance between the center points of the displayed images; and a display driver configured to move the pair of displayed images based on the determined amount of movement.

12. A portable communication apparatus, comprising:
a pair of stereoscopic cameras configured to produce a stereoscopic image of a first scene;
a transmitter configured to transmit the first stereoscopic image;
a receiver configured to receive a stereoscopic image of a second scene different from the first scene;
a pair of display screens configured to display the image of the second scene, wherein each stereoscopic image comprises a pair of two-dimensional plane images;
an input portion configured to provide the distance ($W_a$) between the center points of a viewer's eyes;
a computing device configured to determine an amount of movement for the displayed two-dimensional plane images based on the $W_a$ value such that the $W_a$ value is substantially the same as the distance between the center points of the displayed images; and
a servo mechanism configured to move the pair of display screens based on the determined amount of movement.

13. The apparatus of claim 12, wherein the servo mechanism comprises:
a servo controller configured to determine an adjust amount based on the determined amount of movement; and
a horizontal motor configured to adjust the distance between the display screens based on the determined adjust amount.

14. A portable communication apparatus, comprising:
a pair of stereoscopic cameras configured to produce a stereoscopic image of a first scene;
a transmitter configured to transmit the first stereoscopic image;
a receiver configured to receive a stereoscopic image of a second scene different from the first scene;
a pair of display screens configured to display the image of the second scene, wherein each stereoscopic image comprises a pair of two-dimensional plane images;
an input device configured to provide adjusting data for space magnification, the space magnification relating to a size of a scene to be imaged by the stereoscopic cameras; and
a camera control portion configured to adjust the distance between the stereoscopic cameras based on the provided adjusting data.

15. A portable communication apparatus, comprising:
a pair of stereoscopic cameras configured to produce a stereoscopic image of a first scene;
a transmitter configured to transmit the first stereoscopic image;
a receiver configured to receive a stereoscopic image of a second scene different from the first scene;
a pair of display screens configured to display the image of the second scene, wherein each stereoscopic image comprises a pair of two-dimensional plane images;
a receiver configured to receive adjusting data for space magnification, the space magnification relating to a size of a scene to be imaged by the pair of stereoscopic cameras; and
a camera control portion configured to adjust the distance between the pair of stereoscopic cameras based on the received adjusting data.

16. A portable communication apparatus, comprising:
a pair of stereoscopic cameras configured to produce a stereoscopic image of a first scene;
a transmitter configured to transmit the first stereoscopic image;
a receiver configured to receive a stereoscopic image of a second scene different from the first scene;
a pair of display screens configured to display the image of the second scene, wherein each stereoscopic image comprises a pair of two-dimensional plane images;
an input portion configured to provide adjusting data for space magnification, the space magnification relating to a size of a scene to be imaged by another pair of stereoscopic cameras; and
a transmitter configured to transmit the space magnification adjusting data to the another pair of stereoscopic cameras.

17. A portable communication apparatus, comprising:
a pair of stereoscopic cameras configured to produce a stereoscopic image of a first scene;
a transmitter configured to transmit the first stereoscopic image;
a receiver configured to receive a stereoscopic image of a second scene different from the first scene; and
a pair of display screens configured to display the image of the second scene, wherein each stereoscopic image comprises a pair of two-dimensional plane images;
wherein the receiver is configured to receive the stereoscopic image of the second scene, and first and second photographing ratios (A1:B1:C1, A2:B2:C2) for the stereoscopic image of the second scene produced in another pair of stereoscopic cameras, respectively,
wherein A1 and A2, and B1 and B2 are defined as horizontal and vertical lengths of a scene imaged by the another pair of stereoscopic cameras, respectively, and C1 and C2 are defined as distances between object lenses of the another pair of stereoscopic cameras and the scene, respectively; and
wherein the display screens are configured to display the received stereoscopic image such that each screen ratio (D1:E1:F1, D2:E2:F2) of the display screens is substantially the same as each photographing ratio (A1:B1:C1, A2:B2:C2), wherein D1 and D2, and E1 and E2 are defined as horizontal and vertical lengths of the two-dimensional plane images displayed in each of the display screens, respectively, and F1 and F2 are defined as distances between the display screens and viewing points.

18. The apparatus of claim 17, wherein the viewing points comprise points where each of a viewer's eyes is located at a substantially perpendicular angle with regard to the center points of the displayed images, respectively.

* * * * *